(12) United States Patent
Mattathil

(10) Patent No.: US 10,251,416 B2
(45) Date of Patent: Apr. 9, 2019

(54) APPARATUS TO SCRAPE COCONUT

(71) Applicant: PUMATIK SMALL KITCHEN APPLIANCES PRIVATE LIMITED, Karnataka, Bangalore (IN)

(72) Inventor: Wilson Varghese Mattathil, Bangalore (IN)

(73) Assignee: Pumatik Small Kitchen Appliances Private Limited, Bangalore (IN)

( * ) Notice: Subject to any disclaimer, the term of this patent is extended or adjusted under 35 U.S.C. 154(b) by 316 days.

(21) Appl. No.: 15/112,907

(22) PCT Filed: Jan. 24, 2015

(86) PCT No.: PCT/IB2015/050534
§ 371 (c)(1),
(2) Date: Jul. 20, 2016

(87) PCT Pub. No.: WO2015/111005
PCT Pub. Date: Jul. 30, 2015

(65) Prior Publication Data
US 2016/0338399 A1 Nov. 24, 2016

(30) Foreign Application Priority Data

Jan. 25, 2014 (IN) .............................. 314/CHE/2014
Dec. 11, 2014 (IN) ............................ 6244/CHE/2014

(51) Int. Cl.
A23N 5/03 (2006.01)
(52) U.S. Cl.
CPC ...................................... *A23N 5/03* (2013.01)
(58) Field of Classification Search
CPC ....................................................... A23N 5/03
See application file for complete search history.

(56) References Cited

U.S. PATENT DOCUMENTS 1,438,714 A   12/1922  Olds, Jr.
1,554,516 A    9/1925  Olds, Jr.
(Continued)

FOREIGN PATENT DOCUMENTS

CA     2282786 A1    3/2001
CN   203762241 U     8/2014
(Continued)

OTHER PUBLICATIONS

International Search Report and Written Opinion of the International Searching Authority from the Indian Patent Office for Application No. PCT/IB2015/050534, dated Jun. 10, 2015.

*Primary Examiner* — Anthony J Weier
(74) *Attorney, Agent, or Firm* — Young Basile Hanlon & MacFarlane, P.C.

(57) ABSTRACT

The present disclosure provides an apparatus to scrape to extract coconut meat from a half coconut with minimal human intervention and convenient to use. The apparatus to scrape coconut generally includes 1. Variable-Width-Scraper-Apparatus which considers and accommodates the variability in width of a half coconut and scrapes it accordingly, 2. Vertical-Movement-Control-Apparatus which considers and accommodates the variability in length of a half coconut and moves the Variable-Width-Scraper-Apparatus length-wise through the half coconut to scrape the half coconut fully, 3. Variable-Opening-Entry-Mechanism which considers and accommodates the variability in the diameter of the cut face opening of half coconut and guides the entry of the Variable-Width-Scraper-Apparatus into the half coconut optimally, 3.1. Scraped-coconut-meat-expeller which expels the scraped coconut meat from the scraping area so that it can be collected efficiently. 4. Coconut-holding-mechanism which optimally holds the half coconut to be scraped and 5. Optimal-Operations-Mechanism which con- (Continued)

trols the starting, scraping and stopping process of the overall apparatus to scrape coconut.

29 Claims, 110 Drawing Sheets

(56) References Cited

U.S. PATENT DOCUMENTS

| | | | |
|---|---|---|---|
| 1,554,571 A | | 9/1925 | Gentel |
| 1,645,600 A | | 10/1927 | Kohler |
| 2,190,105 A | * | 2/1940 | Mock ............... A47J 25/00 |
| | | | 241/277 |
| 2,365,358 A | * | 12/1944 | Rector ............... A23N 5/03 |
| | | | 15/104.09 |
| 2,633,883 A | | 4/1953 | Hernandez et al. |
| 3,191,651 A | * | 6/1965 | Sindel ............... A23N 5/03 |
| | | | 426/481 |
| 4,162,811 A | | 7/1979 | Hobbs |
| 4,350,088 A | * | 9/1982 | Rubio, Jr. ............... A23N 5/03 |
| | | | 99/538 |
| D335,615 S | | 5/1993 | Gerstein |

FOREIGN PATENT DOCUMENTS

| | | | |
|---|---|---|---|
| FR | 2201046 | * | 5/1974 |
| FR | 2619497 | * | 2/1989 |
| FR | 2672474 A1 | | 8/1992 |
| IN | 1885/CHE/2008 | | 11/2008 |

\* cited by examiner

APPARATUS TO SCRAPE COCONUT

TECHNICAL FIELD

The present disclosure relates generally to a scraping apparatus and more specifically it relates to an apparatus to scrape coconut meat to extract it from a half coconut with minimal manual intervention.

BACKGROUND

Coconut is the fruit of the coconut palm. It is made up of a thick fibrous fruit coat known as husk, underneath lies the hard protective endocarp or shell (hereafter called shell). Lining the inside of the shell is a white endosperm or 'coconut-meat' (hereafter called Coconut-meat). The Coconut-meat of a matured nut is the most precious product and used in many ways. One of the challenges in using the Coconut-meat is the extraction of the Coconut-meat from inside the shell. Scraping the Coconut-meat is one of the ways to extract Coconut-meat lining the inside of a shell wherein the Coconut-meat is scraped out from inside the shell of a half coconut. This act is called scraping a coconut or scrape a coconut. For scraping a coconut, a reasonably matured coconut is de-husked (fiber removed) and made to two halves and each half is scraped.

The shape of a full coconut varies from elongated, oval to spherical in shape with variation in length and width. It is also not geometrically perfect elongation, oval or spherical in shape but only approximate with variations. For a half coconut the length and width varies across coconuts. For a half coconut the width/diameter of the cut face (or opening) also varies due to the variability of the width of coconuts. Due to this variability in shape, length and width, it is a challenge to create a scraping apparatus which uses less human intervention to scrape a coconut. Presently available coconut scrapers which scrape to extract Coconut-meat lining the inside of the shell of a half coconut are more manual in nature. A half coconut is held by hand and manipulated to move the Coconut-meat against a sharp serrated blade. This is manually intensive, poses risk of injury to hand, inconvenient and not very efficient.

In light of foregoing discussion it is desirable to have a coconut scraping apparatus which reduces manual intervention to the minimum, reduces risk of injury, convenient to use and increases efficiency.

SUMMARY

The present disclosure generally relates to a scraping apparatus and, more specifically it relates to an apparatus to scrape to extract Coconut-meat from a half coconut with minimal human intervention. For scraping purposes, the coconut is made by cutting or other means to two halves across the length. For a half coconut, if we consider the cut face as the horizontal plane, vertical height or length would be the perpendicular distance from this horizontal plane or cut face to the opposite end of the half coconut. For a half coconut there is variability in the width across coconuts as well as width changes along the perpendicular length from the horizontal plane or cut face of a half coconut. Also for a half coconut there is variability in the vertical height across coconuts. Thus in view of the width being variable across coconuts, the diameter of the cut face (or opening) is also variable across coconuts.

The structural features of the present disclosure includes:
1. Variable-Width-Scraper-Apparatus: This apparatus considers and accommodates the variability in width within a horizontal plane of a half coconut and scrapes it accordingly.
2. Vertical-Movement-Control-Apparatus: This apparatus considers and accommodates the variability in length or vertical height of half coconuts and moves the Variable-Width-Scraper-Apparatus in vertical direction or lengthwise through the half coconut to scrape accordingly.
3. Variable-Opening-Entry-Mechanism: This mechanism considers and accommodates the variability in the diameter of the cut face (or opening) of half coconuts and guides the entry of the Variable-Width-Scraper-Apparatus into the half coconut optimally.
3.1. Scraped-coconut-meat-expeller: This mechanism expels the scraped Coconut-meat from the scraping area so that it can be collected efficiently.
4. Coconut-holding-mechanism: Coconut-holding-mechanism ensures that the coconut is securely held in place while being scraped.
5. Optimal-Operations-Mechanism: The half coconut needs to be scraped for a certain amount of time and then stopped when the scraping is completed. This mechanism controls the starting process, scraping process and the stopping process of the overall apparatus to scrape coconut.

Variable-Width-Scraper-Apparatus is connected to a motor and it rotates to scrape the Coconut-meat within a horizontal plane. Vertical-Movement-Control-Apparatus moves the Variable-Width-Scraper-Apparatus vertically up and down through the half coconut to scrape all the horizontal planes within the height of the given half coconut. This combines the horizontal scraping to the vertical movement resulting in the whole half coconut being scraped. Variable-Opening-Entry-Mechanism guides the Variable-Width-Scraper-Apparatus to enter the cut face of the half coconut optimally. When the half coconut is being scraped the half coconut is held in place by the Coconut-holding-mechanism. Optimal-Operations-Mechanism optimally controls the starting, scraping and stopping processes.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways, as can be perceived by a person skilled in the art. Also, it is to be understood that the phraseology and terminology employed herein are for the purposes of the description and should not be regarded as limiting in nature.

It is a primary object of the present invention to provide an apparatus to scrape Coconut-meat to extract it from a half coconut with minimal manual intervention.

It is another object of the present invention to provide apparatus to scrape coconut that reduces risk of injury while scraping.

It is yet another object of the present invention to provide apparatus to scrape coconut that is convenient to use.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE ACCOMPANYING DRAWINGS

Various other objects, features and attendant advantages of the present invention will be fully appreciated as the same becomes better understood when considered in conjunction with the accompanying drawings, in which like reference characters designate the same or similar parts throughout the several views, and wherein.

Figure 6:
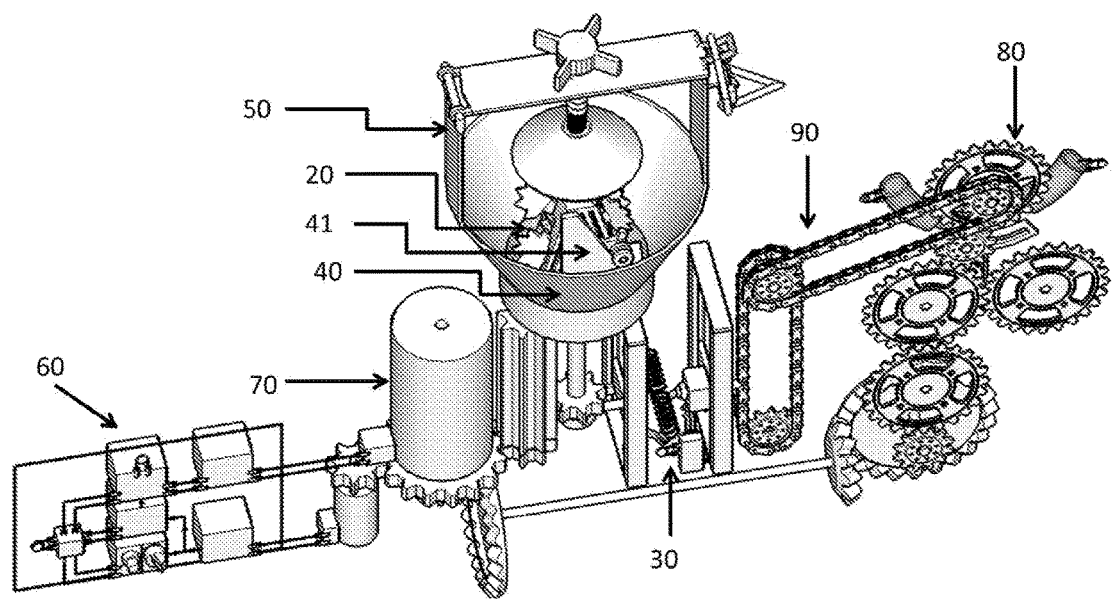

FIG. 6 a front left upper perspective view of apparatus to scrape coconut.

Figure 6A:
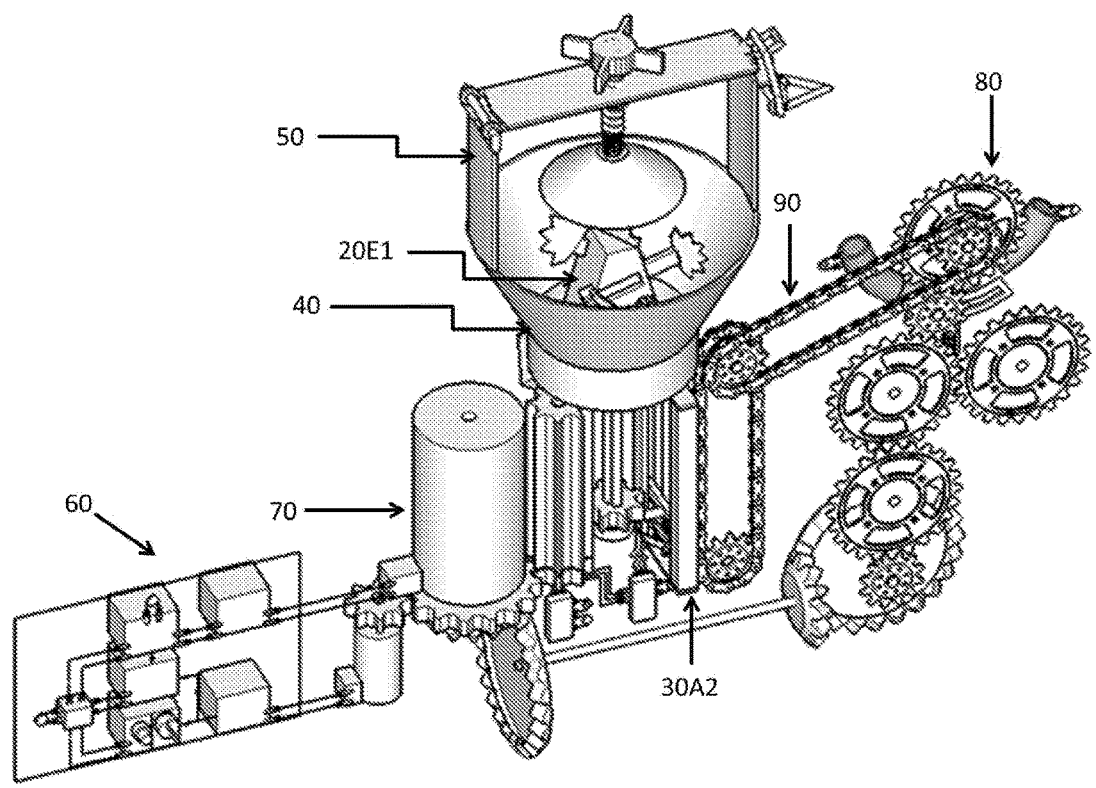

FIG. 6a a front left upper perspective view of preferred embodiment of apparatus to scrape coconut.

Figure 7:
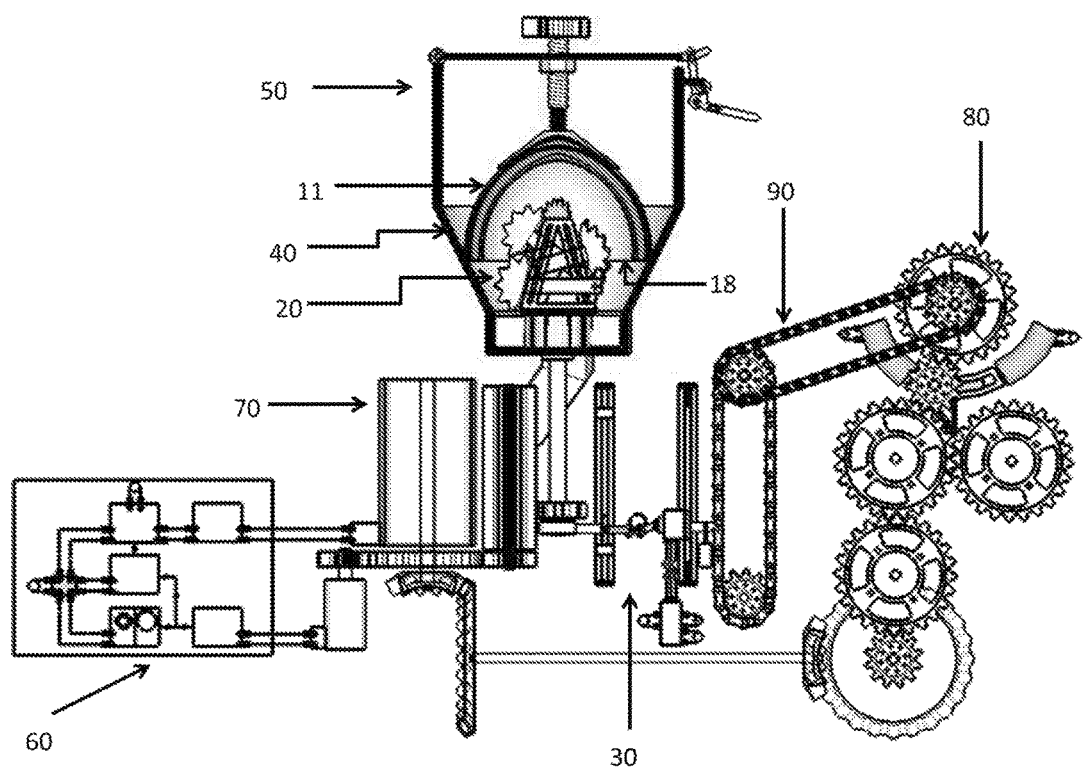

FIG. 7 is a cross section of front elevation view of apparatus to scrape coconut with half-coconut placed inside focusing on Variable-Width-Scraper-Apparatus.

Figure 7A:
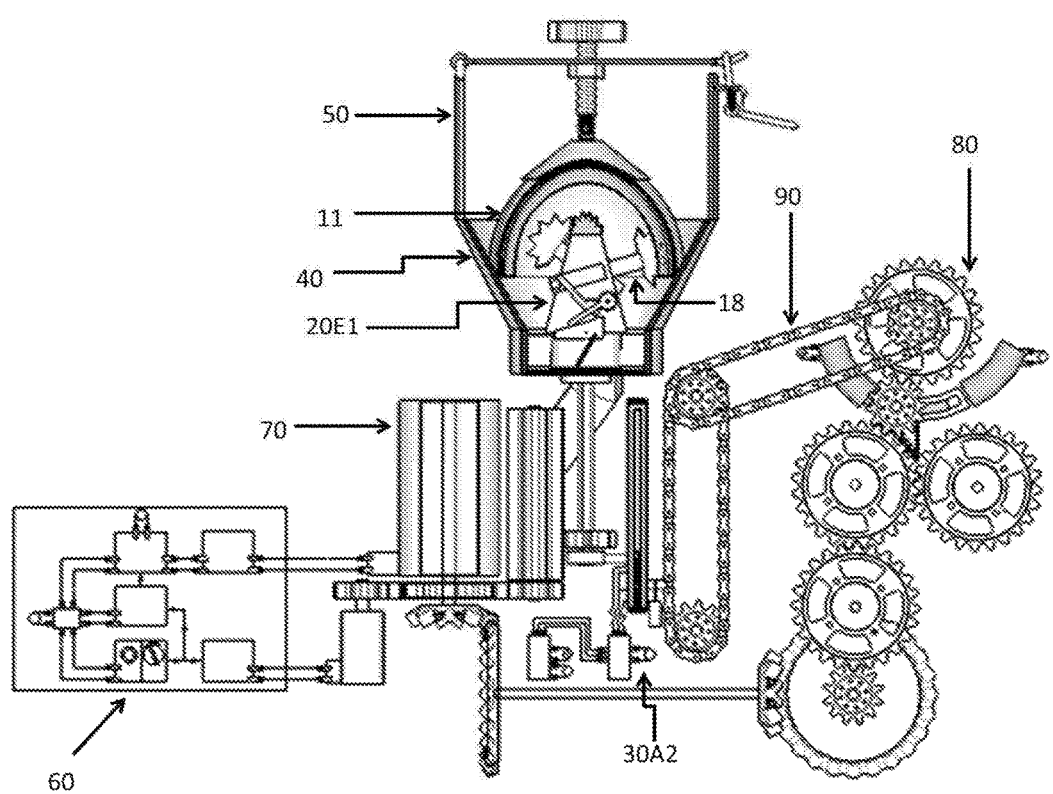

FIG. 7a is a cross section of front elevation view of preferred embodiment of apparatus to scrape coconut with half-coconut placed in inside focusing on Variable-Width-Scraper-Apparatus.

Figure 8:
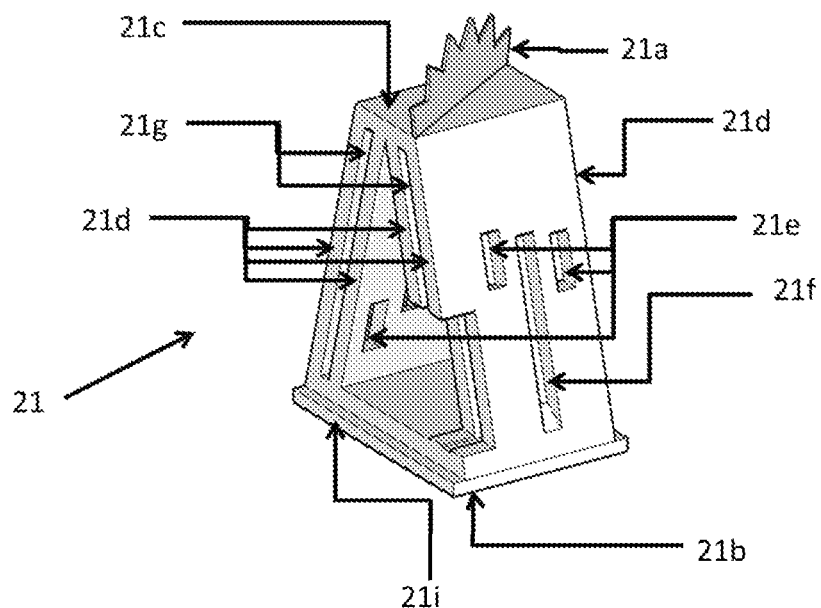

FIG. 8 is a front right upper perspective view of body of Variable-Width-Scraper-Apparatus.

Figure 9:
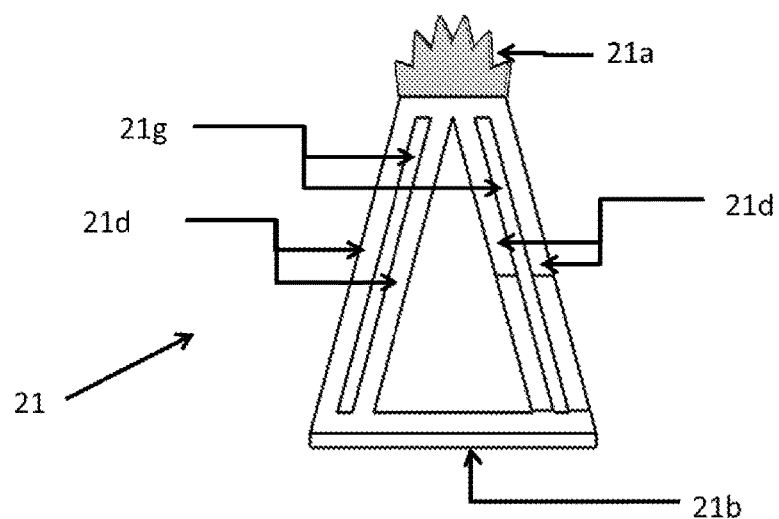

FIG. 9 is a front elevation view of body of Variable-Width-Scraper-Apparatus.

Figure 10:
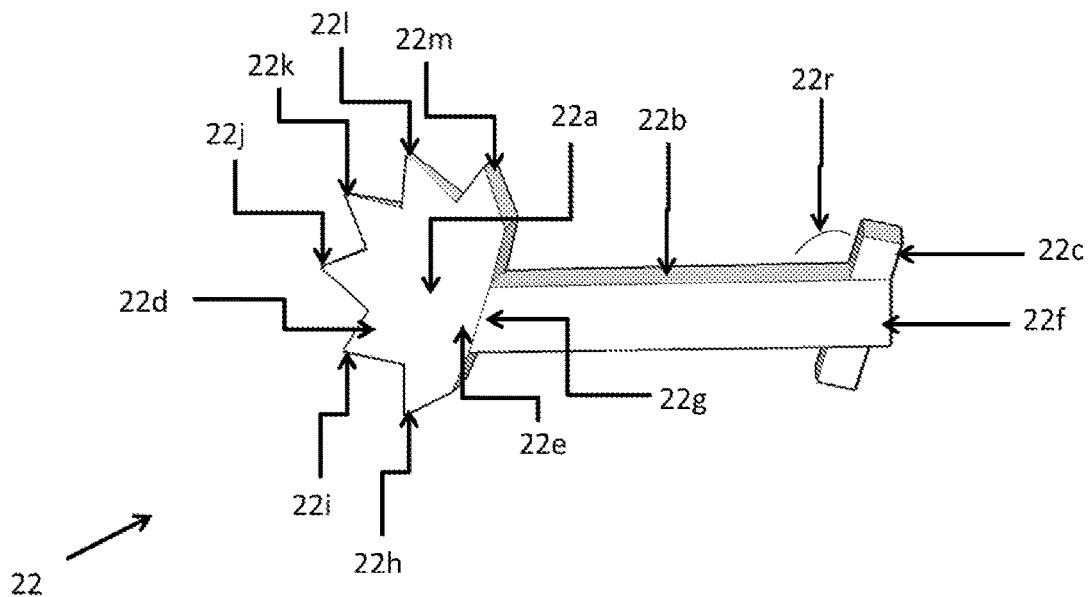

FIG. 10 is front upper perspective view of blade of Variable-Width-Scraper-Apparatus.

Figure 11:
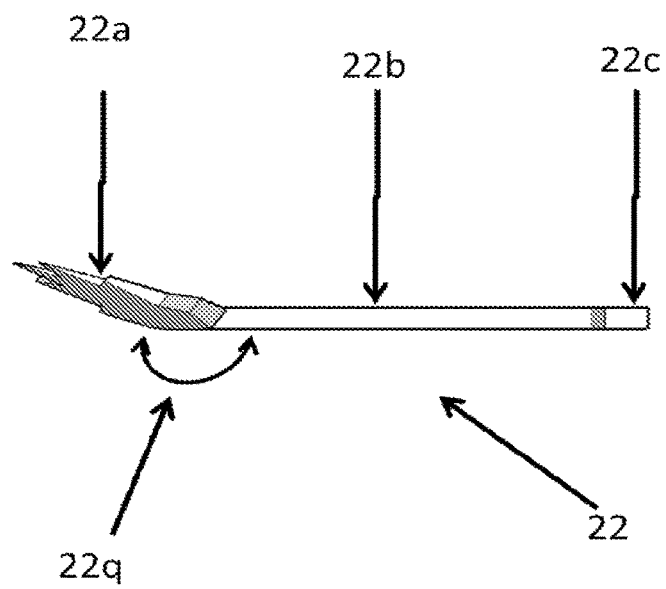

FIG. 11 is a top plan view of blade of Variable-Width-Scraper-Apparatus.

Figure 12:
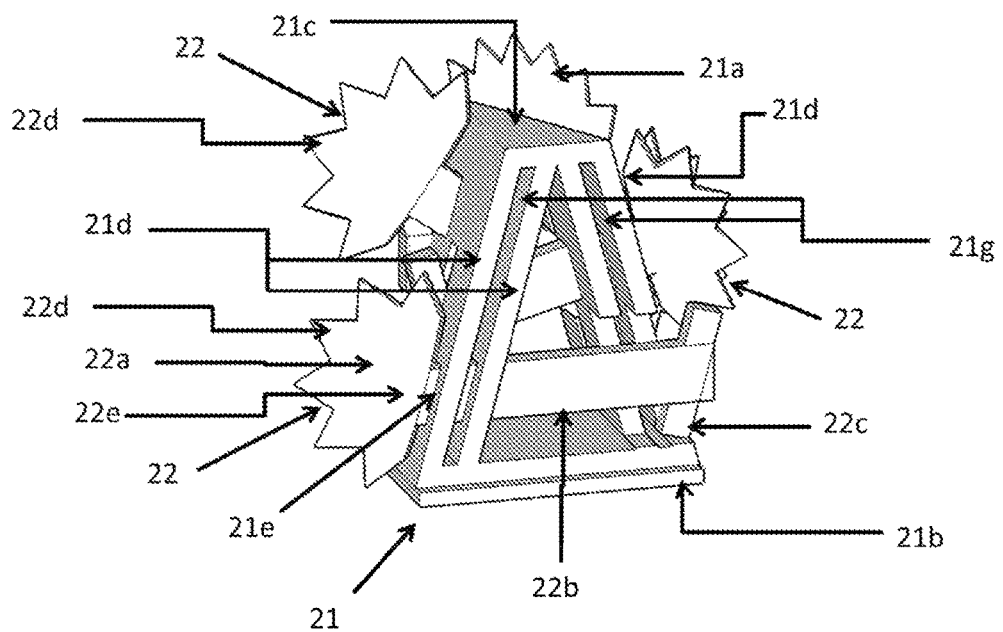

FIG. 12 is a front left upper perspective view of body and four blades assembled together as part of Variable-Width-Scraper-Apparatus.

Figure 13:
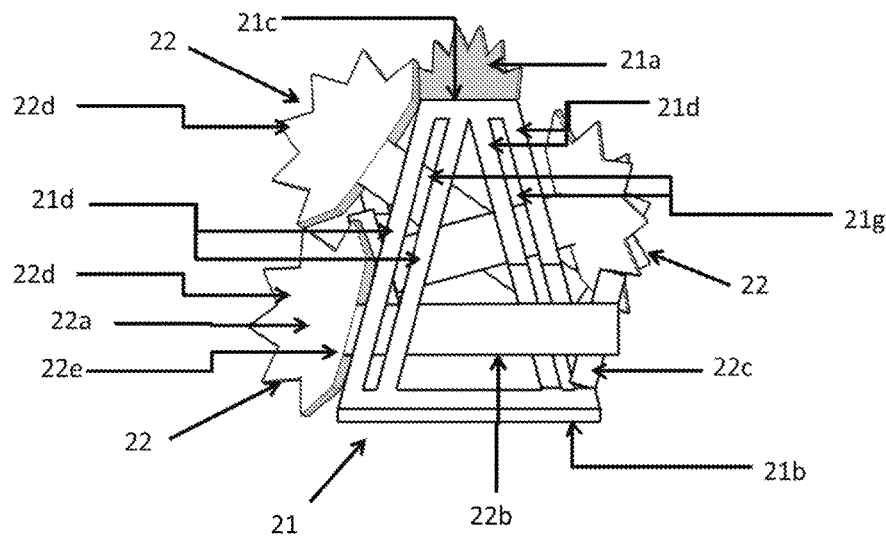

FIG. 13 is a front elevation view of body and four blades assembled together as part of Variable-Width-Scraper-Apparatus.

Figure 14:
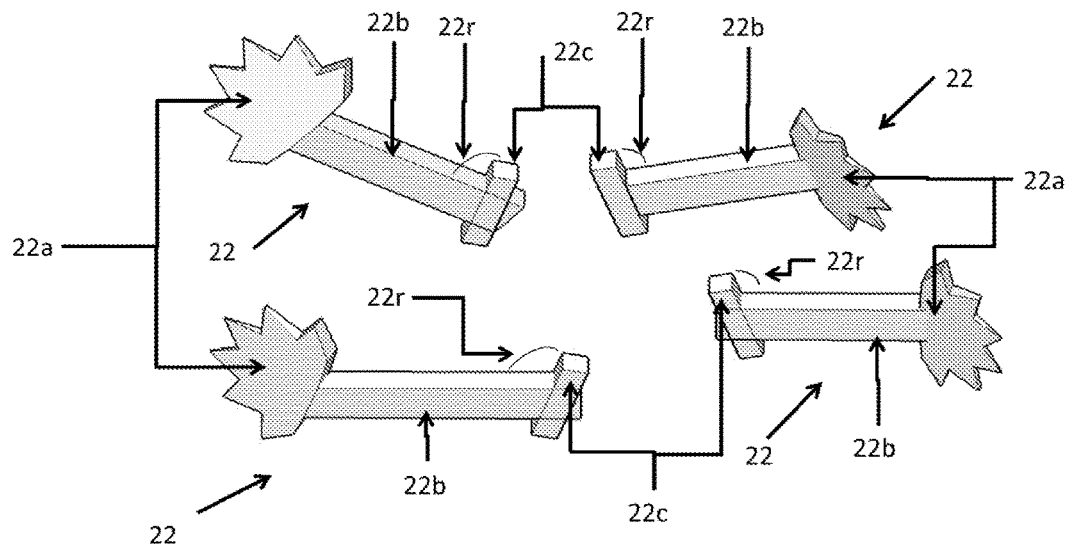

FIG. 14 is a front upper perspective view of four variations of blade to be assembled as part of Variable-Width-Scraper-Apparatus.

Figure 15:
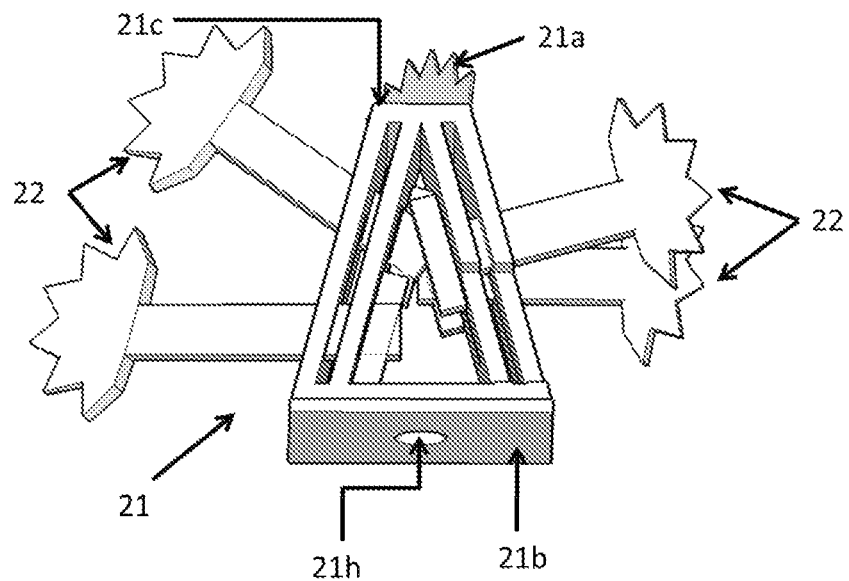

FIG. 15 is a front lower perspective view of body and four blades assembled together as part of Variable-Width-Scraper-Apparatus showing how the blades can move radially outward from the body.

Figure 16:
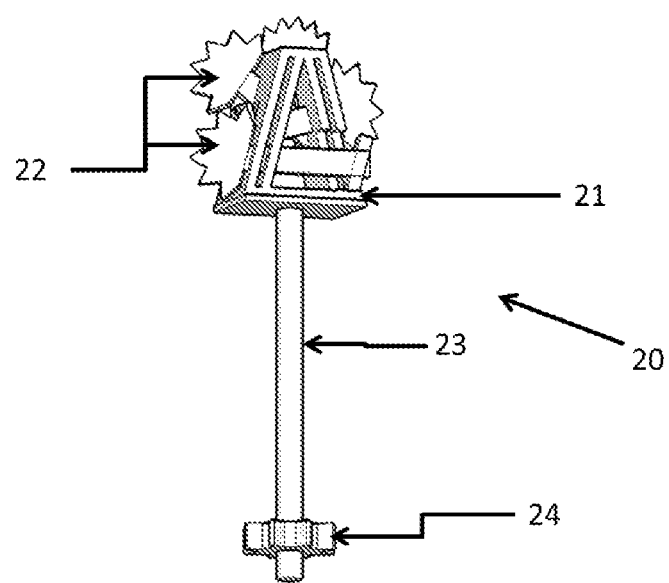

FIG. 16 is a front lower perspective view of Variable-Width-Scraper-Apparatus.

Figure 17:
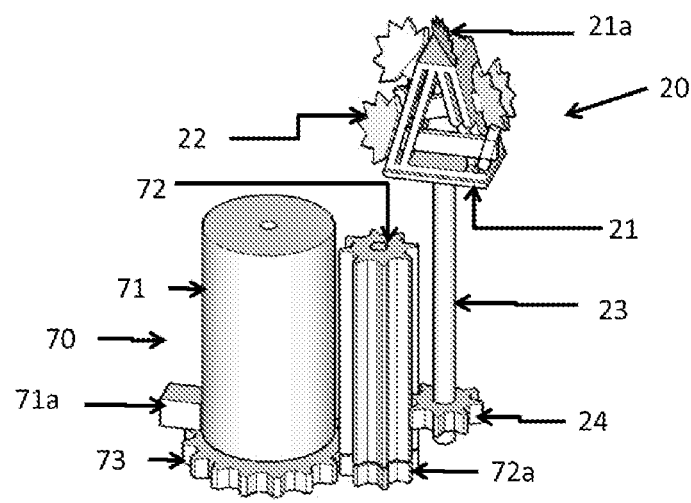

FIG. 17 is a front upper perspective view of Variable-Width-Scraper-Apparatus configured with Motor-and-driving-gears.

Figure 18:
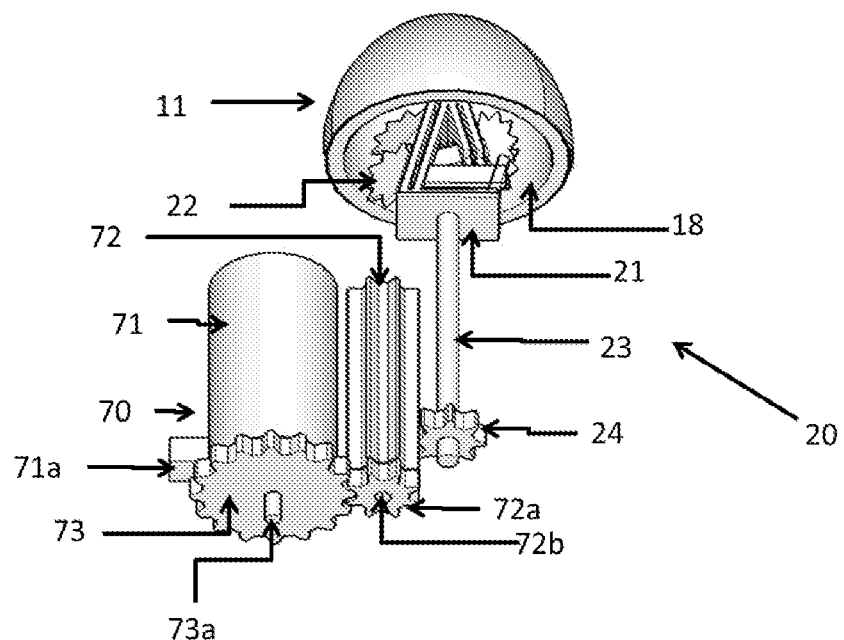

FIG. 18 is a front lower perspective view of Variable-Width-Scraper-Apparatus connected to main motor through gears with a half-coconut placed in position for being scraped.

Figure 19:
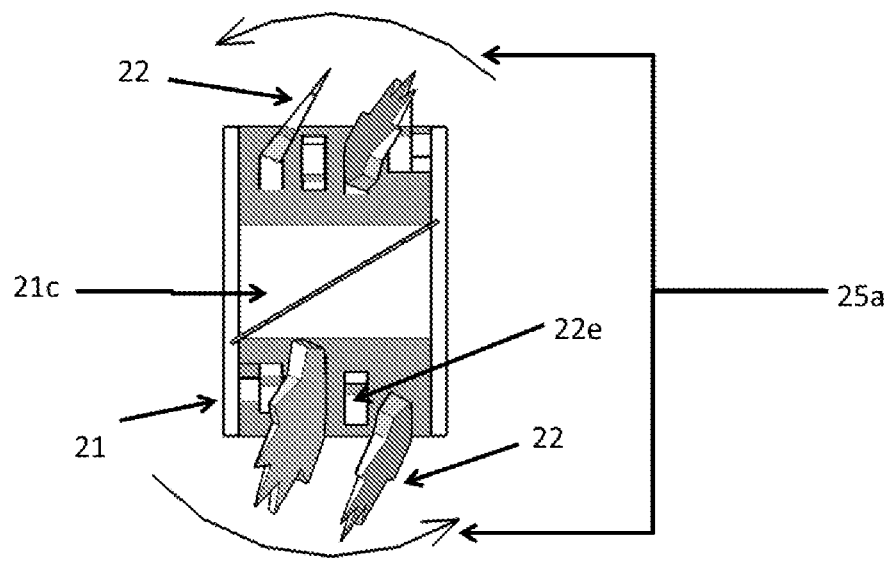

FIG. 19 is a top plan view of body and four blades assembled together showing direction of rotation as part of Variable-Width-Scraper-Apparatus.

Figure 20:
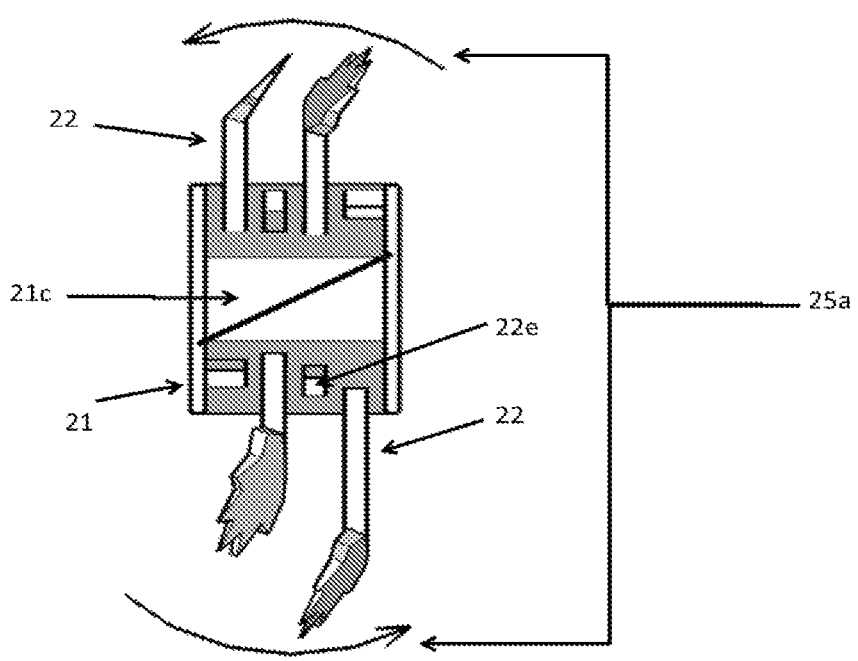

FIG. 20 is a top plan view of body and four blades assembled together as part of Variable-Width-Scraper-Apparatus showing the blades move outward from body due to rotation.

Figure 21:
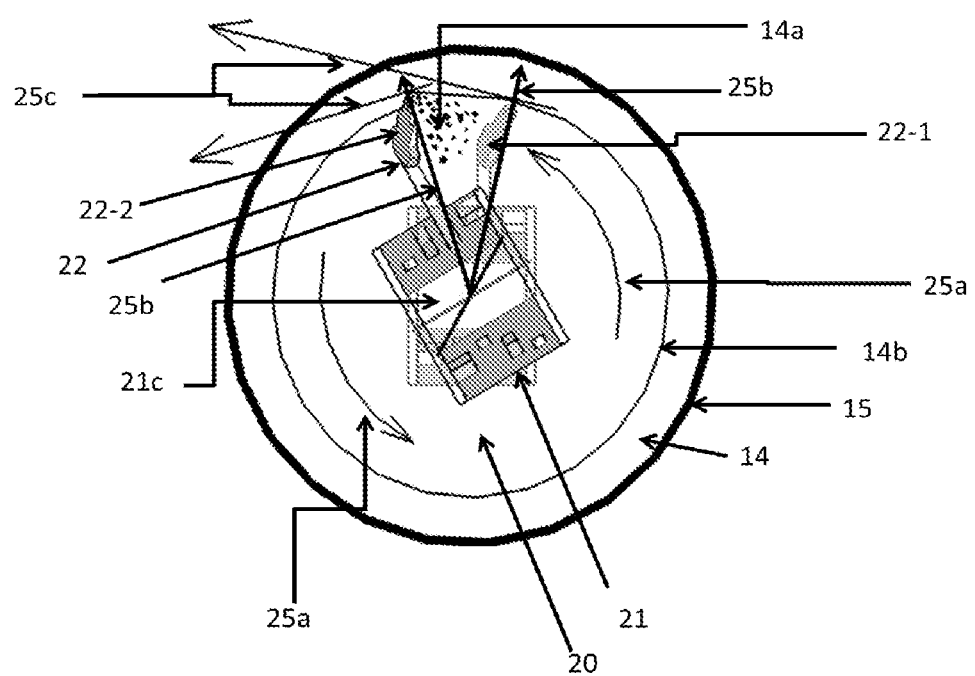

FIG. 21 is a top plan view of rotating Variable-Width-Scraper-Apparatus showing how Coconut-meat is scraped by focusing on two rotational positions of a single blade and the tangential force applied by the blade on the Coconut-meat due to rotation.

Figure 22:
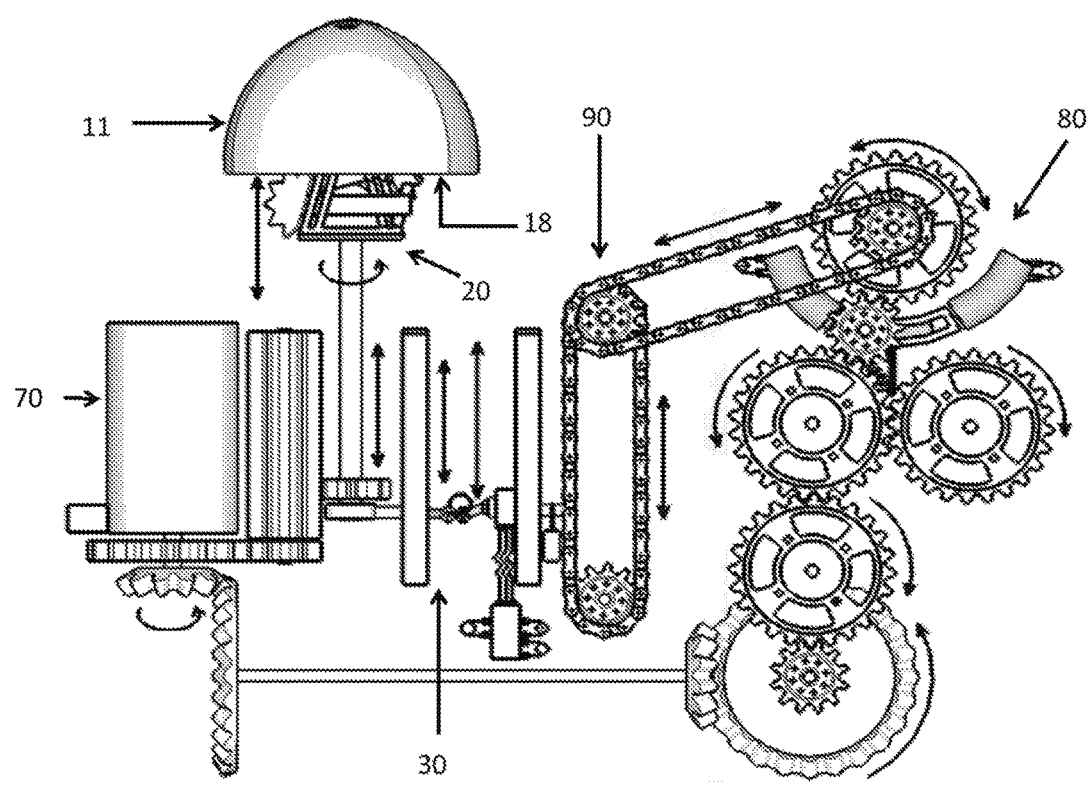

FIG. 22 is a front elevation view of Variable-Width-Scraper-Apparatus, Vertical-Movement-Control-Apparatus and its supporting parts with half-coconut in position to be scraped and arrows for directions of motion.

Figure 23:
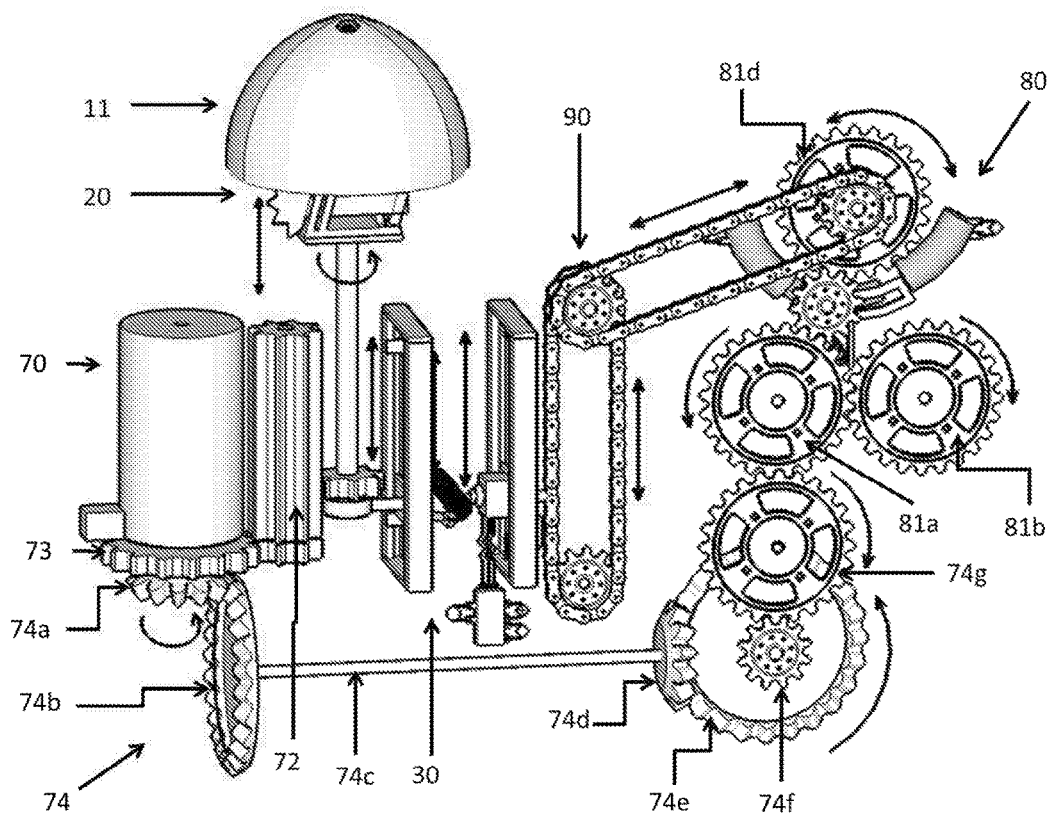

FIG. 23 is a front left upper perspective view of Variable-Width-Scraper-Apparatus, Vertical-Movement-Control-Apparatus and its supporting parts with half-coconut in position to be scraped and arrows for directions of motion.

Figure 24:
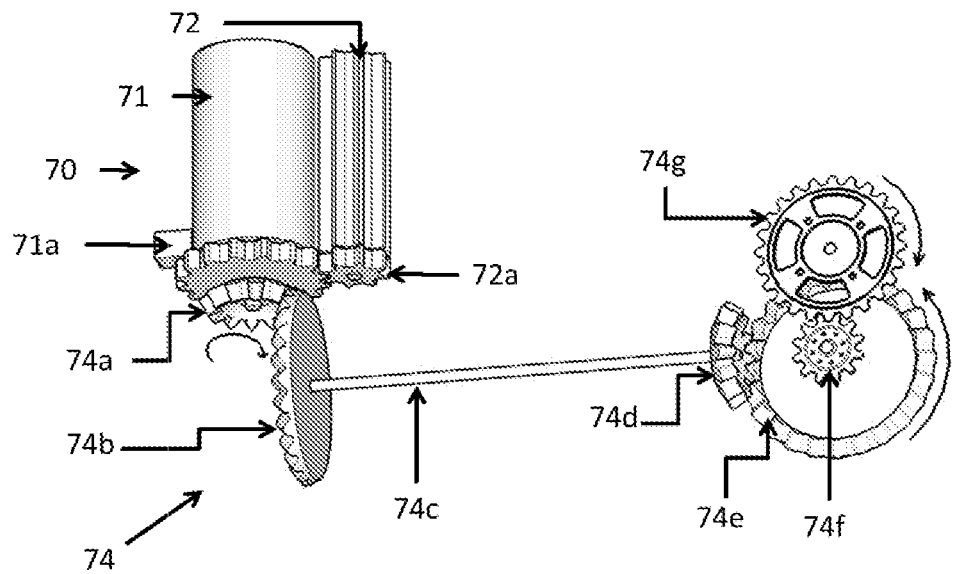

FIG. 24 is a front lower perspective view of Motor-and-driving-gears and Gear-system used to power the rotational and vertically up and down motion of apparatus to scrape coconut.

Figure 25:
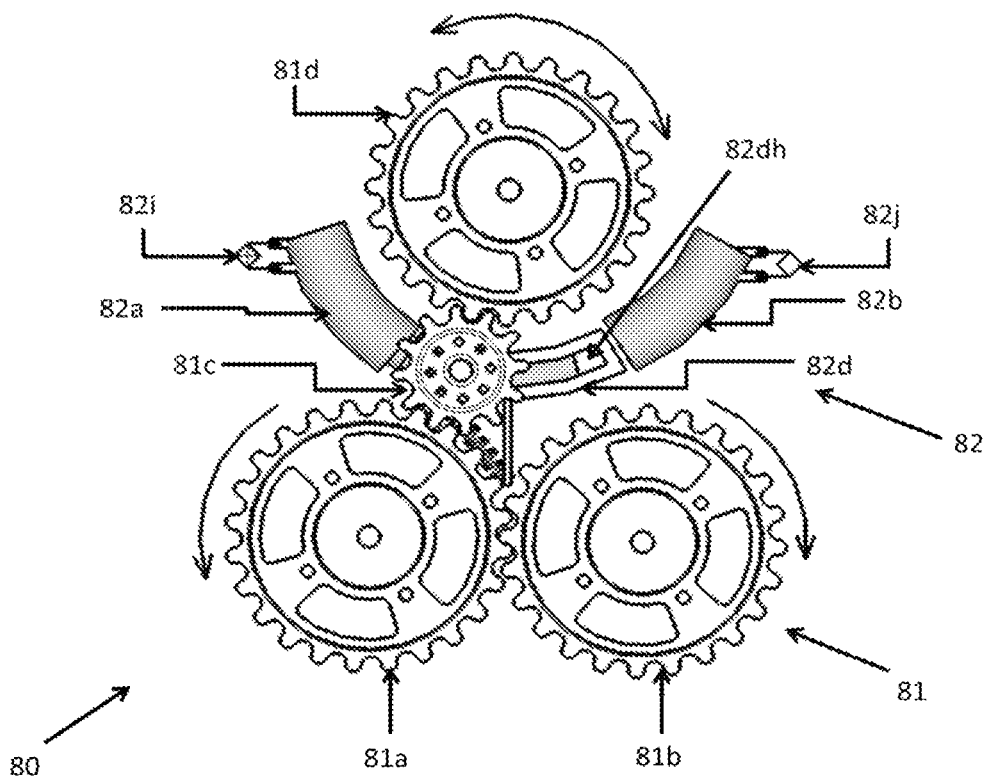

FIG. 25 is a front elevation view of Direction-Changer-Unit used to change the one way rotation of the main motor to two way rotation.

Figure 26:
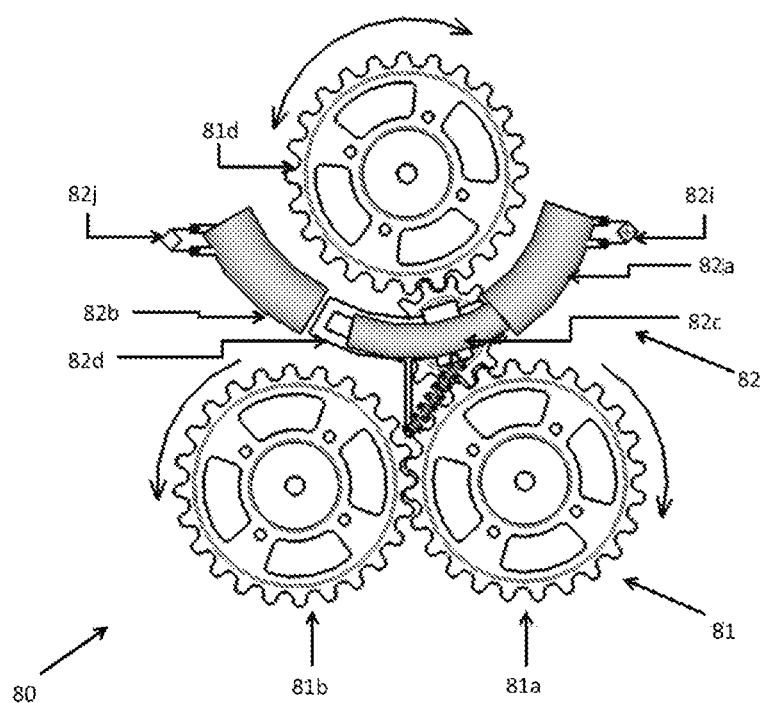

FIG. 26 is a rear elevation view of Direction-Changer-Unit used to change the one way rotation of the main motor to two way rotation.

Figure 27:
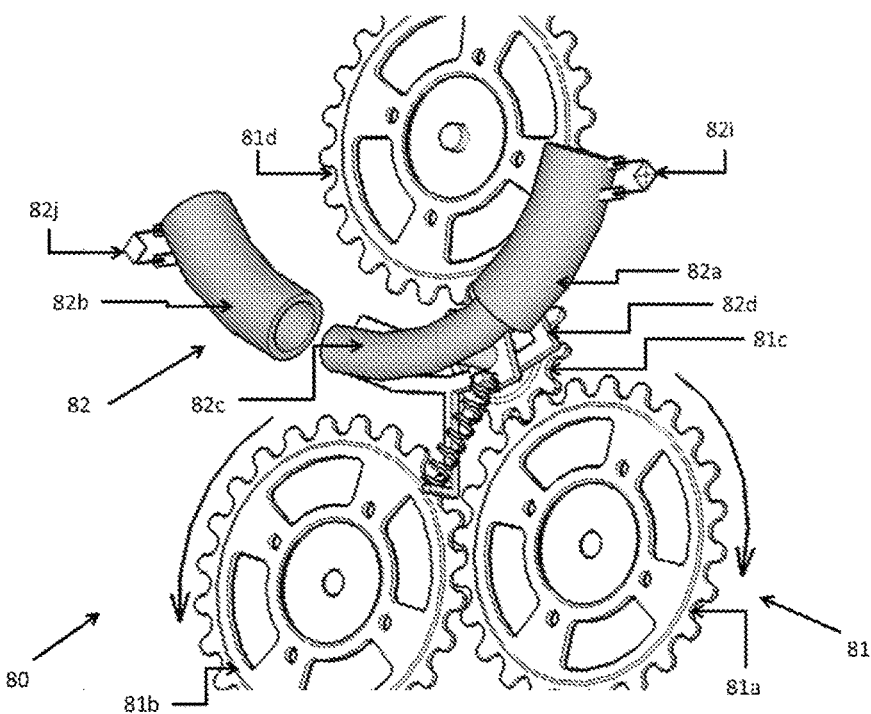

FIG. 27 is a rear left lower perspective view of Direction-Changer-Unit used to change the one way rotation of the main motor to two way rotation.

Figure 28:
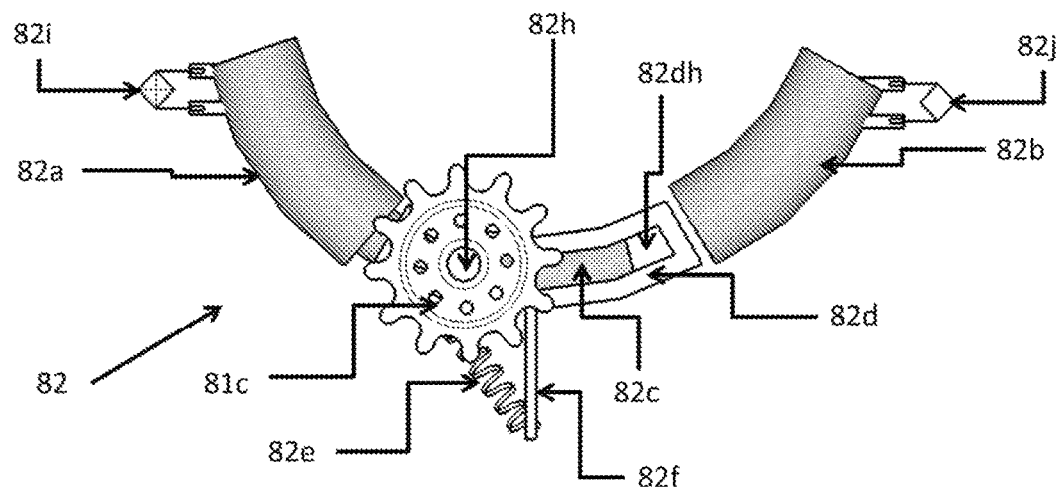

FIG. 28 is a front elevation view of solenoid-unit which is a part of Direction-Changer-Unit.

Figure 29:
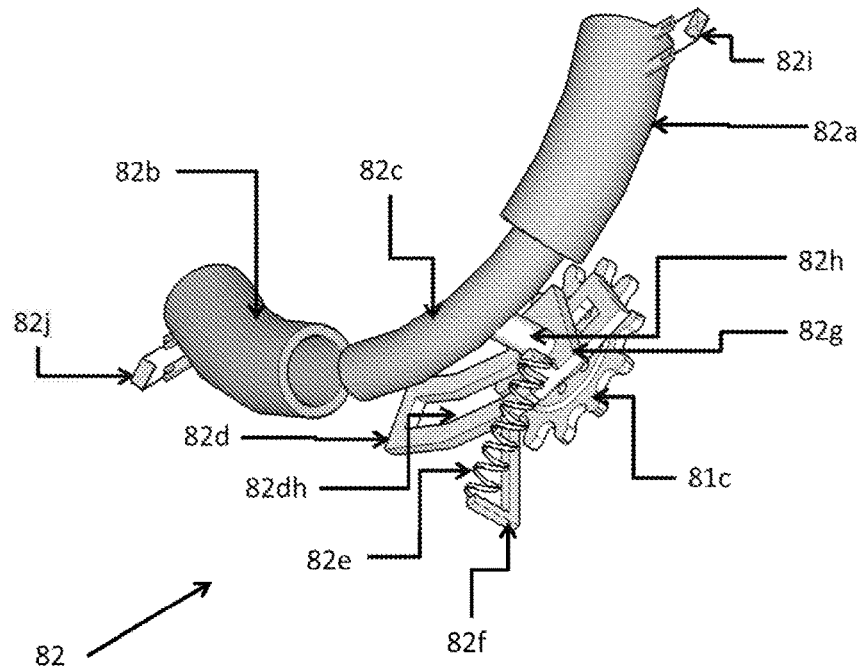

FIG. 29 is a rear left lower perspective view of solenoid-unit which is a part of Direction-Changer-Unit.

Figure 30:
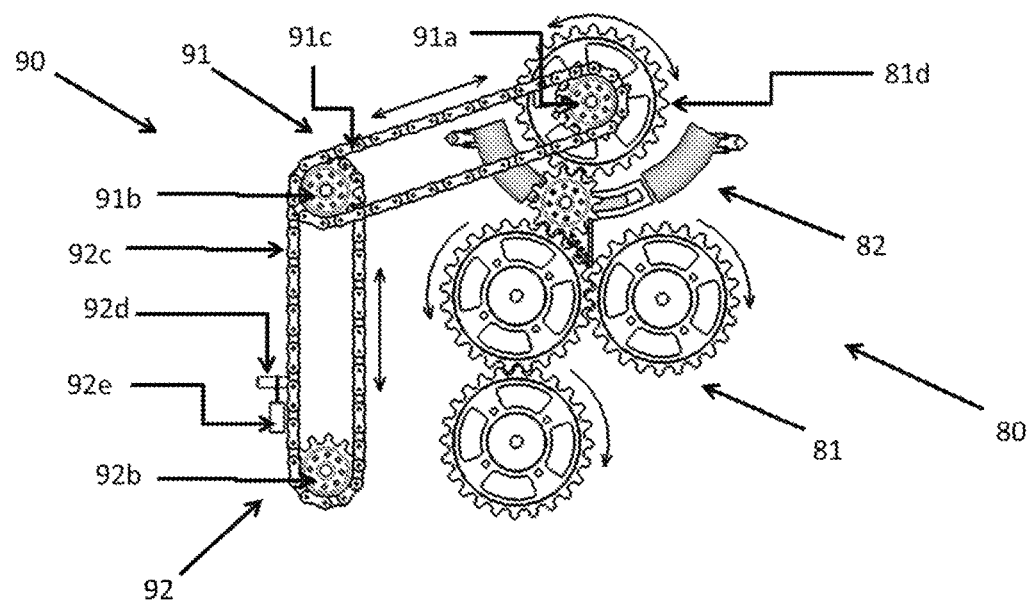

FIG. 30 is a front elevation view of Circular-to-linear-movement-convertor connected to the Direction-Changer-Unit.

Figure 31:
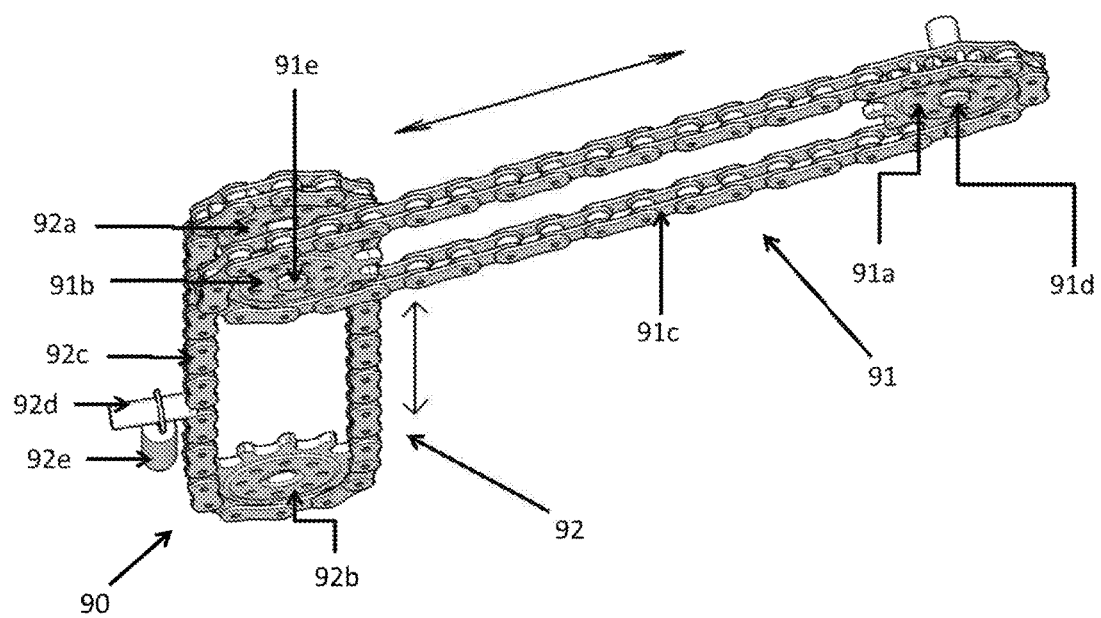

FIG. 31 is a front upper perspective view of Circular-to-linear-movement-convertor which is used to convert bidirectional rotational motion to vertically linear up and down motion.

Figure 32:
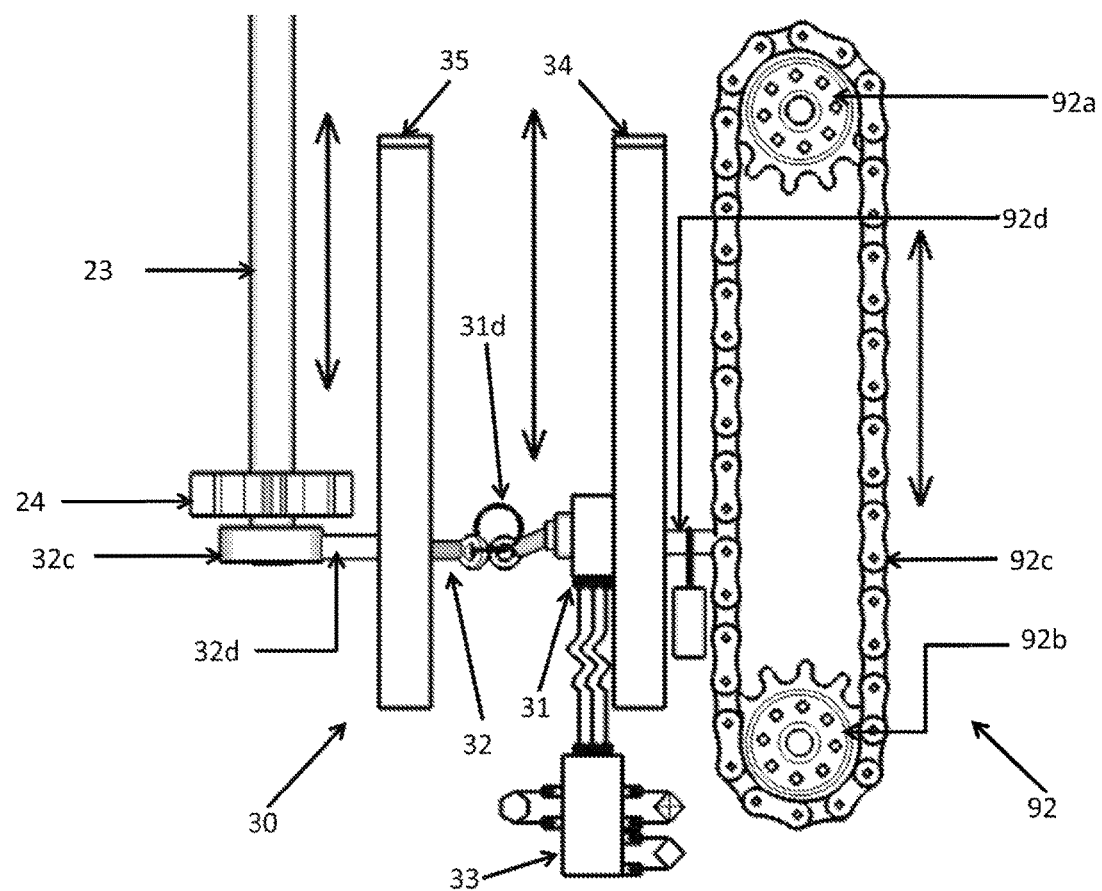

FIG. 32 is a front elevation view of Vertical-Movement-Control-Apparatus connected to Circular-to-linear-movement-convertor through the Chain-sprocket-system2-connecting-rod on one side and Variable-Width-Scraper-Apparatus through Variable-Width-Scraper-Apparatus-Shaft on the other side.

Figure 33:
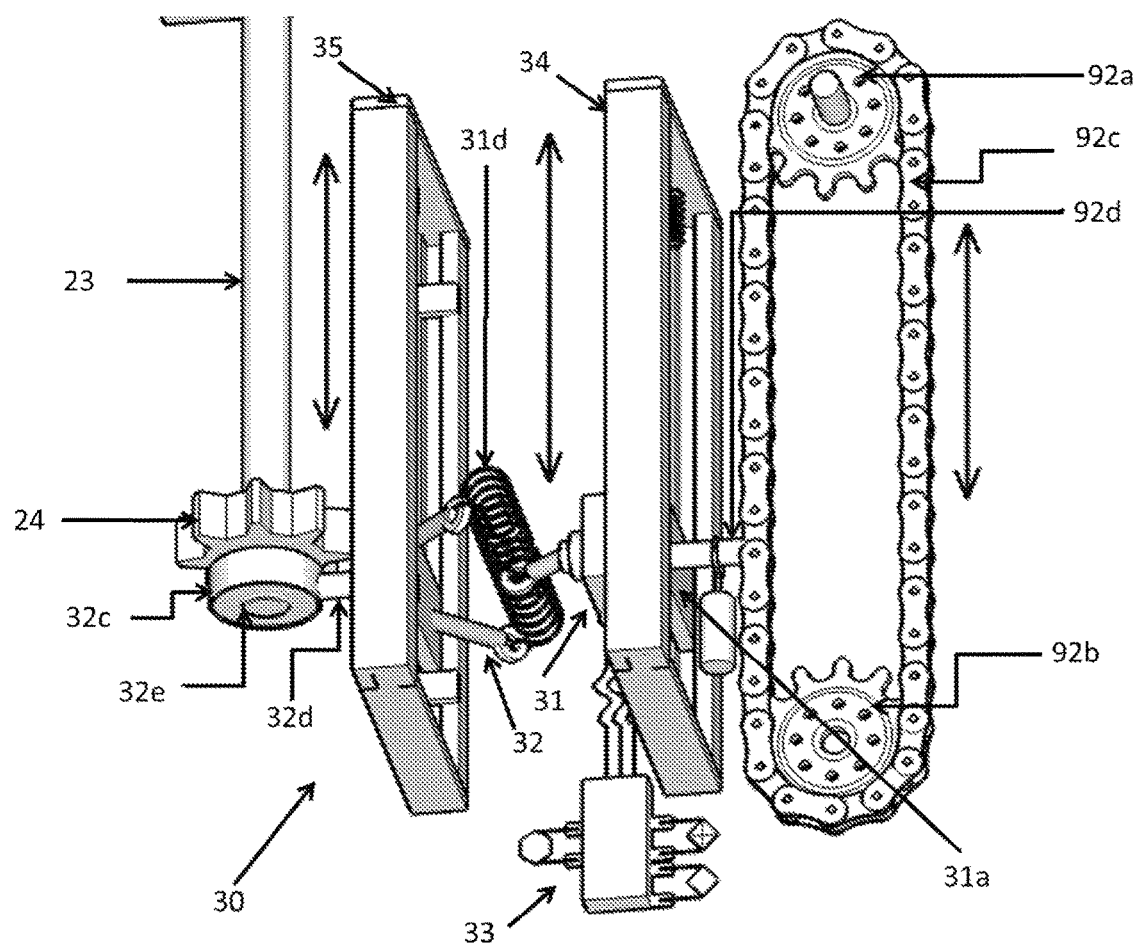

FIG. 33 is a front lower perspective view of Vertical-Movement-Control-Apparatus connected to Circular-to-linear-movement-convertor through the Chain-sprocket-system2-connecting-rod on one side and Variable-Width-Scraper-Apparatus through Variable-Width-Scraper-Apparatus-Shaft on the other side.

Figure 34:
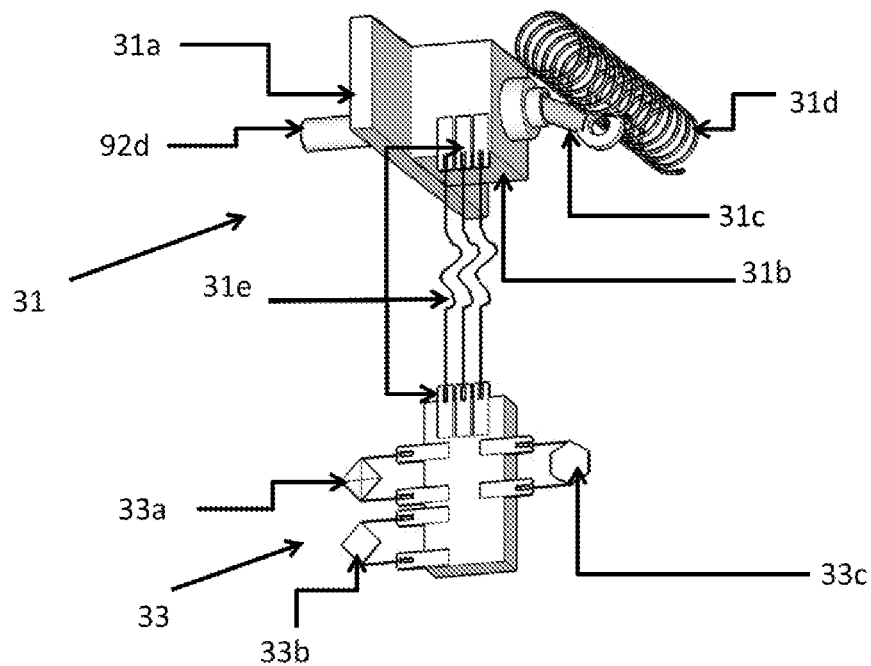

FIG. 34 is a rear lower perspective view of Driver-unit which is part of Vertical-Movement-Control-Apparatus.

Figure 35:
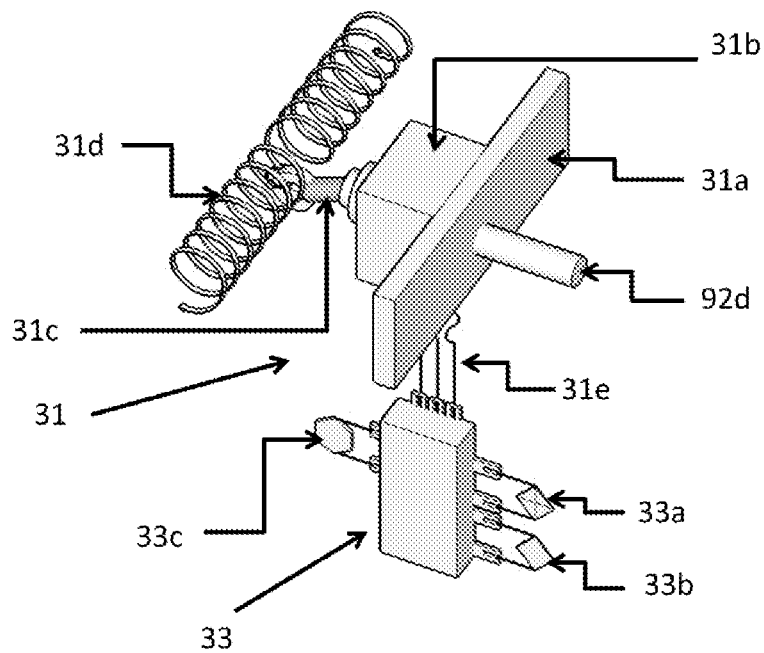

FIG. 35 is a front right upper perspective view of Driver-unit which is part of Vertical-Movement-Control-Apparatus.

Figure 36:
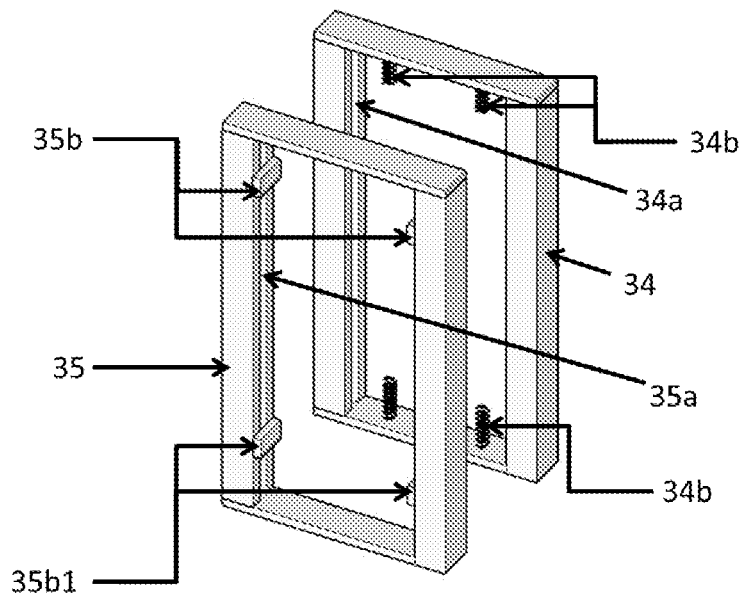

FIG. 36 is a left front upper perspective view of Driver-unit-frame and Follower-unit-frame which is part of Vertical-Movement-Control-Apparatus.

Figure 37:
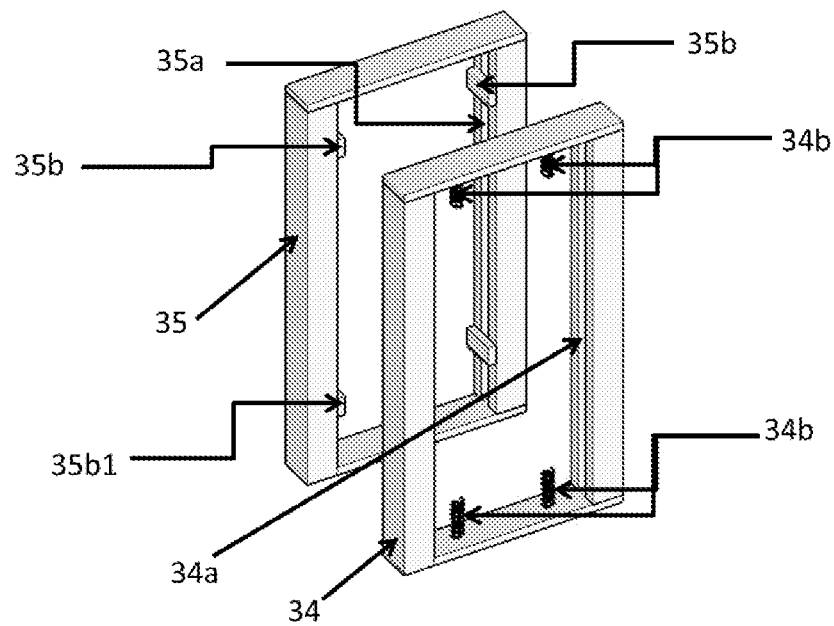

FIG. 37 is a right front upper perspective view of Driver-unit-frame and Follower-unit-frame which is part of Vertical-Movement-Control-Apparatus.

Figure 38:
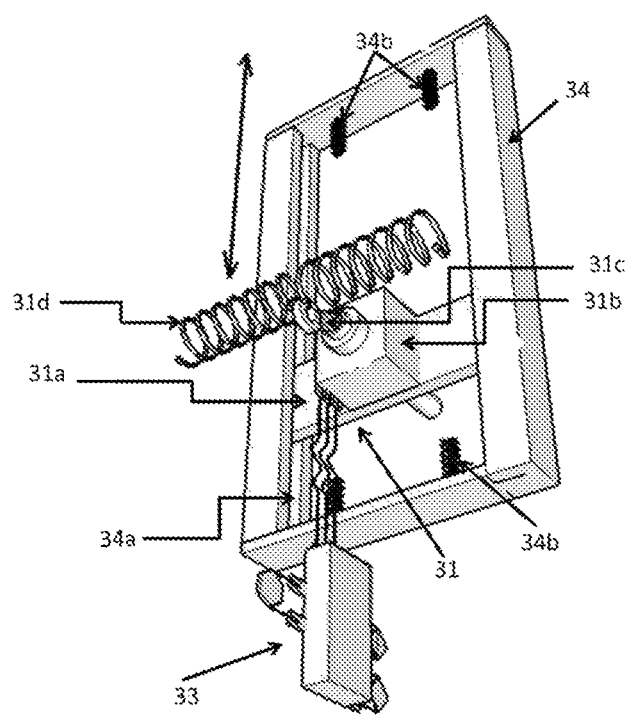

FIG. 38 is a left front lower perspective view of Driver-unit assembled inside Driver-unit-frame which is part of Vertical-Movement-Control-Apparatus.

Figure 39:
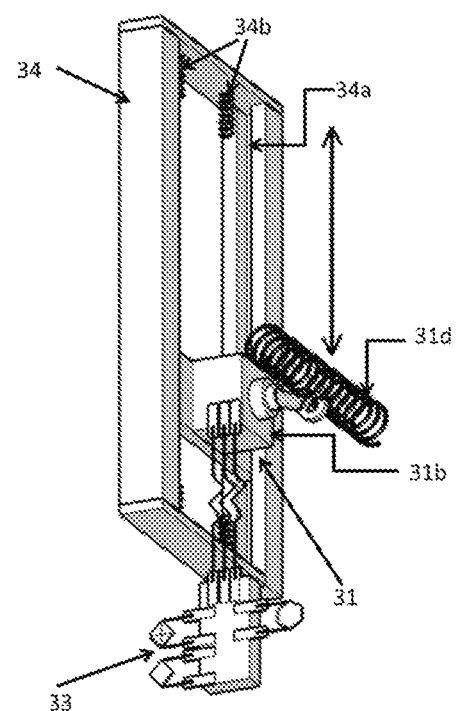
Figure 40:
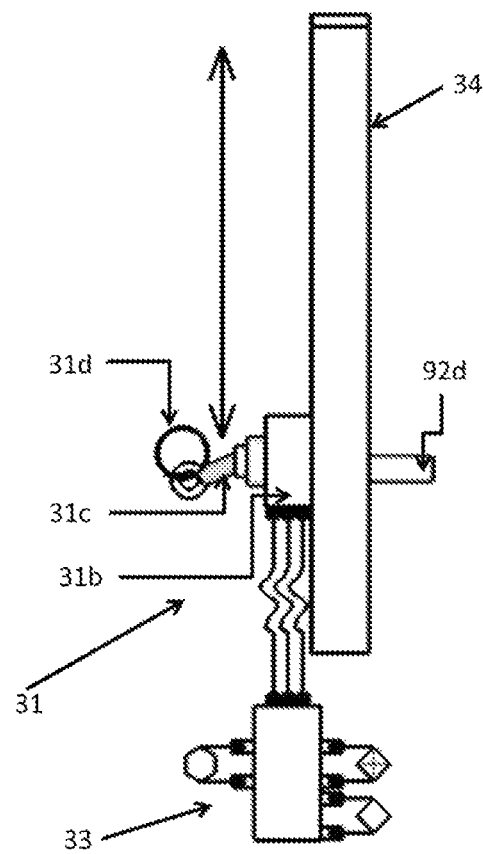

FIG. 39 is a rear left lower perspective view of Driver-unit assembled inside Driver-unit-frame which is part of Vertical-Movement-Control-Apparatus FIG. 40 is a front elevation view of Driver-unit assembled inside Driver-unit-frame which is part of Vertical-Movement-Control-Apparatus.

Figure 41:
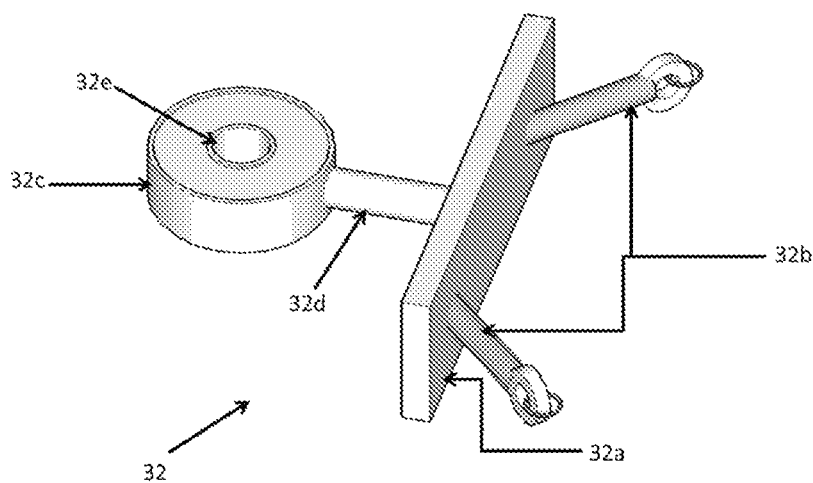

FIG. 41 is a front right upper perspective view of Follower-unit which is part of Vertical-Movement-Control-Apparatus.

Figure 42:
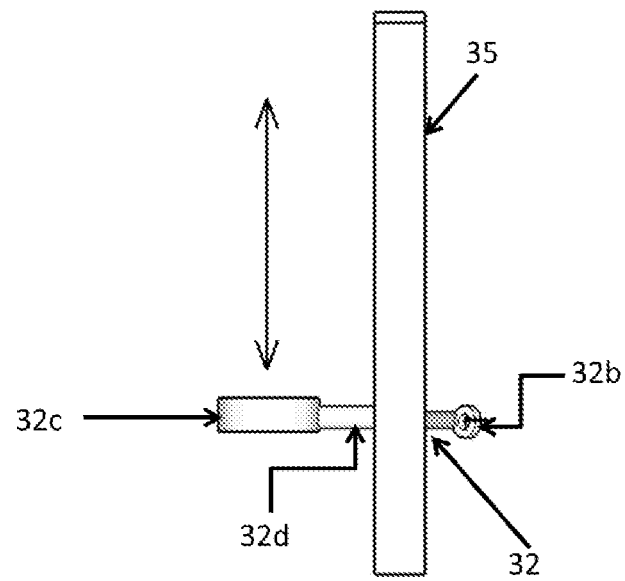

FIG. 42 is a front elevation view of Follower-unit assembled inside Follower-unit-frame which is part of Vertical-Movement-Control-Apparatus.

Figure 43:
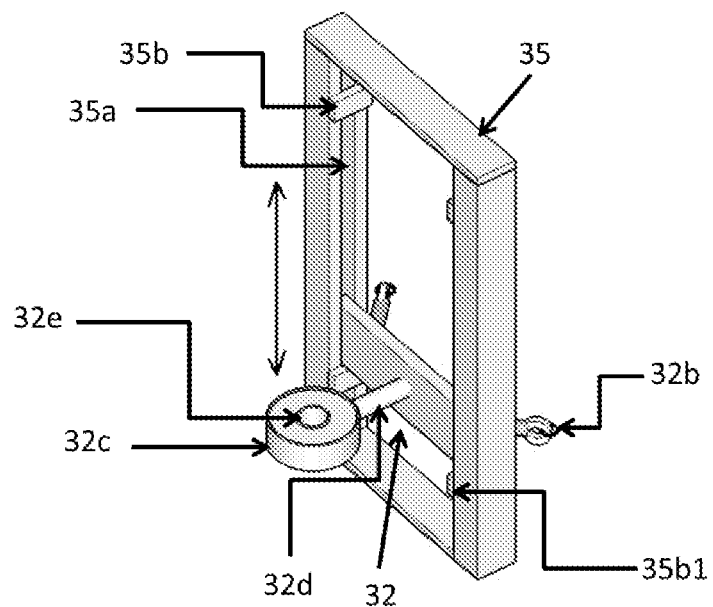

FIG. 43 is a front left upper perspective view of Follower-unit assembled inside Follower-unit-frame which is part of Vertical-Movement-Control-Apparatus.

Figure 44:
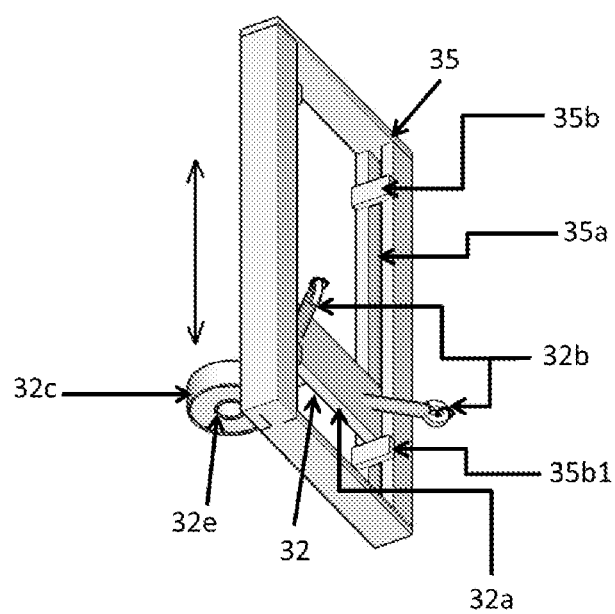

FIG. 44 is a front right lower perspective view of Follower-unit assembled inside Follower-unit-frame which is part of Vertical-Movement-Control-Apparatus.

Figure 45:
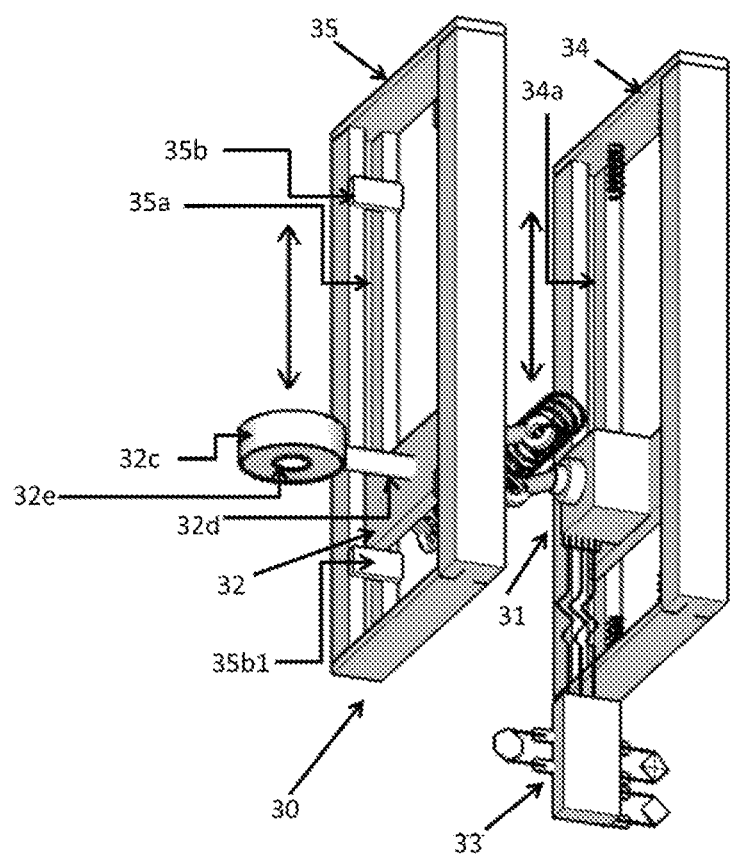

FIG. 45 is a front left lower perspective view of Vertical-Movement-Control-Apparatus showing Driver-unit and Follower-unit assembled inside Driver-unit-frame and Follower-unit-frame respectively and connected to each other through Driver-unit-spdt_switch-handle-spring.

Figure 46:
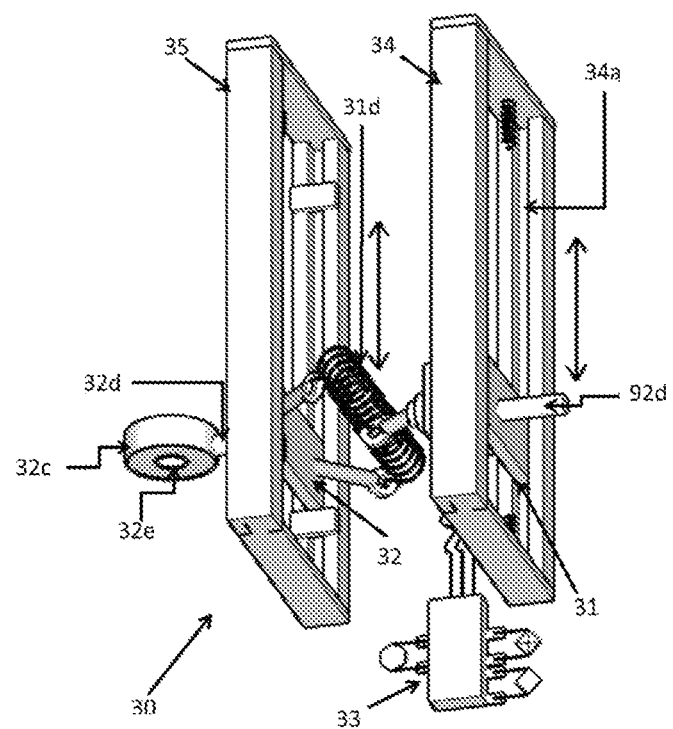

FIG. 46 is a front right lower perspective view of Vertical-Movement-Control-Apparatus showing Driver-unit and Follower-unit assembled inside Driver-unit-frame and Follower-unit-frame respectively and connected to each other through Driver-unit-spdt_switch-handle-spring.

Figure 47:
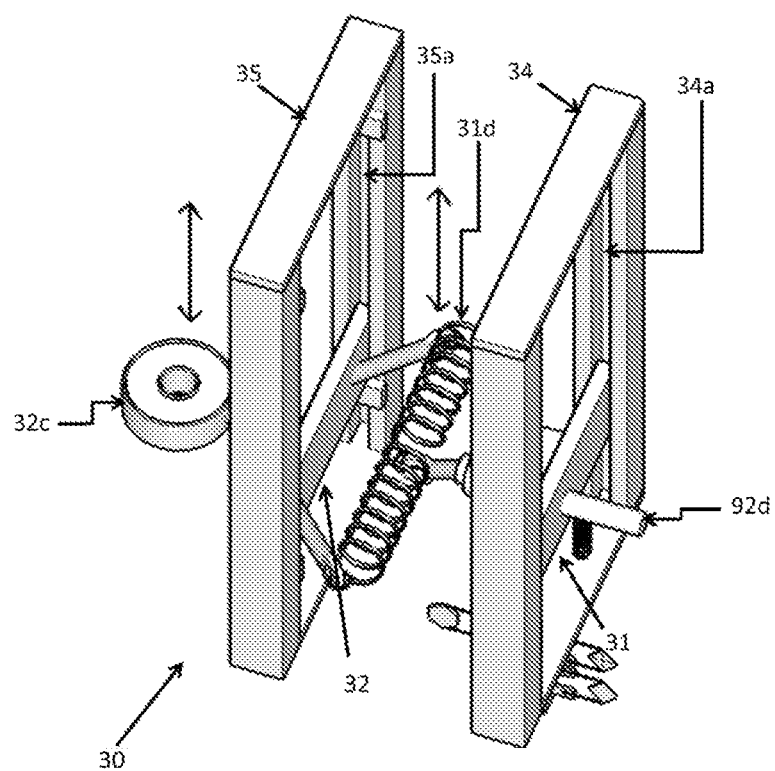

FIG. 47 is a front right upper perspective view of Vertical-Movement-Control-Apparatus showing Driver-unit and Follower-unit assembled inside Driver-unit-frame and Follower-unit-frame respectively and connected to each other through Driver-unit-spdt_switch-handle-spring.

Figure 48:
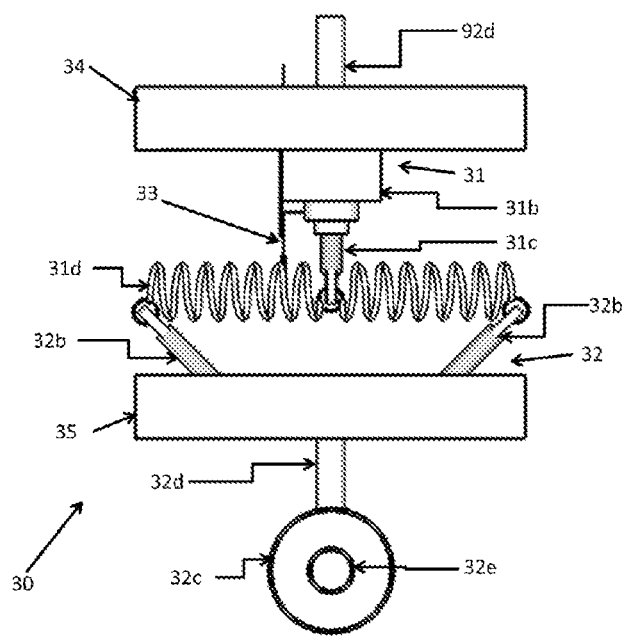

FIG. 48 is a top plan view of Vertical-Movement-Control-Apparatus showing Driver-unit and Follower-unit assembled inside Driver-unit-frame and Follower-unit-frame respectively and connected to each other through Driver-unit-spdt_switch-handle-spring.

Figure 49:
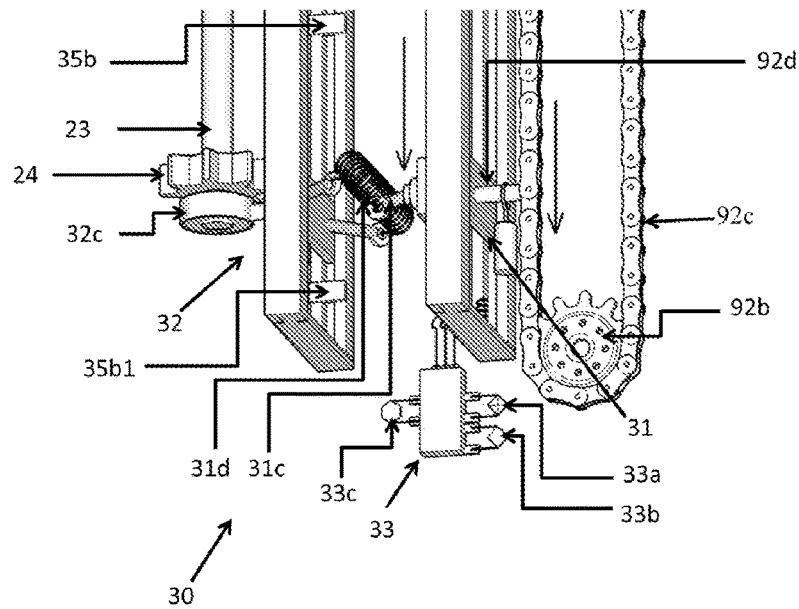

FIG. 49 is a front right lower perspective view of Vertical-Movement-Control-Apparatus to show stage of its operation where the Driver-unit is pulling Follower-unit downward.

Figure 50:
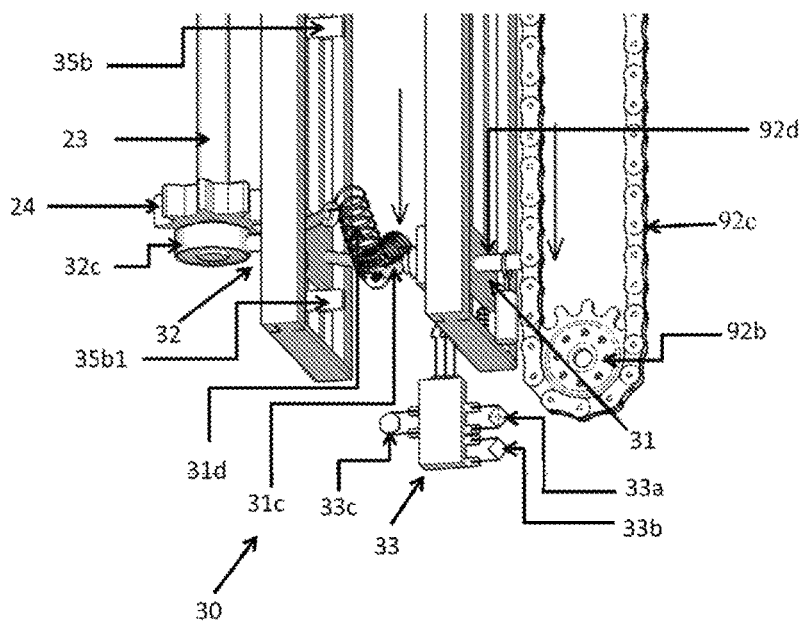

FIG. 50 is a front right lower perspective view of Vertical-Movement-Control-Apparatus to show stage of its operation where the Driver-unit is pulling Follower-unit downward but follower unit is blocked in its downward movement by Follower-unit-frame-block-lower.

Figure 51:
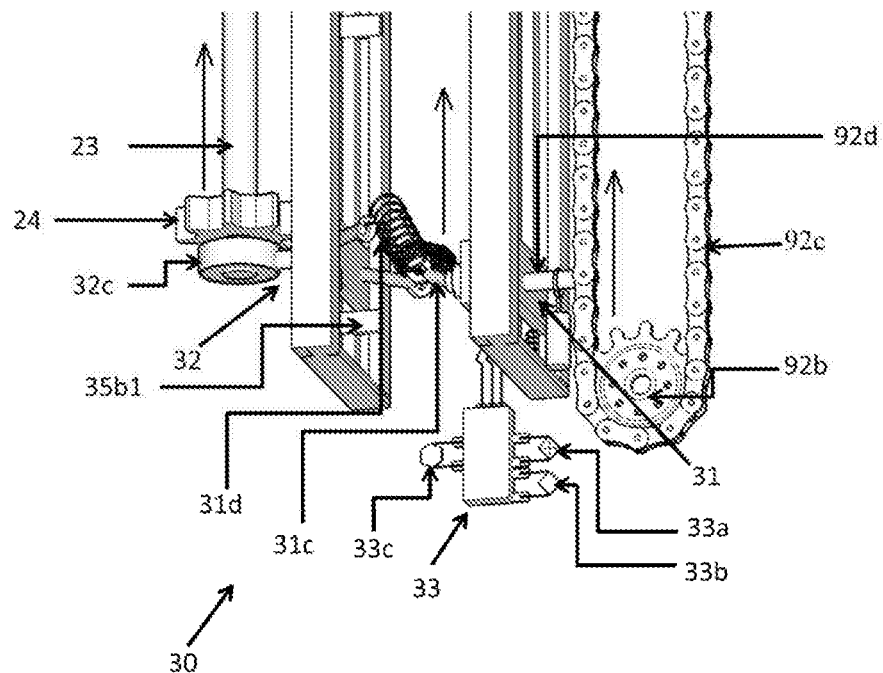

FIG. 51 is a front right lower perspective view of Vertical-Movement-Control-Apparatus to show stage of its operation where the Driver-unit-spdt_switch-handle is flipped upward and direction of motion reversed such that Driver-unit is pulling Follower-unit upwards.

Figure 52:
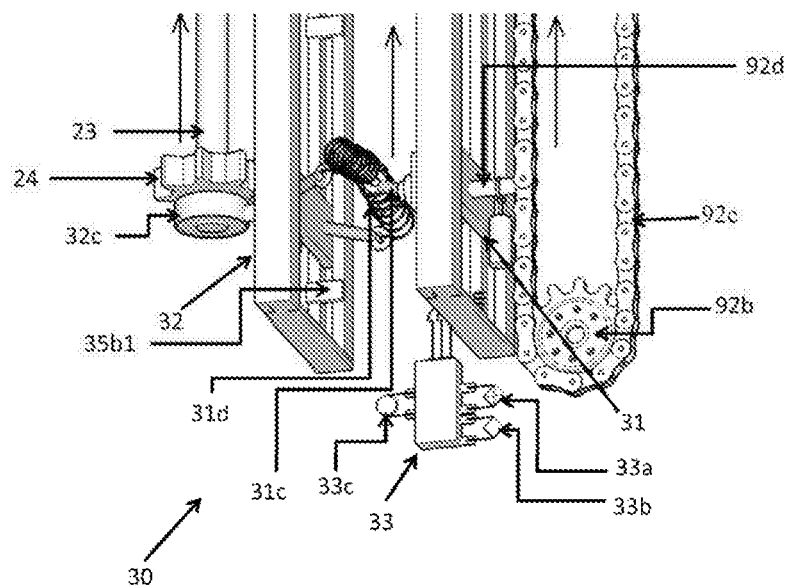

FIG. 52 is a front right lower perspective view of Vertical-Movement-Control-Apparatus to show stage of its operation where the Driver-unit is pulling Follower-unit upward.

Figure 53:
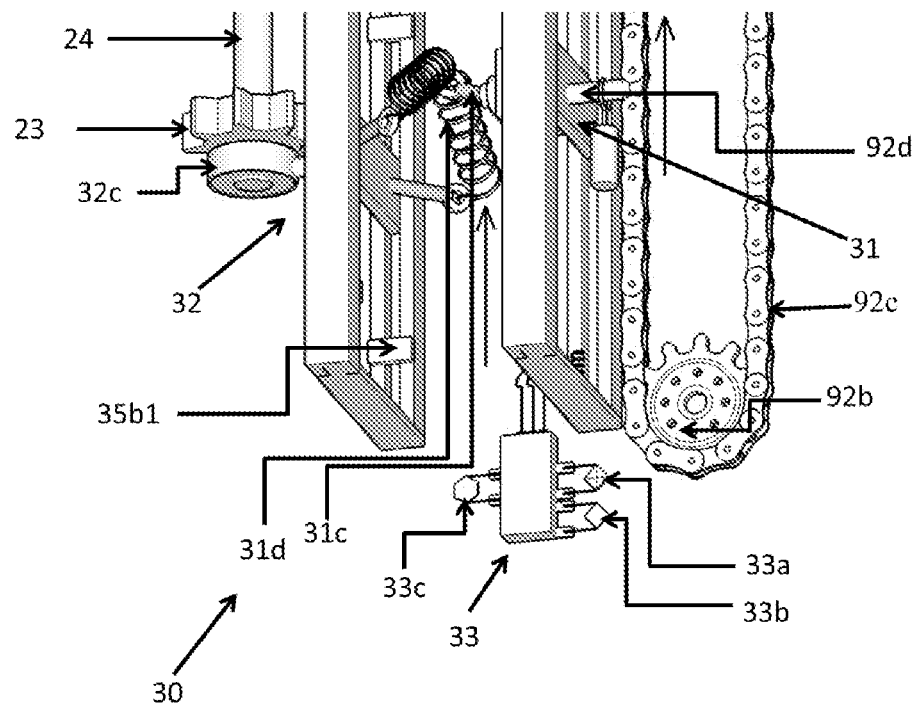

FIG. 53 is a front right lower perspective view of Vertical-Movement-Control-Apparatus to show stage of its operation where the Driver-unit is pulling Follower-unit upward but follower unit is blocked in its upward movement due to Variable-Width-Scraper-Apparatus reaching the top inner layer of the half-coconut.

Figure 54:
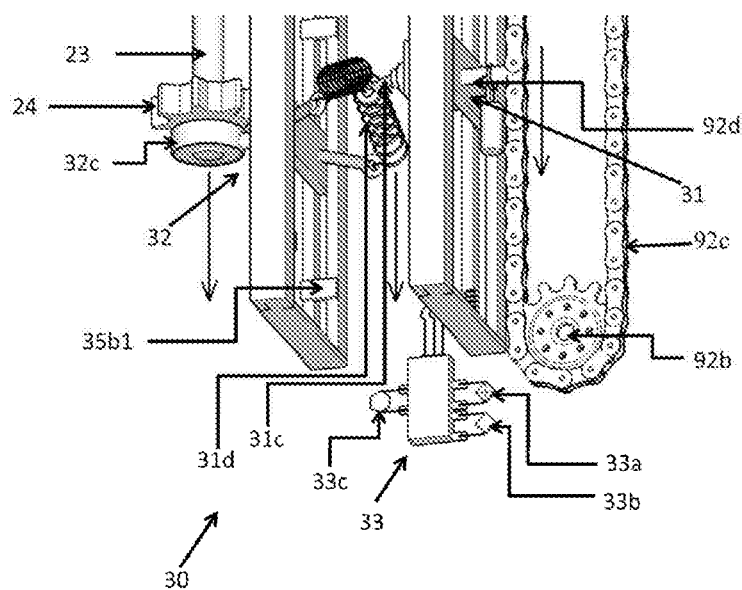

FIG. 54 is a front right lower perspective view of Vertical-Movement-Control-Apparatus to show stage of its operation where the Driver-unit-spdt_switch-handle is flipped downward and direction of motion reversed such that Driver-unit is pulling Follower-unit downward.

Figure 55:
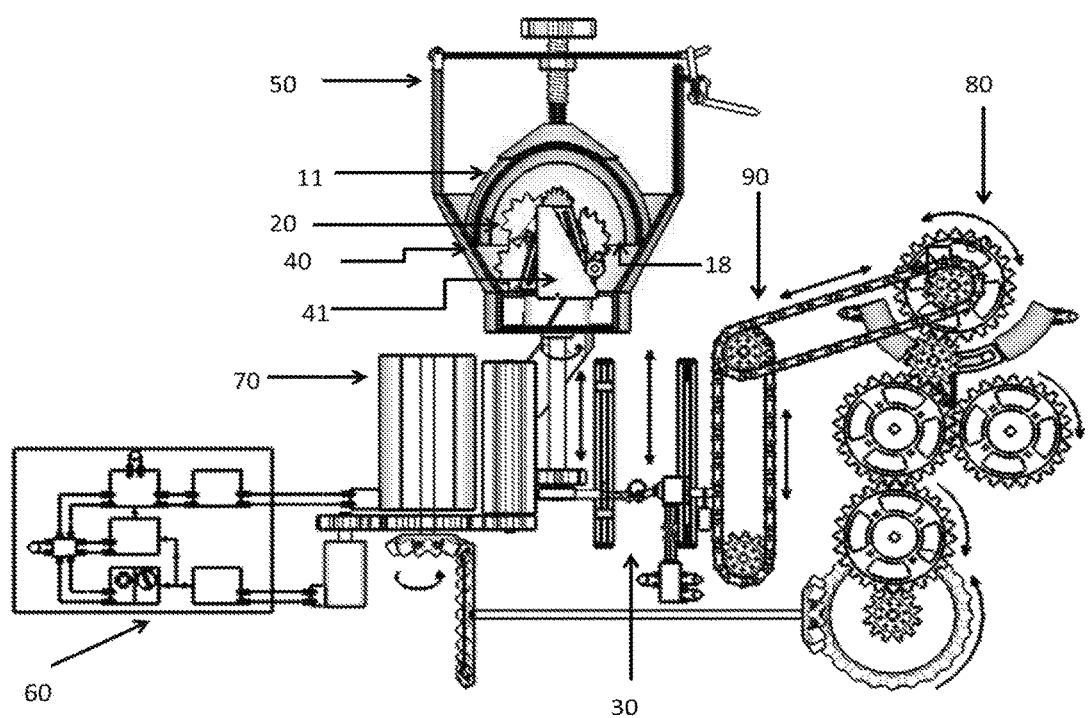

FIG. 55 is a cross section of front elevation view of apparatus to scrape coconut focusing on Variable-Opening-Entry-Mechanism with arrows for directions of motion.

Figure 56:
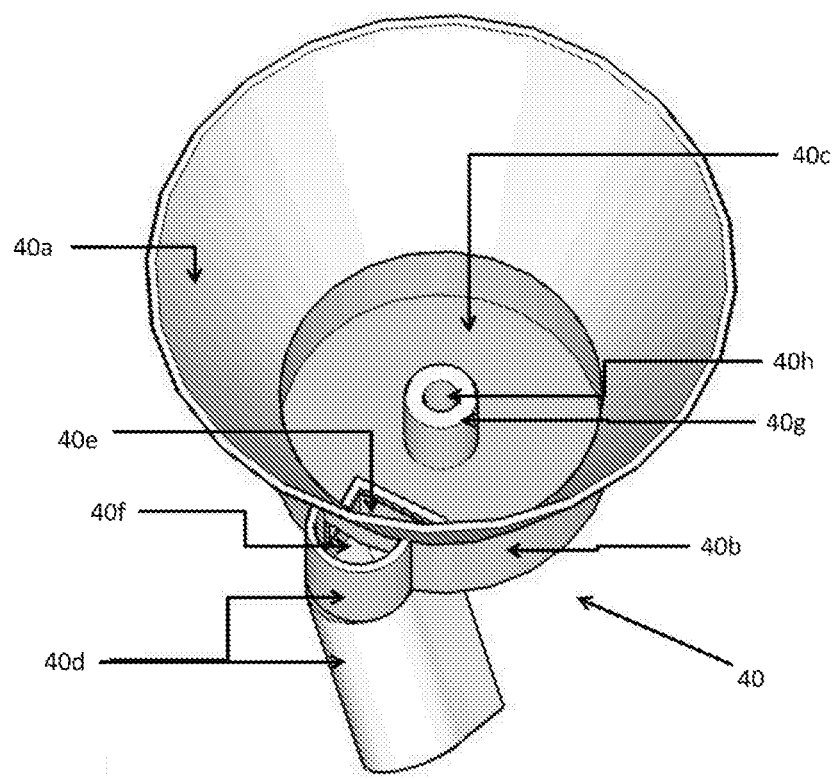

FIG. 56 is a rear upper perspective view of Variable-Opening-Entry-Mechanism-Jar which is part of Variable-Opening-Entry-Mechanism.

Figure 57:
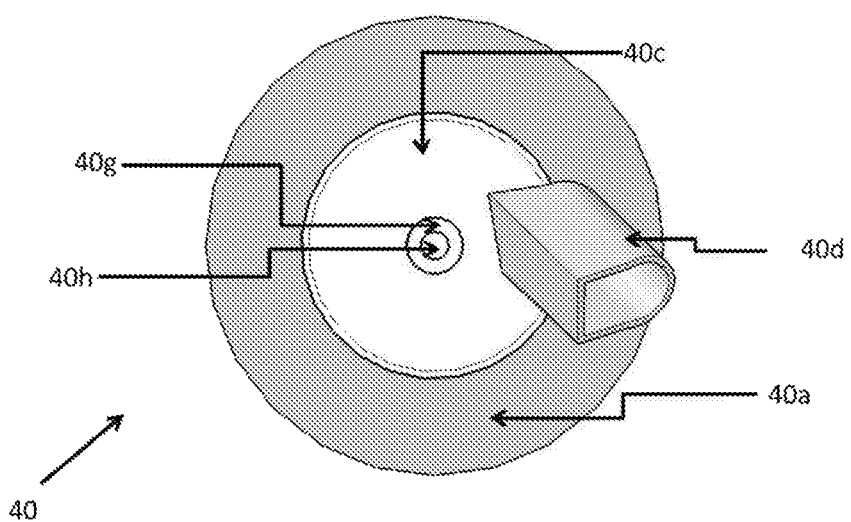

FIG. 57 is a bottom plan view of Variable-Opening-Entry-Mechanism-Jar which is part of Variable-Opening-Entry-Mechanism.

Figure 58:
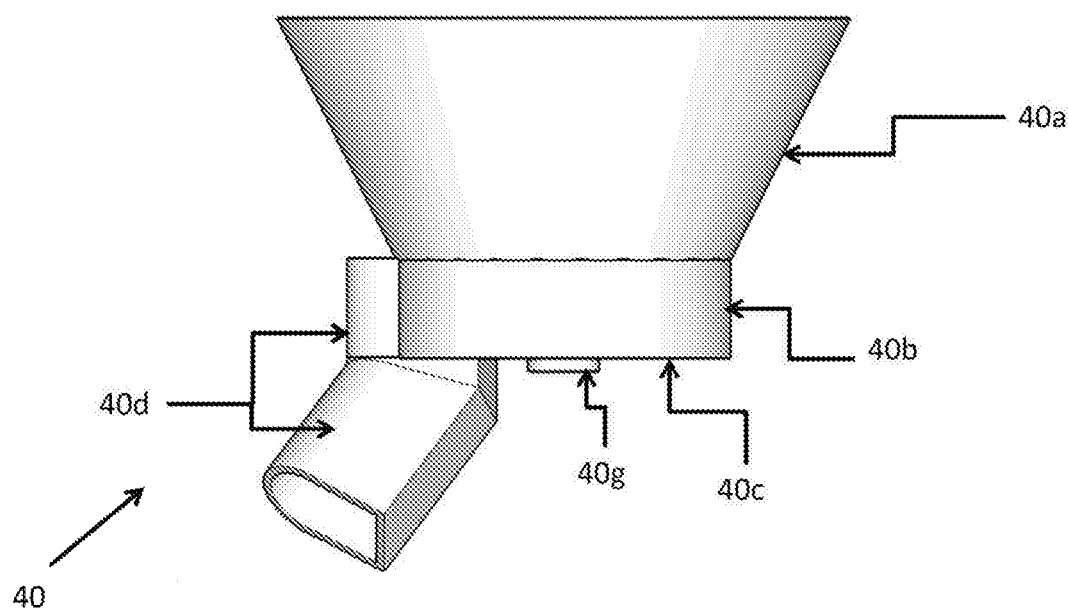

FIG. 58 is a rear elevation view of Variable-Opening-Entry-Mechanism-Jar which is part of Variable-Opening-Entry-Mechanism.

Figure 59:
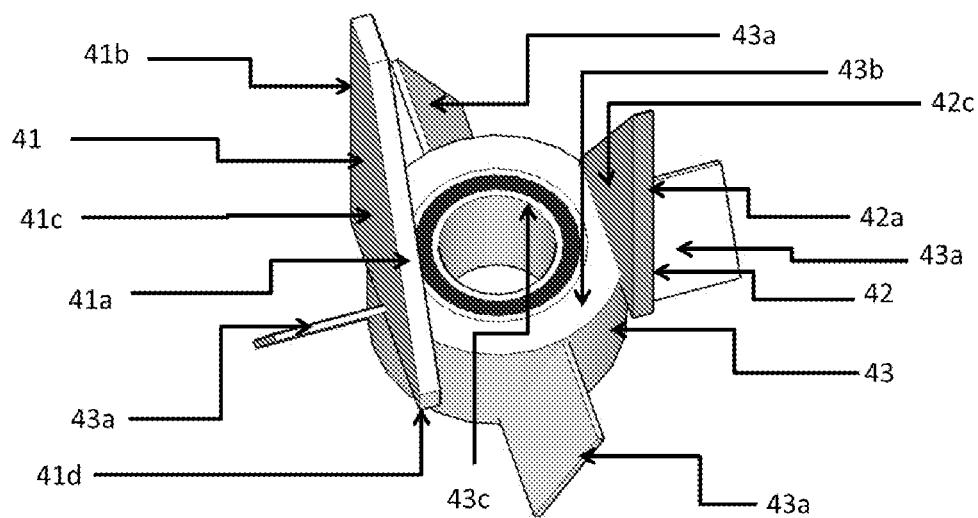

FIG. 59 is a right upper perspective view of Base-bearing with Variable-Opening-Entry-Mechanism-Guide1, Variable-Opening-Entry-Mechanism-Guide2 and Bearing-fan which is part of Variable-Opening-Entry-Mechanism.

Figure 60:
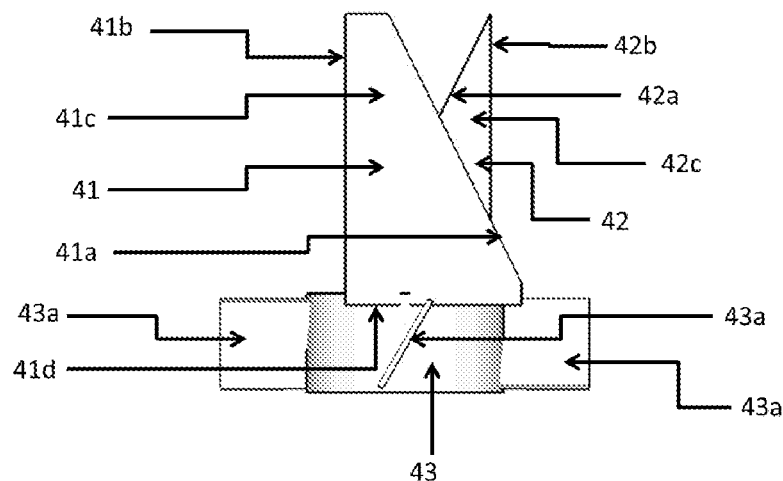

FIG. 60 is a front elevation view of Base-bearing with Variable-Opening-Entry-Mechanism-Guide1, Variable-Opening-Entry-Mechanism-Guide2 and Bearing-fan which is part of Variable-Opening-Entry-Mechanism.

Figure 61:
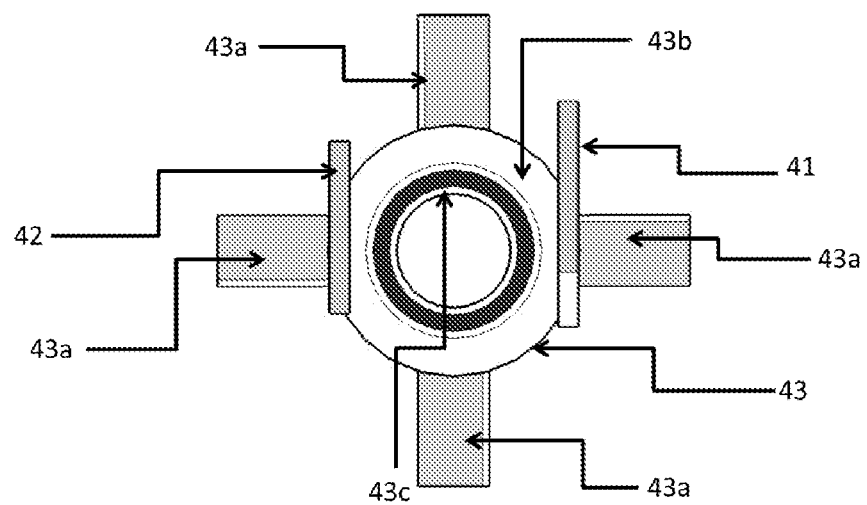

FIG. 61 is a top plan view of Base-bearing with Variable-Opening-Entry-Mechanism-Guide1, Variable-Opening-Entry-Mechanism-Guide2 and Bearing-fan which is part of Variable-Opening-Entry-Mechanism.

Figure 62:
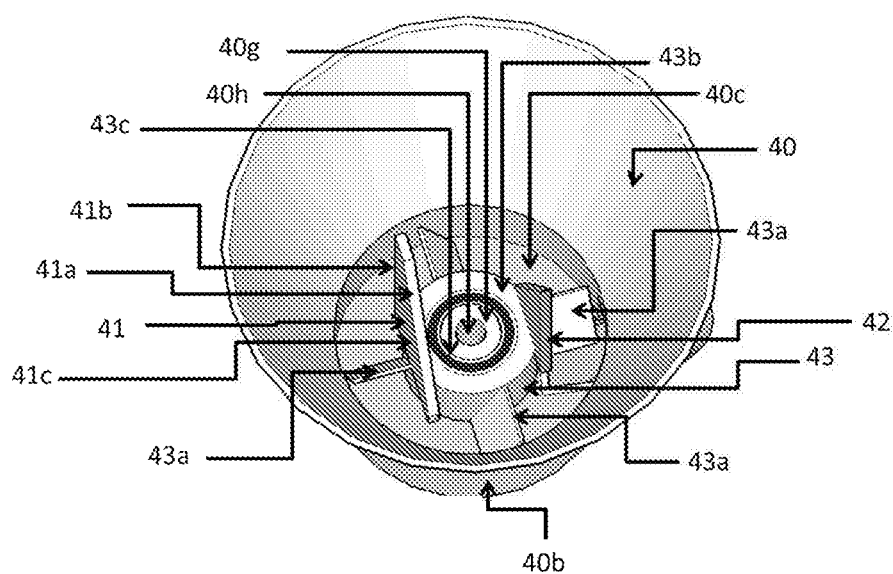

FIG. 62 is a right upper perspective view of Variable-Opening-Entry-Mechanism showing Base-bearing along with Variable-Opening-Entry-Mechanism-Guide1, Variable-Opening-Entry-Mechanism-Guide2 and Bearing-fan assembled into Variable-Opening-Entry-Mechanism-Jar.

Figure 63:
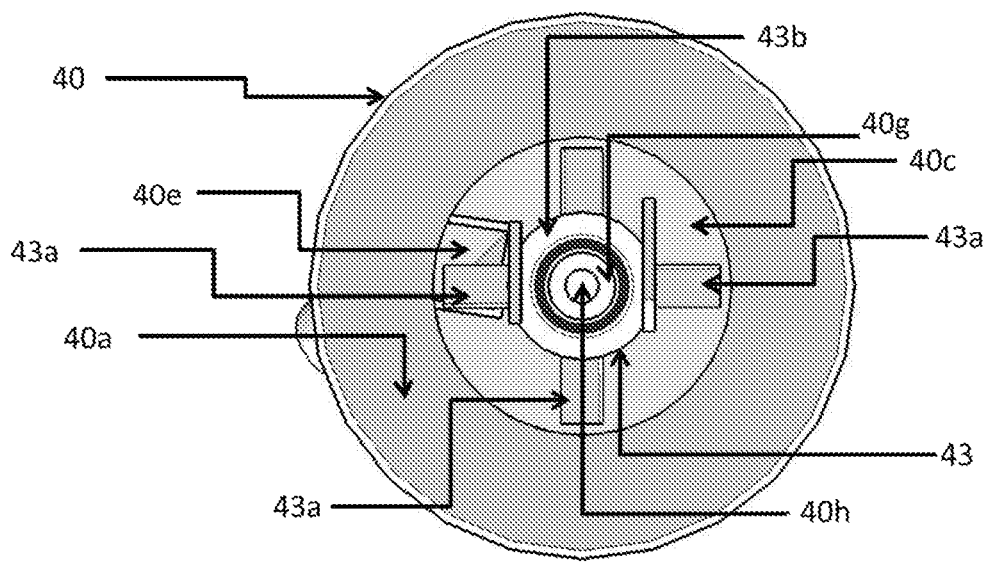

FIG. 63 is a top plan view of Variable-Opening-Entry-Mechanism showing Base-bearing along with Variable-Opening-Entry-Mechanism-Guide1, Variable-Opening-Entry-Mechanism-Guide2 and Bearing-fan assembled into Variable-Opening-Entry-Mechanism-Jar.

Figure 64:
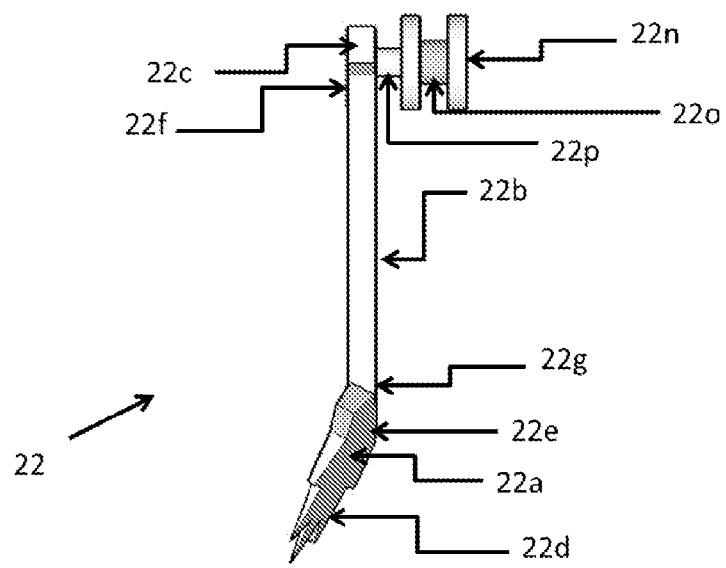

FIG. 64 is a top plan view of blade which has Guide-wheel fixed to it.

Figure 65:
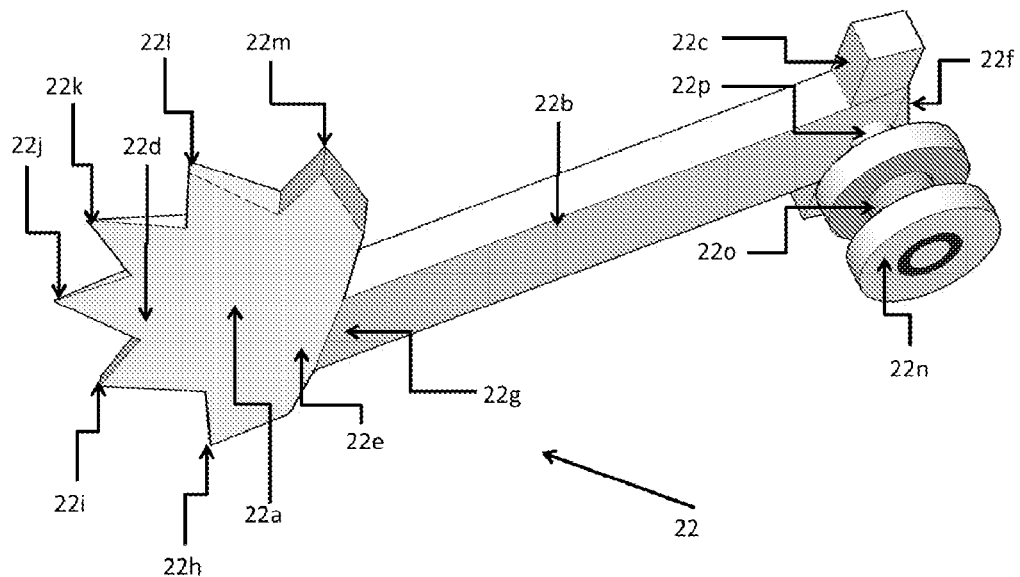

FIG. 65 is a front left upper perspective view of blade which has Guide-wheel fixed to it.

Figure 65A:
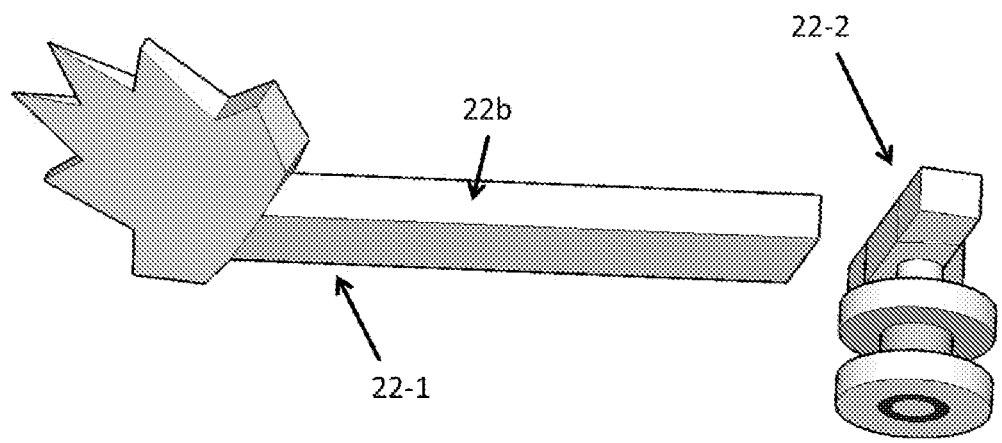

FIG. 65a is a front upper perspective view of Blade-part1 and Blade-part2

Figure 66:
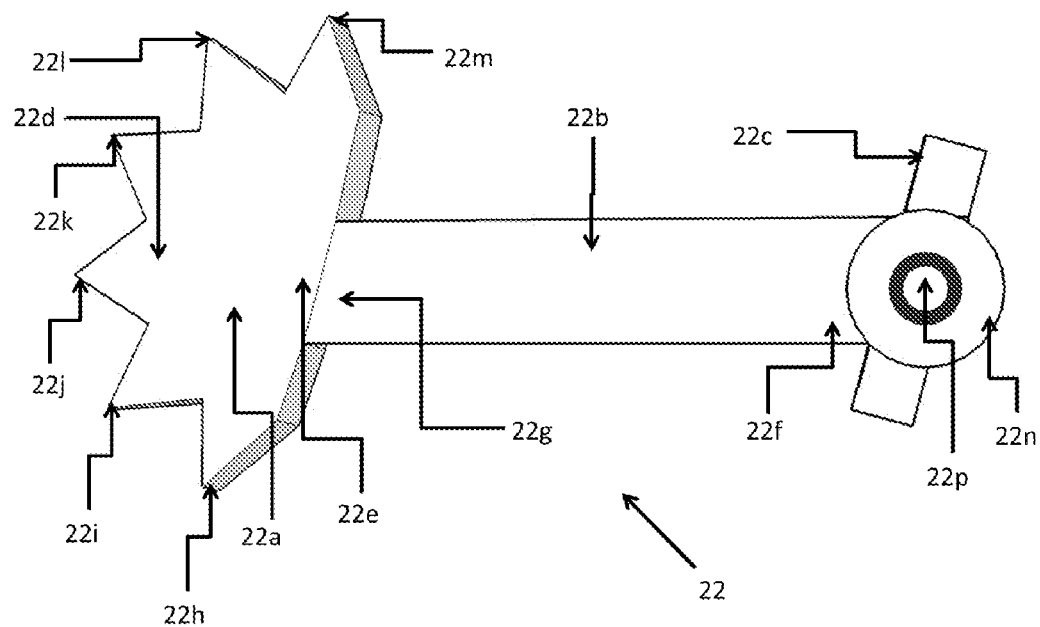

FIG. 66 is a front elevation view of blade which has Guide-wheel fixed to it.

Figure 67:
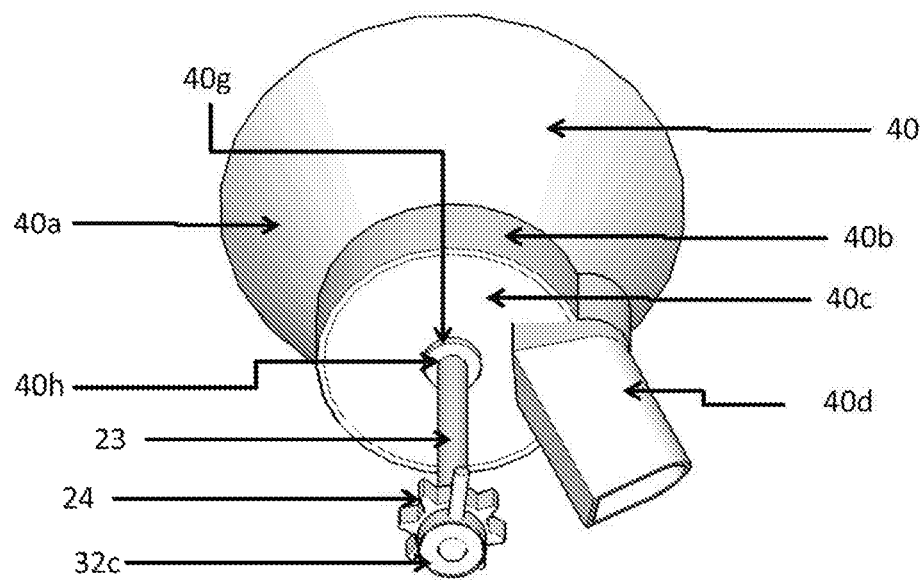

FIG. 67 is a front lower perspective view of Variable-Opening-Entry-Mechanism and Variable-Width-Scraper-Apparatus assembled together.

Figure 68:
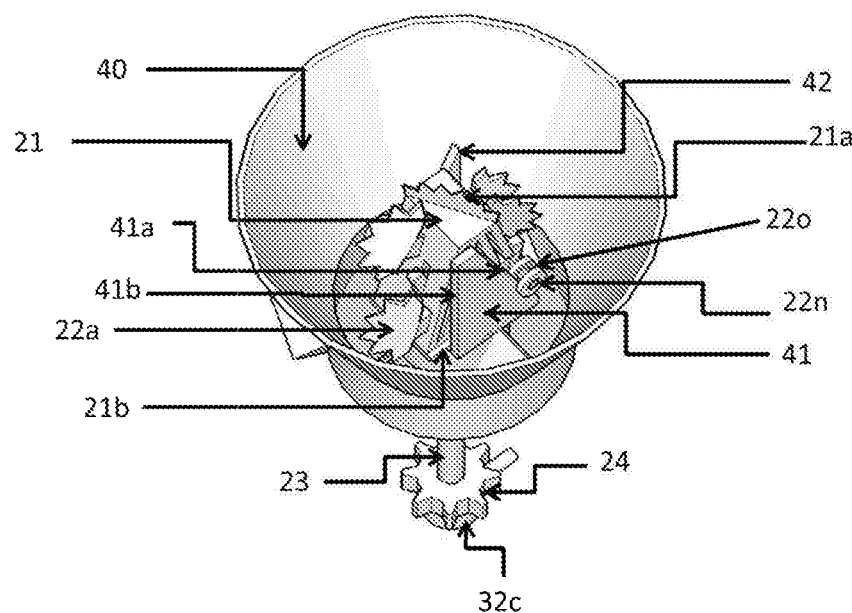

FIG. 68 is a front left upper perspective view of Variable-Opening-Entry-Mechanism and Variable-Width-Scraper-Apparatus assembled together.

Figure 69:
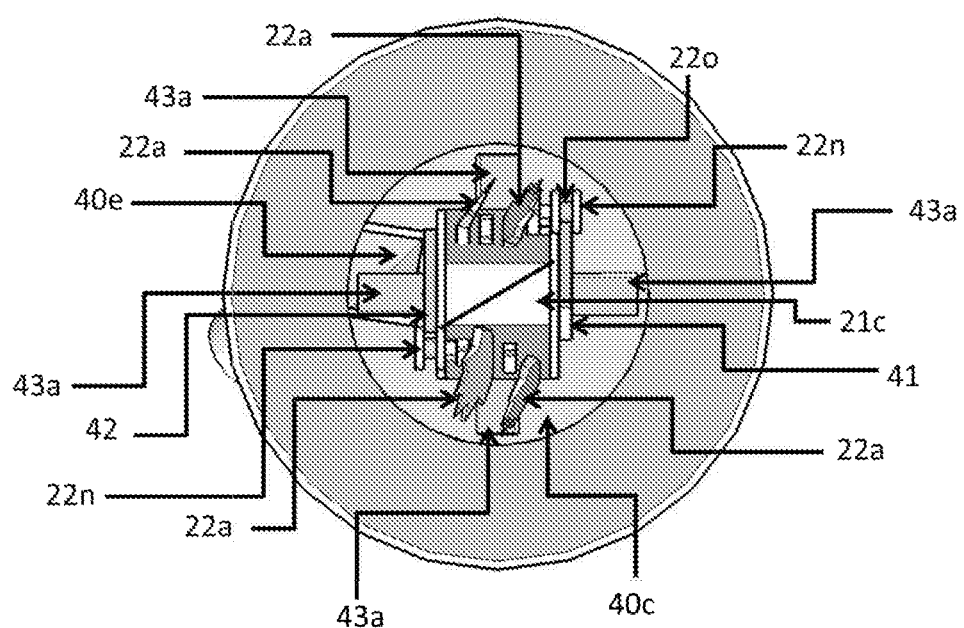

FIG. 69 is a top plan view of Variable-Opening-Entry-Mechanism and Variable-Width-Scraper-Apparatus assembled together.

Figure 70:
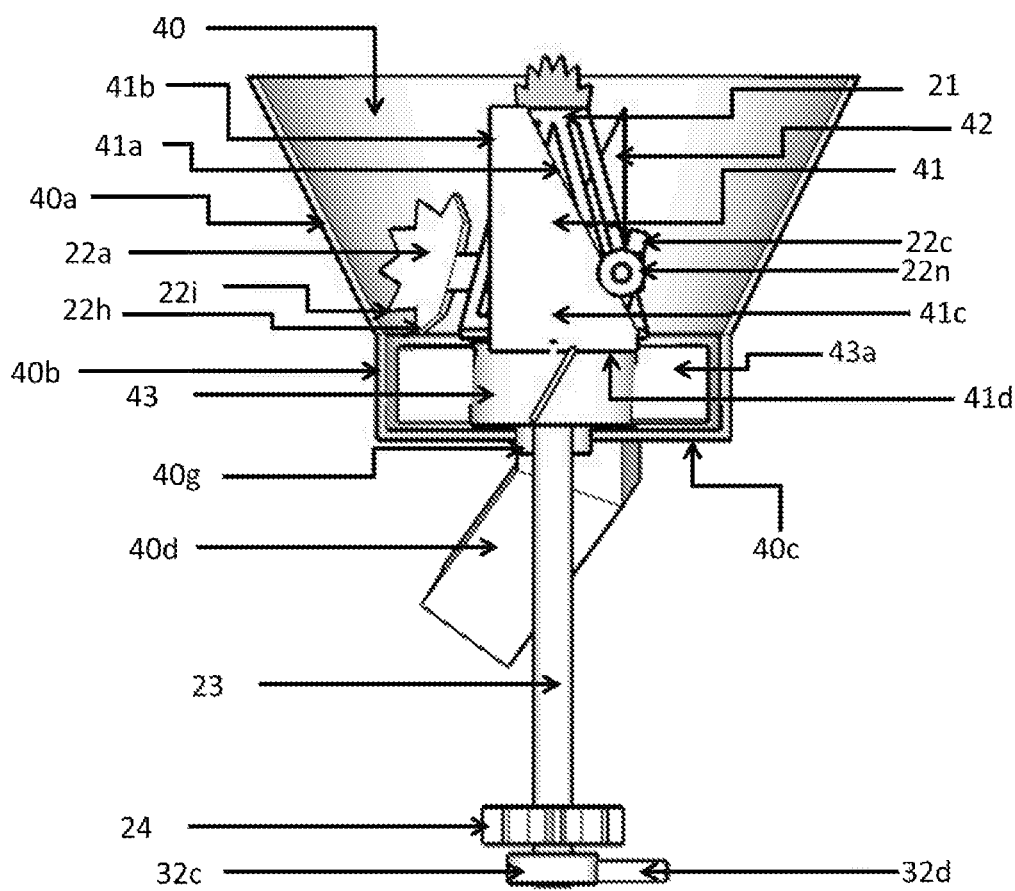

FIG. 70 is a front elevation view of Variable-Opening-Entry-Mechanism and Variable-Width-Scraper-Apparatus assembled together with the Variable-Opening-Entry-Mechanism-Jar cut vertically to expose the alignment of the Variable-Opening-Entry-Mechanism-Guide1, blade, Guide-wheel and Sloping-wall of the Variable-Opening-Entry-Mechanism-Jar with one another. Only one blade is shown for illustration.

Figure 71:
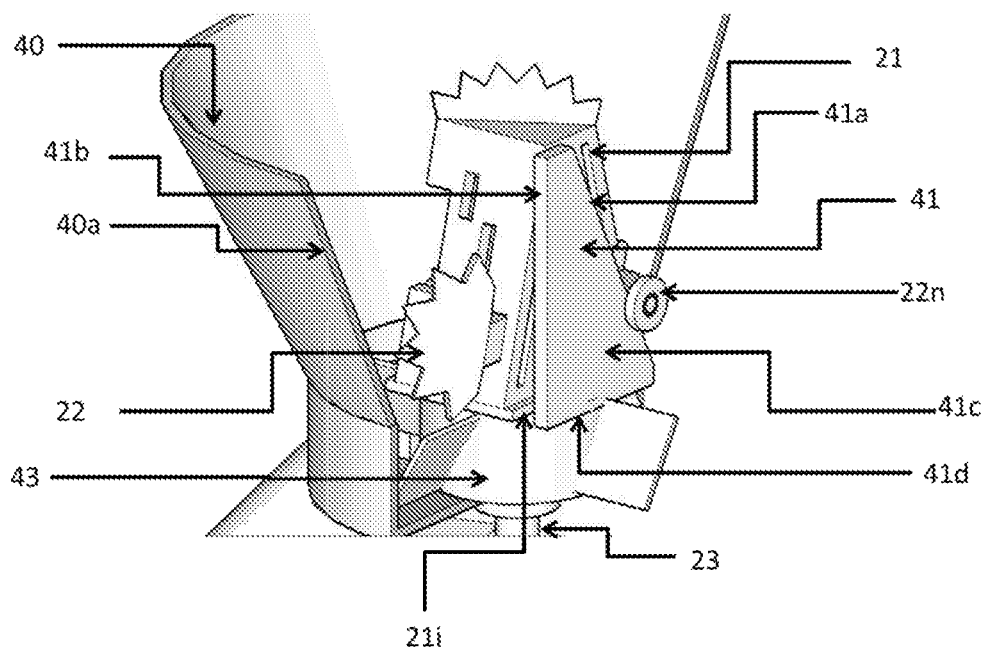

FIG. 71 is a front left upper perspective view of Variable-Opening-Entry-Mechanism and Variable-Width-Scraper-Apparatus assembled together with the Variable-Opening- Entry-Mechanism-Jar cut vertically to expose the alignment of the Variable-Opening-Entry-Mechanism-Guide1, blade, Guide-wheel and Sloping-wall of the Variable-Opening-Entry-Mechanism-Jar with one another. Only one blade is shown for the purpose of illustration. Variable-Opening-Entry-Mechanism is vertically at the lowest level and closest to Base-bearing.

Figure 72:
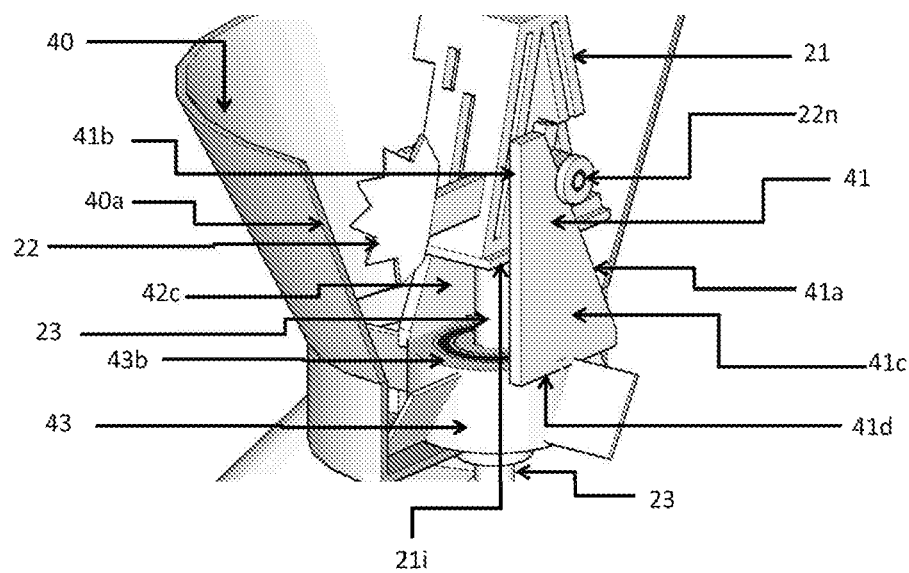

FIG. 72 is a front left upper perspective view of Variable-Opening-Entry-Mechanism and Variable-Width-Scraper-Apparatus assembled together with the Variable-Opening-Entry-Mechanism-Jar cut vertically to expose the alignment of the Variable-Opening-Entry-Mechanism-Guide1, blade, Guide-wheel and Sloping-wall of the Variable-Opening-Entry-Mechanism-Jar with one another. Only one blade is shown for the purpose of illustration. Variable-Opening-Entry-Mechanism is vertically at a higher level and at a height from Base-bearing.

Figure 73:
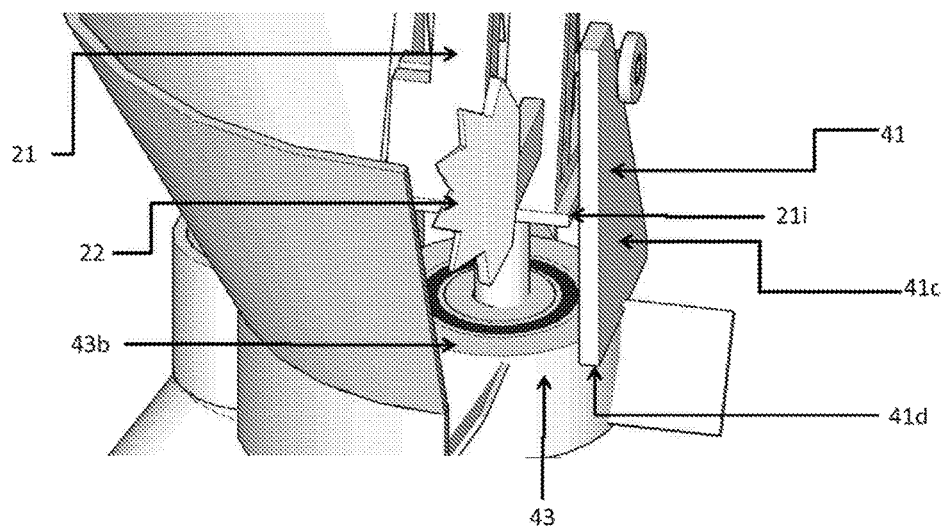

FIG. 73 is a left upper perspective view of Variable-Opening-Entry-Mechanism and Variable-Width-Scraper-Apparatus assembled together with the Variable-Opening-Entry-Mechanism-Jar cut vertically to expose the alignment of the Variable-Opening-Entry-Mechanism-Guide1, blade, Guide-wheel and Sloping-wall of the Variable-Opening-Entry-Mechanism-Jar with one another. Only one blade is shown for the purpose of illustration. Variable-Opening-Entry-Mechanism is vertically at a higher level and at a height from Base-bearing.

Figure 74:
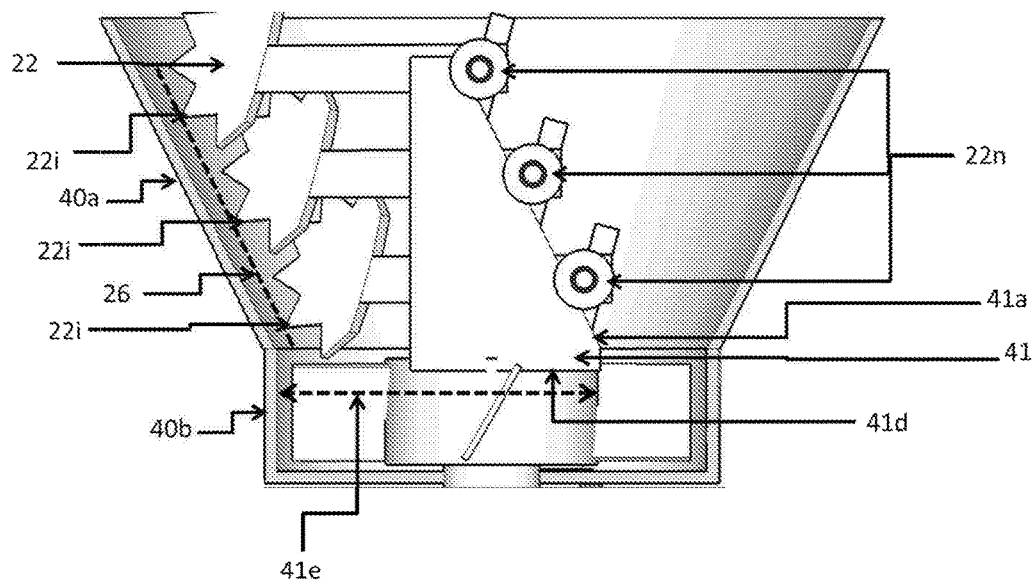

FIG. 74 is a front elevation view of Variable-Opening-Entry-Mechanism and Variable-Width-Scraper-Apparatus assembled together with Variable-Opening-Entry-Mechanism-Jar cut vertically to expose and demonstrate the maximum radially outward movement of blade allowed by Variable-Opening-Entry-Mechanism-Guide1 at three different heights from the Guide1-base.

Figure 75:
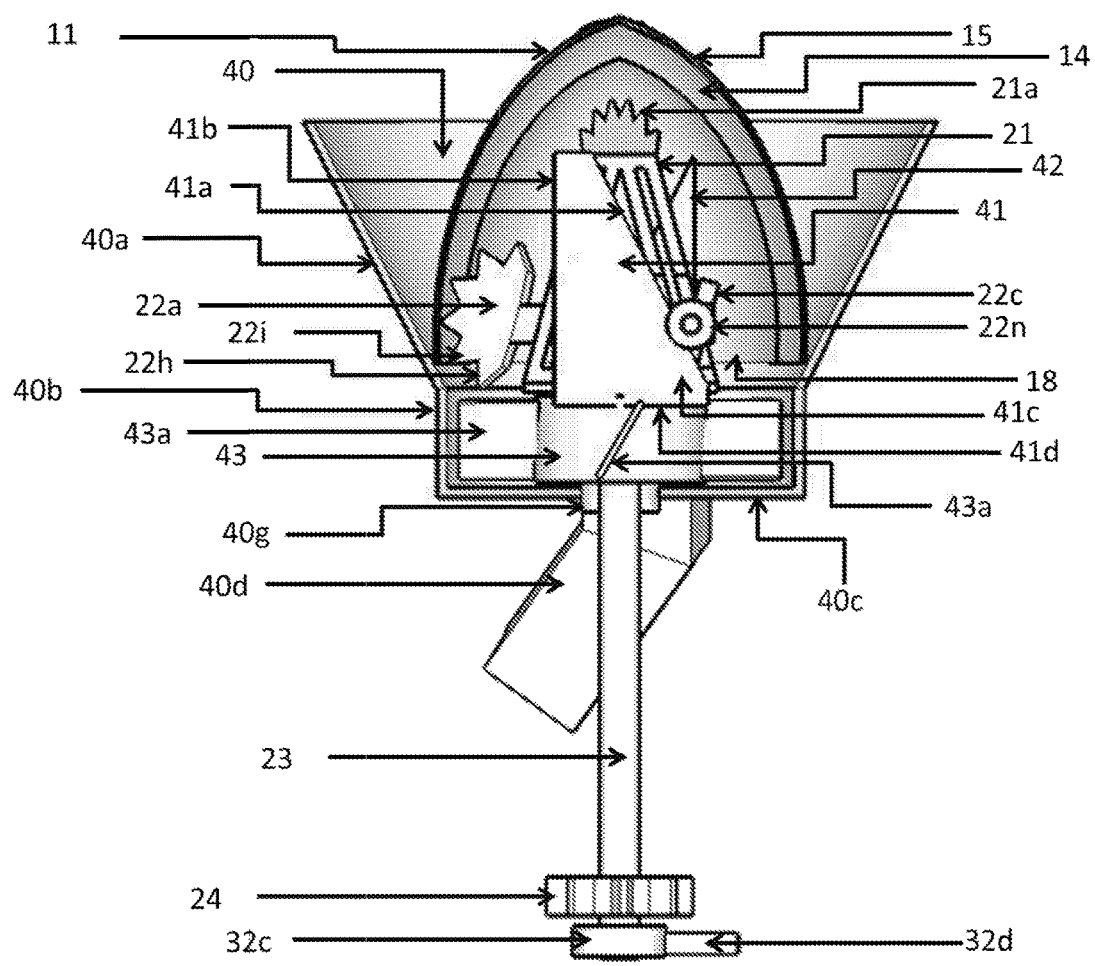

FIG. 75 is a front elevation view of Variable-Opening-Entry-Mechanism and Variable-Width-Scraper-Apparatus assembled together with Variable-Opening-Entry-Mechanism-Jar and Half-coconut cut vertically to expose and demonstrate how a half-coconut with smaller width seats vertically lower in Variable-Opening-Entry-Mechanism-Jar and how Variable-Opening-Entry-Mechanism guides the blade to enter Cut-face-of-coconut optimally. Only one Blade is shown for the purposes of illustration.

Figure 76:
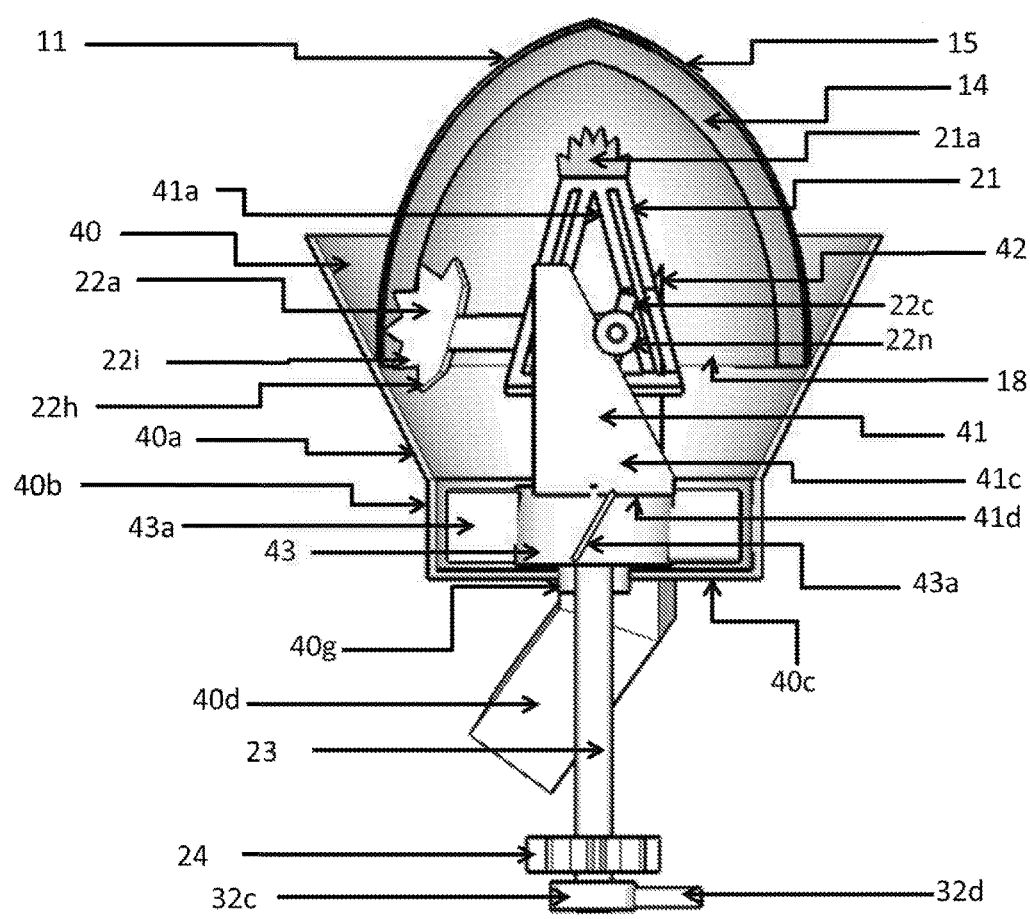

FIG. 76 is a front elevation view of Variable-Opening-Entry-Mechanism and Variable-Width-Scraper-Apparatus assembled together with Variable-Opening-Entry-Mechanism-Jar and Half-coconut cut vertically to expose and demonstrate how a half-coconut with larger width seats vertically higher in Variable-Opening-Entry-Mechanism-Jar and how Variable-Opening-Entry-Mechanism guides the blade to enter Cut-face-of-coconut optimally. Only one Blade is shown for the purposes of illustration.

Figure 77:
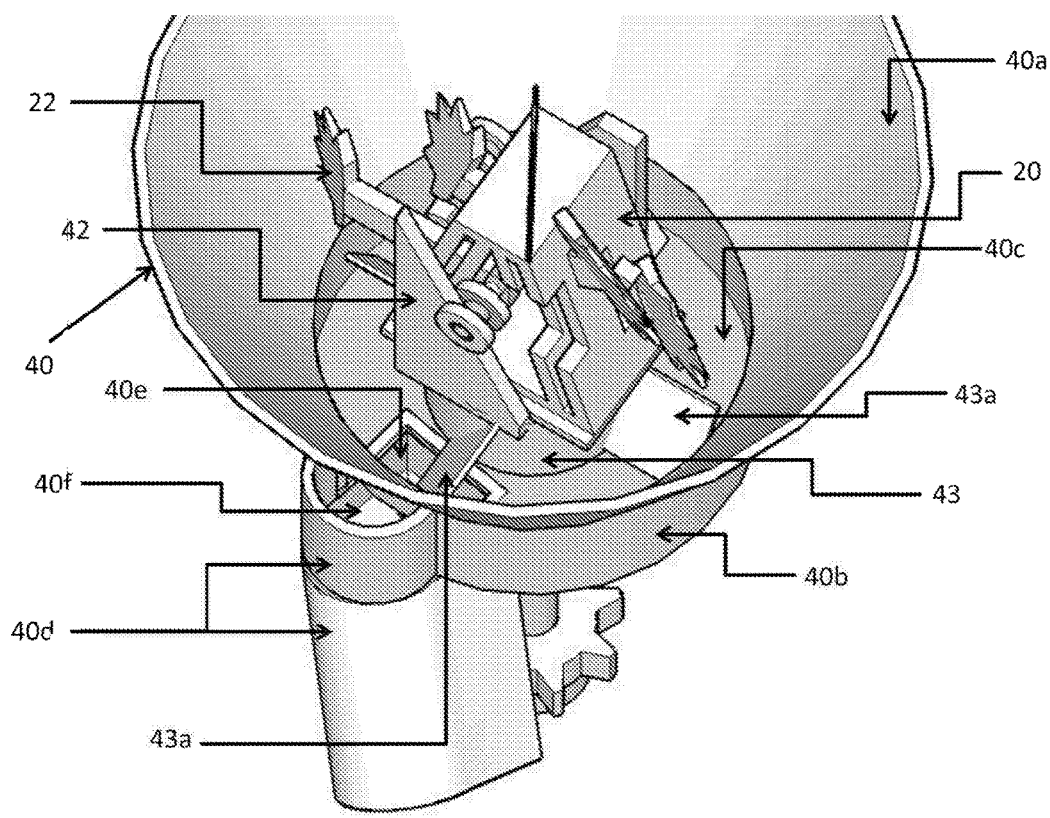

FIG. 77 is a rear upper perspective view of the Coconut Expeller.

Figure 78:
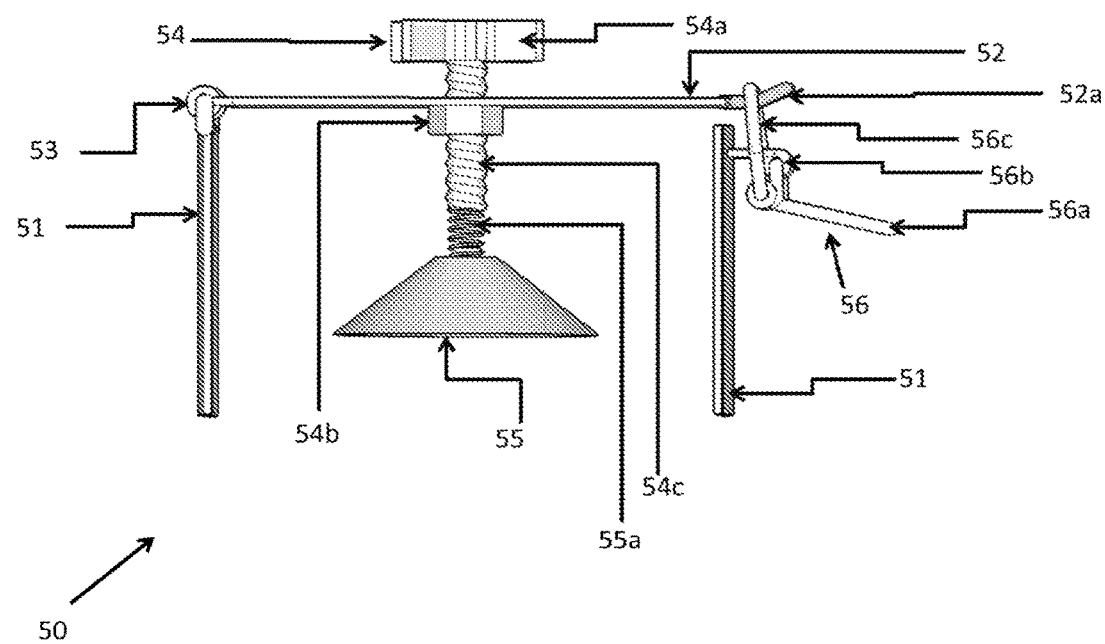

FIG. 78 is a front elevation view of the Coconut-holding-mechanism.

Figure 79:
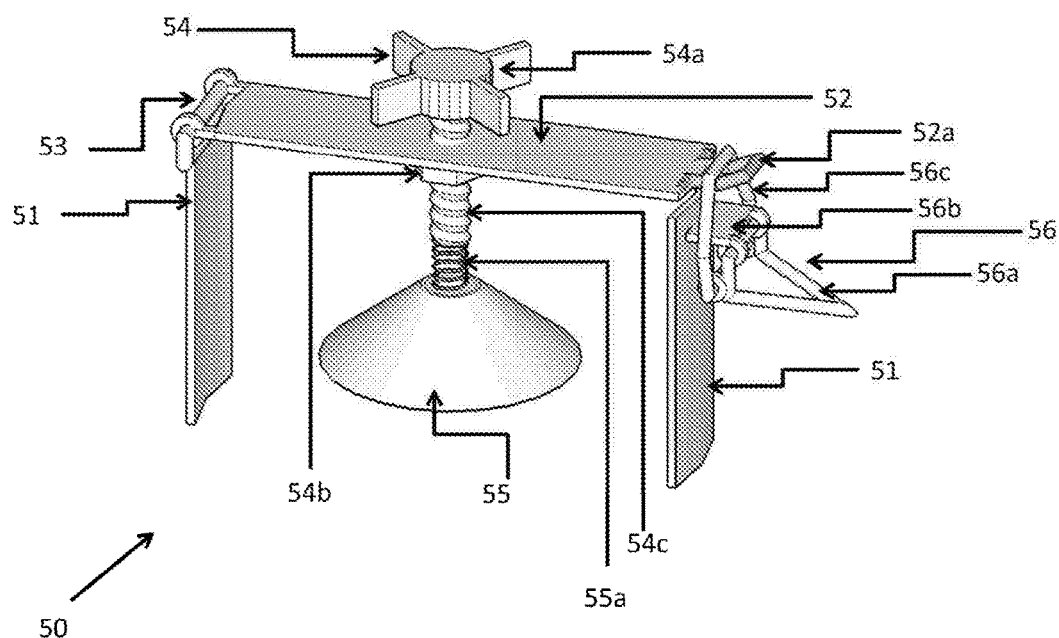

FIG. 79 is a front right upper perspective view of the Coconut-holding-mechanism in closed and locked state.

Figure 80:
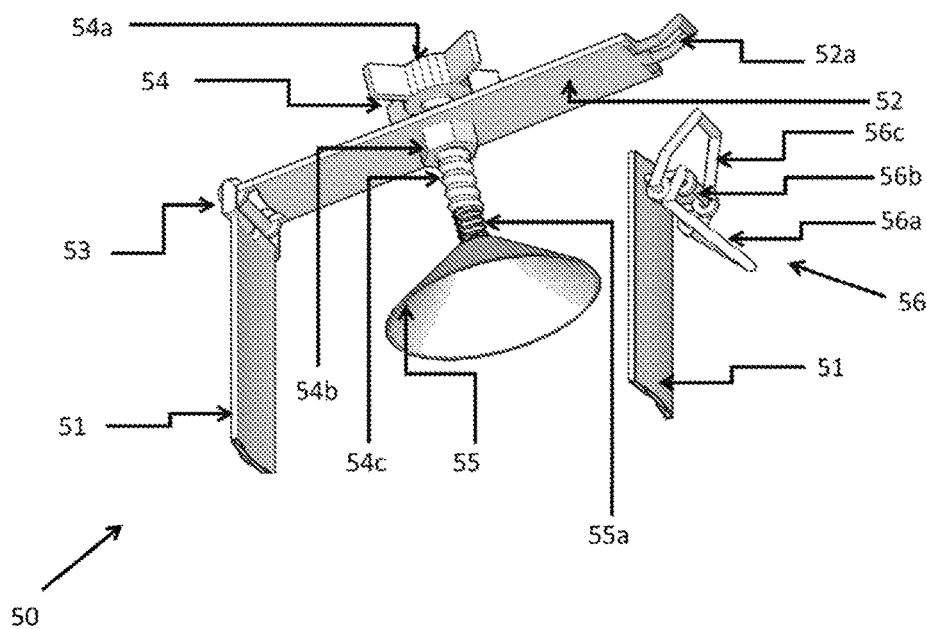

FIG. 80 is a front lower perspective view of the Coconut-holding-mechanism in open state.

Figure 81:
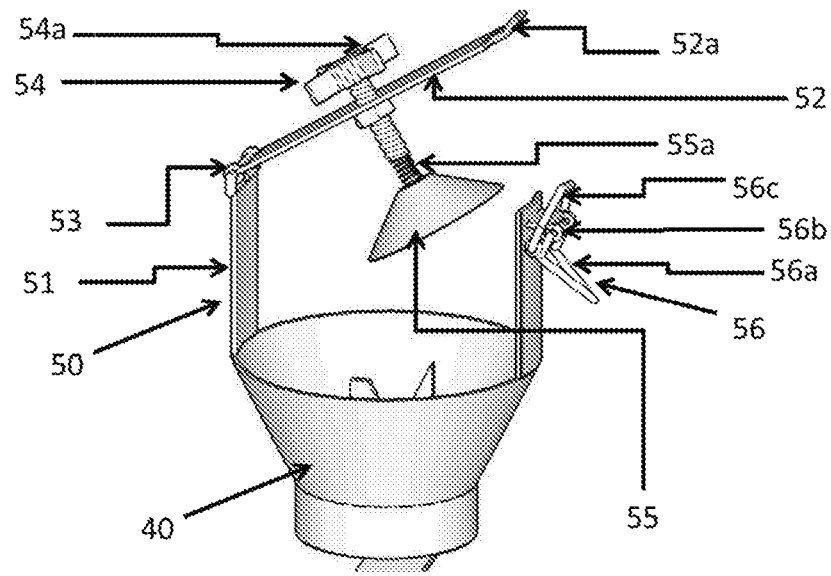

FIG. 81 is a front upper perspective view of the Coconut-holding-mechanism along with Variable-Opening-Entry-Mechanism-Jar in open state.

Figure 82:
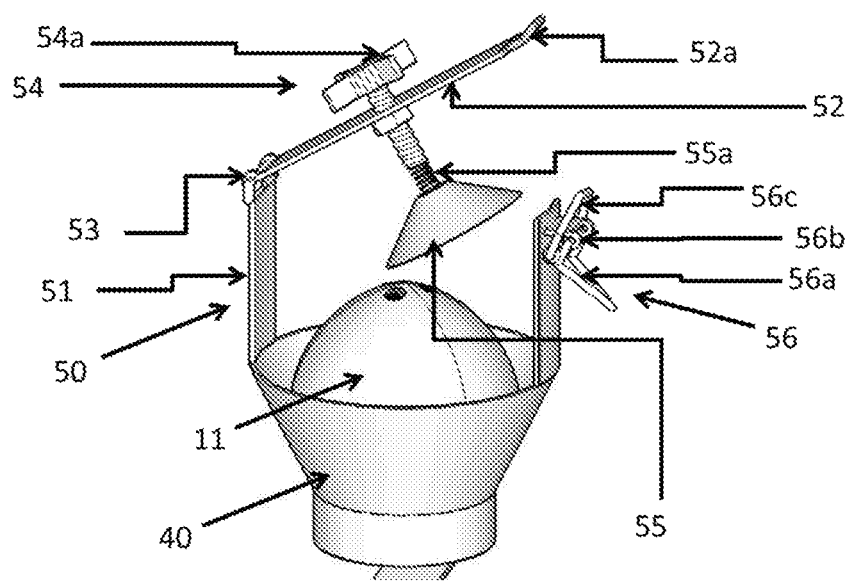

FIG. 82 is a front upper perspective view of the Coconut-holding-mechanism and Variable-Opening-Entry-Mechanism-Jar with half-coconut placed inside in open state.

Figure 83:
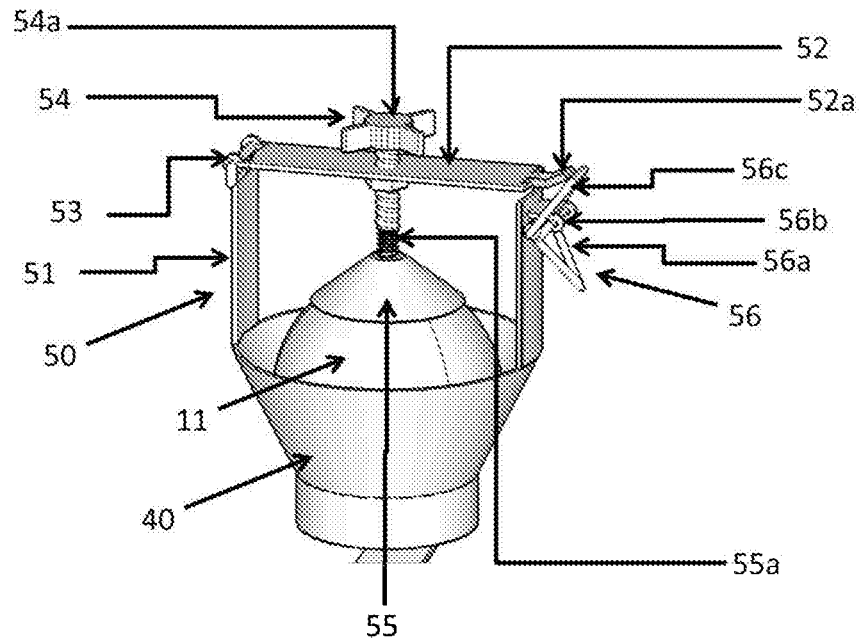

FIG. 83 is a front upper perspective view of the Coconut-holding-mechanism and Variable-Opening-Entry-Mechanism-Jar with half-coconut placed inside in closed state.

Figure 84:
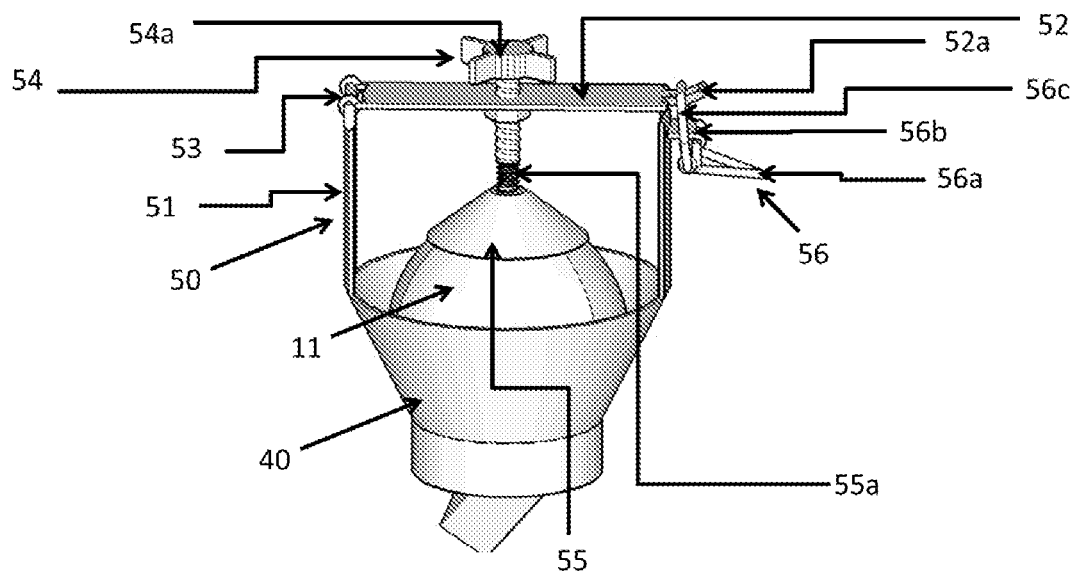

FIG. 84 is a front upper perspective view of the Coconut-holding-mechanism and Variable-Opening-Entry-Mechanism-Jar with half-coconut placed inside in closed and locked state.

Figure 85:
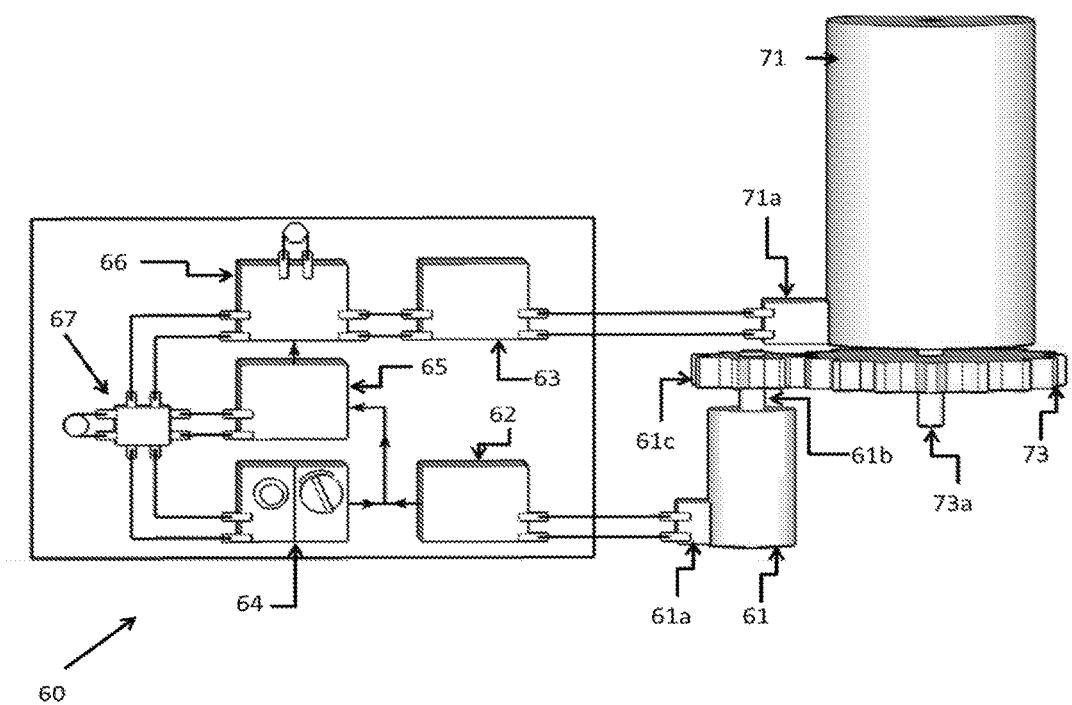

FIG. 85 is a front elevation view of Optimal-Operations-Mechanism along with the Motor-and-driving-gears.

Figure 86:
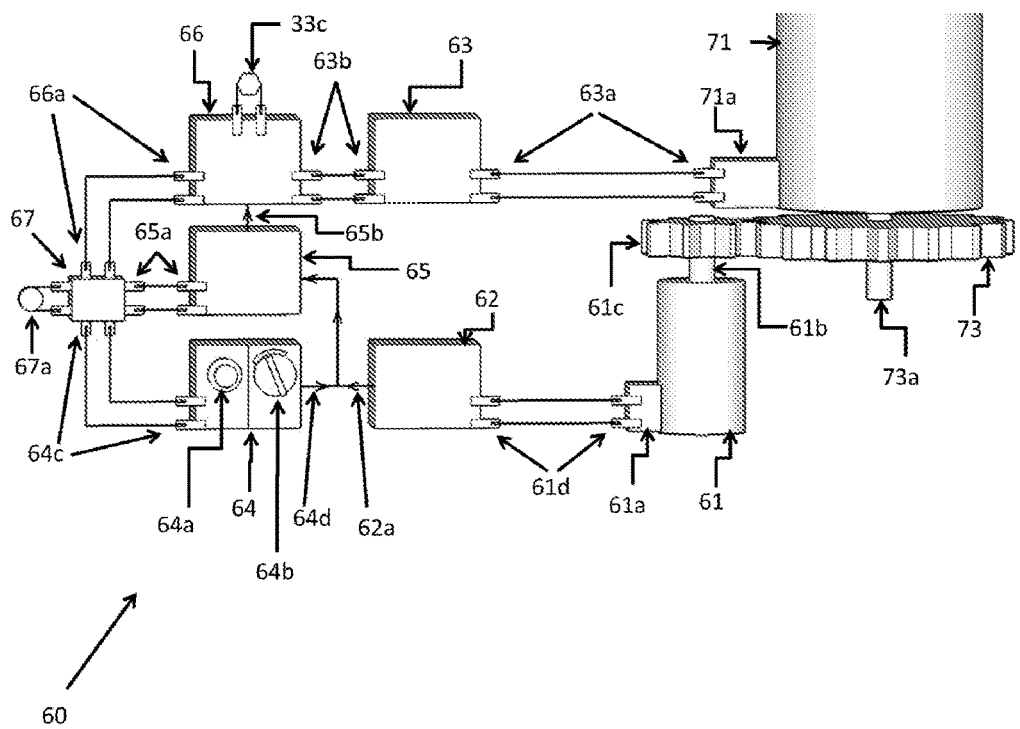

FIG. 86 is a front elevation view of Optimal-Operations-Mechanism in more detail along with the Motor-and-driving-gears.

Figure 87:
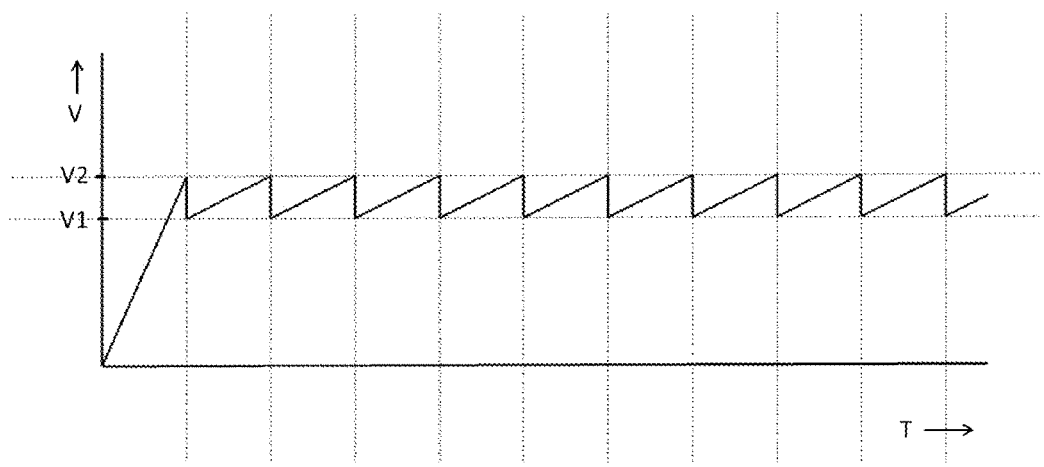

FIG. 87 is a graphical representation of sample 1 waveform of rotational velocity or speed with time of the Main-Motor.

Figure 88:
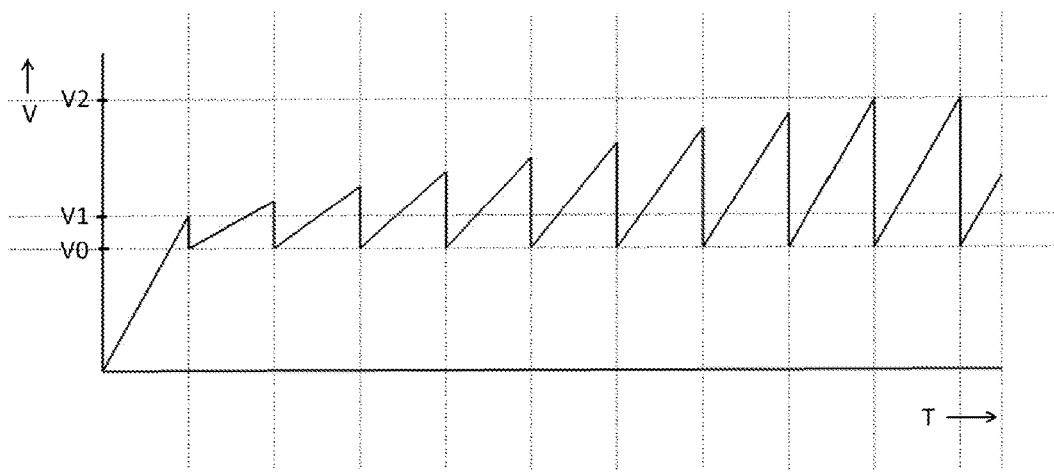

FIG. 88 is a graphical representation of sample 2 waveform of rotational velocity or speed with time of the Main-Motor.

Figure 89:
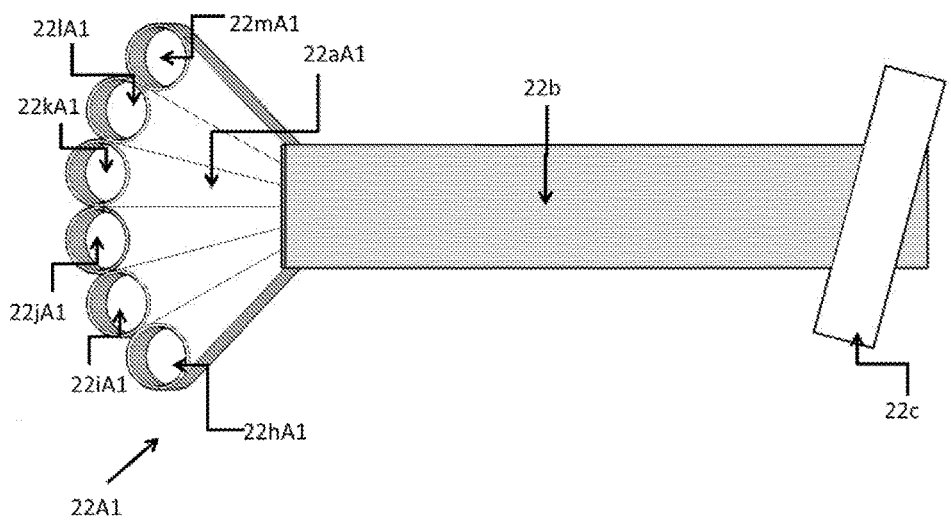
Figure 90:
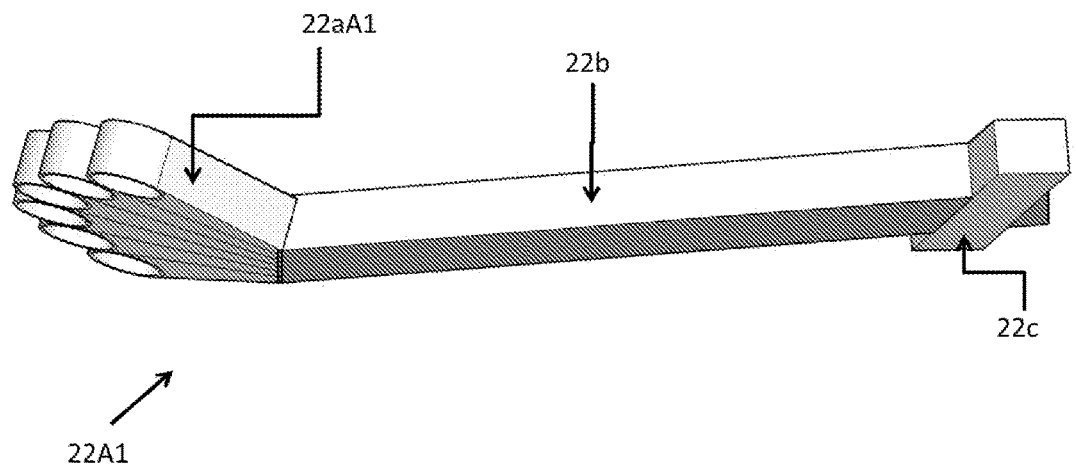

FIG. 89 is a front elevation view of Blade-Alternative1 i.e., the first alternative embodiment of blade FIG. 90 is a front upper perspective view of Blade-Alternative1 i.e., the first alternative embodiment of blade.

Figure 91:
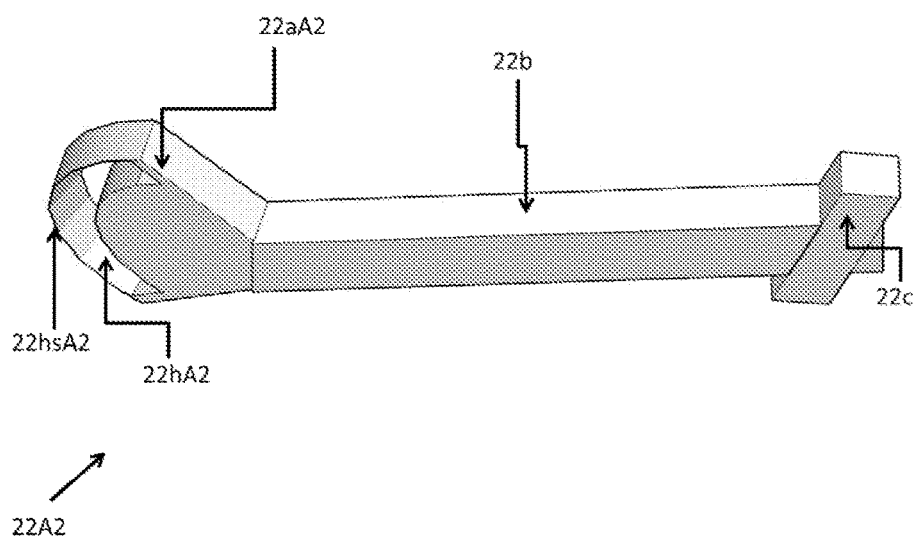

FIG. 91 is a front upper perspective view of Blade-Alternative2 i.e., the second alternative embodiment of blade.

Figure 92:
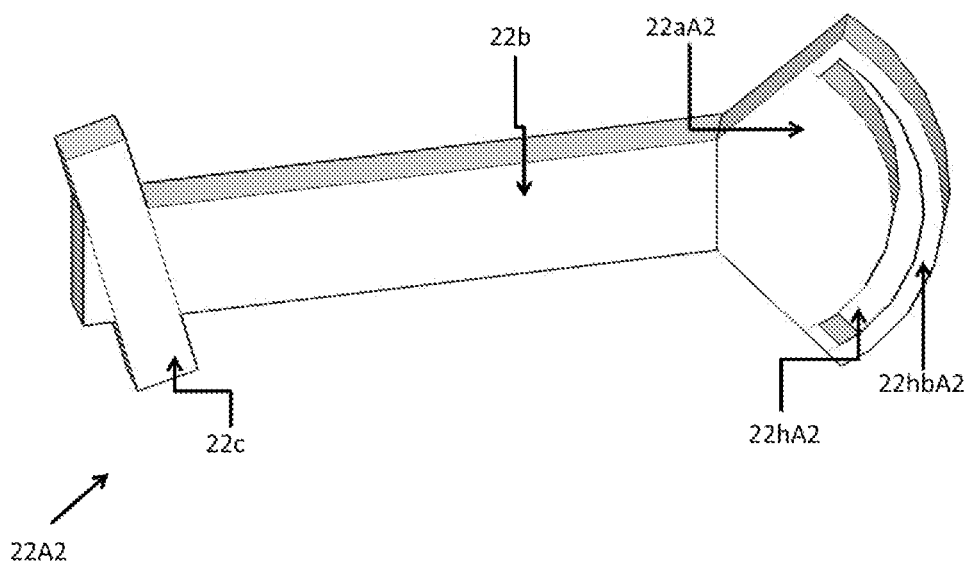

FIG. 92 is a rear upper perspective view of Blade-Alternative2 i.e., the second alternative embodiment of blade.

Figure 93:
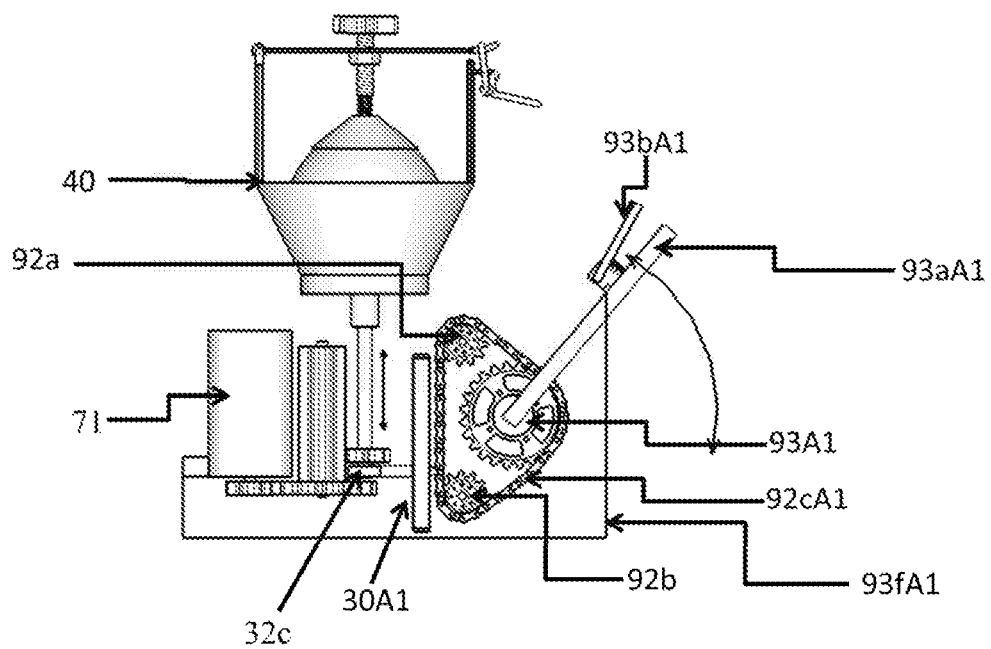

FIG. 93 is a front elevation view of Vertical-Movement-Control-Apparatus-Alternative1 which is the first alternative embodiment of Vertical-Movement-Control-Apparatus.

Figure 94:
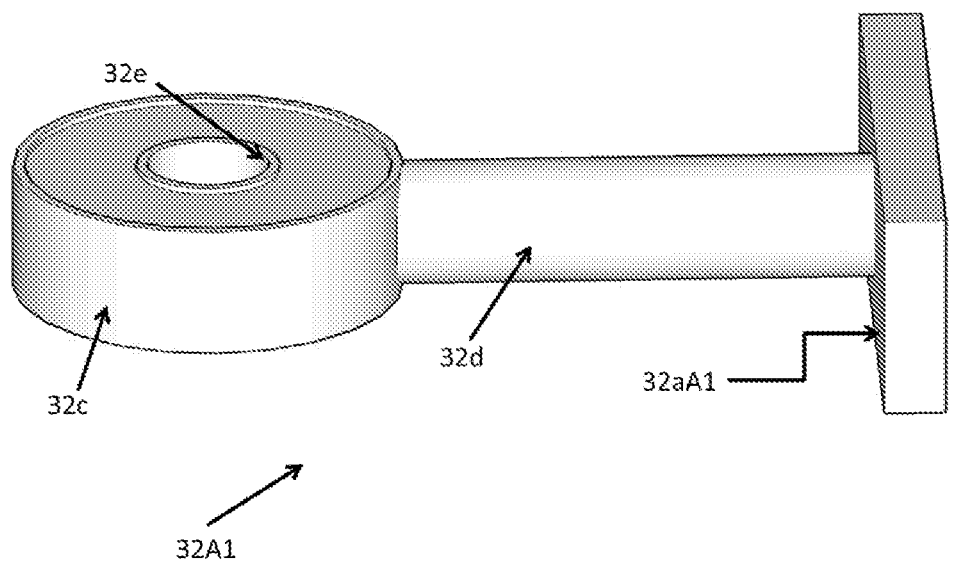

FIG. 94 is a front upper perspective view of Follower-Unit-Alternative-1 of Vertical-Movement-Control-Apparatus-Alternative 1.

Figure 95:
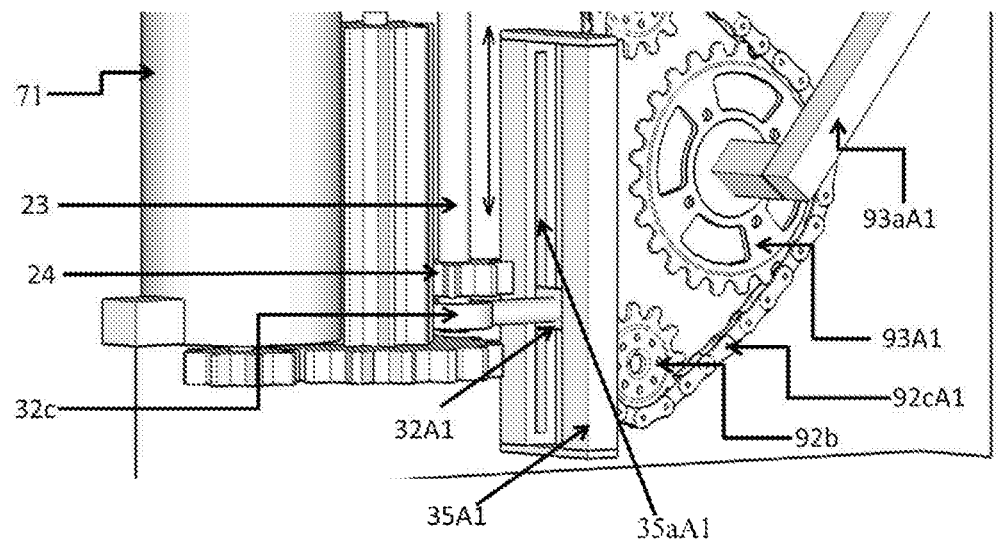

FIG. 95 is a front left upper perspective view of Vertical-Movement-Control-Apparatus-Alternative1 focused on the Follower-Unit-Alternative-1 and its connections to Variable-Width-Scraper-Apparatus-Shaft.

Figure 96:
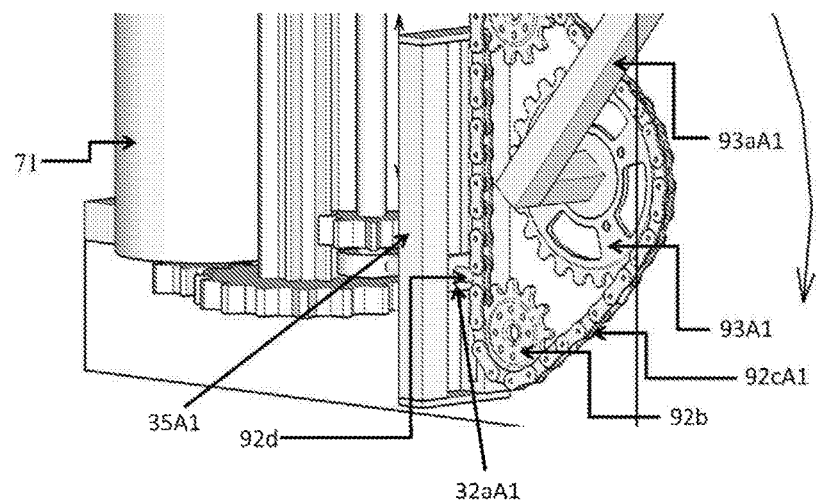

FIG. 96 is a front right upper perspective view of Vertical-Movement-Control-Apparatus-Alternative1 focused on the Follower-Unit-Alternative-1 and its connections to Chain-sprocket-system1-shaft1.

Figure 97:
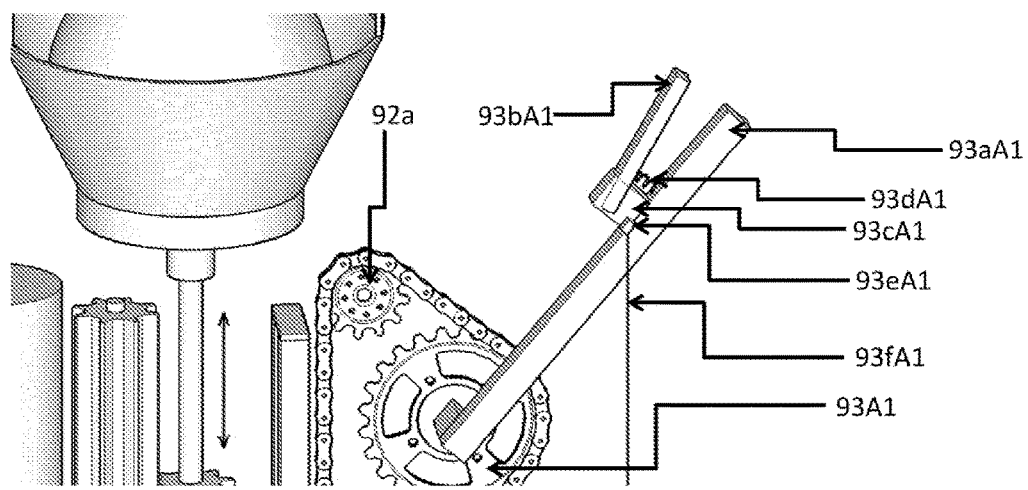

FIG. 97 is a front upper perspective view of Vertical-Movement-Control-Apparatus-Alternative1 focused on the Vertical-Lever and supporting parts.

Figure 98:
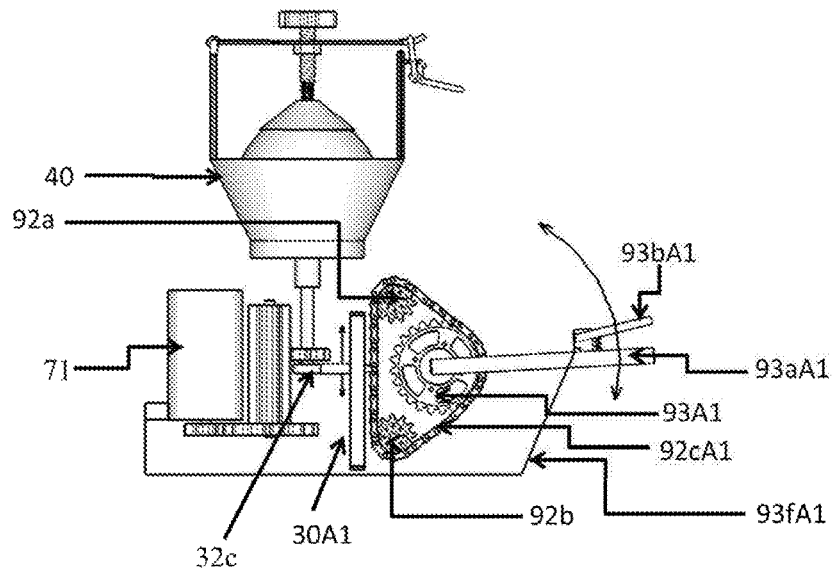

FIG. 98 is a front elevation view of Vertical-Movement-Control-Apparatus-Alternative1 demonstrating movement of Vertical-Lever.

Figure 99:
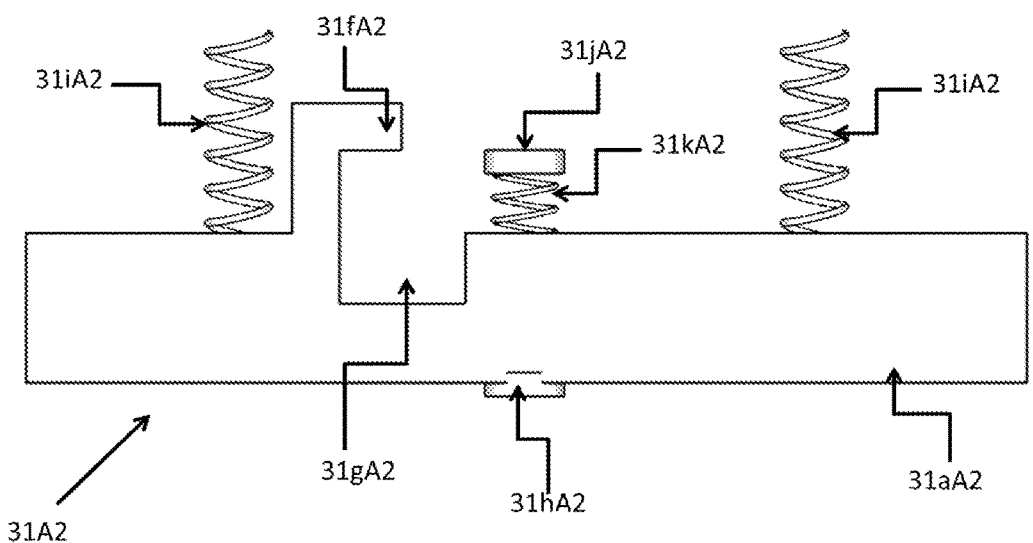

FIG. 99 is a right elevation view of Driver-Unit-Alternative-2 of Vertical-Movement-Control-Apparatus-Alternative2 i.e., the second alternative embodiment of Vertical-Movement-Control-Apparatus.

Figure 100:
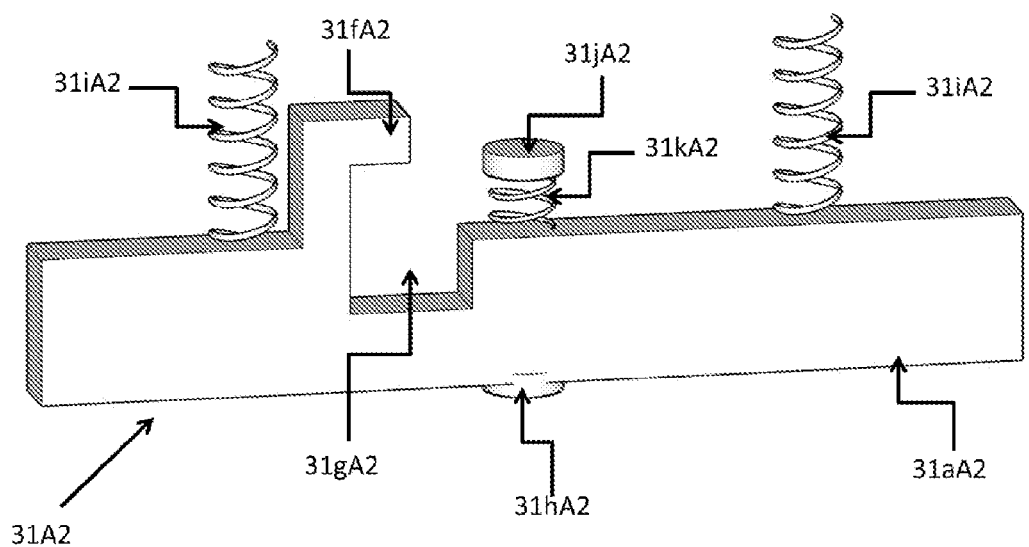

FIG. 100 is a right front upper perspective view of Driver-Unit-Alternative-2 of Vertical-Movement-Control-Apparatus-Alternative2.

Figure 101:
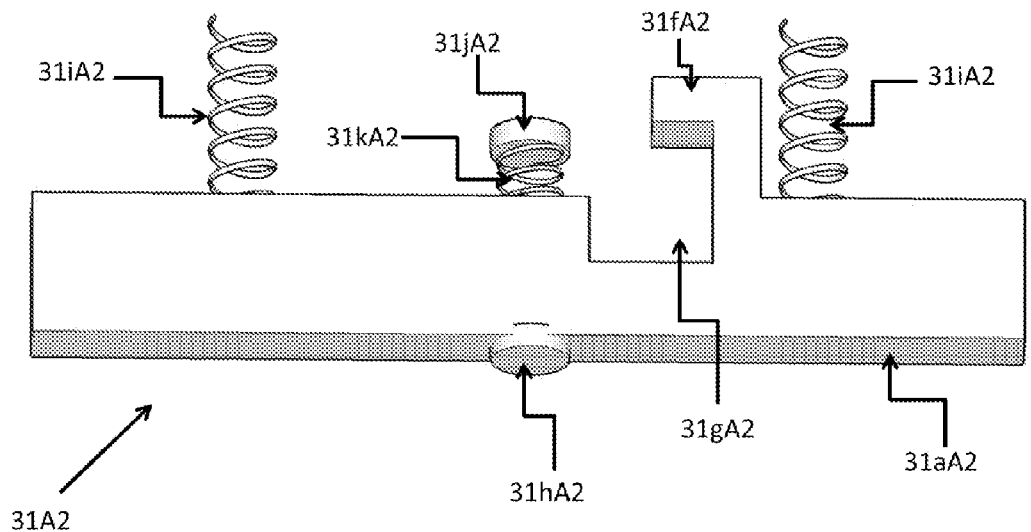

FIG. 101 is a left lower perspective view of Driver-Unit-Alternative-2 of Vertical-Movement-Control-Apparatus-Alternative2.

Figure 102:
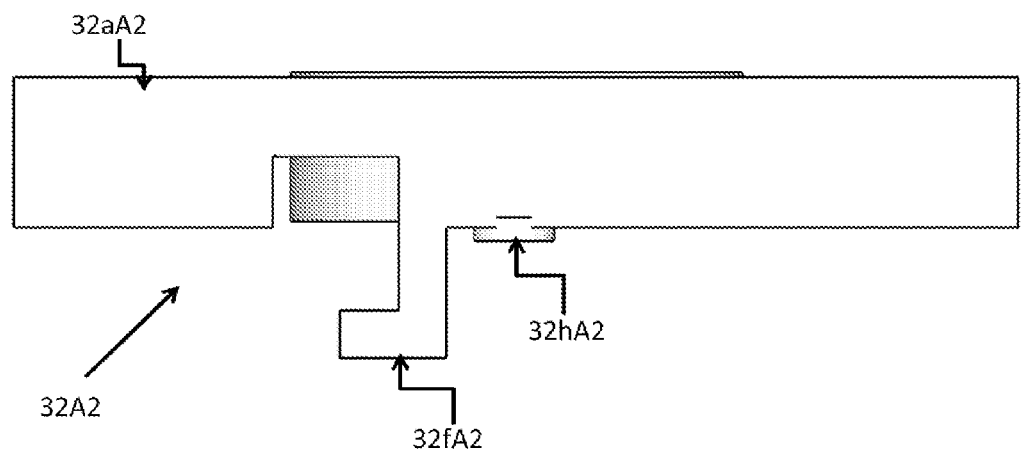

FIG. 102 is a right elevation view of Follower-Unit-Alternative-2 of Vertical-Movement-Control-Apparatus-Alternative2.

Figure 103:
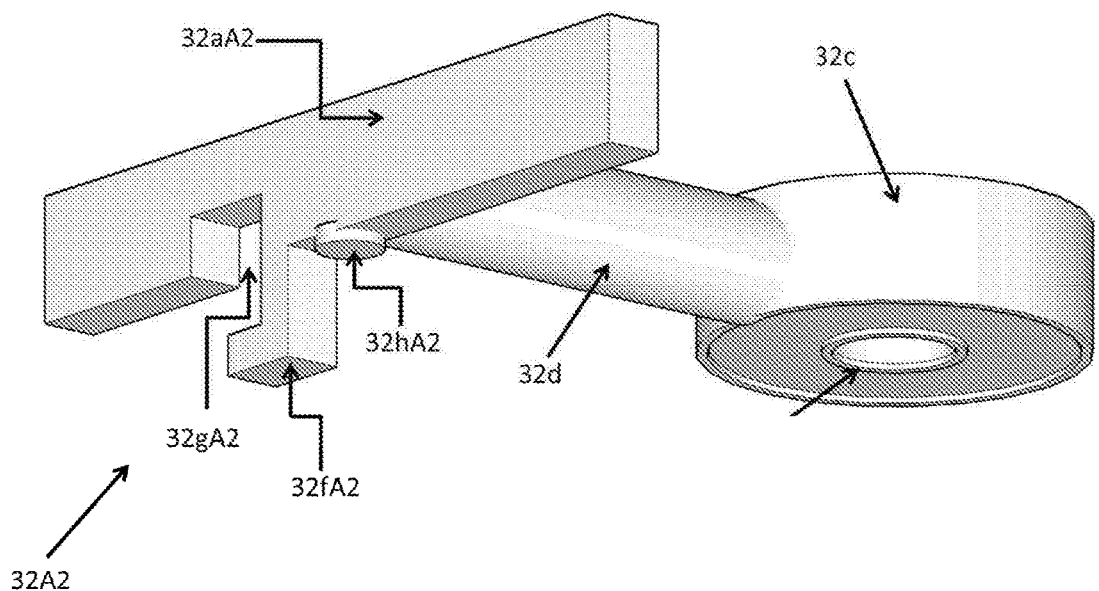

FIG. 103 is a rear left lower perspective view of Follower-Unit-Alternative-2 of Vertical-Movement-Control-Apparatus-Alternative2.

Figure 104:
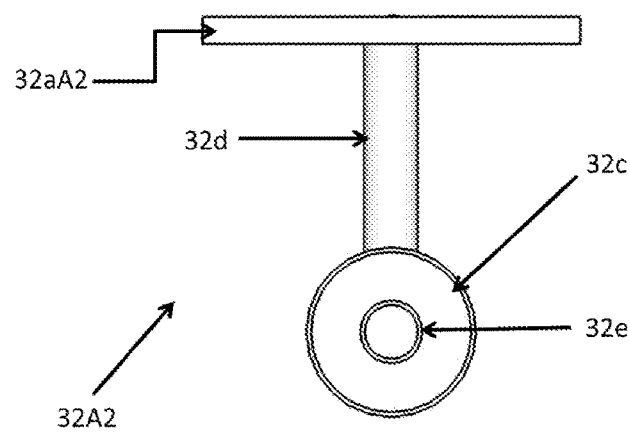

FIG. 104 is a top plan view of Follower-Unit-Alternative-2 of Vertical-Movement-Control-Apparatus-Alternative 2.

Figure 105:
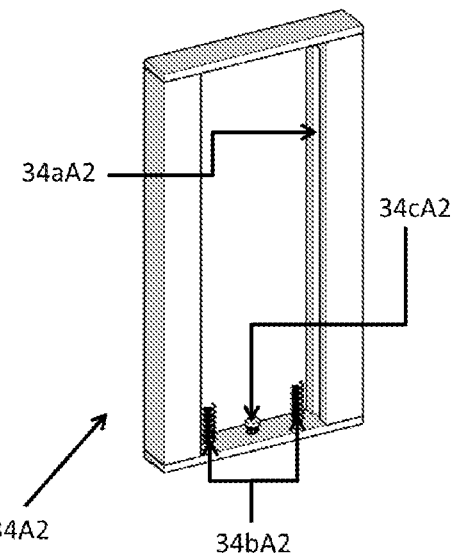

FIG. 105 is a front right upper perspective view of Frame-Alternative-2 which is part of Vertical-Movement-Control-Apparatus-Alternative2.

Figure 106:
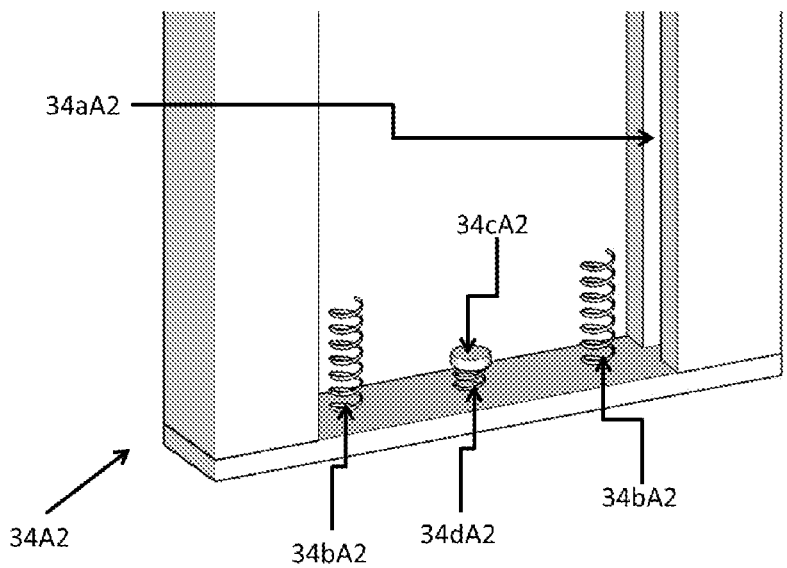

FIG. 106 is a right front upper perspective view of Frame-Alternative-2 which is part of Vertical-Movement-Control-Apparatus-Alternative2. The figure focusses on the lower part of Frame-Alternative-2.

Figure 107:
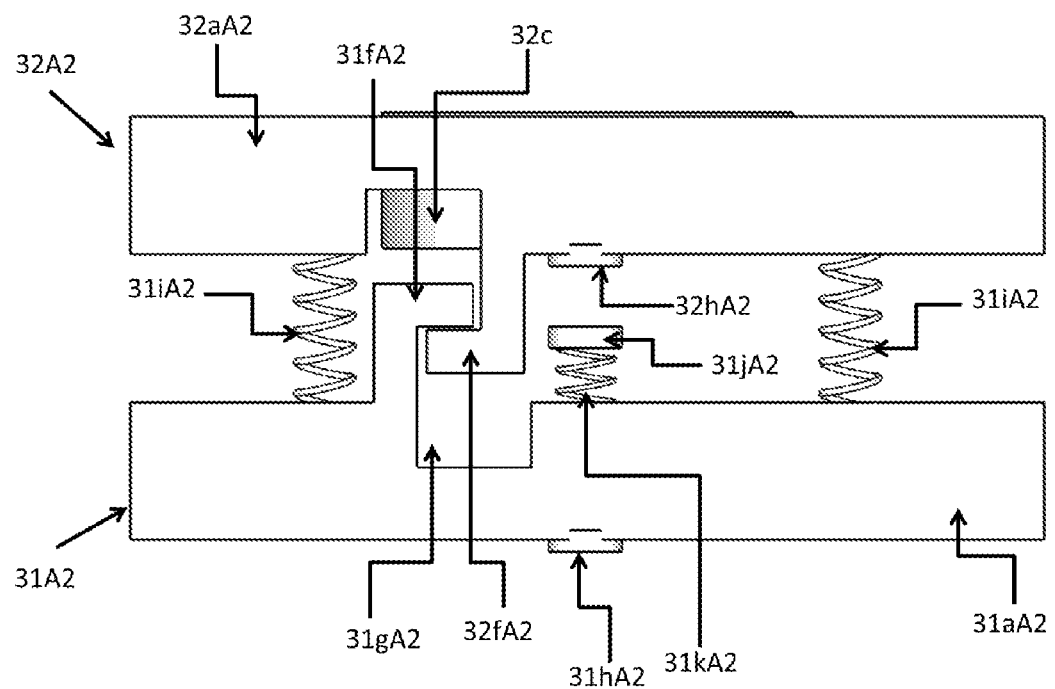

FIG. 107 is a right elevation view of Driver-Unit-Alternative-2 and Follower-Unit-Alternative-2 assembled together as part of Vertical-Movement-Control-Apparatus-Alternative2.

Figure 108:
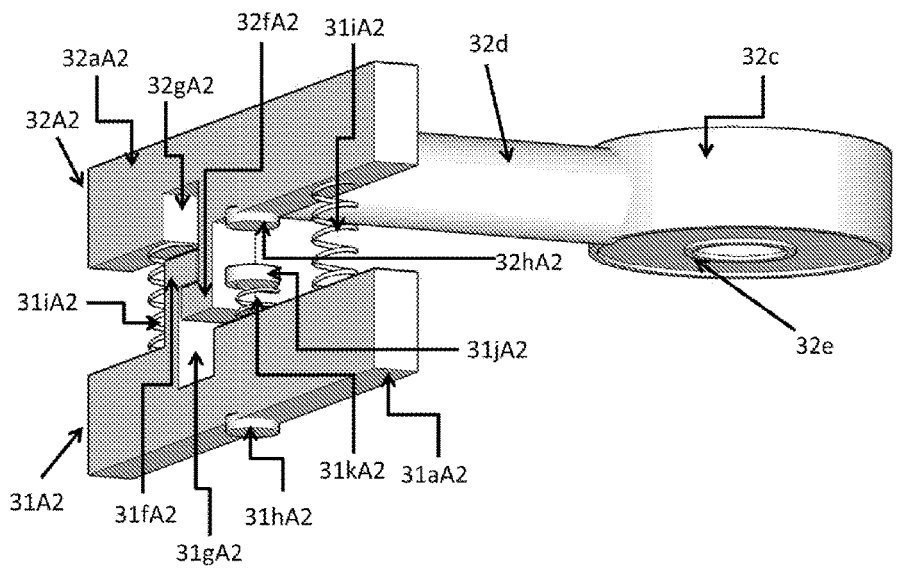

FIG. 108 is a right rear lower perspective view of Driver-Unit-Alternative-2 and Follower-Unit-Alternative-2 assembled together as part of Vertical-Movement-Control-Apparatus-Alternative2.

Figure 109:
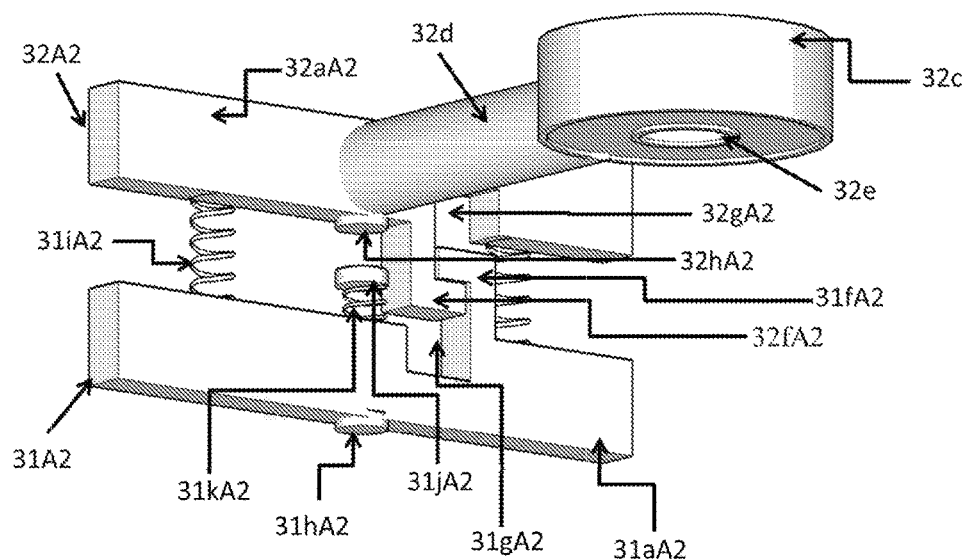

FIG. 109 is a rear left lower perspective view of Driver-Unit-Alternative-2 and Follower-Unit-Alternative-2 assembled together as part of Vertical-Movement-Control-Apparatus-Alternative2.

Figure 110:
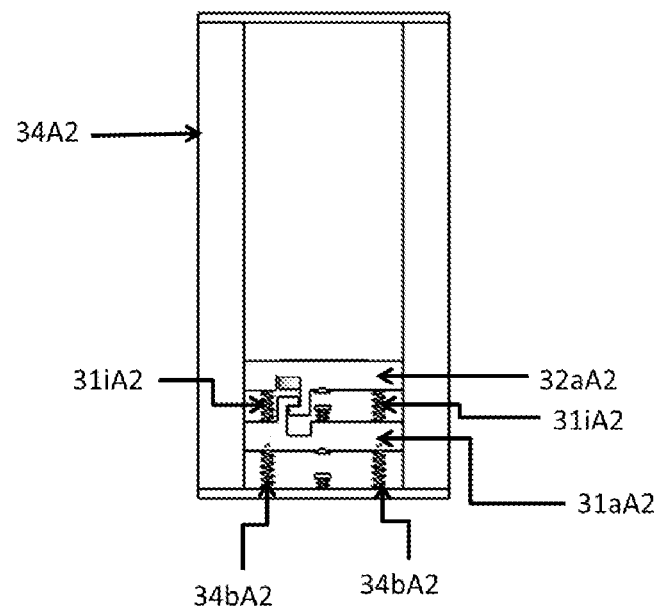

FIG. 110 is a right elevation view of Driver-Unit-Alternative-2 and Follower-Unit-Alternative-2 assembled together inside Frame-Alternative-2 as part of Vertical-Movement-Control-Apparatus-Alternative2.

Figure 111:
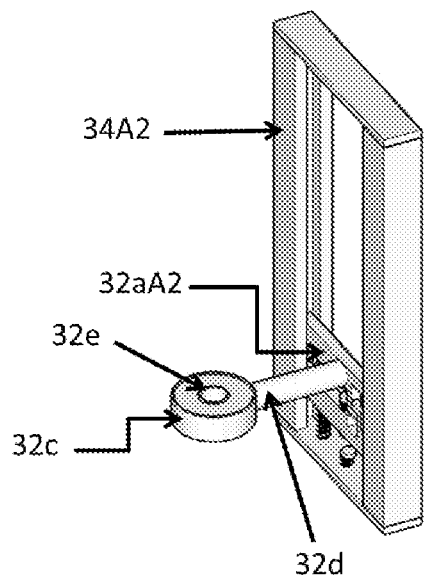

FIG. 111 is a front left upper perspective view of Driver-Unit-Alternative-2 and Follower-Unit-Alternative-2 assembled together inside Frame-Alternative-2 as part of Vertical-Movement-Control-Apparatus-Alternative2.

Figure 112:
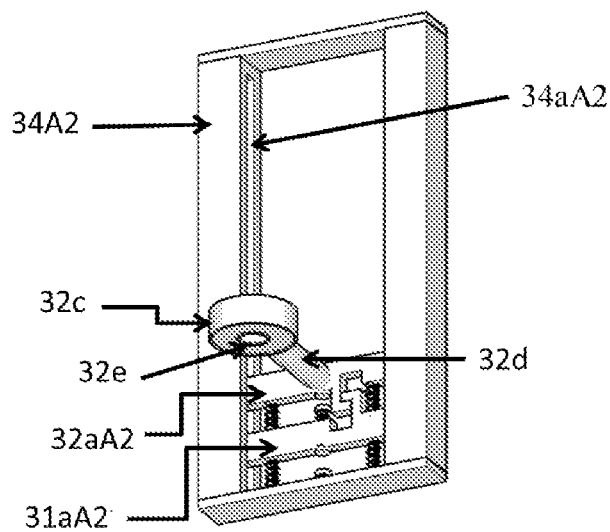

FIG. 112 is a left front lower perspective view of Driver-Unit-Alternative-2 and Follower-Unit-Alternative-2 assembled together inside Frame-Alternative-2 as part of Vertical-Movement-Control-Apparatus-Alternative2.

Figure 113:
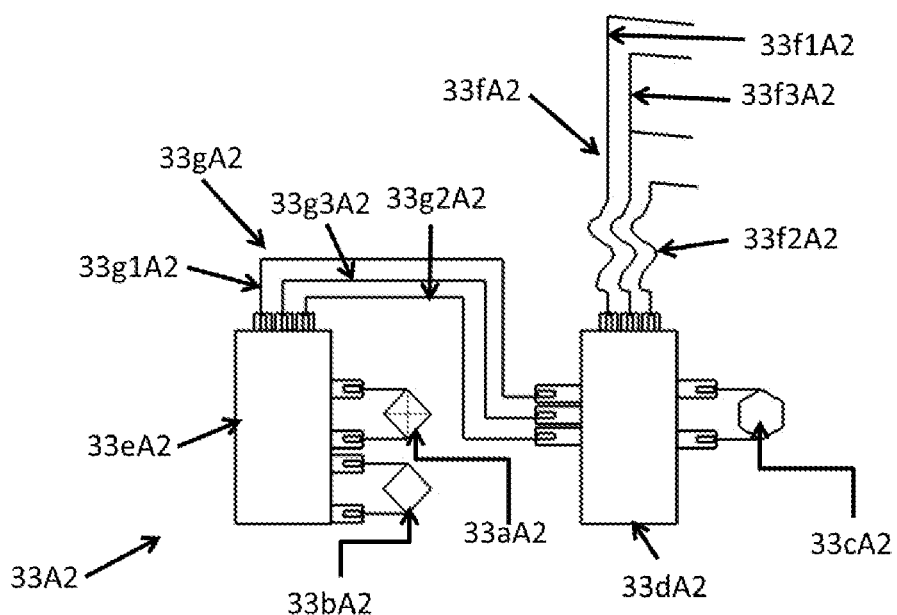

FIG. 113 is a front elevation view of Power-unit-Alternative-2 which is part of Vertical-Movement-Control-Apparatus-Alternative2.

Figure 114:
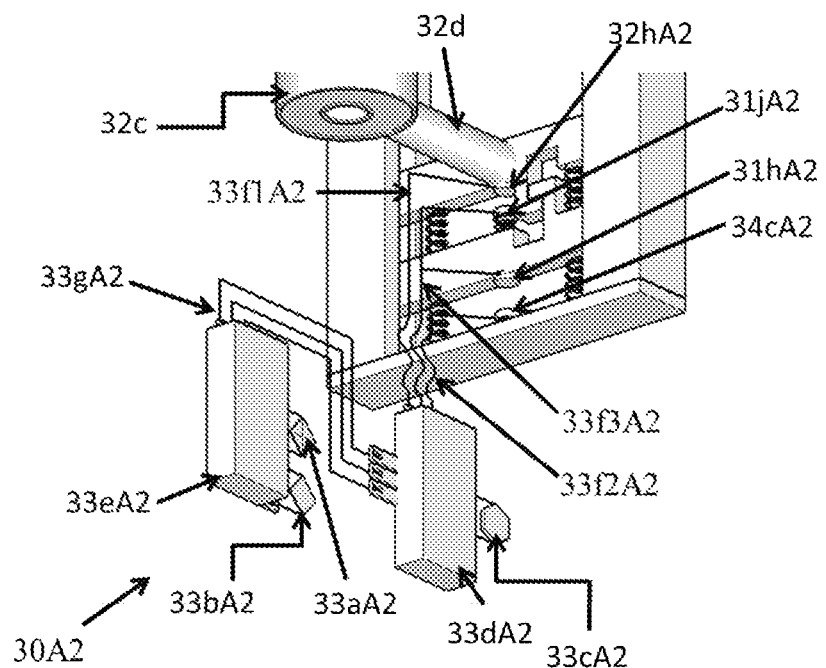

FIG. 114 is a front left lower perspective view of Driver-Unit-Alternative-2 and Follower-Unit-Alternative-2 assembled together inside Frame-Alternative-2 connected to the Power-unit-Alternative-2 as part of Vertical-Movement-Control-Apparatus-Alternative2.

Figure 115:
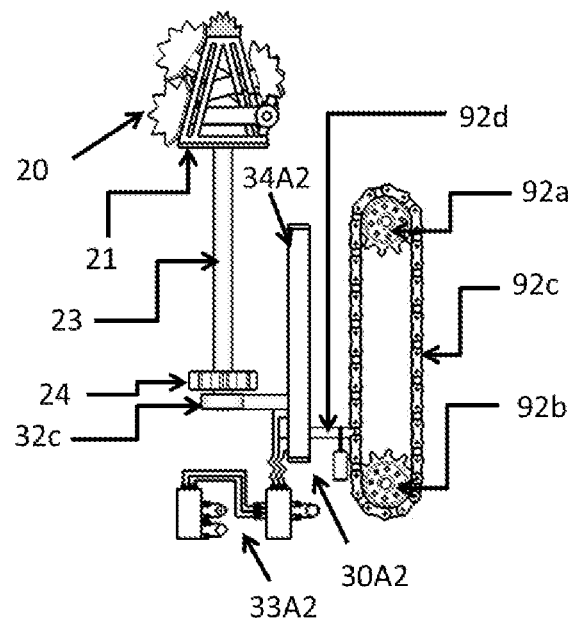

FIG. 115 is a front elevation view of Vertical-Movement-Control-Apparatus-Alternative2 connected to supporting parts.

Figure 116:
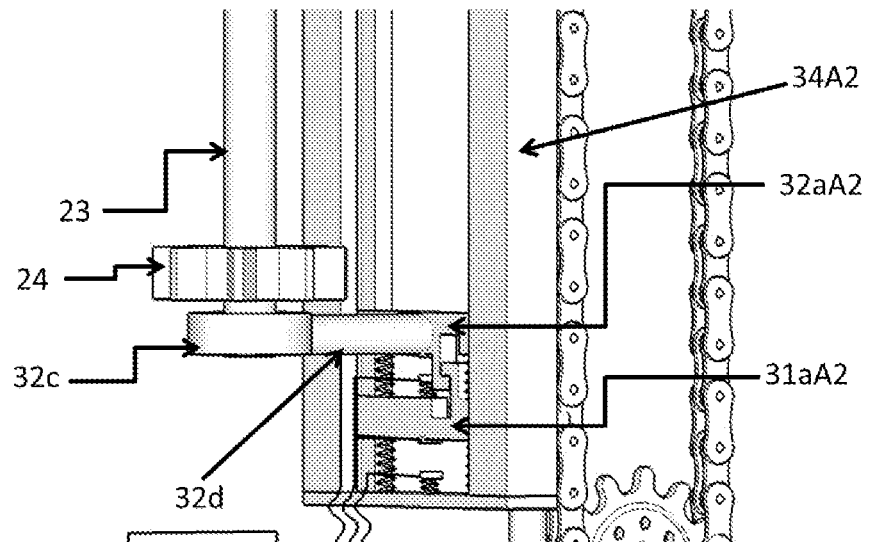

FIG. 116 is a front left perspective view of Vertical-Movement-Control-Apparatus-Alternative2 connected to supporting parts focused on the connection of the Follower-Unit-Alternative-2 to the Variable-Width-Scraper-Apparatus-Shaft.

Figure 117:
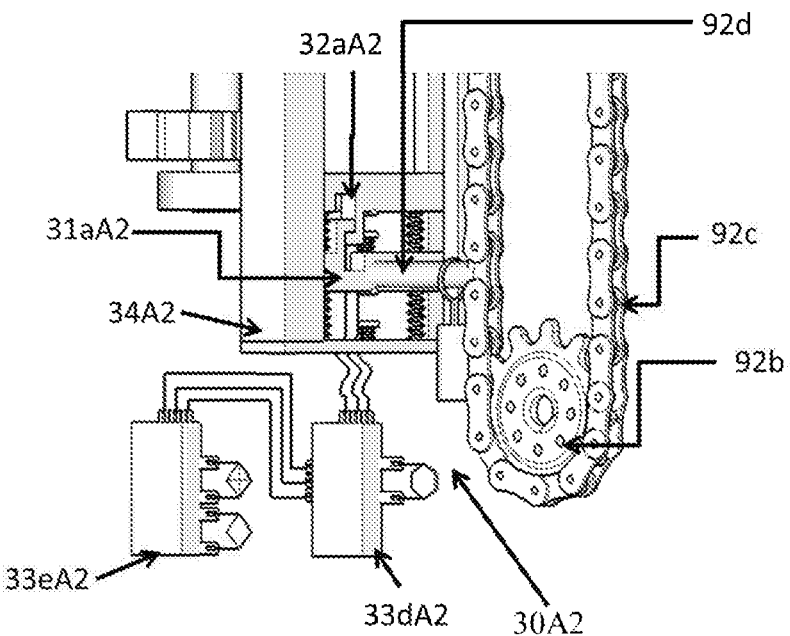

FIG. 117 is a front right perspective view of Vertical-Movement-Control-Apparatus-Alternative2 connected to supporting parts focused on the connection of the Driver-Unit-Alternative-2 to the Chain-sprocket-system2-connecting-rod.

Figure 118:
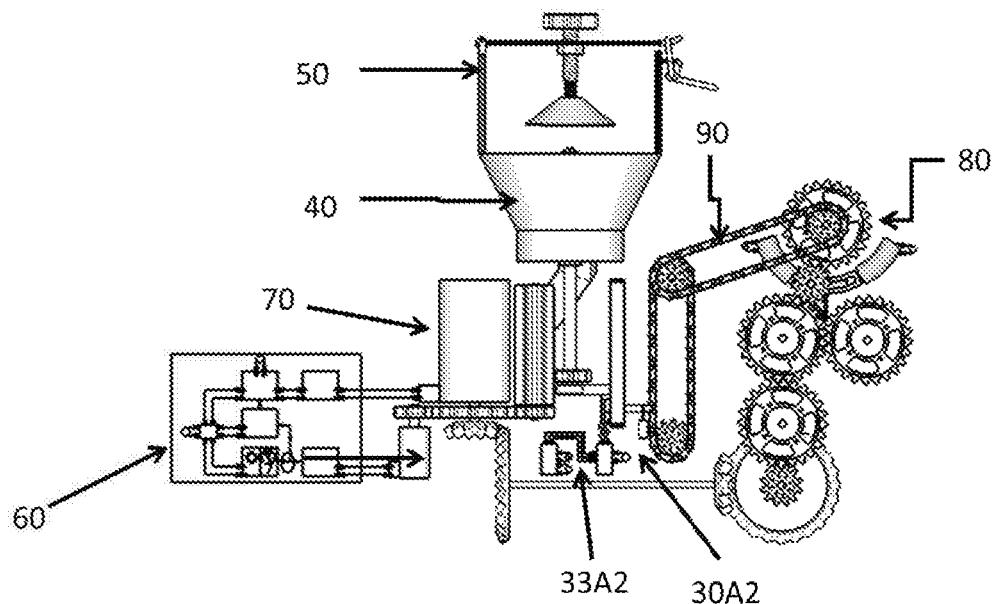

FIG. 118 is a front elevation view of apparatus to scrape coconut with Vertical-Movement-Control-Apparatus-Alternative2 as part of it.

Figure 119:
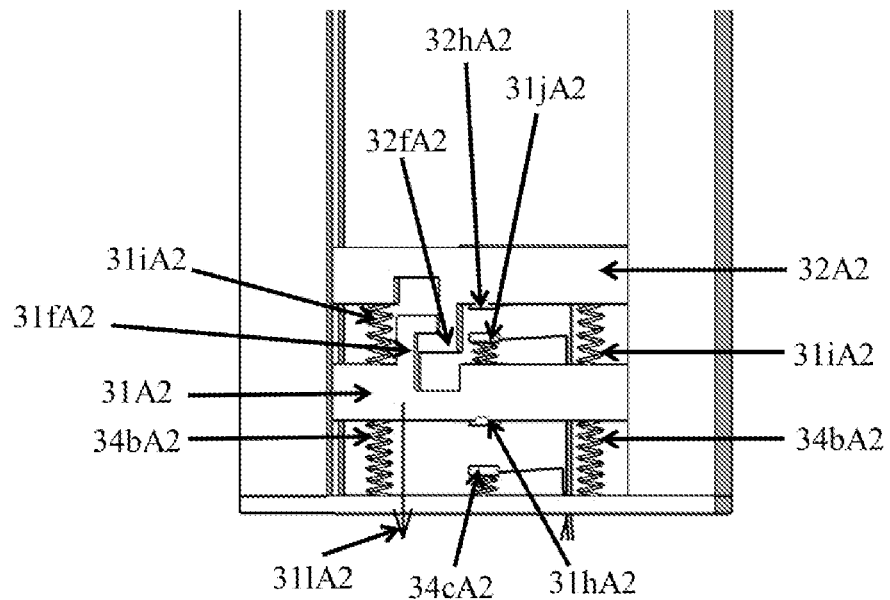

FIG. 119 is a front right perspective view showing step1 of how the Driver-Unit-Alternative-2 and Follower-Unit-Alternative-2 work together to control and change the direction of vertically upward and downward movement as part of Vertical-Movement-Control-Apparatus-Alternative2.

Figure 120:
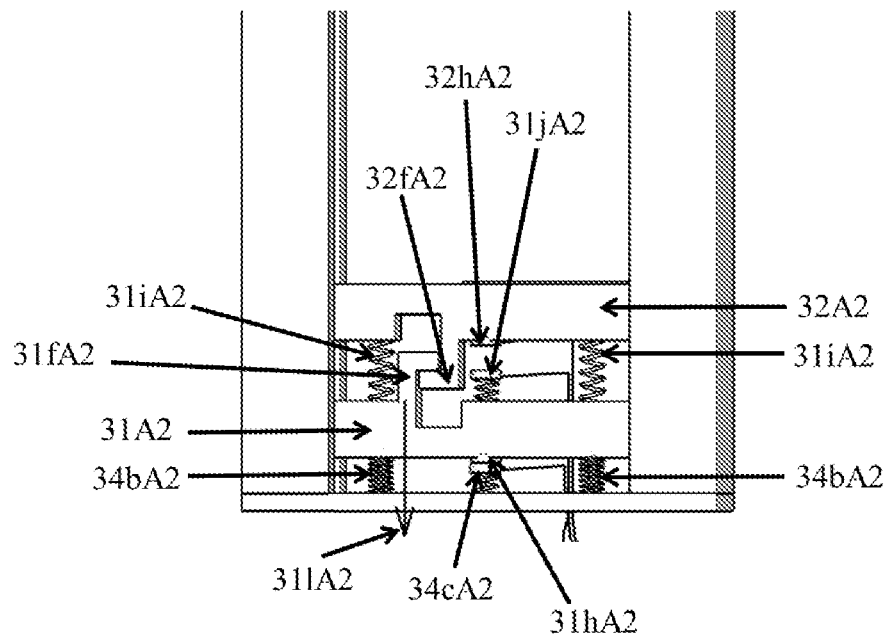

FIG. 120 is a front right perspective view showing step2 of how the Driver-Unit-Alternative-2 and Follower-Unit-Alternative-2 work together to control and change the direction of vertically upward and downward movement as part of Vertical-Movement-Control-Apparatus-Alternative2.

Figure 121:
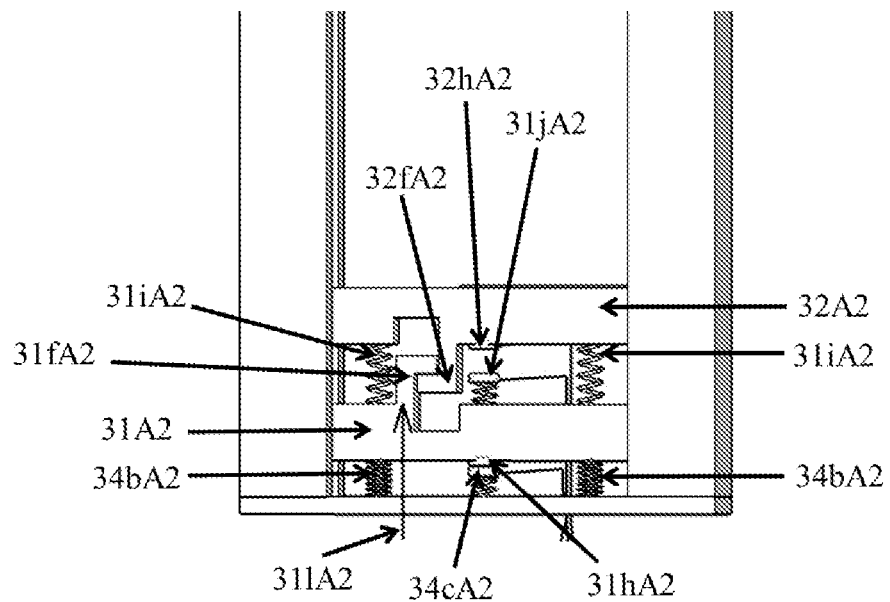

FIG. 121 is a front right perspective view showing step3 of how the Driver-Unit-Alternative-2 and Follower-Unit-Alternative-2 work together to control and change the direction of vertically upward and downward movement as part of Vertical-Movement-Control-Apparatus-Alternative2.

Figure 122:
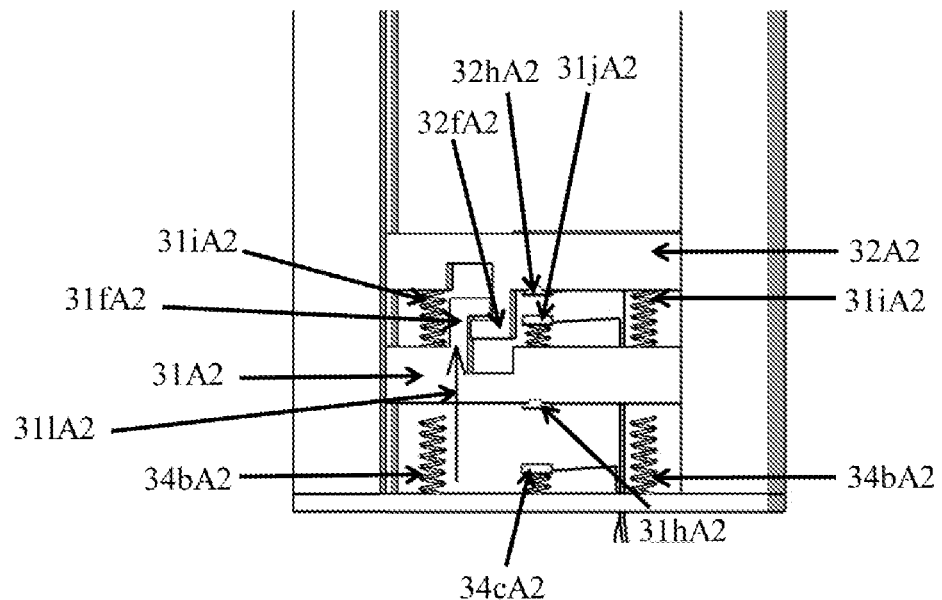

FIG. 122 is a front right perspective view showing step4 of how the Driver-Unit-Alternative-2 and Follower-Unit-Alternative-2 work together to control and change the direction of vertically upward and downward movement as part of Vertical-Movement-Control-Apparatus-Alternative2.

Figure 123:
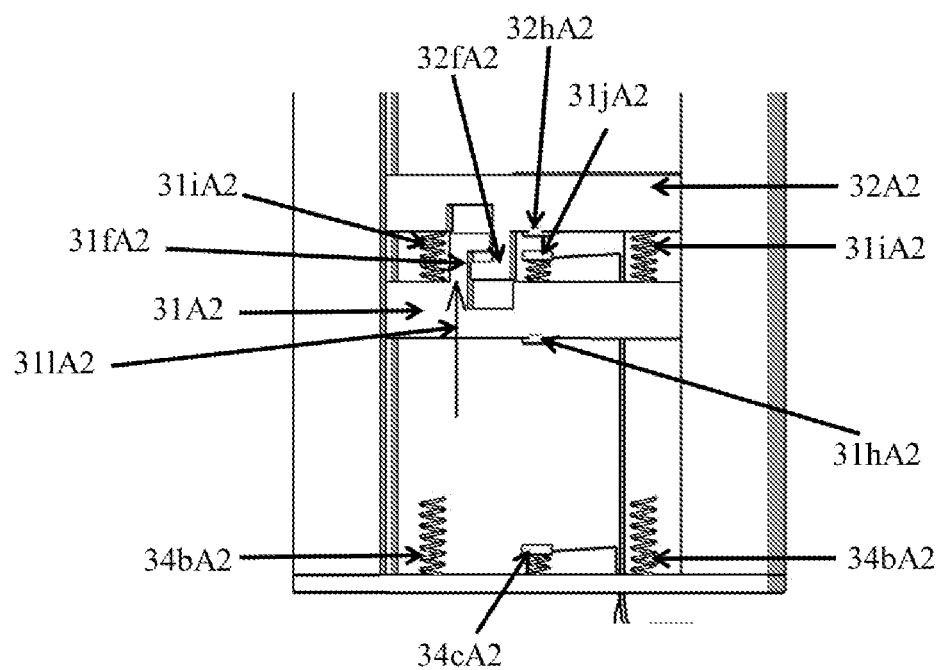

FIG. 123 is a front right perspective view showing step5 of how the Driver-Unit-Alternative-2 and Follower-Unit-Alternative-2 work together to control and change the direction of vertically upward and downward movement as part of Vertical-Movement-Control-Apparatus-Alternative2.

Figure 124:
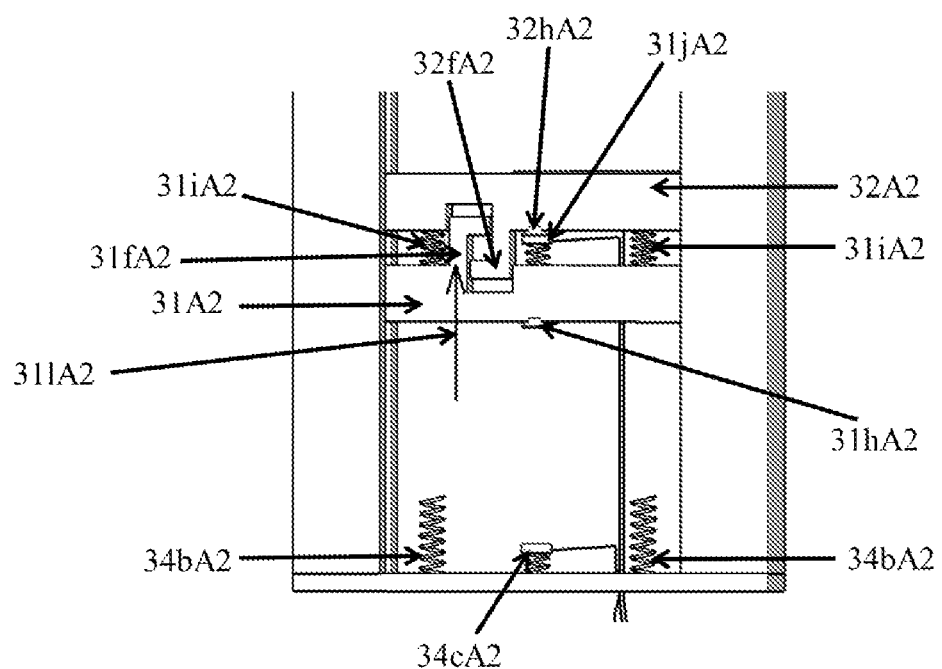

FIG. 124 is a front right perspective view showing step6 of how the Driver-Unit-Alternative-2 and Follower-Unit-Alternative-2 work together to control and change the direction of vertically upward and downward movement as part of Vertical-Movement-Control-Apparatus-Alternative2.

Figure 125:
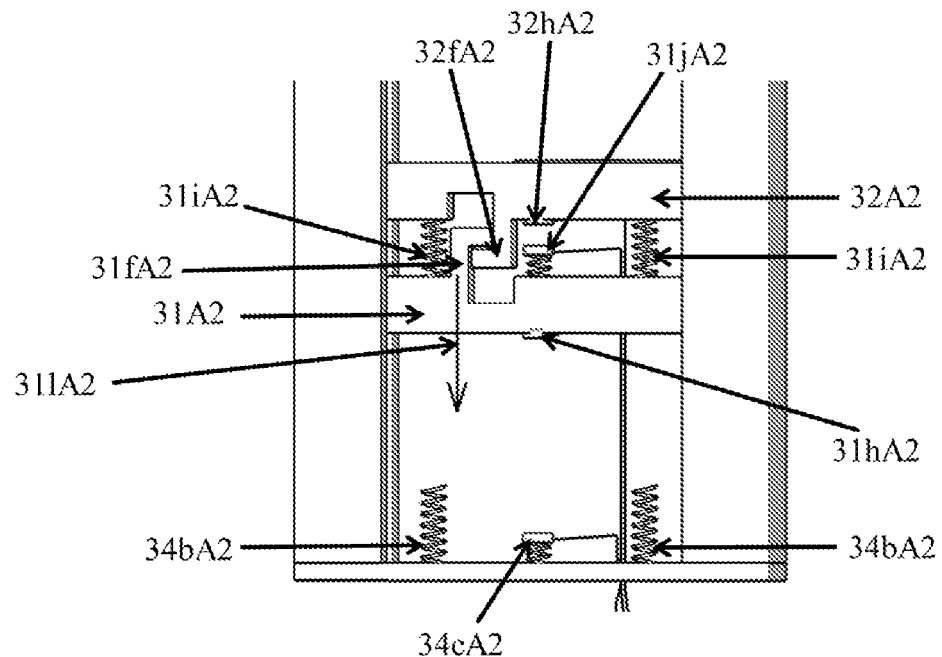

FIG. 125 is a front right perspective view showing step7 of how the Driver-Unit-Alternative-2 and Follower-Unit-Alternative-2 work together to control and change the direction of vertically upward and downward movement as part of Vertical-Movement-Control-Apparatus-Alternative2.

Figure 126:
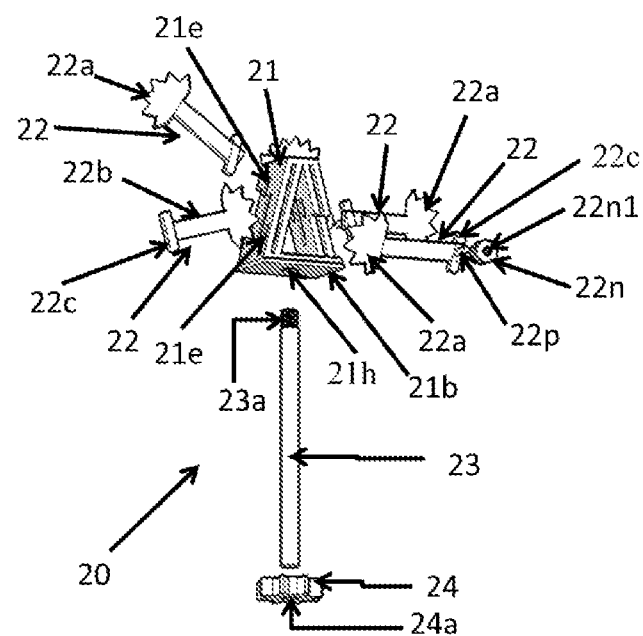

FIG. 126 is an exploded front left lower perspective view of Variable-Width-Scraper-Apparatus.

Figure 127:
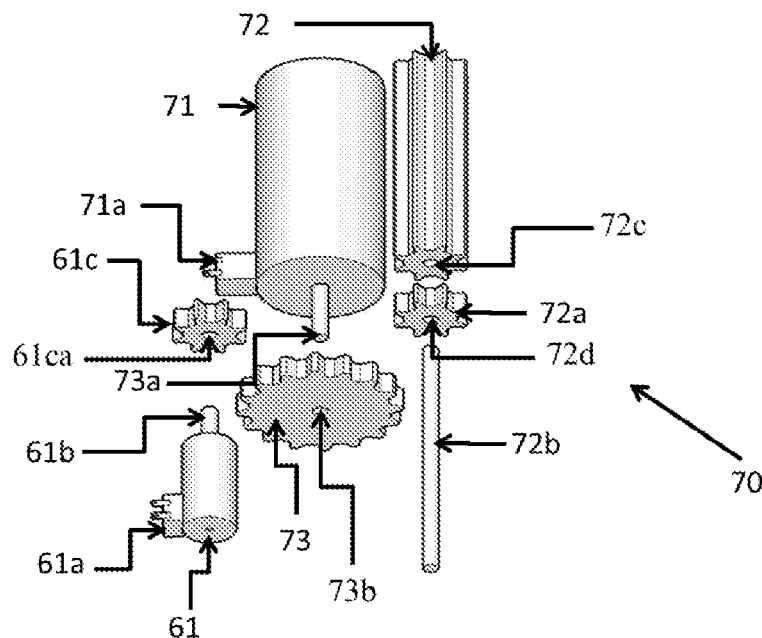

FIG. 127 is an exploded front lower perspective view of Motor-and-driving-gears along with Voltage-generator and its gears.

Figure 128:
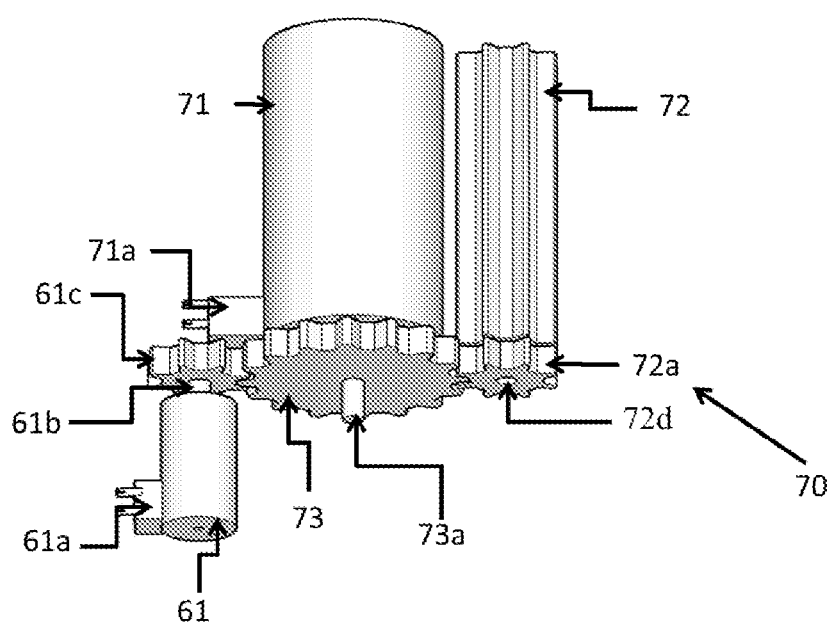

FIG. 128 is a front lower perspective view of Motor-and-driving-gears along with Voltage-generator and its gear.

Figure 129:
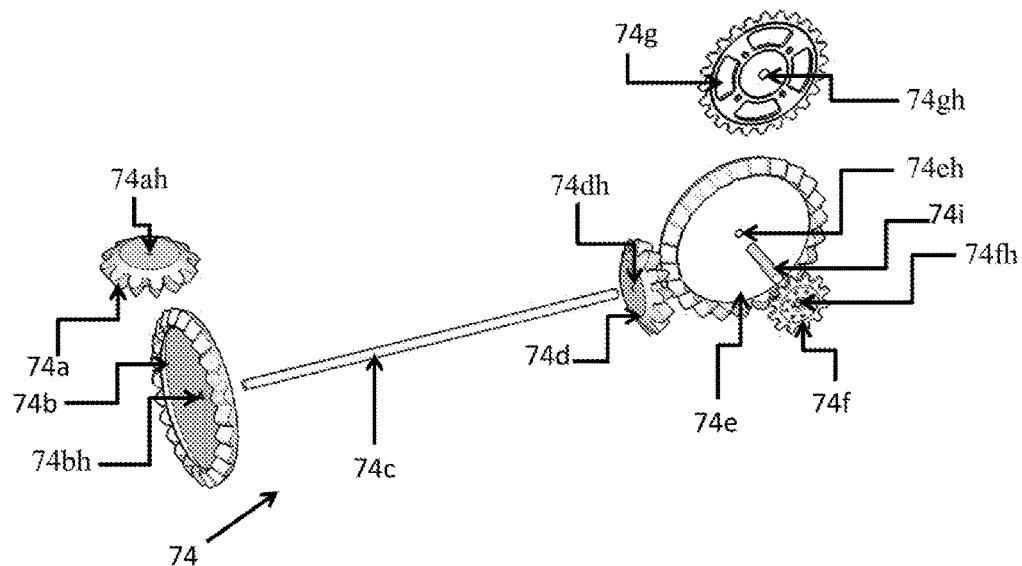

FIG. 129 is an exploded front left upper perspective view of Gear-system.

Figure 130:
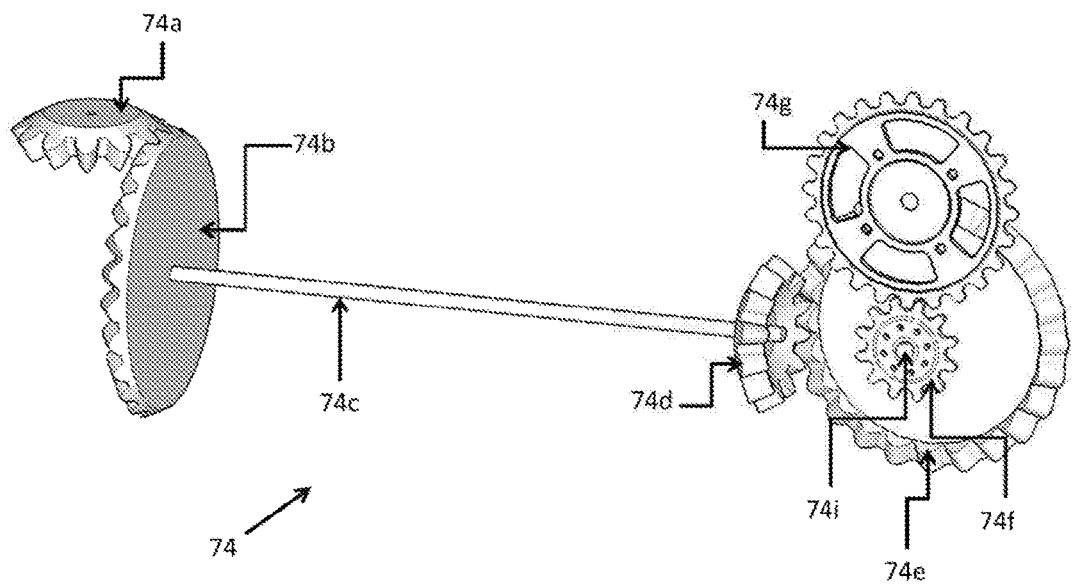

FIG. 130 is a front right upper perspective view of Gear-system.

Figure 131:
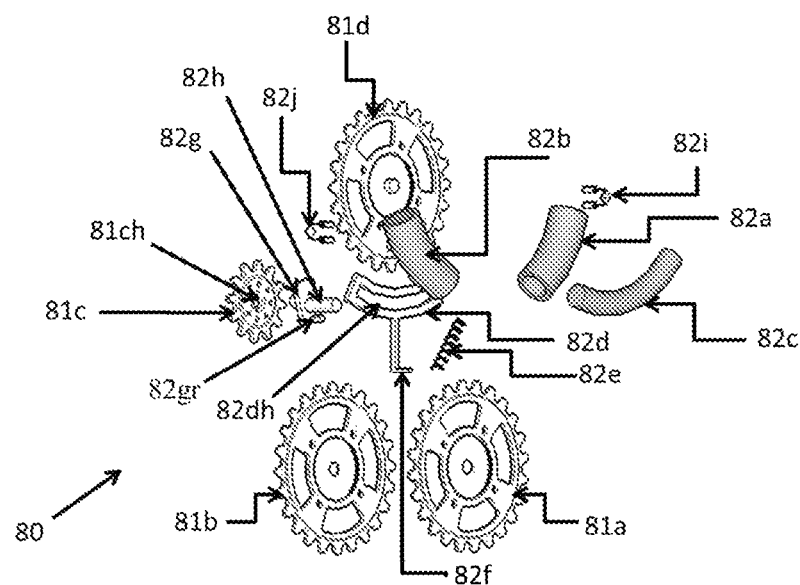
Figure 132:
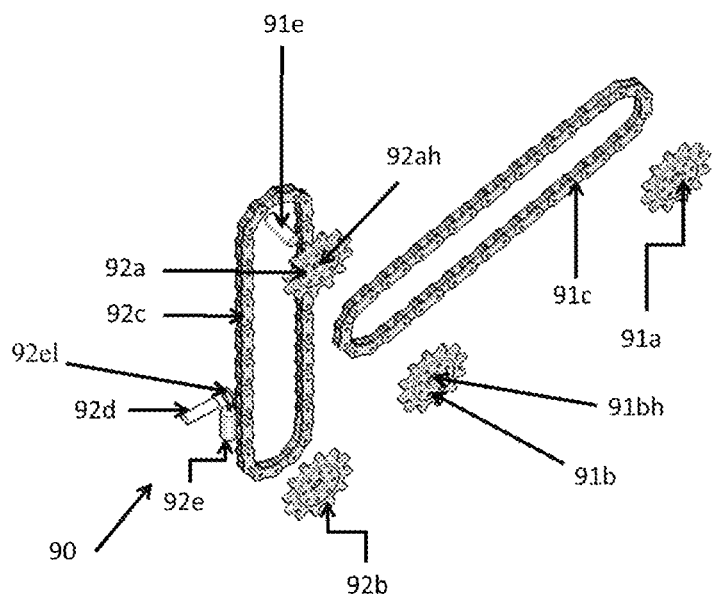

FIG. 131 is an exploded rear right perspective view of Direction-Changer-Unit FIG. 132 is an exploded front left upper perspective view of Circular-to-linear-movement-convertor.

Figure 133:
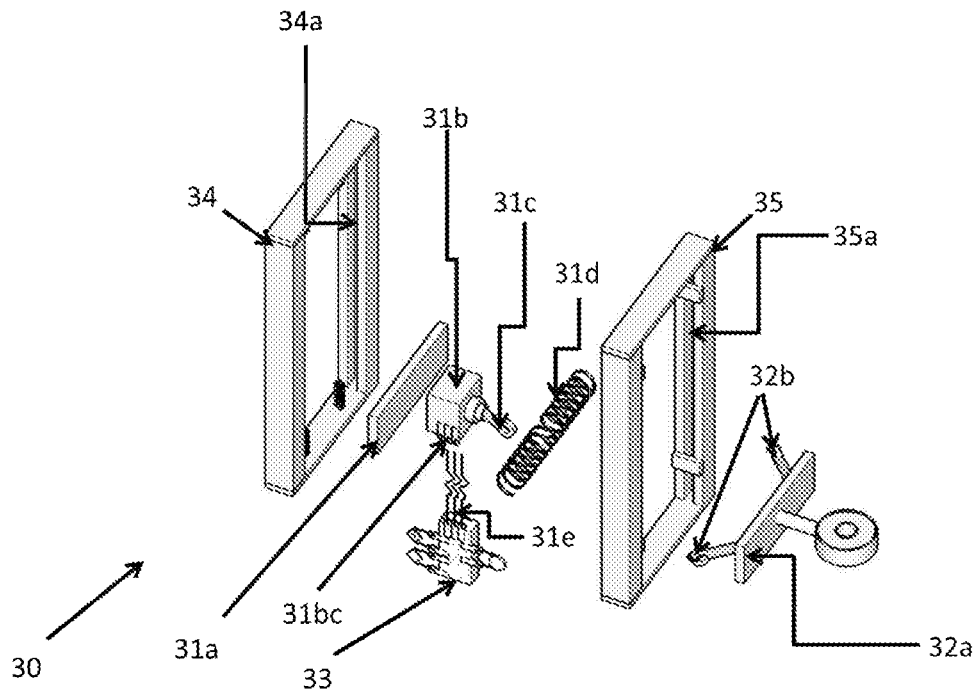

FIG. 133 is an exploded rear left upper perspective view of Vertical-Movement-Control-Apparatus.

Figure 134:
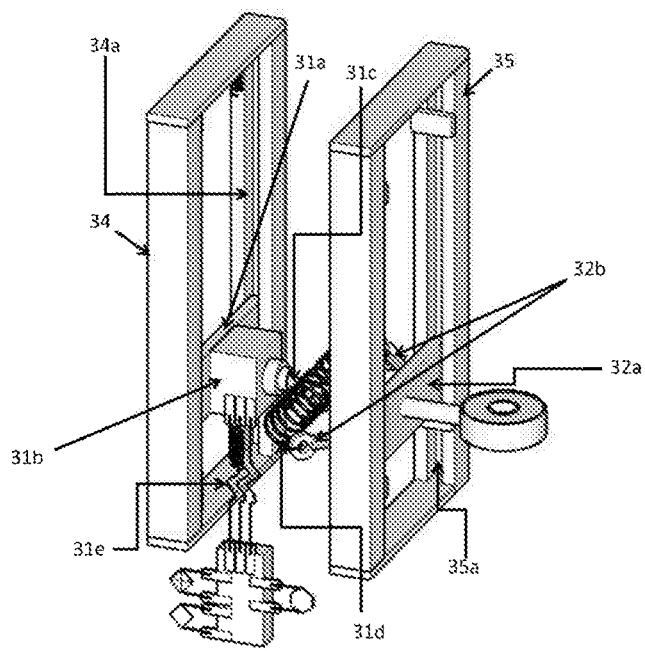

FIG. 134 is rear right upper perspective view of Vertical-Movement-Control-Apparatus.

Figure 135:
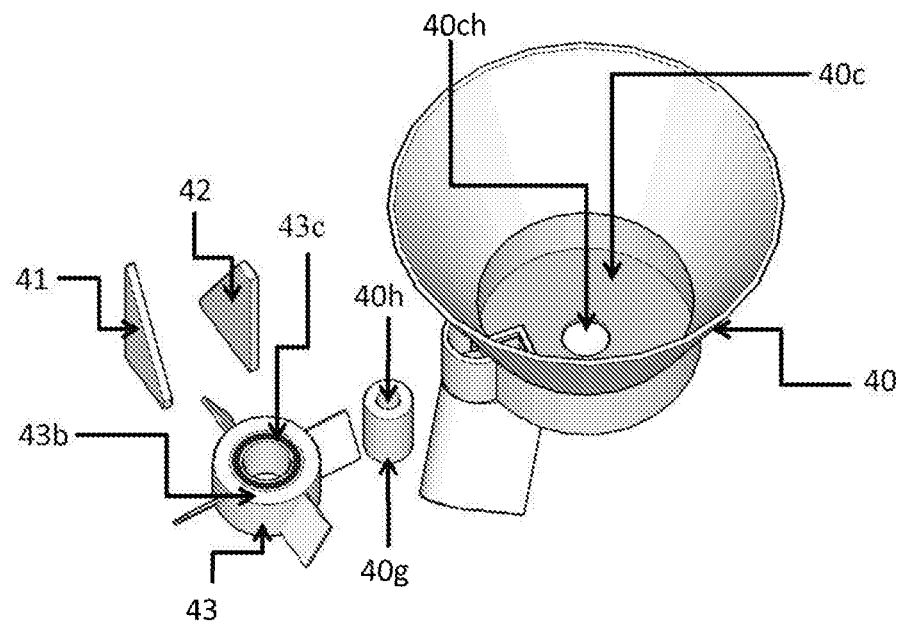

FIG. 135 is an exploded left rear upper perspective view of Variable-Opening-Entry-Mechanism.

Figure 136:
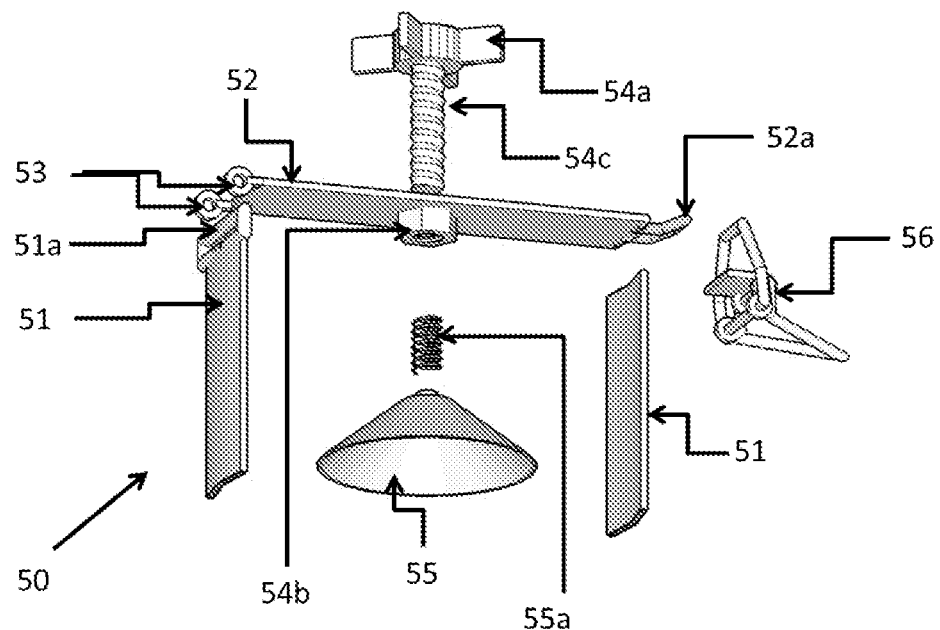

FIG. 136 is an exploded front left lower perspective view of Coconut-holding-mechanism.

Figure 137:
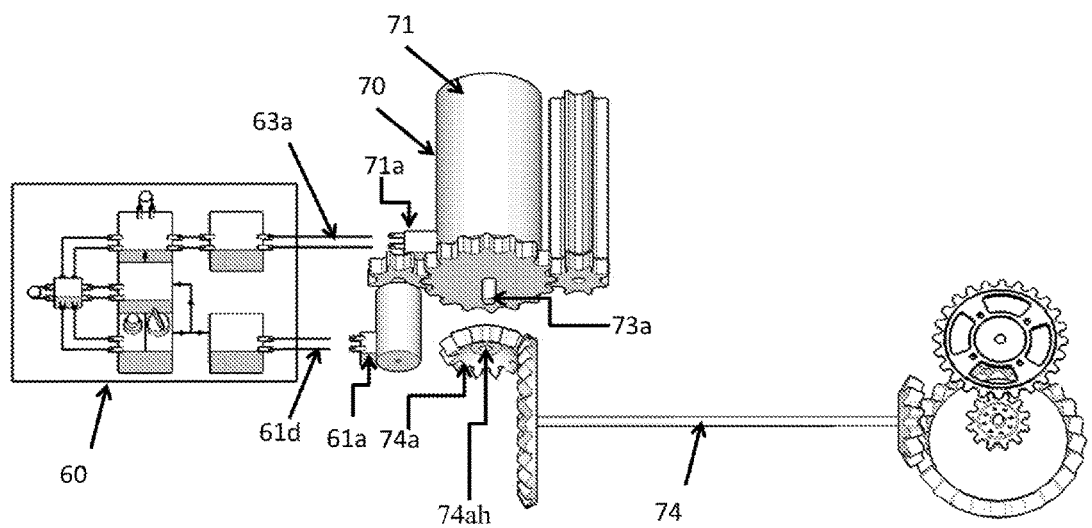

FIG. 137 is a front left lower perspective view showing main elements Optimal-Operations-Mechanism, Motor-and-driving-gears and Gear-system unconnected with each other.

Figure 138:
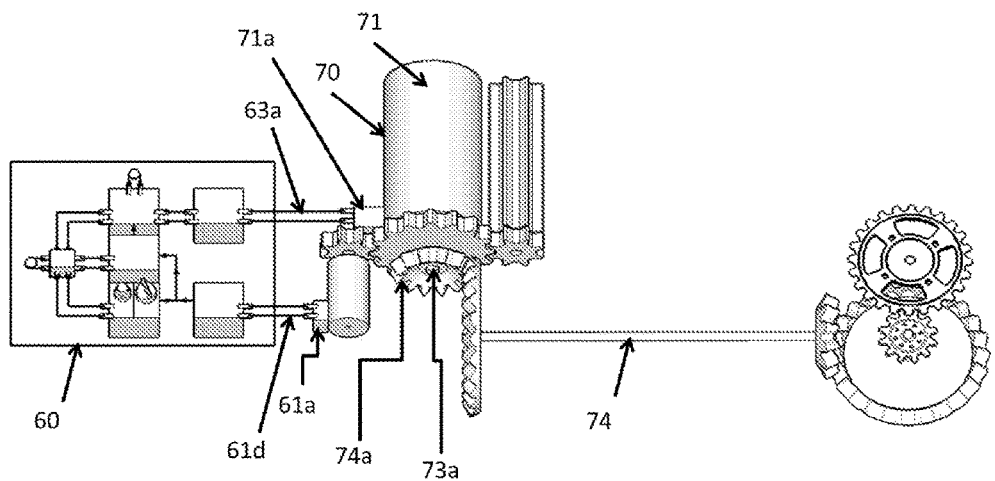

FIG. 138 is a front left lower perspective view showing main elements Optimal-Operations-Mechanism, Motor-and-driving-gears and Gear-system.

Figure 139:
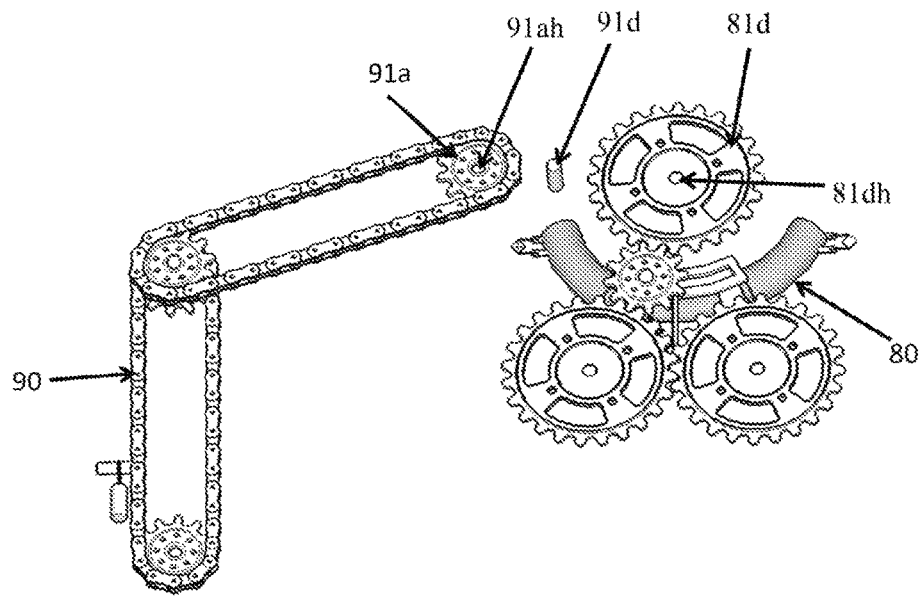

FIG. 139 is a front lower perspective view of Direction-Changer-Unit and Circular-to-linear-movement-convertor unconnected with each other.

Figure 140:
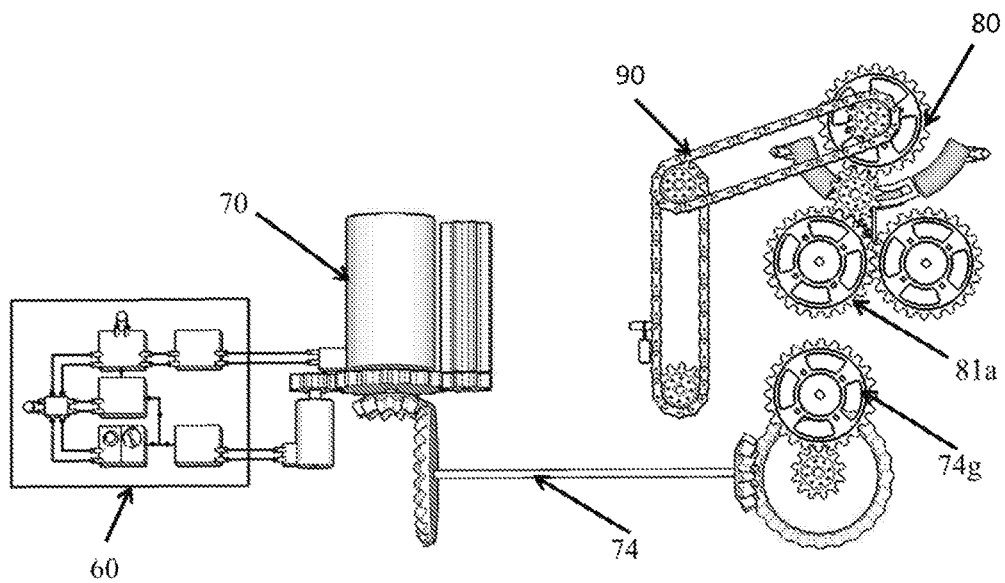

FIG. 140 is a front lower perspective view of two groups of main elements i.e., 1. Direction-Changer-Unit and Circular-to-linear-movement-convertor unconnected to 2. Motor-and-driving-gears, Gear-system and Optimal-Operations-Mechanism.

Figure 141:
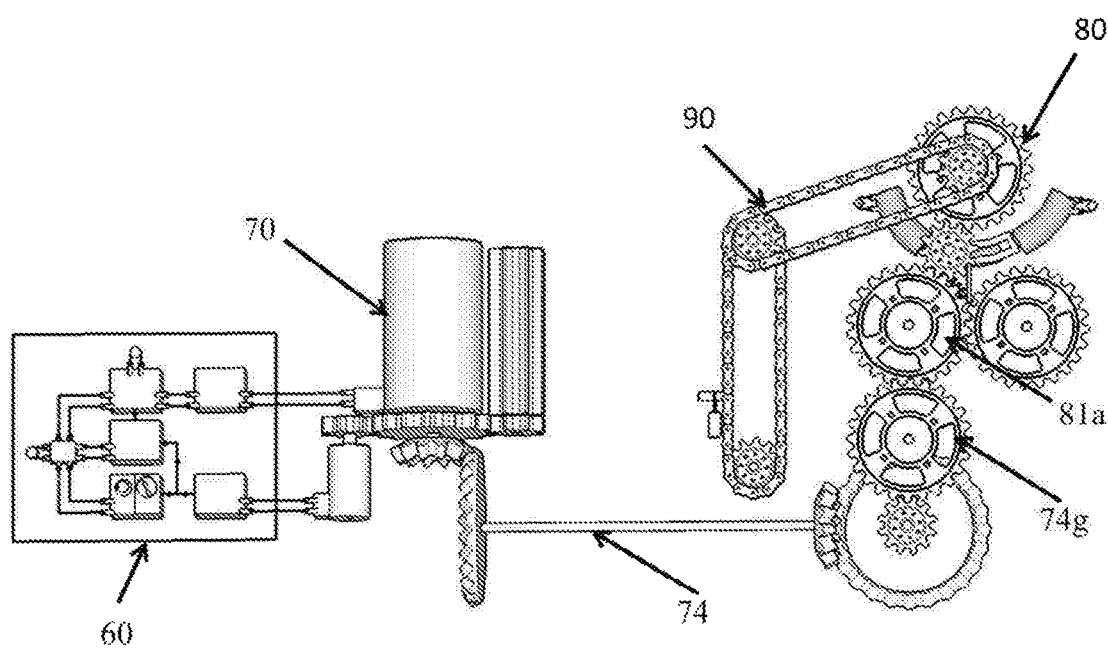

FIG. 141 is a front lower perspective view of two groups of main elements i.e., 1. Direction-Changer-Unit and Circular-to-linear-movement-convertor connected to 2. Motor-and-driving-gears, Gear-system and Optimal-Operations-Mechanism.

Figure 142:
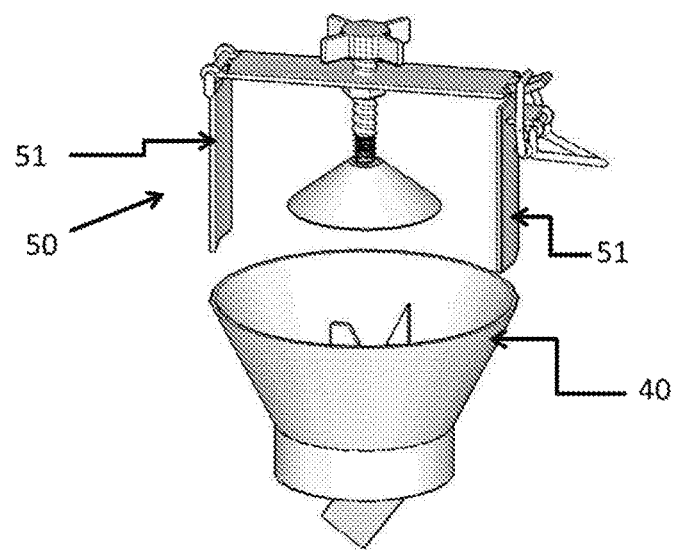

FIG. 142 is a front upper perspective view of two main elements i.e., 1. Variable-Opening-Entry-Mechanism and 2. Coconut-holding-mechanism unconnected with each other.

Figure 143:
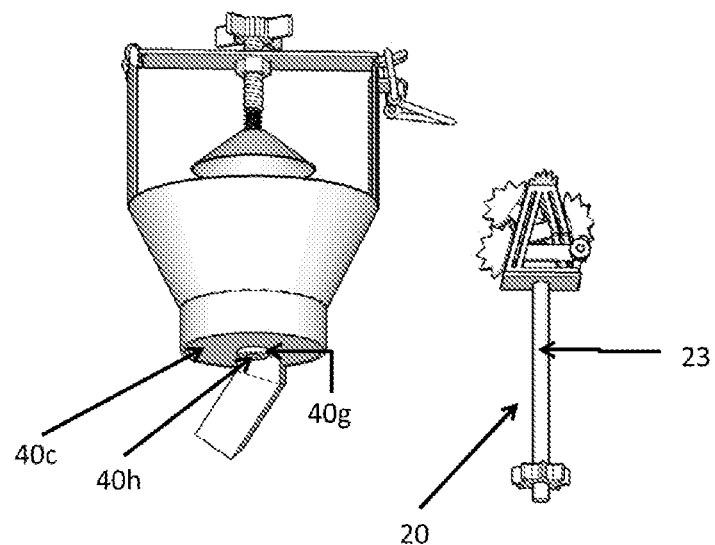

FIG. 143 is a front lower perspective view of main element Variable-Width-Scraper-Apparatus unconnected to group of main elements Variable-Opening-Entry-Mechanism and Coconut-holding-mechanism.

Figure 144:
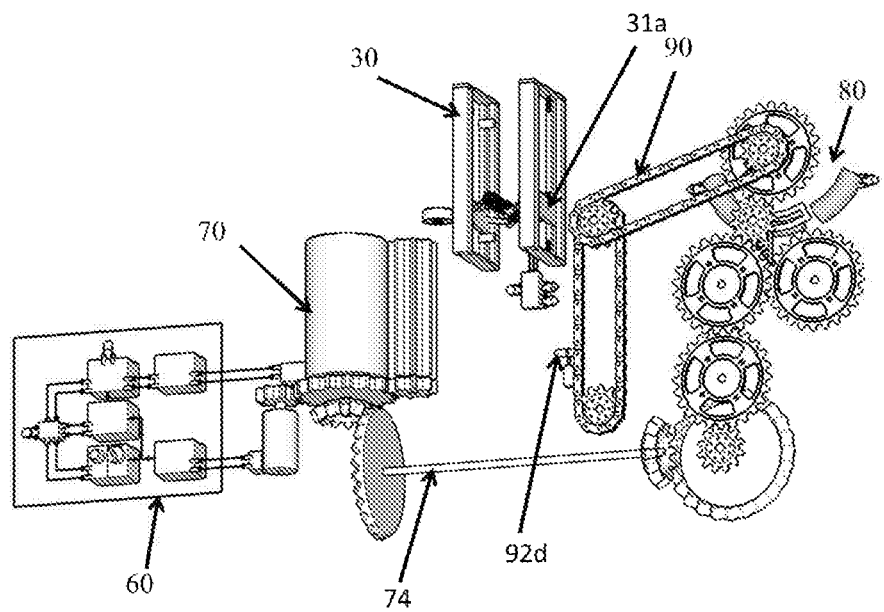

FIG. 144 is a front lower perspective view of main element Vertical-Movement-Control-Apparatus unconnected to group of main elements Direction-Changer-Unit, Circular-to-linear-movement-convertor, Motor-and-driving-gears, Gear-system and Optimal-Operations-Mechanism.

Figure 145:
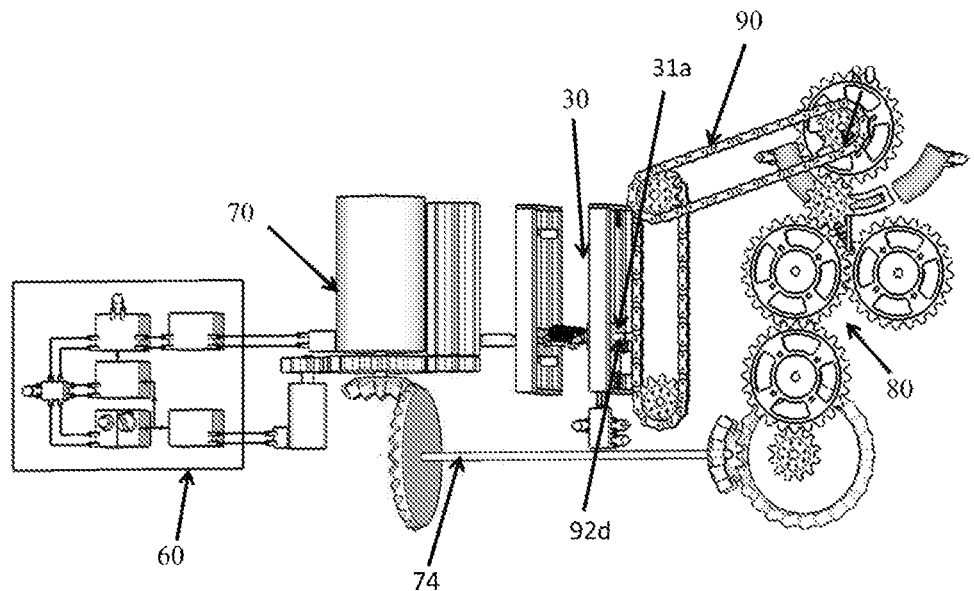

FIG. 145 is a front right perspective view of main element Vertical-Movement-Control-Apparatus connected to group of main elements Direction-Changer-Unit, Circular-to-linear-movement-convertor, Motor-and-driving-gears, Gear-system and Optimal-Operations-Mechanism.

Figure 146:
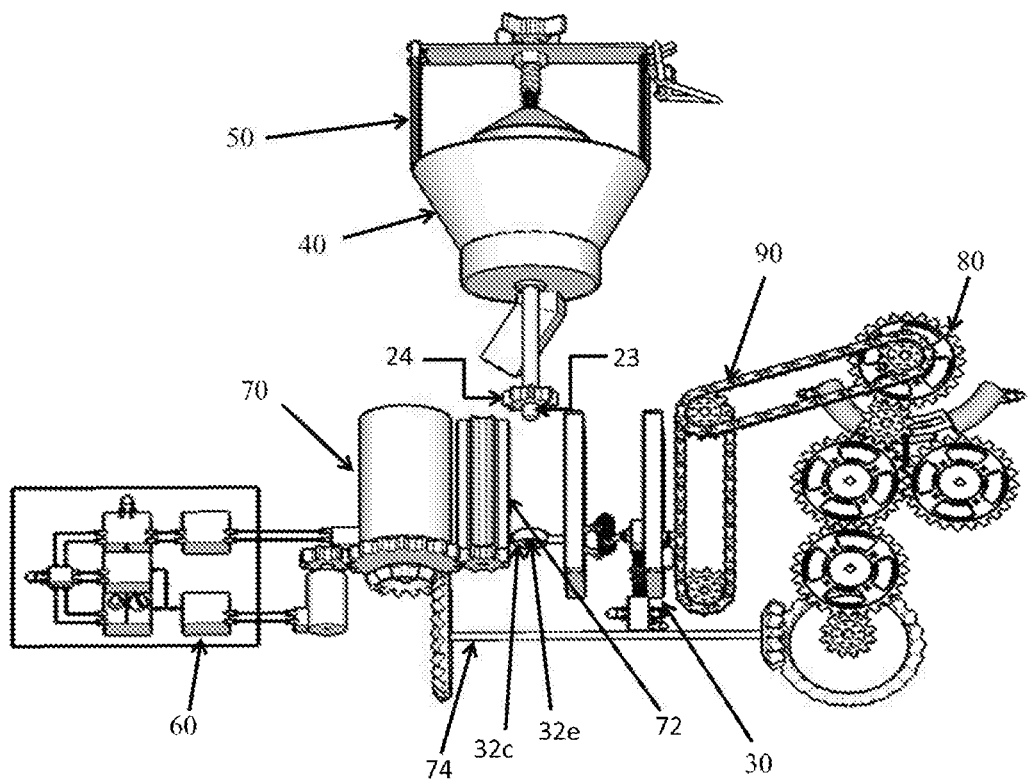

FIG. 146 is a front lower perspective view of two groups of main elements i.e., 1. Variable-Width-Scraper-Apparatus, Variable-Opening-Entry-Mechanism and Coconut-holding-mechanism unconnected to 2. Motor-and-driving-gears, Gear-system, Optimal-Operations-Mechanism, Direction-Changer-Unit, Circular-to-linear-movement-convertor and Vertical-Movement-Control-Apparatus.

Figure 147:
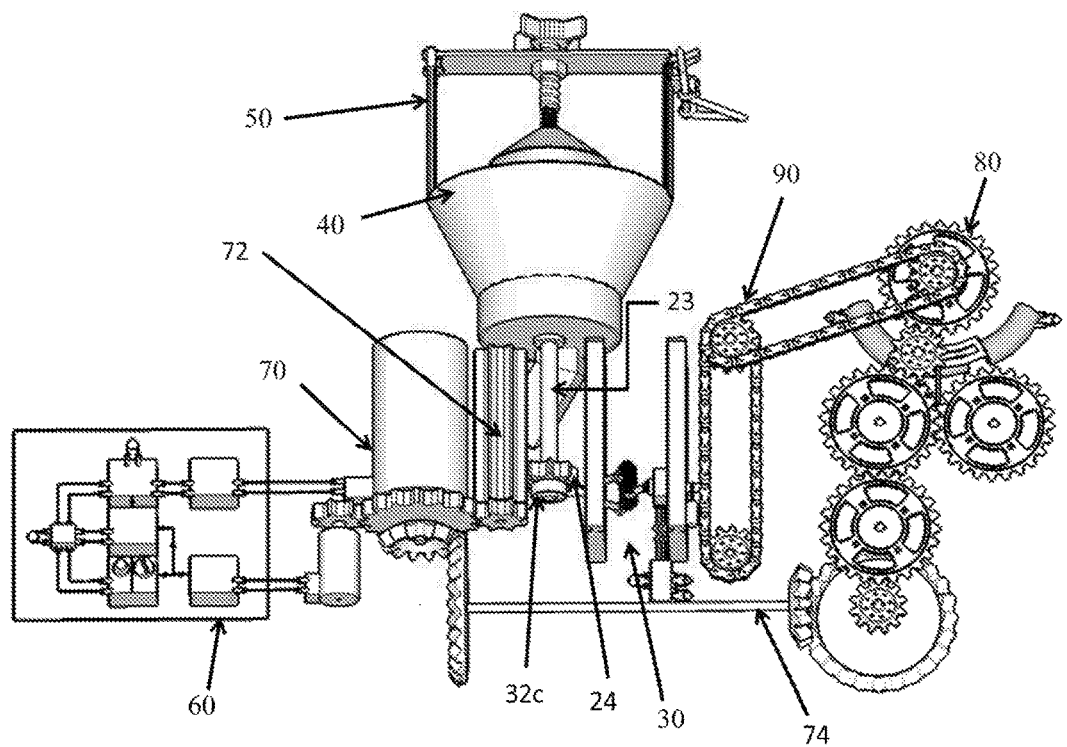

FIG. 147 is a front lower perspective view of two groups of main elements i.e., 1. Variable-Width-Scraper-Apparatus, Variable-Opening-Entry-Mechanism and Coconut-holding-mechanism and 2. Motor-and-driving-gears, Gear-system, Optimal-Operations-Mechanism, Direction-Changer-Unit, Circular-to-linear-movement-convertor and Vertical-Movement-Control-Apparatus connected with each other.

Figure 148:
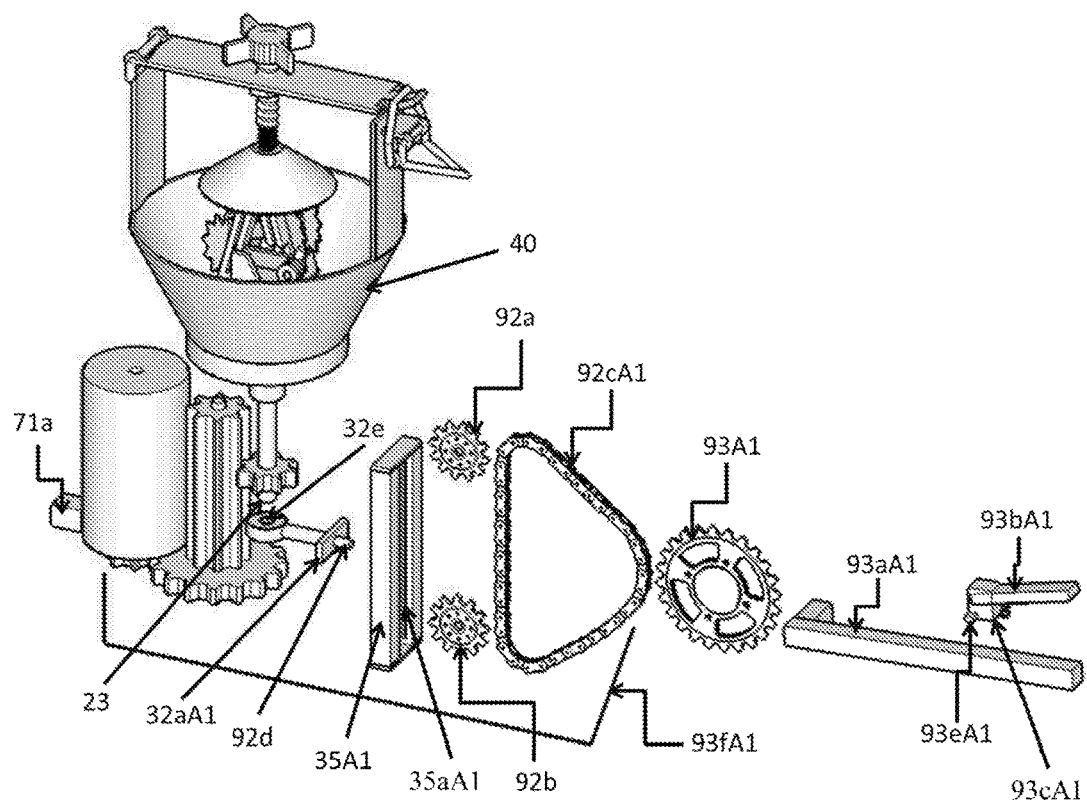

FIG. 148 is an exploded front right upper perspective view of Vertical-Movement-Control-Apparatus-Alternative1 along with supporting elements.

Figure 149:
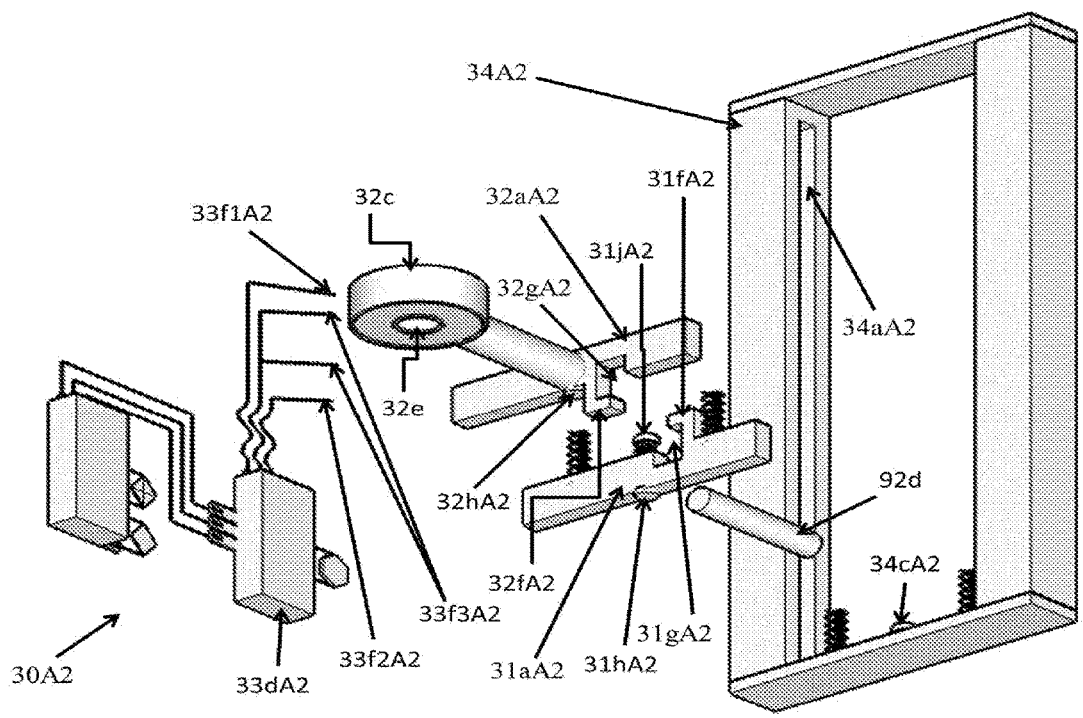

FIG. 149 is an exploded left front lower perspective view of Vertical-Movement-Control-Apparatus-Alternative2.

Figure 150:
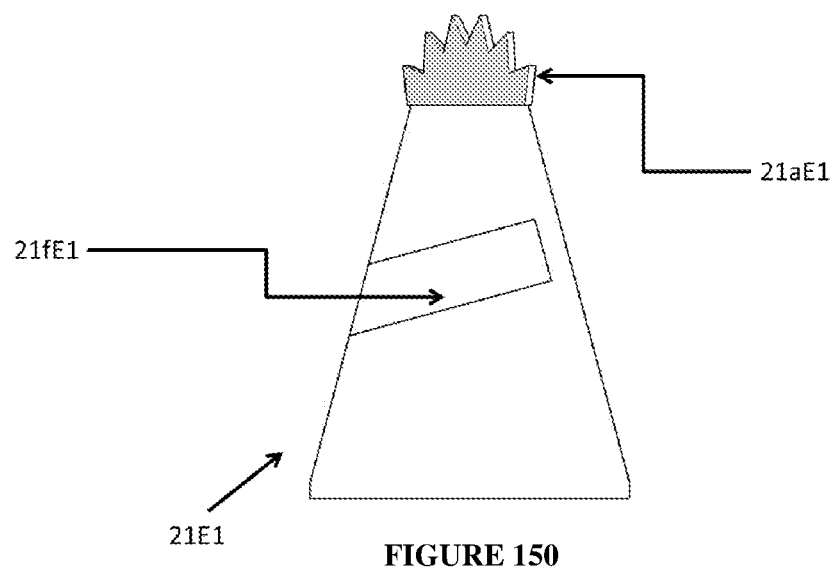

FIG. 150 is front elevation view of Body-Exemplary1 of Variable-Width-Scraper-Apparatus-Exemplary1.

Figure 151:
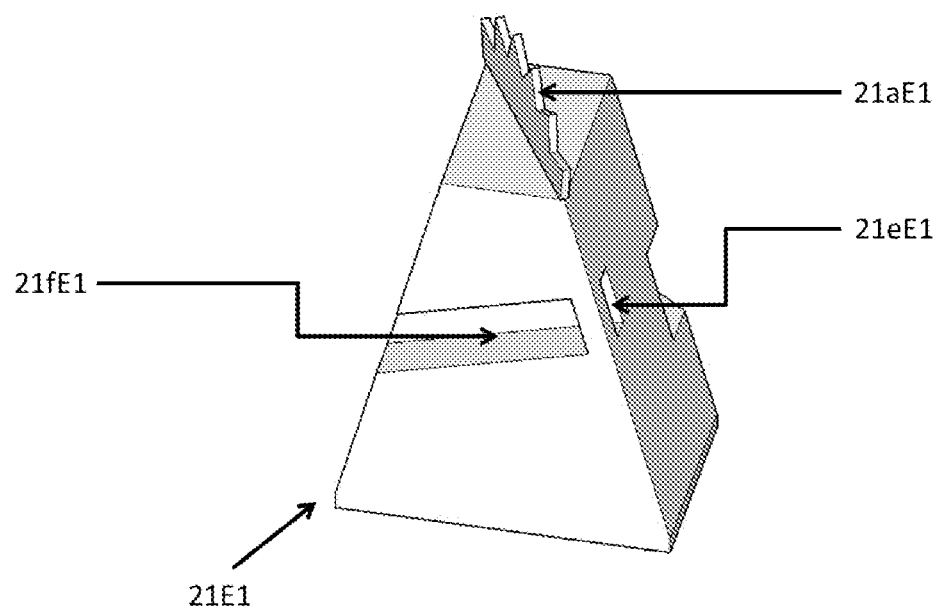

FIG. 151 is front right upper perspective view of Body-Exemplary1 of Variable-Width-Scraper-Apparatus-Exemplary1.

Figure 152:
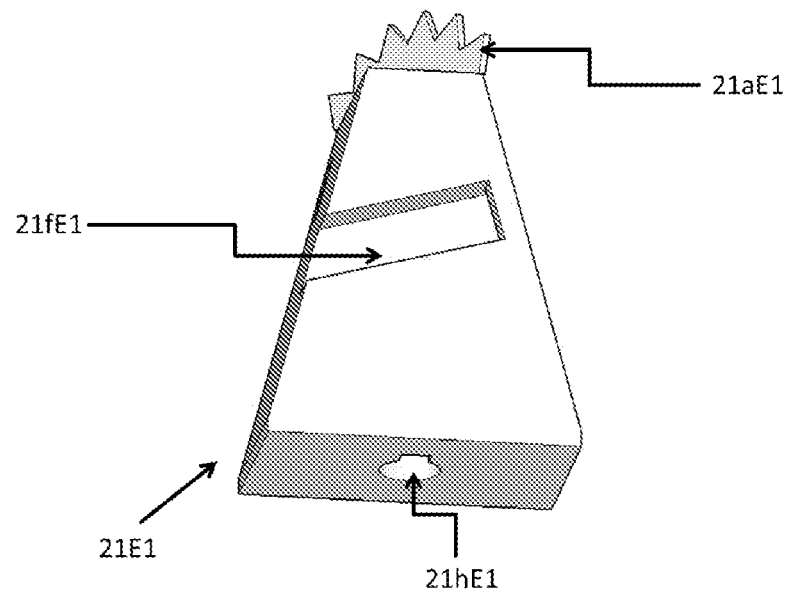

FIG. 152 is rear lower perspective view of Body-Exemplary1 of Variable-Width-Scraper-Apparatus-Exemplary1.

Figure 153:
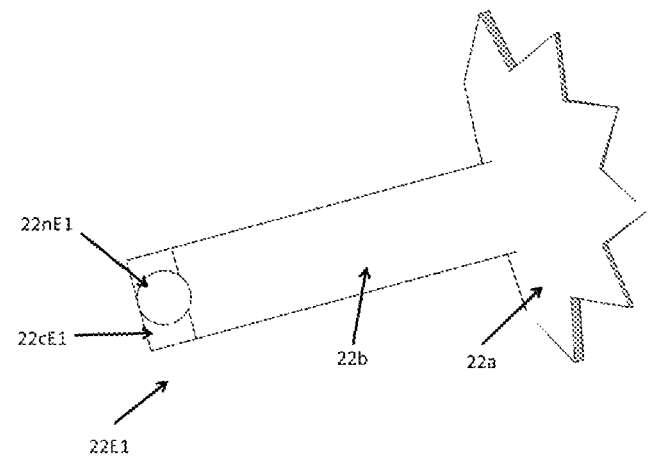

FIG. 153 is front elevation view of Blade-Exemplary1.

Figure 154:
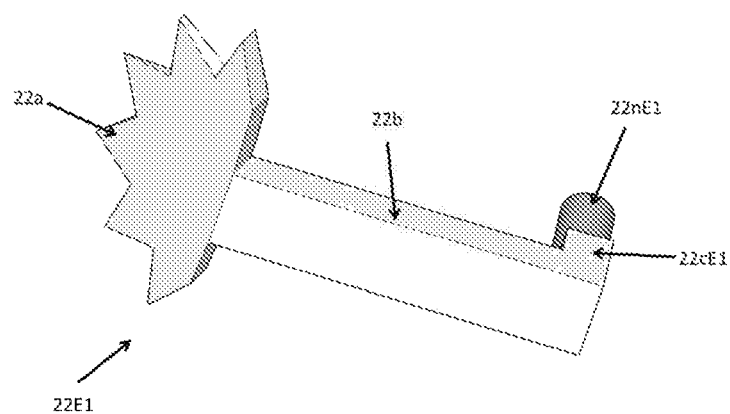

FIG. 154 is rear upper view of Blade-Exemplary1.

Figure 155:
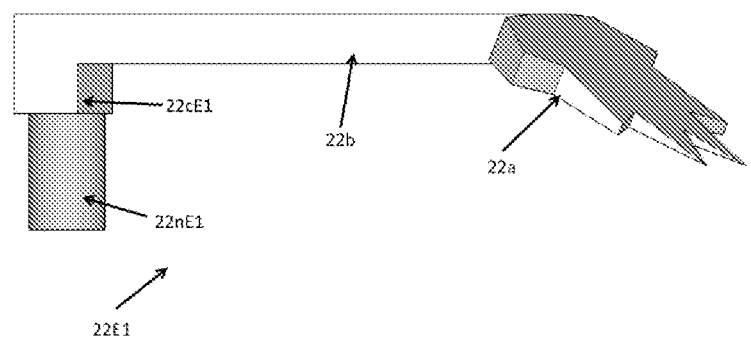

FIG. 155 is top plan view of Blade-Exemplary1.

Figure 156:
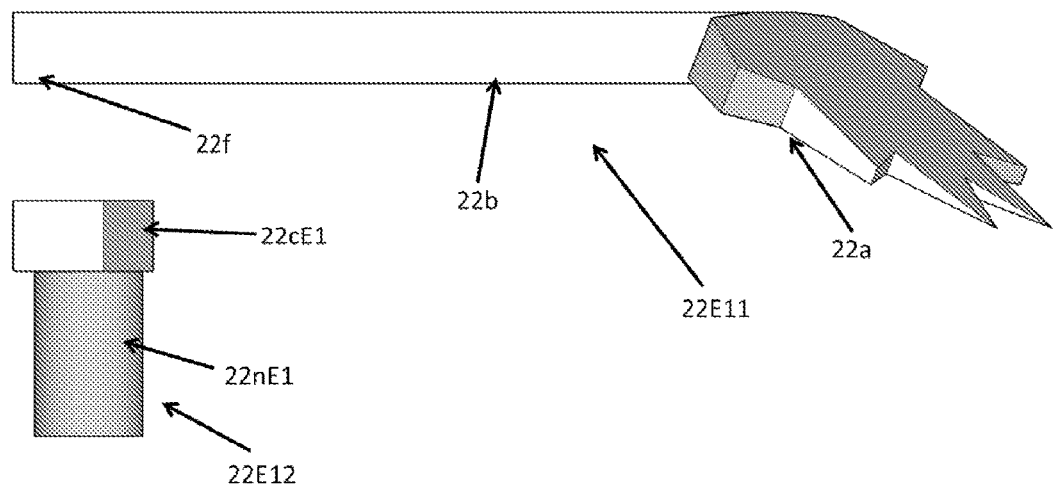

FIG. 156 is top plan view of Blade-Exemplary1-part1 and Blade-Exemplary1-part2.

Figure 157:
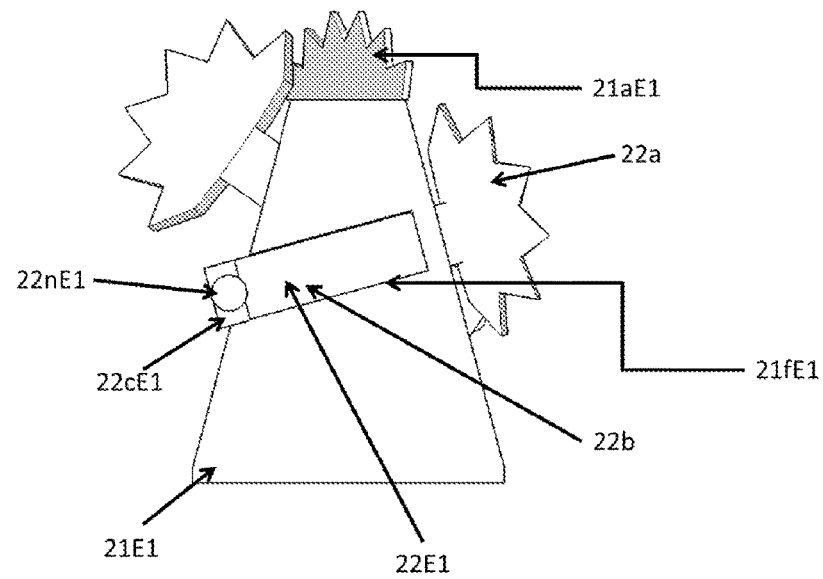

FIG. 157 is front elevation view of Body-Exemplary1 configured with Blade-Exemplary1.

Figure 158:
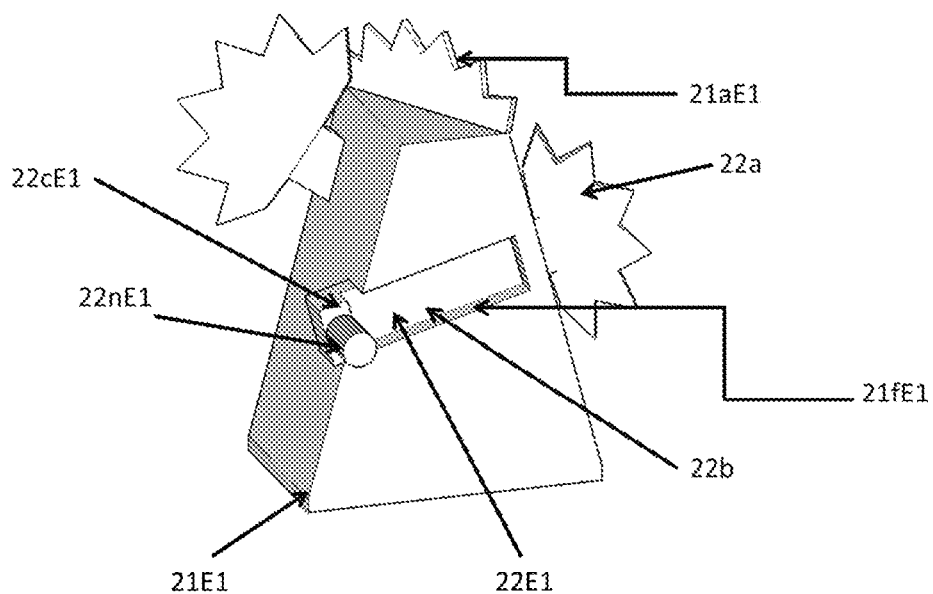

FIG. 158 is front right upper perspective view of Body-Exemplary1 configured with Blade-Exemplary1.

Figure 159:
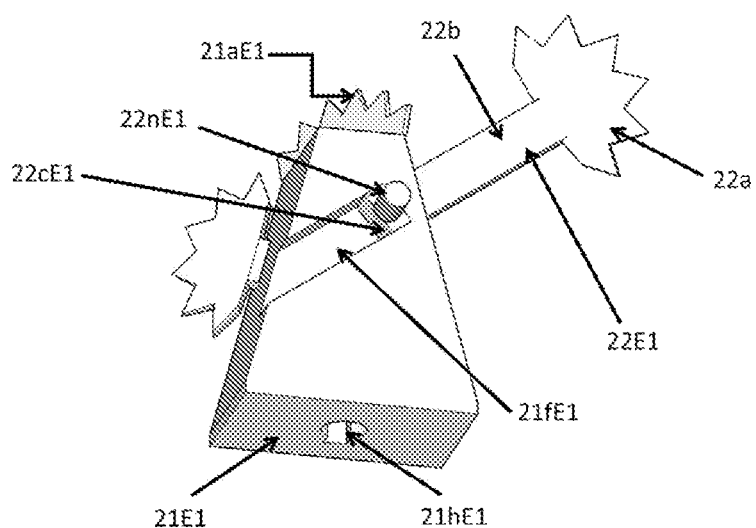

FIG. 159 is rear right lower perspective view of Body-Exemplary1 configured with Blade-Exemplary1 extended outward.

Figure 160:
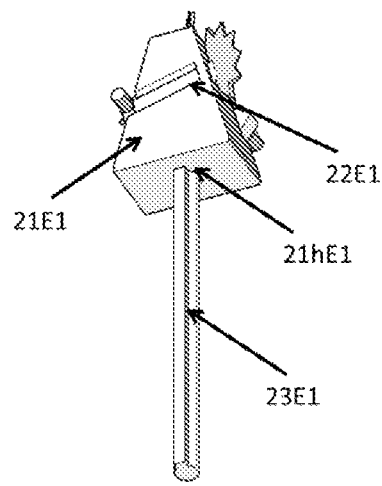

FIG. 160 is front lower right perspective view of combination of Body-Exemplary1 and Blade-Exemplary1 configured with Variable-Width-Scraper-Apparatus-Shaft-Exemplary1

Figure 161:
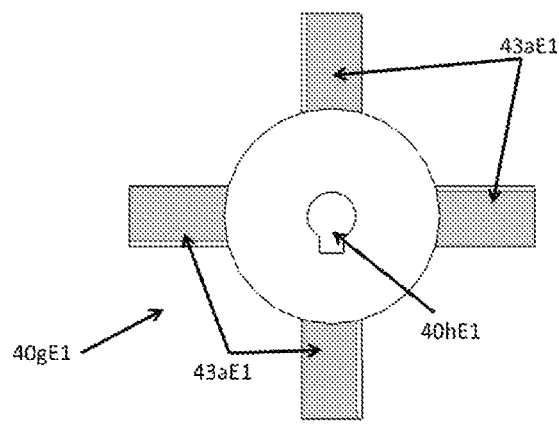

FIG. 161 is top plan view of Base-bush-Exemplary1.

Figure 162:
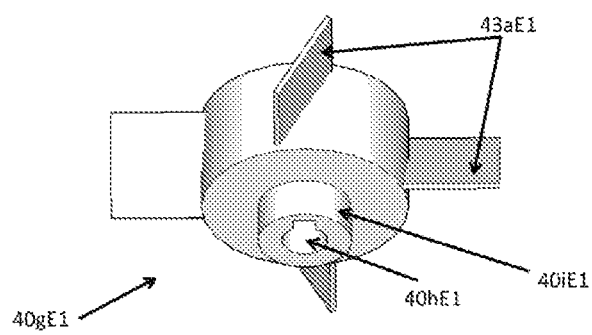

FIG. 162 is front lower perspective view of Base-bush-Exemplary1.

Figure 163:
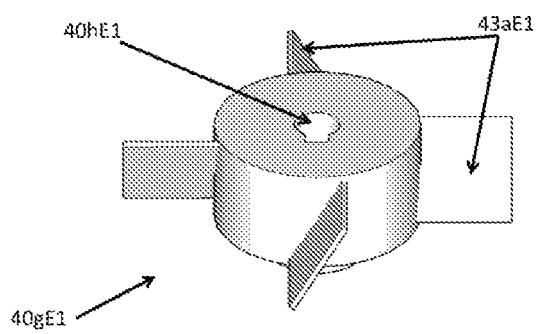

FIG. 163 is front upper perspective view of Base-bush-Exemplary1.

Figure 164:
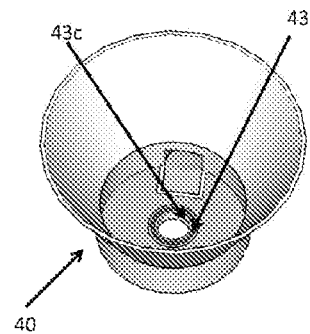

FIG. 164 is front upper perspective view of Variable-Opening-Entry-Mechanism-Jar with Base-bearing.

Figure 165:
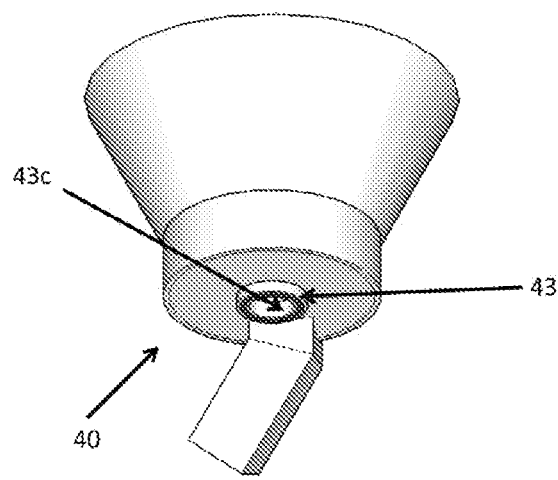

FIG. 165 is front lower perspective view of Variable-Opening-Entry-Mechanism-Jar with Base-bearing.

Figure 166:
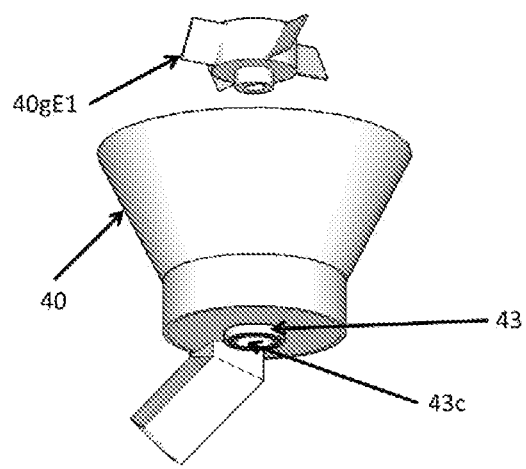

FIG. 166 is front lower perspective view of connections of the combination of Variable-Opening-Entry-Mechanism-Jar and Base-bearing with Base-bush-Exemplary1.

Figure 167:
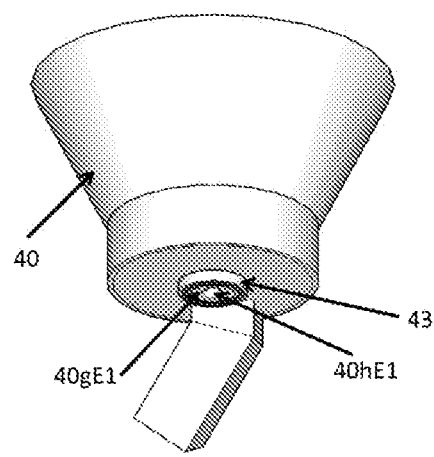

FIG. 167 is front lower perspective view of configuration of the combination of Variable-Opening-Entry-Mechanism-Jar and Base-bearing with Base-bush-Exemplary1.

Figure 168:
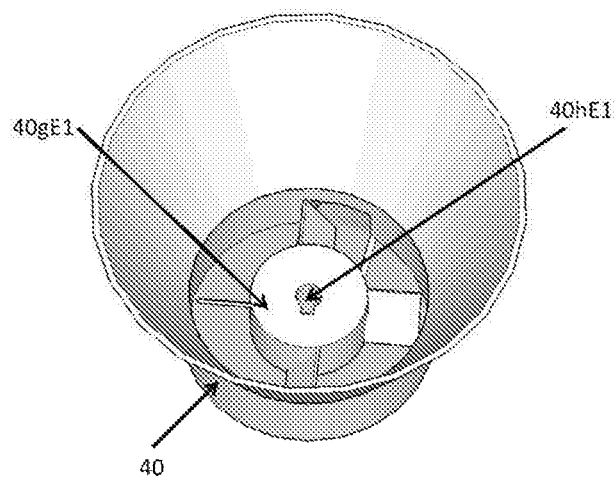

FIG. 168 is front upper perspective view of connections of the combination of Variable-Opening-Entry-Mechanism-Jar and Base-bearing with Base-bush-Exemplary1.

Figure 169:
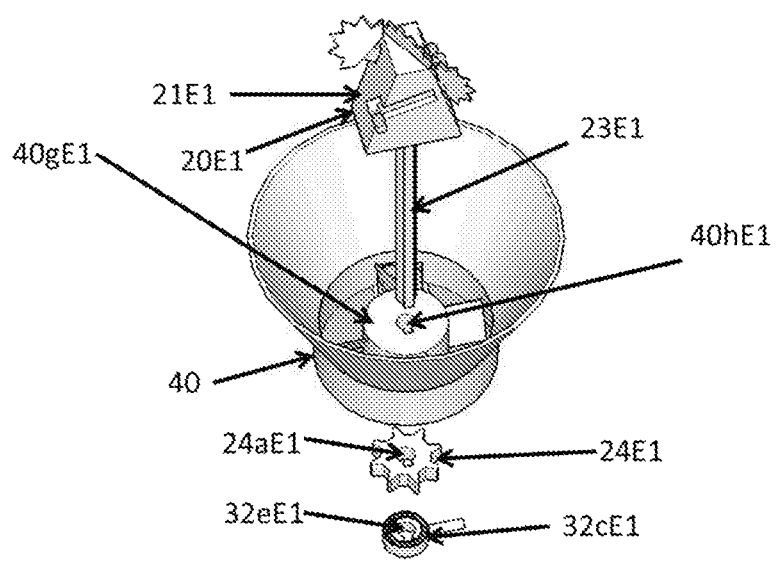

FIG. 169 is front upper perspective view of connections of Variable-Width-Scraper-Apparatus-Shaft-Exemplary1, Base-bush-Exemplary1, Gear-wheel1-Exemplary1 and Follower-unit-bearing-Exemplary1.

Figure 170:
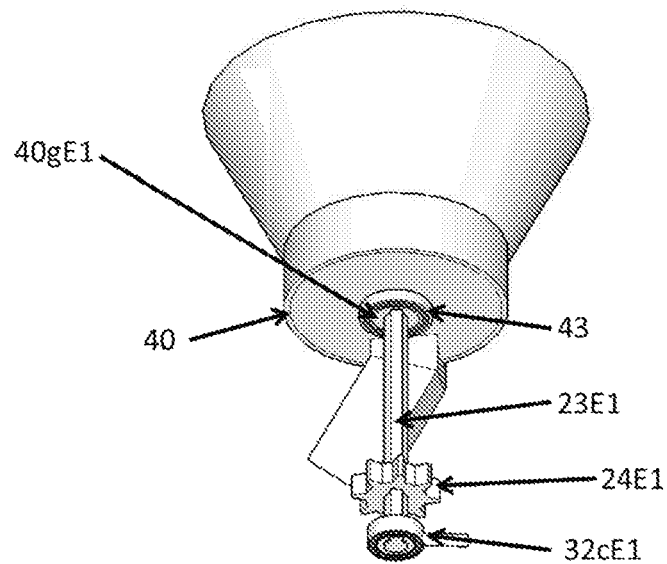

FIG. 170 is front lower perspective view of Variable-Width-Scraper-Apparatus-Shaft-Exemplary1 configured with Base-bush-Exemplary1, Gear-wheel1-Exemplary1 and Follower-unit-bearing-Exemplary1.

Figure 171:
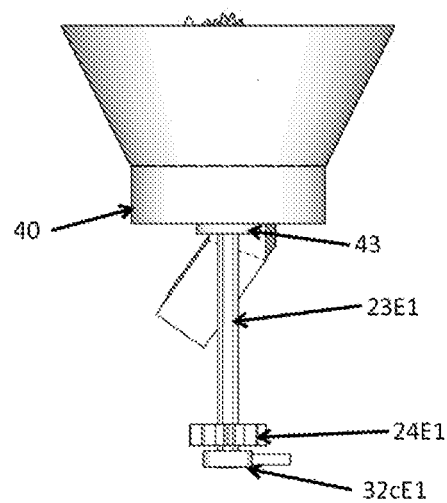

FIG. 171 is front elevation view of Variable-Width-Scraper-Apparatus-Shaft-Exemplary1 configured with Base-bush-Exemplary1, Gear-wheel1-Exemplary1 and Follower-unit-bearing-Exemplary1.

Figure 172:
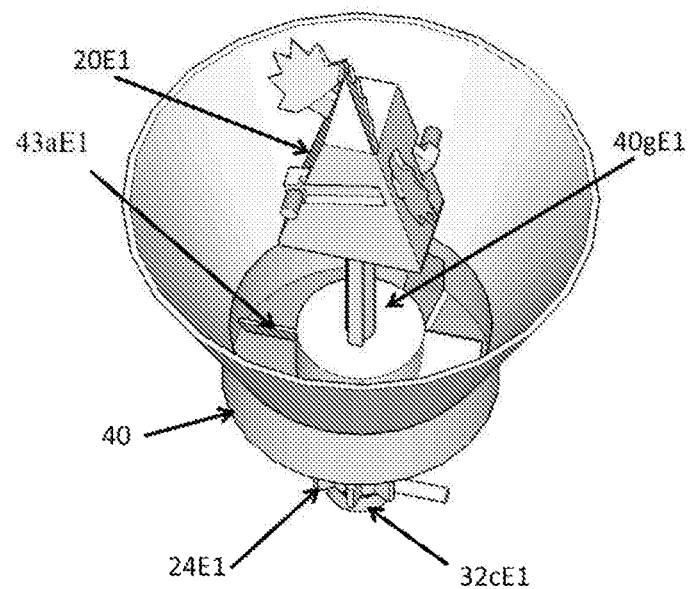

FIG. 172 is front left upper perspective view of Variable-Width-Scraper-Apparatus-Shaft-Exemplary1 configured with Base-bush-Exemplary1, Gear-wheel1-Exemplary1 and Follower-unit-bearing-Exemplary1.

Figure 173:
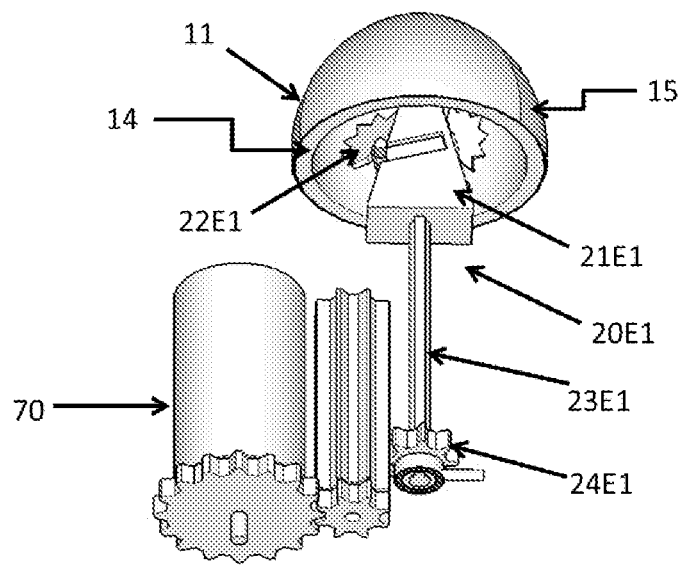

FIG. 173 is front lower perspective view of Variable-Width-Scraper-Apparatus-Exemplary1 with half-coconut and attached to Motor-and-driving-gears.

Figure 174:
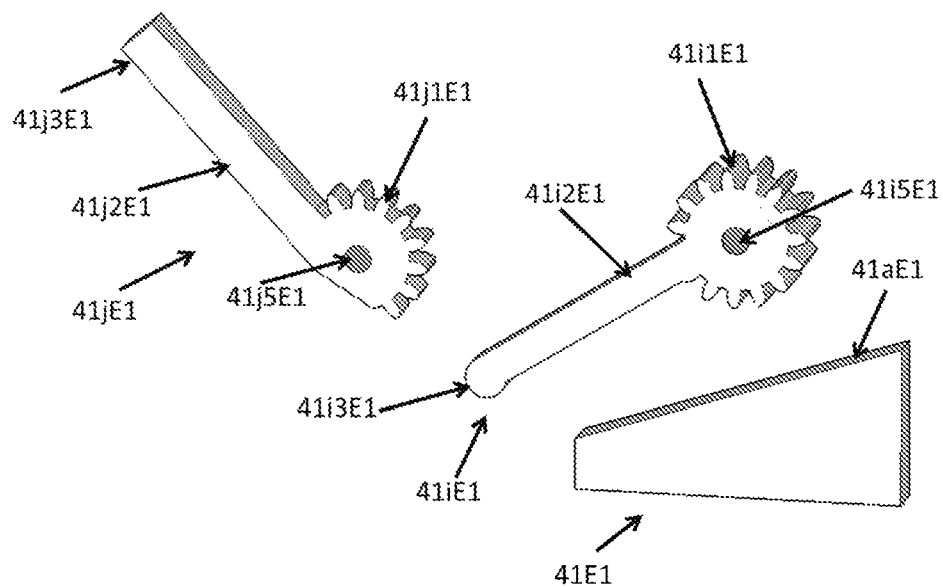

FIG. 174 is a front left upper perspective view of Blade-guide-gear1-Exemplary1, Intermediate-guide-gear1-Exemplary1 and Variable-Opening-Entry-Mechanism-Guide-Exemplary1.

Figure 175:
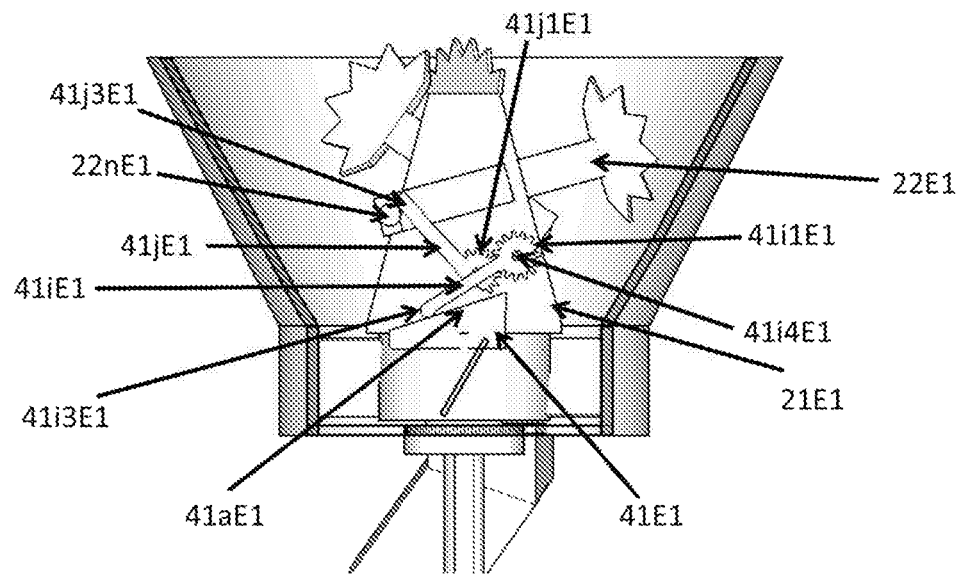

FIG. 175 is cross-section of front elevation view of Variable-Opening-Entry-Mechanism Exemplary Embodiment 1.

Figure 176:
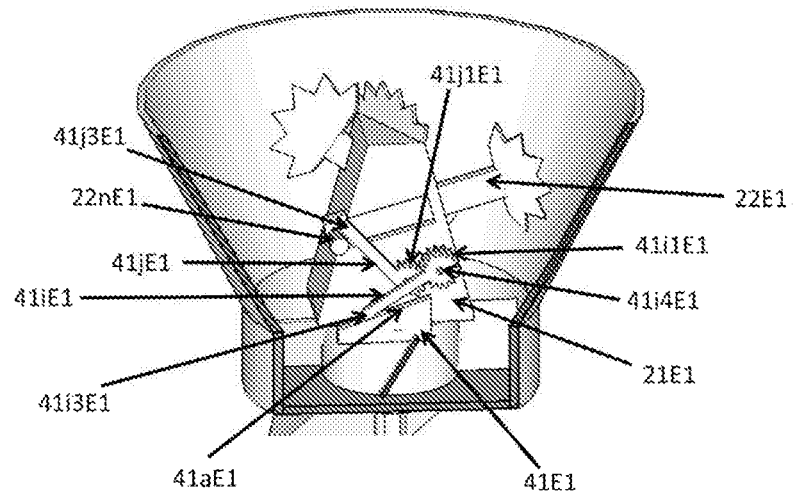

FIG. 176 is front left upper perspective view of Variable-Opening-Entry-Mechanism Exemplary Embodiment 1 where Variable-Opening-Entry-Mechanism-Jar has been cut for better view.

Figure 177:
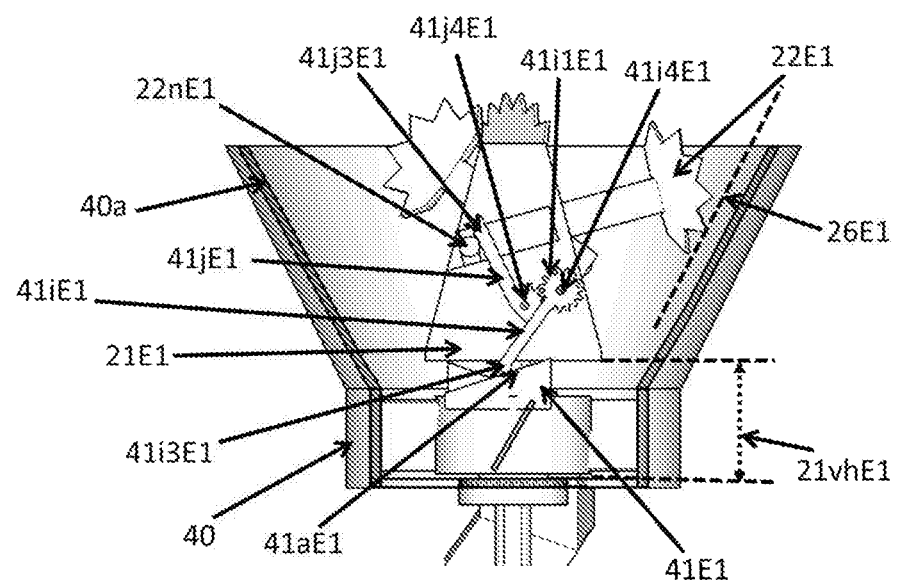

FIG. 177 is cross-section of front elevation view showing the operation of Variable-Opening-Entry-Mechanism Exemplary Embodiment 1 where Variable-Width-Scraper-Apparatus-Exemplary1 is in vertical position 1.

Figure 178:
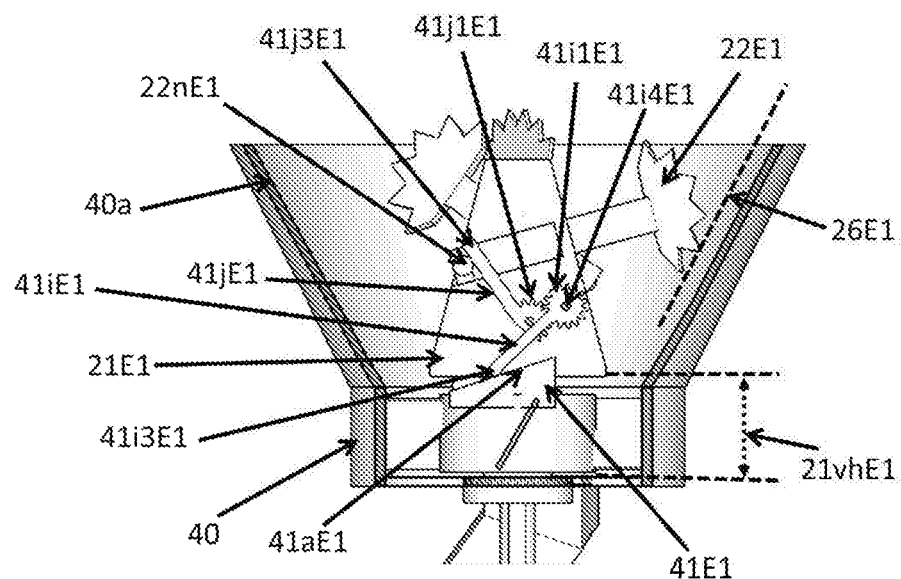

FIG. 178 is cross-section of front elevation view showing the operation of Variable-Opening-Entry-Mechanism Exemplary Embodiment 1 where Variable-Width-Scraper-Apparatus-Exemplary1 is in vertical position 2.

Figure 179:
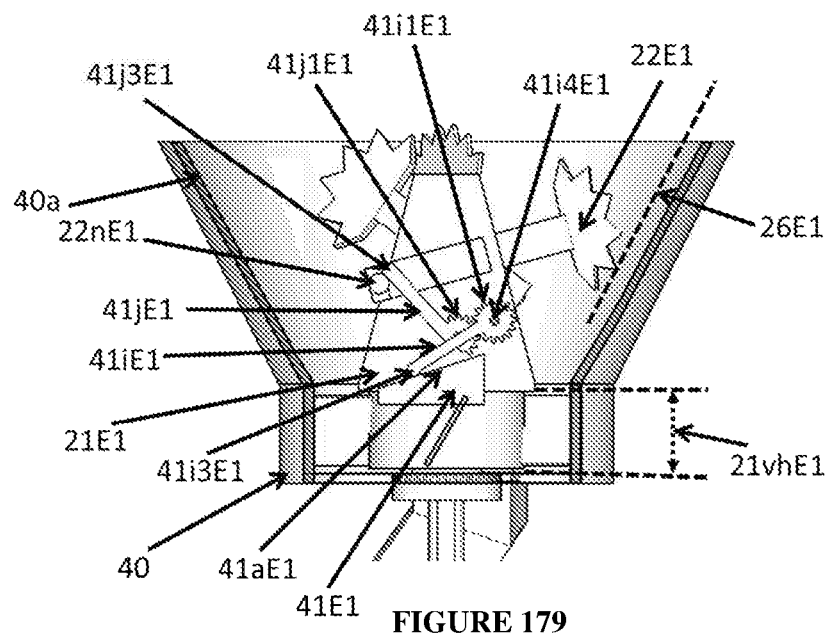

FIG. 179 is cross-section of front elevation view showing the operation of Variable-Opening-Entry-Mechanism Exemplary Embodiment 1 where Variable-Width-Scraper-Apparatus-Exemplary1 is in vertical position 3.

Figure 180:
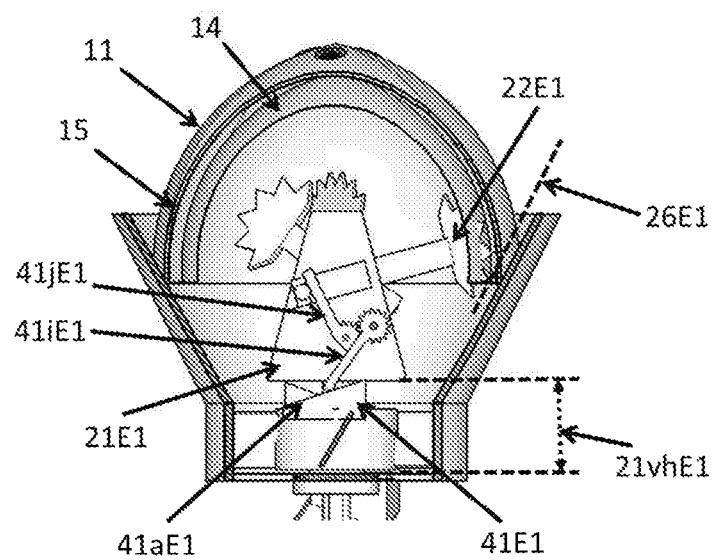

FIG. 180 is cross-section of front elevation view showing the operation of Variable-Opening-Entry-Mechanism Exemplary Embodiment 1 where Variable-Width-Scraper-Apparatus-Exemplary1 is in vertical position 1 with half coconut inside.

Figure 181:
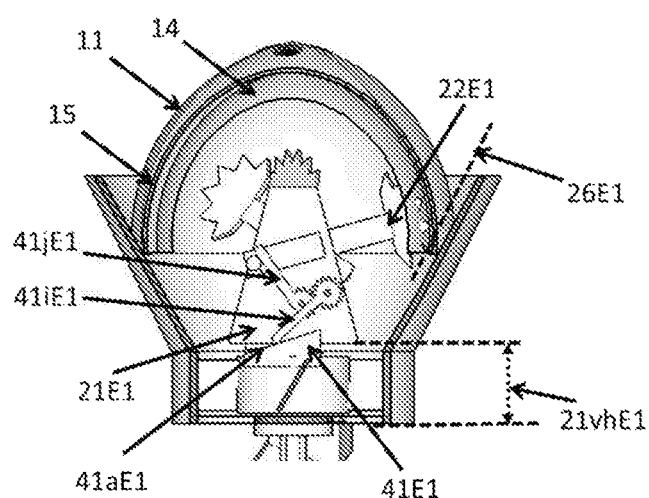

FIG. 181 is cross-section of front elevation view showing the operation of Variable-Opening-Entry-Mechanism Exemplary Embodiment 1 where Variable-Width-Scraper-Apparatus-Exemplary1 is in vertical position 2 with half coconut inside.

Figure 182:
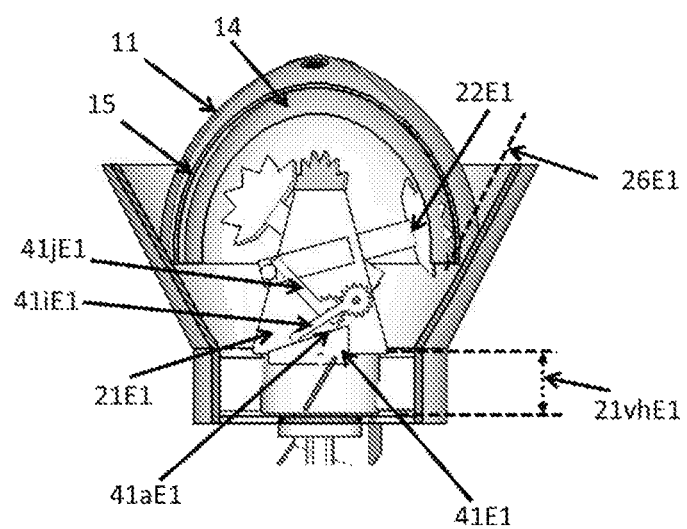

FIG. 182 is cross-section of front elevation view showing the operation of Variable-Opening-Entry-Mechanism Exemplary Embodiment 1 where Variable-Width-Scraper-Apparatus-Exemplary1 is in vertical position 3 with half coconut inside.

DETAILED DESCRIPTION

List of Reference Numerals

10: Coconut
11: Half-coconut
12: Eye
13: Seam
14: Coconut-meat
14a: Scraped-coconut-meat
14b: Coconut-meat-inner-layer
15: Shell
16: Vertical-axis
16a: Height-outer
16b: Height-inner
17: Horizontal-axis
17a Width-outer
17b Width-inner
18: Cut-face-of-coconut
19: Pole
20: Variable-Width-Scraper-Apparatus
21: Body
21a: Body-top-blade
21b: Body-base
21c: Body-top
21d: Body-side-wall
21e: Blocking-holes
21f: Non-blocking-holes
21g: Body-side-wall-gap
21h: Body-base-shaft-hole
21i: Body-base-guide-surface
22: Blade
22-1: Blade-part1
22-2: Blade-part2
22a: Blade-head
22b: Blade-body
22c: Blade-tail-block
22d: Teeth-end-of-blade-head
22e: Body-end-of-blade-head
22f: Blade-tail
22g: Head-end-of-blade-body
22h: Blade-Teeth1
22i: Blade-Teeth2
22j: Blade-Teeth3
22k: Blade-Teeth4
22l: Blade-Teeth5
22m: Blade-Teeth6
22n: Guide-wheel
22n1: Guide-wheel-hole
22o: Guide-wheel-depression
22p: Guide-wheel-connecting-shaft
22q: Angle
22r: Angle-body-tail
22-1: Rotating-position1
22-2: Rotating-position2
23: Variable-Width-Scraper-Apparatus-Shaft
23a: Variable-Width-Scraper-Apparatus-Shaft-Screw
24: Gear-wheel1
24a: Gear-wheel1-hole
25: Direction-Arrows (Used only for structure of naming and not used in diagrams or text)
25a: Direction-of-rotation
25b: Radial-direction
25c: Tangential-direction-of-force
26: Blade-extension-profile
30: Vertical-Movement-Control-Apparatus
31: Driver-unit
31a: Driver-unit-slide-plate
31b: Driver-unit-spdt_switch
31bc: Driver-unit-spdt_switch-connection-point
31c: Driver-unit-spdt_switch-handle
31d: Driver-unit-spdt_switch-handle-spring
31e: Driver-unit-spdt_switch-connections
32: Follower-unit
32a: Follower-unit-slide-plate
32b: Follower-unit-arms
32c: Follower-unit-bearing
32d: Follower-unit-connection-rod
32e: Follower-unit-bearing-ring
33: Driver-unit-power-unit
33a: Driver-unit-power-unit-output1
33b: Driver-unit-power-unit-output2
33c: Driver-unit-power-unit-input
34: Driver-unit-frame
34a: Driver-unit-frame-groove
34b: Driver-unit-frame-cushioning-springs
35: Follower-unit-frame
35a: Follower-unit-frame-groove
35b: Follower-unit-frame-block-upper
35b1: Follower-unit-frame-block-lower
40: Variable-Opening-Entry-Mechanism-Jar
40a: Sloping-wall
40b: Vertical-wall
40c: Jar-base
40ch: Jar-base-hole
40d: Expeller-chute
40e: Expeller-opening
40f: Expeller-vent
40g: Base-bush
40h: Base-bush-hole
41: Variable-Opening-Entry-Mechanism-Guide1
41a: Guide1-sloping-side
41b: Guide1-vertical-side
41c: Guide1-flat-side
41d: Guide1-base
41e: Guide-distance
42: Variable-Opening-Entry-Mechanism-Guide2
42a: Guide2-sloping-side
42b: Guide2-vertical-side
42c: Guide2-flat-side
42d: Guide2-base
43: Base-bearing
43a: Bearing-fan
43b: Bearing-outer-ring
43c: Bearing-inner-ring
50: Coconut-holding-mechanism
51: Support-pillar
51a: Support-pillar-rod
52: Holding-lid
52a: Lid-protrusion
53: Lid-hinge
54: Holding-screw-mechanism
54a: Screw-head
54b: Holding-screw-nut
54c: Holding-screw
55: Conical-holder
55a: Conical-holder-spring
56: Lid-lock
56a: Lid-lock-lower
56b: Lid-lock-middle 56c: Lid-lock-upper
60: Optimal-Operations-Mechanism
61: Voltage-generator
61a: Connection-point2
61b: Voltage-generator-shaft
61c: Voltage-generator-gear
61ca: Voltage-generator-gear-hole
61d: Connector)
62: Voltage-analyzer
62a: Signal2
63: Main-motor-driver
63a: Connector5
63b: Connector6
64: User-interface
64a: On-Off-push-button
64b: Timer
64c: Connector2
64d: Signal)
65: Main-controller
65a: Connector3
65b: Main-Signal
66: Main-distributor
66a: Connector4
67: Input-power-distributor
67a: External-power
70: Motor-and-driving-gears
71: Main-Motor
71a: Connection-point1
72: Gear-wheel2
72a: Gear-wheel3
72b: Gear-wheel3-shaft
72c: Gear-wheel2-hole
72d: Gear-wheel3-hole
73: Gear-wheel4
73a: Gear-wheel4-shaft
73b: Gear-wheel4-hole
74: Gear-system
74a: Gear-system-wheel1
74ah: Gear-system-wheel1-hole
74b: Gear-system-wheel2
74bh: Gear-system-wheel2-hole
74c: Gear-system-shaft
74d: Gear-system-wheel3
74dh: Gear-system-wheel3-hole
74e: Gear-system-wheel4
74eh: Gear-system-wheel4-hole
74f: Gear-system-wheel5
74fh: Gear-system-wheel5-hole
74g: Gear-system-wheel6
74gh: Gear-system-wheel6-hole
74i: Gear-system-shaft-small
80: Direction-Changer-Unit
81: Direction-changing-gears
81a: Direction-changer-gear1
81b: Direction-changer-gear2
81c: Direction-changer-connecting-gear
81ch: Direction-changer-connecting-gear-hole
81d: Direction-changer-gear3
81dh: Direction-changer-gear3-hole
82: Solenoid-unit
82a: Solenoid-sub-unit1
82b: Solenoid-sub-unit2
82c: Solenoid-center-unit
82d: Solenoid-center-guide-slot
82dh: Solenoid-center-guide-slot-hole
82e: Solenoid-center-unit-spring
82f: Solenoid-center-guide-slot-extension
82g: Direction-changer-connecting-gear-backplate
82gr: Direction-changer-connecting-gear-backplate-rod
82h: Solenoid-center-unit-connecting-shaft
82i: Power-point-sub-unit1
82j: Power-point-sub-unit2
90: Circular-to-linear-movement-convertor
91: Chain-sprocket-system1
91a: Chain-sprocket-system1-sprocket1
91ah: Chain-sprocket-system1-sprocket1-hole
91b: Chain-sprocket-system1-sprocket2
91bh: Chain-sprocket-system1-sprocket2-hole
91c: Chain-sprocket-system1-chain
91d: Chain-sprocket-system1-shaft1
91e: Chain-sprocket-system1-shaft2
92: Chain-sprocket-system2
92a: Chain-sprocket-system2-sprocket1
92ah: Chain-sprocket-system2-sprocket1-hole
92b: Chain-sprocket-system2-sprocket2
92c: Chain-sprocket-system2-chain
92d: Chain-sprocket-system2-connecting-rod
92e: Chain-sprocket-system2-weight
92el: Chain-sprocket-system2-weight-loop List of Reference Numerals of Alternative Embodiments Blade Alternative Embodiment 1

22A1: Blade-Alternative1
22aA1: Blade-head-Alternative1
22hA1: Blade-Hole1-Alternative1
22iA1: Blade-Hole 2-Alternative1
22jA1: Blade-Hole3-Alternative1
22kA1: Blade-Hole4-Alternative1
22lA1: Blade-Hole5-Alternative1
22mA1: Blade-Hole6-Alternative1

Blade Alternative Embodiment 2

22A2: Blade-Alternative2
22aA2: Blade-head-Alternative2
22hA2: Blade-Hole-Alternative2
22hsA2: Blade-Hole-Sharp-End
22hbA2: Blade-Hole-Blunt-End Vertical-Movement-Control-Apparatus Alternative Embodiments 1

30A1: Vertical-Movement-Control-Apparatus-Alternative1
32A1: Follower-Unit-Alternative1
32aA1: Follower-Unit-base-plate-Alternative1
35A1: Frame-Alternative1
35aA1: Follower-unit-frame-groove-Alternative1
92cA1: Chain-sprocket-system2-chain-Alternative1
93A1: Manual-Gear
93aA1: Vertical-Lever
93bA1: Speed-Control-Lever
93cA1: Speed-Controller
93dA1: Speed-Control-Lever-Spring
93eA1: Connection-Point
93fA1: Wire-Connection Vertical-Movement-Control-Apparatus Alternative Embodiments 2

30A2: Vertical-Movement-Control-Apparatus-Alternative2

31A2: Driver-Unit-Alternative2
31aA2: Driver-slide-plate-Alternative2
31fA2: Driver-L-hook
31gA2: Driver-slide-plate-depression
31hA2: Driver-connector-button-bottom
31iA2: Driver-Spring
31jA2: Driver-connector-button-top
31kA2: Driver-connector-button-top-spring
31lA2: Driver-Direction
32A2: Follower-Unit-Alternative2
32aA2: Follower-slide-plate-Alternative2
32fA2: Follower-L-hook
32gA2: Follower-slide-plate-depression
32hA2: Follower-connector-button-bottom
33A2: Power-unit-Alternative2
33aA2: Power-unit-output1-Alternative2
33bA2: Power-unit-output2-Alternative2
33cA2: Power-unit-input-Alternative2
33dA2: Power-unit-distributor
33eA2: Power-unit-flip-flop
33fA2: Power-unit-connections1
33f1A2: Power-unit-connections1_1
33f2A2: Power-unit-connections1_2
33f3A2: Power-unit-connections1_3
33gA2: Power-unit-connections2
33g1A2: Power-unit-connections2_1
33g2A2: Power-unit-connections2_2
33g3A2: Power-unit-connections2_3
34A2: Frame-Alternative2
34aA2: Frame-groove-Alternative2
34bA2: Frame-cushioning-springs-Alternative2
34cA2: Frame-connector-button-top
34dA2: Frame-connector-button-top-spring Exemplary Embodiment 20E1: Variable-Width-Scraper-Apparatus-Exemplary1
21E1: Body-Exemplary1
21aE1: Body-top-blade-Exemplary1
21eE1: Blocking-holes-Exemplary1
21fE1: Blade-track-Exemplary1
21hE1: Body-base-shaft-hole-Exemplary1
22E1: Blade-Exemplary1
22cE1: Blade-tail-block-Exemplary1
22nE1: Guide-wheel-Exemplary1
22E1-1: Blade-Exemplary1-part1
22E1-2: Blade-Exemplary1-part2
23E1: Variable-Width-Scraper-Apparatus-Shaft-Exemplary1
40gE1: Base-bush-Exemplary1
40hE1: Base-bush-hole-Exemplary1
40iE1: Base-bush-narrow-Exemplary1
43aE1: Base-bush-fan-Exemplary1
24E1: Gear-wheel1-Exemplary1
24aE1: Gear-wheel1-hole-Exemplary1
32cE1: Follower-unit-bearing-Exemplary1
32eE1: Follower-unit-bearing-ring-Exemplary1
41E1: Variable-Opening-Entry-Mechanism-Guide-Exemplary1
41aE1: Guide1-sloping-side-Exemplary1
41iE1: Intermediate-guide-gear1-Exemplary1
41i1E1: Intermediate-guide-gear1-teeth-Exemplary1
41i2E1: Intermediate-guide-gear1-stem-Exemplary1
41i3E1: Intermediate-guide-gear1-stem-end-Exemplary1
41i4E1: Intermediate-guide-gear1-pivot-Exemplary1
41i5E1: Intermediate-guide-gear1-pivot-hole-Exemplary1
41jE1: Blade-guide-gear1-Exemplary1
41j1E1: Blade-guide-gear1-teeth-Exemplary1
41j2E1: Blade-guide-gear1-stem-Exemplary1
41j3E1: Blade-guide-gear1-stem-end-Exemplary1
41j4E1: Blade-guide-gear1-pivot-Exemplary1
41j5E1: Blade-guide-gear1-pivot-hole-Exemplary1
21vhE1: Body-Jar-Base-height-Exemplary1
26E1: Blade-extension-profile-Exemplary1

Figure 1:
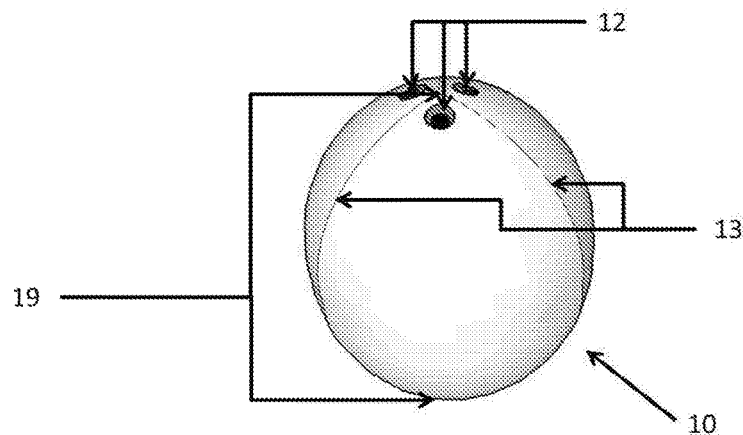
FIG. 1 is an upper perspective view of a full coconut.

Turning now descriptively to the drawings, in which similar reference characters denote similar elements throughout the several views, FIG. 1 illustrates Coconut 10 showing the general shape of a typical full coconut, which is de-husked. Coconut 10 has three Eye 12, which are the germination pores in the endocarp. The three Eye 12 are at one end of the coconut and Seam 13 runs between any two Eye 12 to the opposite end. If these two opposite ends, pole 19, are considered as the poles of the coconut we can imagine the equator as the approximate line on the circumference which divides the coconut to two half coconut with poles on either side. Referring FIG. 2 that illustrates Coconut 10 cut at this imaginary equator to make two Half-coconut 11. This ensures that the cut edges are more or less circular in shape and Half-coconut 11 easy to hold and scrape. For the present disclosure we consider the Pole to Pole distance as the length of the coconut 10 and the approximate diameter of the equator as the width of the coconut 10.

In order to make further explanations easy to understand and simple the following is considered: (Refer FIG. 2):
1. The coconut 10 is placed lengthwise vertically.
2. The coconut 10 is made to two halves across the length or horizontally at the imaginary equator such that it makes two approximately or almost equal half-coconut 11. This makes the cut face of the Half-coconut 11 oriented to the horizontal plane.

Some definitions are made specific to the present disclosure for better understanding, and may not be generic.

Figure 2:
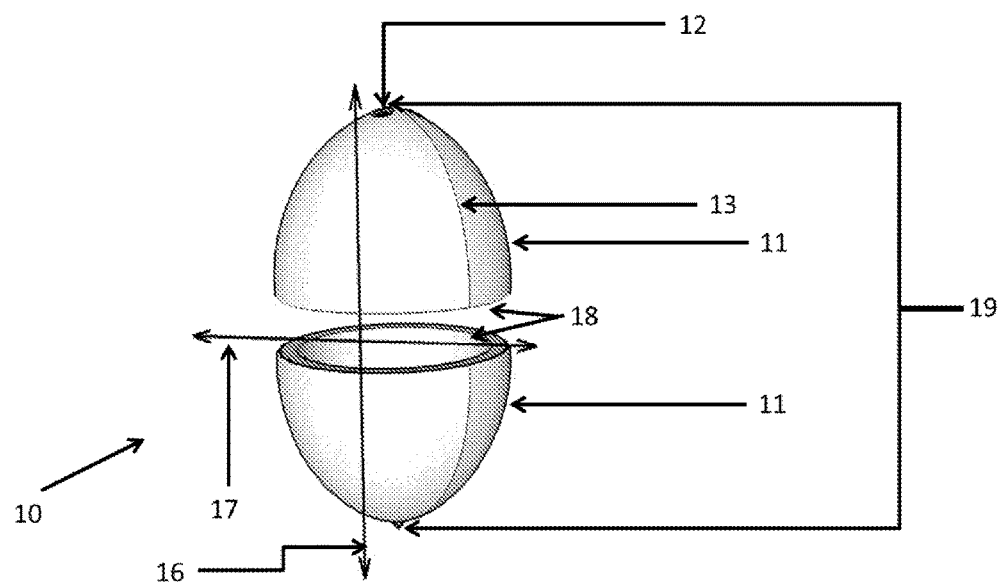
FIG. 2 is a front upper perspective view of a full coconut cut to two halves across its length.
Figure 3:
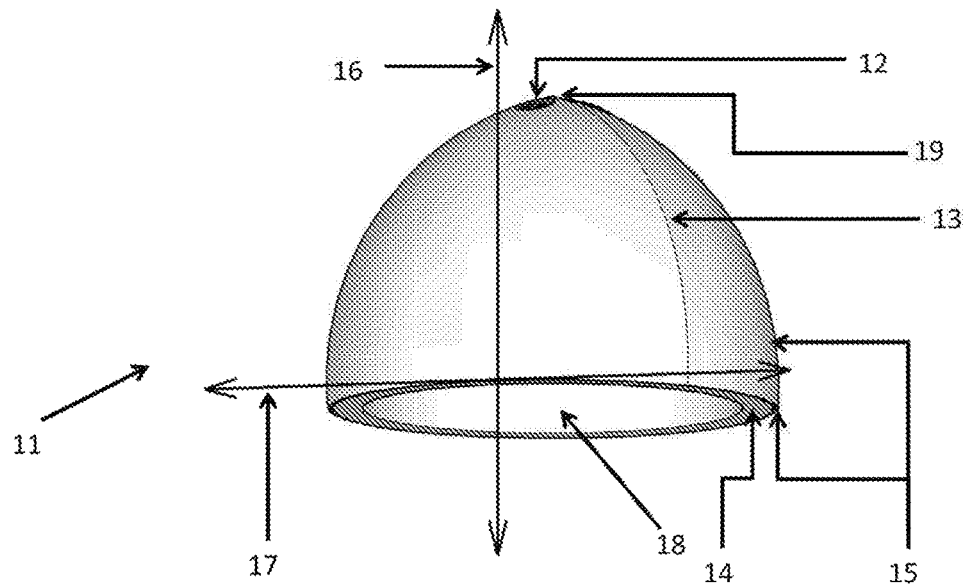
FIG. 3 is a front lower perspective view of a half-coconut.

Referring FIG. 2, Coconut 10 is cut into two Half-coconut 11 such that its length is oriented vertically and the cut face, Cut-face-of-coconut 18 (which is the cut face of Half-coconut 11 is in the horizontal plane. Vertical-axis 16 is the vertical axis and Horizontal-axis 17 is the horizontal axis of the coconut. FIG. 3 represents Half-coconut 11 with Pole 19, Eye 12, Seam 13 and shell 15 which is the hard coconut shell enclosing Coconut-meat 14 (which is the white endosperm or 'coconut-meat'). Cut-face-of-coconut 18 is in the horizontal plane as it is oriented to Horizontal-axis 17 and the length or height of the Half-coconut 11 is vertical as it is oriented to Vertical-axis 16. The length of Half-coconut 11 is the vertical distance from Cut-face-of-coconut 18 to the Pole 19.

The term coconut (Coconut) or half-coconut (Half-coconut, half coconut, Half-Coconut) described hereinafter will be considered to be a de-husked Half-coconut 11 spatially oriented and as represented in FIG. 3.

Phrases viz., "scraping a coconut", "grating a coconut", "scrape a coconut" or "grate a coconut" described hereinafter will all refer to scraping Coconut-meat 14 from inside Shell 15 of a Half-coconut 11 as illustrated in FIG. 3.

Figure 4:
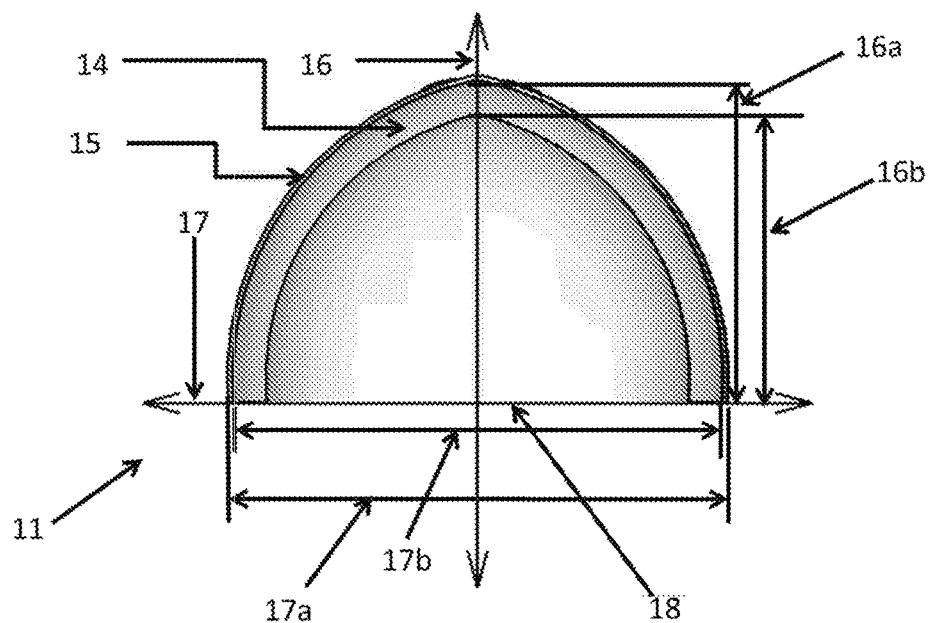
FIG. 4 is a cross section of front elevation view of a half-coconut.

The shape, length and width of a full coconut varies from one coconut to another, considering a Half-coconut 11 as in FIG. 4 each variability is defined herein as under:
1. Horizontal-Width-Variability: The width of Half-coconut 11 varies from one coconut to another. Within a Half-coconut 11 the width decreases with vertical height There is variation in thickness of Coconut-meat 14 as well as Shell 15 within a coconut and across coconuts. This variation in width in all the above cases is defined as Horizontal-Width-Variability. Referring FIG. 4, two kinds of width are to be considered i.e., A. Width-outer 17a which is the width taken from the outside wall of the Shell 15 and B. Width-inner 17b which is the width taken from the inside wall of the Shell 15.

2. Vertical-Height-Variability: The vertical height or length of Half-coconut 11 varies from one coconut to another. Two kind of height are to be considered i.e. A. Height-outer 16a which is the vertical distance from Cut-face-of-coconut 18 to the outer wall of Coconut-meat 14 or inner wall of Shell 15 and, B. Height-inner 16b which is the vertical distance from Cut-face-of-coconut 18 to the inner wall of Coconut-meat 14. It has to be noted that when the coconut is scraped progressively Height-inner 16b increases and finally equals to the height of Height-outer 16a. This variability in height in all the above cases is defined as Vertical-Height-Variability.

3. Cut-face-width-Variability: The width of Coconut 10 varies from one coconut to another. As the full coconut 10 is cut at its imaginary equator to make Half-coconut 11, the Cut-face-of-coconut 18 has the same diameter as that of the imaginary equator of the full coconut 10. Depending on the size of the full coconut 10 the width of the Cut-face-of-coconut 18 varies. This variability in the width of the Cut-face-of-coconut 18 is defined as Cut-face-width-Variability.

The detailed description of the various parts/elements that constitute the apparatus to scrape to extract Coconut-meat 14 from a Half-coconut 11 with minimal human intervention is given below.

There are five main elements each of which is described under its heading.

1. Variable-Width-Scraper-Apparatus.

Figure 5:
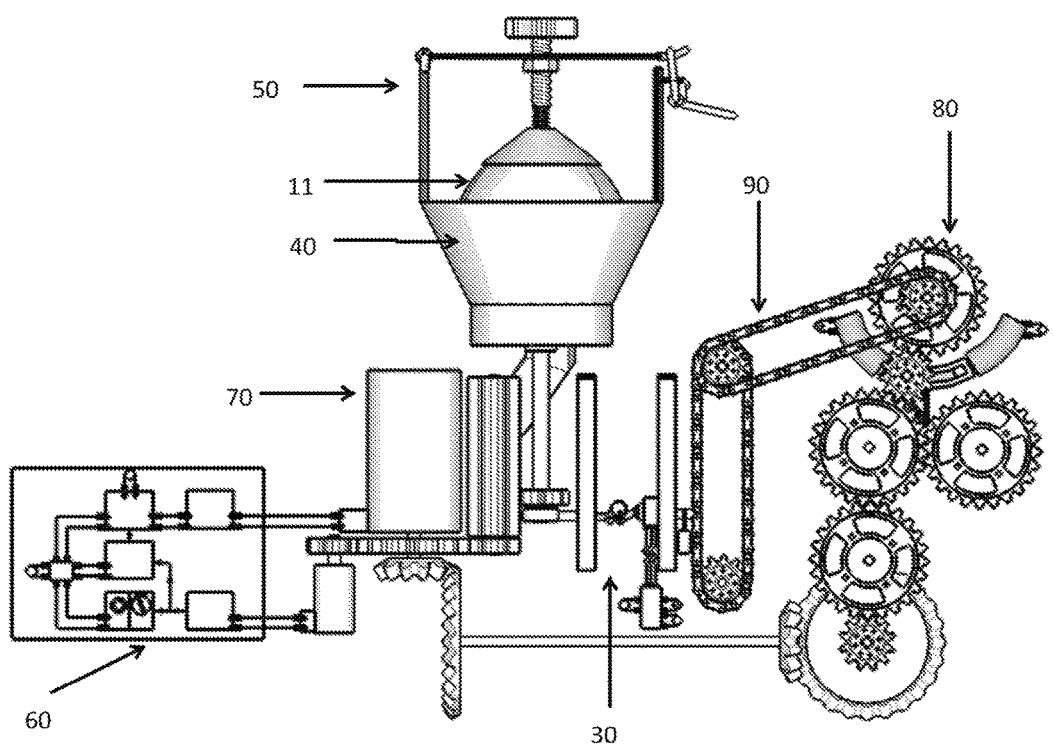
FIG. 5 is a front elevation view of apparatus to scrape coconut with half-coconut placed in position for being scraped.

1a. Description of Variable-Width-Scraper-Apparatus:

FIG. 16 illustrates the Variable-Width-Scraper-Apparatus 20. FIGS. 5, 6 and 7 illustrate the overall apparatus to scrape to extract Coconut-meat 14 from a Half-coconut 11 with minimal human intervention and shows how Variable-Width-Scraper-Apparatus 20 is part of the apparatus. In FIG. 5 the major part of Variable-Width-Scraper-Apparatus 20 is inside Half-coconut 11 and hence not visible. Variable-Width-Scraper-Apparatus 20 considers and accommodates the Horizontal-Width-Variability of a Half-coconut 11 within a horizontal plane and scrapes it accordingly.

Refer FIGS. 08 and 09 which illustrate the Body 21 of Variable-Width-Scraper-Apparatus 20. Body 21 has Body-top-blade 21a which is used to scrape the top part of a Half-coconut 11, Body-base 21b which is the base of the body 21, Body-top 21c forming the top surface of the body 21 and Body-side-wall 21d which are two on either side. There are two side-walls 21d on either side of the body 21, as shown in FIGS. 8 & 9. However, there can be any number of side-walls in the body, as per the requirements of the apparatus. Body-side-wall 21d has Blocking-holes 21e which are smaller holes, Non-blocking-holes 21f which are larger holes and Body-side-wall-gap 21g between two Body-side-wall 21d. The vertical surface on Body-base 21b on the side where Body-side-wall 21d is absent is the Body-base-guide-surface 21i.

Refer FIGS. 10 and 11 which illustrate the blade 22. The blade 22 has Blade-head 22a, Blade-body 22b and Blade-tail-block 22c. The Blade-head 22a has Teeth-end-of-blade-head 22d, Body-end-of-blade-head 22e. The Blade-body 22b has Blade-tail 22f and Head-end-of-blade-body 22g.

The Blade-head 22a has Blade-Teeth1 22h, Blade-Teeth2 22i, Blade-Teeth3 22j, Blade-Teeth4 22k, Blade-Teeth5 22l and Blade-Teeth6 22m near the Teeth-end-of-blade-head 22d. However, the number of blade teeth is not limited to what has been shown in the present description, and can vary along with the shape as per the design requirements of the apparatus and in certain cases teeth can be totally absent depending on the suitability and the requirements of the apparatus, and as can be perceived by a person skilled in the art. In such cases the end opposite to Body-end-of-blade-head 22e of Blade-head 22a will scrape Coconut-meat 14. Refer FIG. 10 which illustrates the Blade-tail-block 22c is formed at an angle, Angle-body-tail 22r to Blade-body 22b. Refer FIG. 11 which illustrates the Blade-head 22a at Angle 22q to the body 22b. This angle is for ease of operation, based on design the angle could be zero depending on the suitability and the requirements of the apparatus, and as can be perceived by a person skilled in the art.

Refer FIGS. 12 and 13 which illustrate the Blade 22 and body 21 configured together. Here the blade 22 is configured such a way that its Blade-body 22b can freely move through both the Blocking-holes 21e and Non-blocking-holes 21f. The Blocking-holes 21e however blocks the Blade-head 22a as well as Blade-tail-block 22c from passing through it. The Non-blocking-holes 21f allows the Blade-tail-block 22c to pass through it freely.

Refer FIG. 14 which shows only the four Blade 22 which are configured inside Body 21 in FIGS. 12 and 13. However, the number of blades 22 are not limited to four, and can be any number (including a single blade) depending on the suitability and the requirements of the apparatus, and as can be perceived by a person skilled in the art. It can be noticed that the Angle-body-tail 22r is different for each of the Blade 22 in order for the Blade-tail-block 22c of Blade 22 to be parallel to the Body-side-wall 21d of Body 21 for best alignment.

Refer FIGS. 12, 13 and 15 it can be seen how the blade 22 are able to move freely outward from the body 21 of the Variable-Width-Scraper-Apparatus 20.

Refer FIGS. 15 and 16 which illustrates how the Variable-Width-Scraper-Apparatus-Shaft 23 is attached to Body-base-shaft-hole 21h of body 21. Variable-Width-Scraper-Apparatus-Shaft 23 has Gear-wheel1 24 attached to it. FIG. 16 illustrates Body 21, Blade 22, Variable-Width-Scraper-Apparatus-Shaft 23 and Gear-wheel1 24 configured together, and collectively forming Variable-Width-Scraper-Apparatus 20.

The Variable-Width-Scraper-Apparatus is required to rotate in order to operate and perform scraping function. Refer FIGS. 17 and 18 which illustrates how Variable-Width-Scraper-Apparatus 20 is connected to Motor-and-driving-gears 70 to rotate. Gear-wheel1 24 is connected to Main-motor 71 through Gear-wheel2 72, Gear-wheel3 72a and Gear-wheel4 73. As the Gear-wheel2 72 has larger thickness, Gear-wheel1 24 can slide vertically up and down the thickness of Gear-wheel2 72 while being rotated by it.

1b. Operation of Variable-Width-Scraper-Apparatus:

Refer FIG. 18 which illustrates how the Variable-Width-Scraper-Apparatus 20 is placed inside the half-coconut 11. The Variable-Width-Scraper-Apparatus-Shaft 23 is vertically aligned. When the Main-motor 71 rotates it rotates the body 21 and the blade 22 along with it. FIG. 19 illustrates Variable-Width-Scraper-Apparatus 20 rotating in the Direction-of-rotation 25a. Refer FIG. 20, as the speed of rotation increases the blade 22 moves outward due to centrifugal force on the blade 22. The centrifugal force increases with speed of rotation and mass of blade. As the mass of blade 22 is more towards Blade-head 22a, centrifugal force is more near Blade-head 22a and hence moves it outwards along with the whole blade 22. Refer FIG. 21 which illustrates Variable-Width-Scraper-Apparatus 20 rotating in the direction shown by arrows Direction-of-rotation 25a. The rotation results in the outward movement of the blade 22 in the radial direction shown by radial-direction 25b due to centrifugal force. Blade 22 comes in contact with the Coconut-meat 14 due to this outward movement from Body 21. Owing to the above tangential force in the direction indicated by Tangential-direction-of-force 25c is exerted by the Blade-Teeth1 22h to Blade-Teeth6 22m on the Coconut-meat 14. This creates the required force to scrape the Coconut-meat 14 resulting in Scraped-coconut-meat 14a. To have a detailed understanding FIG. 21 also illustrates two positions of the blade 22 at two points in time and rotation. When the Variable-Width-Scraper-Apparatus is rotating blade 22 moves from Rotating-position1 22-1 to Rotating-position2 22-2. In this movement the blade 22 exerts Tangential-direction-of-force 25c on the inner layer of Coconut-meat 14, Coconut-meat-inner-layer 14b, and results in the Coconut-meat 14 getting scraped and formation of Scraped-coconut-meat 14a. In the Rotating-position2 22-2 the blade 22 is more outward along Radial-direction 25b than in Rotating-position1 22-1 as the top layer of Coconut-meat 14 in that position got scraped and blade 22 extended outward to reach the next layer of Coconut-meat 14. As the Coconut-meat 14 is scraped, the Coconut-meat 14 reduces in thickness and the blade 22 moves outward in Radial-direction 25b due to centrifugal force generated in order to fill this gap and scrapes the next layer of the Coconut-meat 14. This process goes on till it reaches the shell. As the blades 22 of the Variable-Width-Scraper-Apparatus 20 can move outward due to centrifugal force generated by rotation makes it possible to scrape a coconut of variable width. Therefore Variable-Width-Scraper-Apparatus 20 considers and accommodates the Horizontal-Width-Variability of a half coconut and scrapes it accordingly.

When the blade 22 is scraping Coconut-meat 14 the speed of motor is at load speed but when Coconut-meat 14 is fully scraped and the blade reaches the shell 15 it will run closer to no load speed. This is assuming the motor speed is such that it generates centrifugal force strong enough to scrape Coconut-meat 14 but not strong enough to scrape the shell 15. The above difference in load speed and no load speed can be used to identify as to when the coconut is fully scraped.

The concept of Variable-Width-Scraper-Apparatus is to have a variably extendable blade which can extend outward and scrape considering and accommodating the width variability inside a Half-coconut 11 across its length. This requires an outwardly extendable blade, a force which moves the blade to extend outward to exert pressure on the Coconut-meat 14 and relative motion between the blade and Coconut-meat 14. In order to have a an outwardly extendable blade, the blade could slide out of a central body (as in the embodiment above) or be hinged to a central body and open outward like a hinged lever. The force which moves the blade to extend outward to exert pressure on the Coconut-meat 14 could be in the form of centrifugal force due to rotation of central body through which the blade slides out or hinge out. Also the force which moves the blade to extend outward to exert pressure on the Coconut-meat 14 could be in the form of spring tension which comes into play when a spring is used to move the blade move outward or open outward for a hinged blade. The relative motion between the blade and Coconut-meat 14 can be achieved by either rotating the blade inside a stationary Half-coconut 11 or rotating Half-coconut 11 inside a stationary blade or rotating both blade and Half-coconut 11 in opposite directions. In case where centrifugal force is not used to extend the blade outward a spring tension can be used.

One embodiment of the above concept has been given above other ways of achieving this is possible as can be perceived by a person skilled in the art.

2. Vertical-Movement-Control-Apparatus and Elements.

2a. Description of Vertical-Movement-Control-Apparatus and Supporting Elements:

Variable-Width-Scraper-Apparatus considers and accommodates the Horizontal-Width-Variability of a half coconut and scrapes it accordingly. Refer FIGS. 18 and 21: If the Variable-Width-Scraper-Apparatus 20 is not moved in a vertical direction then only the horizontal planes where each of the blade 22 is able to reach due to its outward movement in Radial-direction 25b will be scraped. In order that Half-coconut 11 is scraped fully the Variable-Width-Scraper-Apparatus 20 needs to be moved vertically up and down. Vertical-Movement-Control-Apparatus 30 considers and accommodates the Vertical-Height-Variability of Half-coconut 11 and moves the Variable-Width-Scraper-Apparatus 20 vertically up and down to completely scrape the whole Half-coconut 11.

Refer FIGS. 45 and 46 which illustrate the Vertical-Movement-Control-Apparatus 30. Refer FIGS. 5, 6 and 7 which illustrate the overall apparatus to scrape to extract Coconut-meat 14 from a Half-coconut 11 with minimal human intervention and how Vertical-Movement-Control-Apparatus 30 is part of it. Refer FIGS. 22 and 23 which illustrates Vertical-Movement-Control-Apparatus 30 moving Variable-Width-Scraper-Apparatus 20 vertically up and down. In order for Vertical-Movement-Control-Apparatus 30 to move Variable-Width-Scraper-Apparatus 20 vertically up and down it requires the driving power to make the linear up and down movement. The driving power for the vertical up and down movement is provided to Vertical-Movement-Control-Apparatus 30 by the supporting parts Motor-and-driving-gears 70, Direction-Changer-Unit 80 and Circular-to-linear-movement-convertor 90. Motor-and-driving-gears 70 gives the rotational motion to the apparatus, Direction-Changer-Unit 80 converts the unidirectional rotation of the main-motor 71 to bidirectional and Circular-to-linear-movement-convertor 90 converts the rotational motion to linear motion. Before explaining Vertical-Movement-Control-Apparatus 30 it is necessary to explain the supporting parts Motor-and-driving-gears 70, Direction-Changer-Unit 80 and Circular-to-linear-movement-convertor 90.

Motor-and-Driving-Gears 70:

Refer FIGS. 23 and 24 which illustrate how the rotational motion of main-motor 71 is transferred to the Direction-Changer-Unit 80 through gears-system 74. Gear-system 74 also reduces the speed of rotation during this transfer. This rotational motion is transferred from Main-Motor 71 to the Direction-Changer-Unit 80 through Gear-system-wheel1 74a, Gear-system-wheel2 74b, Gear-system-shaft 74c, Gear-system-wheel3 74d, Gear-system-wheel4 74e, Gear-system-wheel5 74f and Gear-system-wheel6 74g. There can be used any alternate means of transferring the motion as can be perceived by a person skilled in the art.

Direction-Changer-Unit 80:

The direction of rotation from main-motor 71 is single direction and in order to power the up and down motion of Vertical-Movement-Control-Apparatus 30, it is required to be bi-directional. Direction-Changer-Unit 80 converts the unidirectional rotation of the main-motor 71 to a bi-directional rotation.

Refer FIGS. 23, 25, 26 and 27 which illustrate the Direction-Changer-Unit 80. Direction-Changer-Unit 80 mainly consists of Direction-changing-gears 81 and solenoid unit 82. Direction-changing-gears 81 consists of Direction-changer-gear1 81a which receives the rotational force from 74g, Direction-changer-gear2 81b, Direction-changer-connecting-gear 81c and Direction-changer-gear3 81d. As Direction-changer-gear2 81b and Direction-changer-gear1 81a are directly connected to each other they rotate in opposite directions. For example as shown in figure, if and Direction-changer-gear1 81a rotates in anticlockwise then Direction-changer-gear2 81b rotates in a clockwise direction. Direction-changer-gear3 81d is connected to changer-gear1 81a and Direction-changer-gear2 81b through the Direction-changer-connecting-gear 81c. Direction-changer-connecting-gear 81c is not a fixed gear but a movable gear, and this movement is controlled by solenoid-unit 82.

Refer FIGS. 27, 28 and 29 which illustrate the solenoid-unit 82. The solenoid-unit 82 consists of solenoid-sub-unit1 82a which has power-point-sub-unit1 82i and solenoid-sub-unit2 82b which has power-point-sub-unit2 82j. Solenoid-center-unit 82c is placed in between solenoid-sub-unit1 82a and solenoid-sub-unit2 82b and connected to the Direction-changer-connecting-gear 81c by means of a solenoid-center-unit-connecting-shaft 82h. The solenoid-center-unit-connecting-shaft 82h passes through Solenoid-center-guide-slot-hole 82dh of solenoid-center-guide-slot 82d which guides in its sideways movement. The Direction-changer-connecting-gear-backplate 82g is placed such a way that the Direction-changer-connecting-gear 81c can only have only side-ways (right-left) movement and not front and back movement. Solenoid-center-guide-slot-extension 82f is attached to the solenoid-center-guide-slot 82d. Solenoid-center-unit-spring 82e is connected from one end of solenoid-center-guide-slot-extension 82f to the Direction-changer-connecting-gear-backplate 82g such a way that there is tension in the Solenoid-center-unit-spring 82e when the solenoid-center-unit 82c is not in its central position (between solenoid-sub-unit1 82a and solenoid-sub-unit2 82b). Thus the natural state for solenoid-center-unit 82c is to be between solenoid-sub-unit1 82a and solenoid-sub-unit2 82b. This ensures that the natural state for Direction-changer-connecting-gear 81c is not to be connected either to Direction-changer-gear1 81a or Direction-changer-gear2 81b, but to be present between them.

The Direction-changer-connecting-gear 81c can have three moving positions as described below:

Position1

Refer FIGS. 25, 26 and 27: Solenoid-sub-unit1 82a and Solenoid-sub-unit2 82b are electromagnets (solenoids) which become magnetic when powered by electricity. When only power-point-sub-unit1 82i is powered with electricity solenoid-sub-unit1 82a becomes magnetic and pulls solenoid-center-unit 82c towards it, resulting in Direction-changer-connecting-gear 81c moving towards Direction-changer-gear1 81a and connecting to it. In this position Direction-changer-connecting-gear 81c connects Direction-changer-gear1 81a and Direction-changer-gear3 81d. This ensures that the Direction-changer-gear3 81d rotates in the same direction as that of Direction-changer-gear1 81a. As shown in figure, as Direction-changer-gear1 81a is rotating in anti-clockwise direction, Direction-changer-gear3 81d will also rotate in anti-clockwise direction.

Position 2:

Refer FIGS. 25, 26 and 27: When only power-point-sub-unit2 82j is powered with electricity solenoid-sub-unit2 82b becomes magnetic and pulls solenoid-center-unit 82c towards it, resulting in Direction-changer-connecting-gear 81c moving towards Direction-changer-gear2 81b and connecting to it. In this position Direction-changer-connecting-gear 81c connects Direction-changer-gear2 81b and Direction-changer-gear3 81d. This ensures that the Direction-changer-gear3 81d rotates in the same direction as that of Direction-changer-gear2 81b. As shown in figure, as Direction-changer-gear2 81b is rotating in clockwise direction, Direction-changer-gear3 81d will also rotate in clockwise direction.

Position 3:

Refer FIGS. 25, 26 and 27: When neither power-point-sub-unit1 82i nor power-point-sub-unit1 82j is powered with electricity there is no magnetic force from solenoid-sub-unit1 82a or solenoid-sub-unit2 82b to pull solenoid-center-unit 82c sideways towards them. The tension in solenoid-center-unit-spring 82e will ensure that solenoid-center-unit 82c will be in central position i.e., midway between solenoid-sub-unit1 82a and solenoid-sub-unit2 82b.

In this position Direction-changer-connecting-gear 81c is midway between Direction-changer-gear1 81a and Direction-changer-gear2 81b and does not connect to either of them. In position 3 Direction-changer-connecting-gear 81c and Direction-changer-gear3 81d are not connected to any gears from the main-motor 71 and so is free to rotate in any direction.

Circular-to-Linear-Movement-Convertor 90:

Refer FIGS. 30 and 31 which illustrates Circular-to-linear-movement-convertor 90 which converts the bidirectional rotation from Direction-Changer-Unit 80 to a linear vertically up and down movement. It consists mainly of chain and sprocket system, Chain-sprocket-system1 91 and Chain-sprocket-system2 92. Chain-sprocket-system1 91 connects Direction-changer-gear3 81d to Chain-sprocket-system2 92. Chain-sprocket-system1 91 consists of Chain-sprocket-system1-sprocket1 91a which connects to Direction-changer-gear3 81d. Chain-sprocket-system1-chain 91c connects Chain-sprocket-system1-sprocket1 91a to Chain-sprocket-system1-sprocket2 91b. Chain-sprocket-system1-shaft1 91d connects Chain-sprocket-system1-sprocket1 91a to Direction-changer-gear3 81d. Chain-sprocket-system1-shaft2 91e connects Chain-sprocket-system1-sprocket2 91b to Chain-sprocket-system2-sprocket1 92a.

FIGS. 30, 31 and 32 illustrate Chain-sprocket-system2 92 which provides the vertically linear up and down driving movement to the Vertical-Movement-Control-Apparatus 30 through the Chain-sprocket-system2-connecting-rod 92d. It has chain Chain-sprocket-system2-chain 92c connecting sprocket Chain-sprocket-system2-sprocket1 92a and sprocket Chain-sprocket-system2-sprocket2 92b. A relatively heavy weight, Chain-sprocket-system2-weight 92e is attached to the rod Chain-sprocket-system2-connecting-rod 92d in order to give a downward weight. The purpose of the downward weight is to ensure that when the Direction-Changer-Unit 80 is in position 3 the weight of Chain-sprocket-system2-weight 92e will be heavy enough to move the Chain-sprocket-system2-connecting-rod 92d and hence Vertical-Movement-Control-Apparatus 30 to vertically lowest position. The size of Chain-sprocket-system2-weight 92e is only illustrative.

Vertical-Movement-Control-Apparatus 30:

FIGS. 34 and 35 illustrate Driver-unit 31 which consists of Driver-unit-slide-plate 31a which is the base on which Driver-unit-spdt_switch 31b, a toggle SPDT (single pole double throw) switch, is fixed. The Driver-unit-spdt_switch 31b has Driver-unit-spdt_switch-handle 31c which when flipped up or down gives two different switching positions for Driver-unit-spdt_switch 31b. Driver-unit-spdt_switch-handle-spring 31d is attached to the Driver-unit-spdt_switch-handle 31c. Driver-unit-power-unit 33 is the junction box which sends and receives electric current to and from Driver-unit-spdt_switch 31b through Driver-unit-spdt_switch-connections 31e. Chain-sprocket-system2-connecting-rod is connected to Driver-unit-slide-plate 31a.

SPDT toggle switch is Single Pole Double Throw toggle switch. As it is single pole either positive or negative/ground current is used. In this case positive current is used as the single pole input to the Driver-unit-spdt_switch 31b. The positive current is received at Driver-unit-power-unit-input 33c and passed on to Driver-unit-spdt_switch 31b through Driver-unit-spdt_switch-connections 31e. As the switch Driver-unit-spdt_switch 31b is double throw it toggles between the two switching positions or two different closed circuits. In one switching position it can give electric current to one closed circuit and in another it gives electric current to another closed circuit.

Switching position1: When Driver-unit-spdt_switch-handle 31c is flipped to vertically lower position, the switch, Driver-unit-spdt_switch 31b connects the electrical path between Driver-unit-power-unit-input 33c and Driver-unit-power-unit-output1 33a. This results in the input current from Driver-unit-power-unit-input 33c flowing to Driver-unit-power-unit-output1 33a.

Switching position2: When Driver-unit-spdt_switch-handle 31c is flipped to vertically upper position, the switch, Driver-unit-spdt_switch 31b disconnects the electrical path between Driver-unit-power-unit-input 33c and Driver-unit-power-unit-output1 33a and connects the electrical path between Driver-unit-power-unit-input 33c and Driver-unit-power-unit-output2 33b. This results in the input current from Driver-unit-power-unit-input 33c flowing to Driver-unit-power-unit-output2 33b.

Depending on the position of Driver-unit-spdt_switch-handle 31c of Driver-unit-spdt_switch 31b either Driver-unit-power-unit-output1 33a or Driver-unit-power-unit-output2 33b is connected to Driver-unit-power-unit-input 33c.

Refer FIGS. 36 and 37 which illustrates Driver-unit-frame 34 and Follower-unit-frame 35. The Driver-unit-frame 34 has Driver-unit-frame-groove 34a on both the side walls and Driver-unit-frame-cushioning-springs 34b at top and bottom. The Follower-unit-frame 35 has Follower-unit-frame-groove 35a on both the side walls and Follower-unit-frame-block-upper 35b and Follower-unit-frame-block-lower 35b1 at two heights blocking the groove on both the side walls.

Refer FIGS. 38, 39 and 40 which illustrates how Driver-unit-frame 34 provides the frame inside which Driver-unit 31 is able to slide up and down vertically. The side ends of Driver-unit-slide-plate 31a correctly fits into the Driver-unit-frame-groove 34a such that it can slide vertically up and down the Driver-unit-frame 34 freely. Driver-unit-frame 34 is provided with Driver-unit-frame-cushioning-springs 34b at its top and bottom end, in order to have a cushioning effect when Driver-unit 31 reaches the top and bottom of the Driver-unit-frame 34.

Refer FIG. 41 which illustrates Follower-unit 32 with Follower-unit-slide-plate 32a and two Follower-unit-arms 32b. Follower-unit 32 has Follower-unit-connection-rod 32d with bearing wheel Follower-unit-bearing 32c at one end. Follower-unit-bearing 32c has inner ring Follower-unit-bearing-ring 32e.

Refer FIGS. 42, 43 and 44 which illustrates how Follower-unit-frame 35 provides the frame inside which Follower-unit 32 is able to slide up and down vertically. The side ends of Follower-unit-slide-plate 32a correctly fits into Follower-unit-frame-groove 35a so that it can slide vertically up and down the Follower-unit-frame 35 freely. Follower-unit-frame 35 has Follower-unit-frame-block-upper 35b and Follower-unit-frame-block-lower 35b1 at two heights blocking the groove on both the side walls in order to restrict the vertically up and down sliding motion of the Follower-unit 32 within these blocks.

Refer FIGS. 45, 46, 47 and 48 which illustrate the Vertical-Movement-Control-Apparatus 30 wherein the Driver-unit 31 and Follower-unit 32 are connected together through Driver-unit-spdt_switch-handle-spring 31d. The two outer ends of Driver-unit-spdt_switch-handle-spring 31d are connected to the two arms of Follower-unit-arms 32b. The inner ends of Driver-unit-spdt_switch-handle-spring 31d are connected to the Driver-unit-spdt_switch-handle 31c.

In Vertical-Movement-Control-Apparatus 30, when Driver-unit 31 moves vertically upwards or downwards, it pulls the Driver-unit-spdt_switch-handle-spring 31d which in turn pulls Follower-unit 32 to move vertically upwards or downwards along with it.

Refer FIGS. 23, 32 and 33 which illustrates how Vertical-Movement-Control-Apparatus 30 is connected to the Circular-to-linear-movement-convertor 90 on one side and Variable-Width-Scraper-Apparatus 20 at the other. Chain-sprocket-system2-connecting-rod 92d connects Chain-sprocket-system2-chain 92c of Circular-to-linear-movement-convertor 90 to the Driver-unit-slide-plate 31a of Driver-unit 31. Variable-Width-Scraper-Apparatus-Shaft 23 of Variable-Width-Scraper-Apparatus 20 fits tightly into the inner ring Follower-unit-bearing-ring 32e of bearing wheel Follower-unit-bearing 32c which is attached to the Follower-unit-slide-plate 32a through the Follower-unit-connection-rod 32d. As the Variable-Width-Scraper-Apparatus-Shaft 23 tightly fits to the Follower-unit-bearing-ring 32e of Follower-unit-bearing 32c (which is a bearing), Variable-Width-Scraper-Apparatus-Shaft 23 can rotate freely. At the same time the Follower-unit 32 can move the Variable-Width-Scraper-Apparatus-Shaft 23 vertically up and down through the Follower-unit-connection-rod 32d and Follower-unit-bearing 32c. Hence the Variable-Width-Scraper-Apparatus 20 is rotated by the Gear-wheel2 72 and Gear-wheel1 24 while its vertical up and down movement is controlled by the Vertical-Movement-Control-Apparatus 30 through the Follower-unit 32.

2b. Operation of Vertical-Movement-Control-Apparatus 30 and Supporting Elements:

Refer FIG. 7 which illustrate the scraper apparatus used for scraping a half-coconut 11, and FIGS. 49 to 54 which illustrate the six stages in the operation of Vertical-Movement-Control-Apparatus 30. Also refer FIG. 25 which illustrates Direction-Changer-Unit 80. Every electrical equipment has two terminals and need positive current in one and negative or ground in the other (for simplicity purposes DC current/equipment is assumed). It is assumed that both the solenoid-sub-unit1 82a and solenoid-sub-unit2 82b have one terminal always connected to the ground. Driver-unit-power-unit-input 33c has positive current. In order to power solenoid-sub-unit1 82a and solenoid-sub-unit2 82b, power-point-sub-unit1 82i is connected to Driver-unit-power-unit-output1 33a and power-point-sub-unit2 82j is connected to Driver-unit-power-unit-output2 33b respectively.

Stage1:

Refer FIG. 49 which illustrates Vertical-Movement-Control-Apparatus 30 and FIG. 25 which illustrates Direction-Changer-Unit 80.

The status at this stage of operation is as follows:

Driver-unit-spdt_switch-handle 31c: Flipped downward

Follower-unit 32: Able to move freely

Variable-Width-Scraper-Apparatus 20: Able to move freely

Tension in Driver-unit-spdt_switch-handle-spring 31d: Normal

As the Driver-unit-spdt_switch-handle 31c is flipped downward Driver-unit-power-unit-output1 33a gets positive current and Driver-unit-power-unit-output2 33b has no current. This results in current in power-point-sub-unit1 82i and solenoid-sub-unit1 82a getting magnetized. This results in Position1 as explained above under the description of Direction-Changer-Unit 80. This ensures that the Direction-changer-gear3 81d rotates in the same direction as that of Direction-changer-gear1 81a i.e. anti-clockwise as shown in figure. This makes the Circular-to-linear-movement-convertor 90 moving the Driver-unit 31 vertically downward. Driver-unit 31 pulls Driver-unit-spdt_switch-handle-spring 31d which in turn pulls Follower-unit 32 vertically downward. This results in the Variable-Width-Scraper-Apparatus 20 moving vertically downward.

Stage2:

Refer FIG. 50 which illustrates Vertical-Movement-Control-Apparatus 30 and FIG. 25 which illustrates Direction-Changer-Unit 80.

The status at this stage of operation is as follows:

Driver-unit-spdt_switch-handle 31c: Flipped downward

Follower-unit 32: downward movement blocked by Follower-unit-frame-block-lower 35b1 Variable-Width-Scraper-Apparatus 20: Able to move freely.

Tension in Driver-unit-spdt_switch-handle-spring 31d: Increased but not reached threshold. This is a continuation of the previous stage for Driver-unit 31 as such it is moving downward and pulling Follower-unit 32 vertically downward. But in the case of Follower-unit 32, it encounters encountered Follower-unit-frame-block-lower 35b1 and cannot move vertically downward any more. This results in increased tension in Driver-unit-spdt_switch-handle-spring 31d, which is being stretched. This increased tension in the Driver-unit-spdt_switch-handle-spring 31d results in an increased force on the Driver-unit-spdt_switch-handle 31c to flip upwards.

Stage3:

Refer FIG. 51 which illustrates Vertical-Movement-Control-Apparatus 30 and FIG. 25 which illustrates Direction-Changer-Unit 80.

The status at this stage of operation is as follows:

Driver-unit-spdt_switch-handle 31c: Just Flipped Upwards due to force from Tension in Driver-unit-spdt_switch-handle-spring 31d reaching threshold.

Follower-unit 32: Able to move freely upward Variable-Width-Scraper-Apparatus 20: Able to move freely.

Tension in Driver-unit-spdt_switch-handle-spring 31d: Normal.

From Stage2 as the tension in Tension in Driver-unit-spdt_switch-handle-spring 31d increased and reached threshold it generates enough force to flip the Driver-unit-spdt_switch-handle 31c upwards. As the Driver-unit-spdt_switch-handle 31c is flipped upwards Driver-unit-power-unit-output2 33b gets positive current and Driver-unit-power-unit-output1 33a has no current. This results in current in power-point-sub-unit2 82j and solenoid-sub-unit2 82b getting magnetized.

This results in Position2 as explained above under the description of Direction-Changer-Unit 80. This ensures that the Direction-changer-gear3 81d rotates in the same direction as that of 81b Direction-changer-gear2 81b i.e. clockwise as shown in figure. This results in the Circular-to-linear-movement-convertor 90 moving the Driver-unit 31 vertically upwards. Driver-unit 31 pulls Driver-unit-spdt_switch-handle-spring 31d which in turn pulls Follower-unit 32 vertically upwards. This results in the Variable-Width-Scraper-Apparatus 20 changing direction and starting to move vertically upwards.

Stage4:

Refer FIG. 52 which illustrates Vertical-Movement-Control-Apparatus 30 and FIG. 25 which illustrates Direction-Changer-Unit 80.

The status at this stage of operation is as follows:

Driver-unit-spdt_switch-handle 31c: Flipped Upwards.

Follower-unit 32: Able to move freely upwards.

Variable-Width-Scraper-Apparatus 20: Able to move freely.

Tension in Driver-unit-spdt_switch-handle-spring 31d: Normal.

In stage3 the upward movement was just started. This stage shows uninterrupted continued upward movement.

Stage5:

Refer FIG. 53 which illustrates Vertical-Movement-Control-Apparatus 30 and FIG. 25 which illustrates Direction-Changer-Unit 80. Also refer FIG. 7 representing the overall scraper apparatus and FIG. 4 representing the cross section of a half coconut.

The status at this stage of operation is as follows:

Driver-unit-spdt_switch-handle 31c: Flipped downward

Follower-unit 32: Able to move freely.

Variable-Width-Scraper-Apparatus 20: Upward movement blocked by Body-top-blade 21a of Variable-Width-Scraper-Apparatus 20 touching the inner top part of the Half-coconut 11 or inner top wall of Coconut-meat 14.

Tension in Driver-unit-spdt_switch-handle-spring 31d: Increased but not reached threshold. This is a continuation of the previous stage for Driver-unit 31 as such it is moving upwards and pulling Follower-unit 32 vertically upwards. The Follower-unit 32 is not able to move upwards as the Variable-Width-Scraper-Apparatus 20 is blocked in its upper movement by the top inner wall of the Coconut-meat 14. This results in increased tension in Driver-unit-spdt_switch-handle-spring, which is being stretched. This increased tension in the Driver-unit-spdt_switch-handle-spring results in an increased force on the Driver-unit-spdt_switch-handle 31c to flip downwards.

Stage6:

Refer FIG. 54 which illustrates Vertical-Movement-Control-Apparatus 30 and FIG. 25 which illustrates Direction-Changer-Unit 80.

The status at this stage of operation is as follows:

Driver-unit-spdt_switch-handle 31c: Just flipped downward due to force from Tension in Driver-unit-spdt_switch-handle-spring 31d reaching threshold.

Follower-unit 32: Able to move freely.

Variable-Width-Scraper-Apparatus 20: Able to move freely downward Tension in Driver-unit-spdt_switch-handle-spring 31d: Normal.

From earlier stage as the tension in Tension in Driver-unit-spdt_switch-handle-spring 31d increased and reached threshold it generates enough force to flip the Driver-unit-spdt_switch-handle 31c downward. As the Driver-unit-spdt_switch-handle 31c is flipped downward Driver-unit-power-unit-output1 33a gets positive current and Driver-unit-power-unit-output2 33b has no current. This results in current in power-point-sub-unit1 82i and solenoid-sub-unit1 82a getting magnetized. This results in Position1 as explained above under the description of Direction-Changer-Unit 80. This ensures that the Direction-changer-gear3 81d rotates in the same direction as that of Direction-changer-gear1 81a i.e. anti-clockwise as shown in figure. This results in the Circular-to-linear-movement-convertor 90 moving the Driver-unit 31 vertically downward. Driver-unit 31 pulls Driver-unit-spdt_switch-handle-spring 31d which in turn pulls Follower-unit 32 vertically downwards. This results in the Variable-Width-Scraper-Apparatus 20 changing direction and starting to move vertically downwards.

These six stages of the operation as described above completes one cycle of scraping the half-coconut 11. There needs to be several cycles before the Half-coconut 11 is fully scraped. This cycle stops only when the positive current is stopped to the Driver-unit-power-unit-input 33c. Here it needs to be noted that in Stage 5 the tension in the Driver-unit-spdt_switch-handle-spring 31d is caused by the Variable-Width-Scraper-Apparatus 20 getting blocked when it reaches the inner top part of the half-coconut 11. This top part could be the inner top wall of the Coconut-meat 14 for the first time. As the Variable-Width-Scraper-Apparatus 20 touches the inner wall of the Coconut-meat 14 there is force applied on the Coconut-meat 14 to scrape until the tension in Driver-unit-spdt_switch-handle-spring 31d reaches the threshold to flip the Driver-unit-spdt_switch-handle 31c downward. The spring Driver-unit-spdt_switch-handle-spring 31d as well as the SPDT toggle switch Driver-unit-spdt_switch 31b need to be selected such a way that the tension in spring and the force required to flip the switch handle Driver-unit-spdt_switch-handle 31c are optimal to scrape the Coconut-meat 14 as well as flip the switch handle Driver-unit-spdt_switch-handle 31c.

The underlying concept in Vertical-Movement-Control-Apparatus 30 is that of a driver and follower system where the driver drives the vertical movement and follower follows or resists this movement. When the follower follows the driver no change happens but when the follower resists the movement, the current is toggled between two solenoids to change the direction of movement (vertically up and down movement). This concept can also be achieved in alternate ways and one of these is also explained in alternate methods section.

3. Variable-Opening-Entry-Mechanism.

3a. Description of Variable-Opening-Entry-Mechanism:

Refer FIG. 22 which illustrates the Variable-Width-Scraper-Apparatus 20 and Cut-face-of-coconut 18. Variable-Width-Scraper-Apparatus 20 rotates and moves vertically upwards to enter the Half-coconut 11 through the Cut-face-of-coconut 18. Variable-Width-Scraper-Apparatus 20 when rotating will extend its blades/blade 22 fully outward, even before entering the Half-coconut 11. As the width or diameter of the Cut-face-of-coconut 18 is not known (is not certain and varies), there is a possibility of the blades extending beyond the Shell 15 of the Half-coconut 11 and getting blocked by the hard Shell 15 while entering. Cut-face-width-Variability of a coconut brings variability in the width of the Cut-face-of-coconut 18 across coconuts. Variable-Opening-Entry-Mechanism considers and accommodates the variability in the diameter of the Cut-face-of-coconut 18 (Cut-face-width-Variability) and optimally guides the entry of the Variable-Width-Scraper-Apparatus 20 into the Half-coconut 11.

Refer FIG. 55 which illustrate the scraping apparatus used to scrape to extract Coconut-meat 14 from Half-coconut 11 with minimal human intervention and how Variable-Opening-Entry-Mechanism-Jar 40 and Variable-Opening-Entry-Mechanism-Guide1 41 forms a part of it.

FIGS. 56, 57 and 58 illustrate the Variable-Opening-Entry-Mechanism-Jar 40 which is conical in shape at the top with a cylindrical bottom. The conical part of the Entry-Mechanism-Jar 40 has sloping wall, Sloping-wall 40a which is sloping at an angle and the cylindrical part has vertical wall, Vertical-wall 40b which is vertical. The bottom of the cylindrical part is formed with a Jar-base 40c which has bush, Base-bush 40g fixed tightly at the center. Base-bush 40g has a hole in the center Base-bush-hole 40h. In order that the scraped Coconut-meat (Scraped-coconut-meat 14a) is expelled properly there is a hole Expeller-opening 40e at the edge of Jar-base 40c and Vertical-wall 40b which leads to the passage Expeller-chute 40d to expel the Scraped-coconut-meat 14a out of the Variable-Opening-Entry-Mechanism-Jar 40. Expeller-vent 40f gives a view of the Expeller-chute 40d passage which can be used to view the flow of Scraped-coconut-meat 14a through the Expeller-chute 40d.

Refer FIGS. 59, 60 and 61 which illustrates Base-bearing 43 which has an inner ring Bearing-inner-ring 43c and an outer ring Bearing-outer-ring 43b. Four leaves are attached to the outer ring Bearing-outer-ring 43b equidistant from each other and tilting at an angle to create a fan Bearing-fan 43a such that when the bearing turns anti-clockwise suction is created vertically downward. Two vertical plates Variable-Opening-Entry-Mechanism-Guide1 41 and Variable-Opening-Entry-Mechanism-Guide2 42 are fixed onto the Bearing-outer-ring 43b of Base-bearing 43. The Variable-Opening-Entry-Mechanism-Guide1 41 has two edges, a sloping edge Guide1-sloping-side 41a and a vertical edge Guide1-vertical-side 41b. Similarly Variable-Opening-Entry-Mechanism-Guide2 42 has a sloping edge Guide2-sloping-side 42a and a vertical edge Guide2-vertical-side 42b. The flat sides of both Variable-Opening-Entry-Mechanism-Guide1 41 and Variable-Opening-Entry-Mechanism-Guide2 42 have an inner side facing Bearing-inner-ring 43c and an outer side. The flat sides (inner side and outer side) of both Variable-Opening-Entry-Mechanism-Guide1 41 and Variable-Opening-Entry-Mechanism-Guide2 42 are Guide1-flat-side 41c and Guide2-flat-side 42c. The bottom side of the Variable-Opening-Entry-Mechanism-Guide1 41 and Variable-Opening-Entry-Mechanism-Guide2 42 is the Guide1-base 41d and Guide2-base 42d.

Refer FIGS. 62 and 63 which illustrates how Base-bearing 43 is fixed inside the Variable-Opening-Entry-Mechanism-Jar 40 such that Bearing-inner-ring 43c tightly fits to the Base-bush 40g. This results in the Base-bearing 43 being fixed to the bottom of the Variable-Opening-Entry-Mechanism-Jar 40 with the Bearing-outer-ring 43b able to rotate freely. As Bearing-outer-ring 43b can rotate freely the Bearing-fan 43a and the Variable-Opening-Entry-Mechanism-Guide1 41 and Variable-Opening-Entry-Mechanism-Guide2 42 are able to rotate freely. As Bearing-inner-ring 43c is tightly fixed to Base-bush 40g vertical motion is not possible for the whole Base-bearing 43 and parts fixed on it.

Refer FIGS. 64, 65 and 66 which illustrates blade 22 which has a guide wheel Guide-wheel 22n attached towards the Blade-tail 22f end. A shaft Guide-wheel-connecting-shaft 22p is used to attach Guide-wheel 22n to the blade 22 and the Guide-wheel 22n has a depression in its wheel Guide-wheel-depression 22o. Refer FIGS. 68, 69 and 70 which illustrates how blade 22 with Guide-wheel 22n is configured with body 21 and Variable-Opening-Entry-Mechanism-Guide1 41. Refer FIG. 65a, from a manufacturing perspective Blade 22 could be manufactured as two parts Blade-part1 22-1 and Blade-part2 22-2. Refer FIG. 68 and FIG. 65*a*, in order to configure Blade 22 inside Body 21, Blade-body 22*b* of Blade-part1 22-1 could be passed through Blocking-holes 21*e* and then Blade-part2 22-2 could be fixed to Blade-tail 22*f* of Blade-part1 22-1. This fixing could be rivet or screw or any other possible ways as can be perceived by a person skilled in the art. Another way could be to manufacture body 21 as more than one part, and assemble it with blade 22 inside it. It can be noticed that Guide-wheel 22*n* is not attached to all blade 22 in Variable-Width-Scraper-Apparatus 20 but only to certain blade 22 that need guidance on how much they move outward when Variable-Width-Scraper-Apparatus 20 rotates and moves vertically up and down in the Variable-Opening-Entry-Mechanism-Jar 40.

Refer FIG. 67 which illustrates how Variable-Width-Scraper-Apparatus 20 is configured into the Variable-Opening-Entry-Mechanism-Jar 40 where Variable-Width-Scraper-Apparatus-Shaft 23 passes through the Base-bush-hole 40*h* of Base-bush 40*g* freely such that it can rotate as well as move vertically up and down.

Refer FIGS. 68, 69 and 70 which illustrates how Variable-Width-Scraper-Apparatus 20 is configured into the Variable-Opening-Entry-Mechanism-Jar 40 in relation to the Variable-Opening-Entry-Mechanism-Guide1 41 and Variable-Opening-Entry-Mechanism-Guide2 42.

This is illustrated by the connection between blade 22, Guide-wheel 22*n* and Guide1-sloping-side 41*a* of Variable-Opening-Entry-Mechanism-Guide1 41. Guide-wheel-depression 22*o* acts as the groove into which the Guide1-sloping-side 41*a* correctly fits when blade 22 tries to move outward. Guide-wheel 22*n* connects blade 22 to Guide1-sloping-side 41*a* of Variable-Opening-Entry-Mechanism-Guide1 41 such a way that Guide1-sloping-side 41*a* controls the extent to which the blade 22 moves outward for a particular height of the blade 22 from Guide1-base 41*d*. As Guide1-sloping-side 41*a* is sloping the blade 22 extends less when closer to the Guide1-base 41*d* and extends more as it increases its vertical height from Guide1-base 41*d*. Similar is the case with Variable-Opening-Entry-Mechanism-Guide2. Blade 22 moves vertically up and down when Variable-Width-Scraper-Apparatus 20 moves vertically up and down.

Refer 68, 71, 72 and 73 which illustrates the surface Body-base-guide-surface 21*i* of Body 21 is parallel and very close to the inner side flat surface Guide1-flat-side 41*c* of Variable-Opening-Entry-Mechanism-Guide1 41 facing Body-base-guide-surface 21*i*. When Variable-Width-Scraper-Apparatus 20 rotates, the Body-base-guide-surface 21*i* will rotate and this will push to rotate Guide1-flat-side 41*c* facing it. This results in the rotation of the Variable-Opening-Entry-Mechanism-Guide1 41, Bearing-outer-ring 43*b* and the Bearing-fan 43*a*. Similarly Variable-Opening-Entry-Mechanism-Guide2 42 is also configured the same way. The distance between Body-base-guide-surface 21*i* and the inner Guide1-flat-side 41*c* is minimal such that there is minimum play during rotation but at the same time there is no hindrance to the vertical movement of the Variable-Width-Scraper-Apparatus 20 (as illustrated in FIGS. 71, 72 and 73). This configuration ensures that when Variable-Width-Scraper-Apparatus 20 rotates, there is no relative motion between its body 21 and blade 22 with the Variable-Opening-Entry-Mechanism-Guide1 41 and Variable-Opening-Entry-Mechanism-Guide2 42. For all practical purpose when Variable-Width-Scraper-Apparatus 20 rotates the blade 22 and Variable-Opening-Entry-Mechanism-Guide1 41 and Variable-Opening-Entry-Mechanism-Guide2 42 are all motionless in relation to each other to rotational motion. When Variable-Width-Scraper-Apparatus 20 moves vertically up and down inside the Variable-Opening-Entry-Mechanism-Jar 40, Variable-Opening-Entry-Mechanism-Guide1 41 and Variable-Opening-Entry-Mechanism-Guide2 42 do not go up and down.

3b. Operation of the Variable-Opening-Entry-Mechanism:

Refer FIGS. 68, 71, 72 and 73—When Variable-Width-Scraper-Apparatus 20 rotates and goes vertically up and down, Variable-Opening-Entry-Mechanism-Guide1 41 and Variable-Opening-Entry-Mechanism-Guide2 42 rotate at the same speed but do not go vertically up and down. Blade 22 is pulled outward from the body 21 due to centrifugal force. Refer FIG. 74 which illustrates how blade 22 is controlled in its outward movement by the Variable-Opening-Entry-Mechanism-Guide1 41 through the Guide-wheel 22*n*. Three different positions of the same blade 22 are shown at three different vertical heights from Guide1-base 41*d*. As the vertical distance of the blade 22 increases from Guide1-base 41*d*, the blade 22 moves more outward from the Body 21. The furthest tip i.e., Blade-Teeth2 22*i*, on the blade 22 is connected as a dotted line for the three different vertical positions of the blade 22 to get Blade-extension-profile 26. It can be noticed that Blade-extension-profile 26 is parallel to the Guide1-sloping-side 41*a*. This shows that it is possible to control the Blade-extension-profile 26 (extent to which blade 22 extends and its shape) by defining the slope of Guide1-sloping-side 41*a*. In this case the slope of Guide1-sloping-side 41*a* is parallel to Sloping-wall 40*a*. Therefore the Blade-extension-profile 26 is also parallel to Sloping-wall 40*a*. It can be noticed that the distance between the Blade-extension-profile 26 and the Sloping-wall 40*a* is controlled by Guide-distance 41*e*, the distance of the Guide1-sloping-side 41*a* from the Sloping-wall 40*a*. Guide-distance 41*e* is fixed such that the distance between the Blade-extension-profile 26 and the Sloping-wall 40*a* is slightly more (about 1-2 mm) than the maximum thickness of shell 15. Therefore when Variable-Width-Scraper-Apparatus 20 rotates and goes vertically up and down the Variable-Opening-Entry-Mechanism-Jar 40, the furthest tip, Blade-Teeth2 22*i*, on the blade 22 moves vertically up and down such that it is parallel to the Sloping-wall 40*a* and at a distance of 1-2 mm more than the maximum thickness of shell 15.

Refer FIGS. 4, 74, 75 and 76—In each of FIGS. 75 and 76 Half-coconut 11 is placed, Cut-face-of-coconut 18 facing down, in the conical part of the Entry-Mechanism-Jar 40 such that the shell 15 rests on inside wall of Sloping-wall 40*a*. The Half-coconut 11 have different width at Cut-face-of-coconut 18 in each figure. As the width at Cut-face-of-coconut 18 increases the coconut sits at a higher height in the conical section of the Variable-Opening-Entry-Mechanism-Jar 40. Therefore a single jar, Variable-Opening-Entry-Mechanism-Jar 40 can be used to accommodate any size of half-coconut 11, the only difference is in the height at which it sits. In order that a rotating Variable-Width-Scraper-Apparatus 20 enters the Half-coconut 11 placed at a particular height from Guide1-base 41*d* on sloping-wall 40*a* optimally, the farthest tip of the blade 22 should be inside the Width-inner 17*b*(Refer FIG. 4). As the furthest tip, Blade-Teeth2 22*i*, on the blade 22 moves vertically up and down such that it is parallel to the Sloping-wall 40*a* and at a distance of 1-2 mm more than the maximum thickness of shell 15, it is always inside the Width-inner 17*b* by 1-2 mm. The distance is only illustrative, and can vary depending on the shape of blade head used and the speed of rotation while Variable-Width-Scraper-Apparatus 20 enters Cut-face-of-coconut 18. Notice that in both cases (FIGS. 75 and 76) how the Blade-Teeth2 22*i* of blades 22 are placed with relation to shell 15 for optimal entry into the half coconut through Cut-face-of-coconut 18. Blade-Teeth2 22*i* of blades 22 is considered while discussing entry into the coconut as it's the closest to the Variable-Opening-Entry-Mechanism-Jar 40 or the farthest point of the blade 22.

Therefore for any size of Half-coconut 11 the combination of Variable-Opening-Entry-Mechanism-Jar 40, Variable-Opening-Entry-Mechanism-Guide1 41, Variable-Opening-Entry-Mechanism-Guide2 42 and Guide-wheel 22*n* ensure that the blade 22 of Variable-Width-Scraper-Apparatus 20 enters it optimally.

The slope of Sloping-wall 40*a* of Variable-Opening-Entry-Mechanism-Jar 40 could be sloping straight line or exponential curve, the only condition being that the diameter of the conical section of the Variable-Opening-Entry-Mechanism-Jar 40 should increase with vertical height from Guide1-base 41*d*.

The slope or profile of the Guide1-sloping-side 41*a* needs to be an exact replica of the slope or profile of Sloping-wall 40*a*. Similarly with Variable-Opening-Entry-Mechanism-Guide2.

Only blade 22 which have the possibility of not entering Half-coconut 11 optimally need to be guided.

If two blades are to be guided only then will Variable-Opening-Entry-Mechanism-Guide2 42 come into existence along with Variable-Opening-Entry-Mechanism-Guide1 41. Depending on the design of body 21 there can be more blade 22 to be guided and corresponding guides to guide.

The underlying concept in Variable-Opening-Entry-Mechanism is: To harness A) the difference in height between Jar-base 40*c* and furthest tip of Blade 22 (when Body 21 moves vertically up and down with blade 22 inside it) and B) the change in width of Variable-Opening-Entry-Mechanism-Jar 40 with vertical height. To use this (difference) to move the Blade 22 such that its furthest tip (closest to inner wall of Variable-Opening-Entry-Mechanism-Jar 40) follows the same pattern or profile as that of inner wall of Variable-Opening-Entry-Mechanism-Jar 40 with a minimum distance of separation by using a guide (Variable-Opening-Entry-Mechanism-Guide1 41) for blade 22. This can be achieved in many ways one of which is described above. Another way of achieving the above is explained under the description of Variable-Opening-Entry-Mechanism Exemplary Embodiment 1.

3.1. Operation of Scraped-Coconut-Meat-Expeller:

The parts of Scraped-coconut-meat-expeller have already been explained as part of Variable-Opening-Entry-Mechanism.

Refer FIG. 77 which illustrates Bearing-fan 43*a* inside the Variable-Opening-Entry-Mechanism-Jar 40. When Variable-Width-Scraper-Apparatus 20 rotates anti-clockwise, it rotates Variable-Opening-Entry-Mechanism-Guide1 41 and Variable-Opening-Entry-Mechanism-Guide2 42 and hence rotates Base-bearing 43. When Base-bearing 43 and Bearing-fan 43*a* rotates anti-clockwise suction is created vertically downward. This suction will pull down the Scraped-coconut-meat 14*a* towards the Expeller-opening 40*e* and out of the Variable-Opening-Entry-Mechanism-Jar 40 through the Expeller-chute 40*d*. Expeller-vent 40*f* gives view from outside into the expeller-chute 40*d* to view/check the flow of Scraped-coconut-meat 14*a*.

4. Coconut-Holding-Mechanism.

4. Description of Coconut-Holding-Mechanism

When a coconut is being scraped there is good amount of vertical and rotational force on the Half-coconut 11. In order that the Half-coconut 11 is scraped it needs to be held tightly. Refer FIGS. 5 and 55 which illustrate the scraping apparatus to scrape to extract Coconut-meat 14 from a Half-coconut 11 with minimal human intervention and how Coconut-holding-mechanism 50 is part of it.

Refer FIGS. 78, 79 and 80 which illustrates the Coconut-holding-mechanism 50 and its parts. Two supporting pillars, Support-pillar 51 stand vertically and on top of these pillars is placed the holding lid Holding-lid 52 which has Lid-protrusion 52*a* at one end and at the other end is attached to the Support-pillar 51 through the hinge Lid-hinge 53. As Holding-lid 52 is connected to Support-pillar 51 through a hinge connection Lid-hinge 53, Holding-lid 52 can open and close. In order to tightly hold the top of a half coconut, a conical object Conical-holder 55 is used, which is held by a spring Conical-holder-spring 55*a*. The Conical-holder-spring 55*a* is attached to a screw Holding-screw 54*c*, which goes through a nut Holding-screw-nut 54*b* and through Holding-lid 52 with a Screw-Head 54*a* at the other end. In order to lock a closed Holding-lid 52 a lock mechanism Lid-lock 56 is used. The Lid-lock 56 has three components, namely; Lid-lock-upper 56*c* which goes over the Lid-protrusion 52*a* to hold the Holding-lid 52, Lid-lock-lower 56*a* which is pressed downward to lock the Lid-lock 56 and a middle section Lid-lock-middle 56*b* which helps in connecting Lid-lock-upper 56*c* and Lid-lock-lower 56*a* component. Lid-lock 56 is similar to the ones used in cookie jars. There can be any alternate elements and/or structures than the one's as described in the present disclosure. Refer FIG. 81 which illustrates Coconut-holding-mechanism 50 configured with Variable-Opening-Entry-Mechanism-Jar 40 where Support-pillar 51 is attached to the top part of Variable-Opening-Entry-Mechanism-Jar 40.

4b. Operation of the Coconut-Holding-Mechanism 50:

Refer FIGS. 81, 82, 83 and 84 which illustrates the operation of the Coconut-holding-mechanism 50.

Step 1: Refer FIG. 81 which illustrates the way Holding-lid 52 is opened.

Step 2: Refer FIG. 82 which illustrates the way Half-coconut 11 is placed inside the Variable-Opening-Entry-Mechanism-Jar 40.

Step 3: Refer FIG. 83 which illustrates the way Holding-lid 52 is closed with the Conical-holder 55 on top of the top end of the half-coconut 11. As the Conical-holder 55 is attached to Holding-screw 54*c* through a spring Conical-holder-spring 55*a*, it is flexible to adjust and fit correctly on top of the coconut.

Step 4: Refer FIG. 84 which illustrates the way Lid-lock-upper 56*c* is placed over Lid-protrusion 52*a* and Lid-lock-lower 56*a* is pressed downward with Lid-lock-middle 56*b* as the hinge to lock the Holding-lid 52 onto the Support-pillar 51. The Holding-screw-mechanism 54 is tightened by rotating the Screw-head 54*a* which will result in the Holding-screw 54*c* moving downward with the help from Holding-screw-nut 54*b*. This will push the Conical-holder-spring 55*a* to compress and resulting in Conical-holder 55 to press against the top end of the Half-coconut 11 in flexible manner. Screw-head 54*a* can have a clutch mechanism whereby when the Screw-head 54*a* is turned and once Holding-screw-mechanism 54 reaches the required tightness, the clutch mechanism can disengage the Screw-head 54*a* such that it will not over tighten the Holding-screw-mechanism 54. This is similar to fuel tank caps used in motor vehicles and described in U.S. Pat. No. 4,132,091. The Conical-holder-spring 55a pushes the Conical-holder 55 in a flexible manner towards the top of the Half-coconut 11 as well as protects Coconut-holding-mechanism 50 by absorbing the shocks from the grating half-coconut.

5. Optimal-Operations-Mechanism Components and Operation:

Refer FIG. 5 which illustrate the overall apparatus to scrape to extract Coconut-meat 14 from a Half-coconut 11 with minimal human intervention and how Optimal-Operations-Mechanism 60 forms a part of it.

Refer FIGS. 85 and 86 which illustrate the Optimal-Operations-Mechanism 60 in more detail. Voltage-generator 61 is connected to the Main-Motor 71 through the gears Gear-wheel4 73, Voltage-generator-gear 61c and shaft Voltage-generator-shaft 61b to get the rotational power. Voltage-generator 61 is a DC motor which when rotated will generate voltage. This voltage is passed on to Voltage-analyzer 62 through Connection-point2 61a and Connector) 61d. Voltage-analyzer 62 has circuit to check the voltage level and timer to time this. When the voltage exceeds the threshold voltage for a certain amount of preset time, it sends an electrical signal Signal2 62a to Main-controller 65. Main-controller 65 is the overall controller of the electrical current being sent to the coconut scraping apparatus. User-interface 64 is the user interface which has an On-Off push button Push-button 64a and timer knob Timer 64b where a user can use only one of these in one operation. On-Off push button Push-button 64a is used to start the coconut scraper apparatus with one push and stop it with another push. It is also possible to make use of a push button which keeps the apparatus running only when pushed and held in pushed state and will stop when not held in pushed state. This option is not discussed further. Timer 64b which has a knob to set a preset time for which the coconut scraper apparatus will operate (this can be used to scrape the half-coconut partially). User-interface 64 will send two electrical signals Signal) 64d to Main-controller 65, one to start the coconut scraping operation when either the Push-button 64a is pushed first time or the timer is started and another to stop the coconut scraping operation by pushing Push-button 64a second time or the timer comes to the end of its designated time. Input-power-distributor 67 gets the external electrical power through External-power 67a and distributes to other systems. Electricity is supplied to User-interface 64, Main-controller 65 and Main-distributor 66 through Connector2 64c, Connector3 65a and Connector4 66a. Main-controller 65 controls the overall flow of electricity to the coconut scraping apparatus based on Signal1 64d and Signal2 62a. Main-distributor 66 starts and stops electrical power to various systems of the coconut scraping apparatus based on the Main-Signal 65b it receives from Main-controller 65. Main-distributor 66 gives electrical power to Driver-unit-power-unit-input 33c which is used by the Driver-unit-spdt_switch 31b to power the solenoid-unit 82. Main-distributor 66 distributes electrical power to Main-motor-driver 63 through connection Connector6 63b. Main-motor-driver 63 gives the electrical power in the required form to Main-Motor 71 through Connector5 63a and Connection-point1 71a in order to get the required waveform in rotational velocity. Refer FIGS. 87 and 88 which give two samples of the waveform for the rotational velocity where T denotes the time and V denotes the rotational velocity. Refer FIGS. 21 and 87 where V1 denotes the minimum threshold velocity such that there is just enough Tangential-direction-of-force on the Blade 22 to scrape Coconut-meat-inner-layer 14a and V2 denotes the maximum threshold velocity such that Tangential-direction-of-force on the Blade 22 will be able to scrape the outer layer of Coconut-meat 14 but not scrape Shell 15 of the half-coconut 11. Refer FIGS. 21 and 88 where V0 denotes the minimum threshold velocity that will result in the blade 22 move outward, V1 denotes the minimum threshold velocity such that there is just enough Tangential-direction-of-force on the Blade 22 to scrape Coconut-meat-inner-layer 14a and V2 denotes the maximum threshold velocity such that Tangential-direction-of-force on the Blade 22 will be able to scrape the outer layer of Coconut-meat 14 but not scrape Shell 15 of the half-coconut 11.

Connections of Main Elements and Sub-Elements of Invention

Under the section for the particular main elements and sub-elements above each element has been described in detail and how it connects to the other element to form sub-elements and main elements. The objective of the present section is to give an overall or overview of the connections of main elements and sub-elements of invention. The following description illustrate how the various elements are interconnected.

1. Variable-Width-Scraper-Apparatus 20:

Refer FIG. 126 which illustrates an exploded view of the elements of Variable-Width-Scraper-Apparatus 20. Guide-wheel-connecting-shaft 22p correctly fits into the Guide-wheel-hole 22n1 such that Guide-wheel 22n can rotate freely. This results in Guide-wheel 22n being attached to Blade 22 near Blade-tail-block 22c in such a way that it can rotate freely about the Guide-wheel-connecting-shaft 22p. Blade 22 is configured into Body 21 such a way that Blocking-holes 21e blocks Blade-head 22a and Blade-tail-block 22c but allows Blade-body 22b to move freely. Gear-wheel1 24 is fixed to Variable-Width-Scraper-Apparatus-Shaft 23 such that it tightly fits into Gear-wheel1-hole 24a. Variable-Width-Scraper-Apparatus-Shaft-Screw 23a of Variable-Width-Scraper-Apparatus-Shaft 23 is screwed into Body-base-shaft-hole 21h of Body 21. This ensures that when Gear-wheel1 24 rotates Body 21 also rotates and the blade 22 are projected outward till their Blade-tail-block 22c is blocked by Blocking-holes 21e. FIG. 16 illustrates the elements of Variable-Width-Scraper-Apparatus 20 assembled and configured together.

2. Motor-and-Driving-Gears 70:

Refer FIG. 127 which illustrates an exploded view of the elements of Motor-and-driving-gears 70, Voltage-generator 61 and Voltage-generator-gear 61c. Gear-wheel3-shaft 72b is fitted tightly into Gear-wheel2-hole 72c and Gear-wheel3-hole 72d of Gear-wheel2 72 and Gear-wheel3 72a respectively. Gear-wheel4-shaft 73a is fitted tightly into Gear-wheel4-hole 73b of Gear-wheel4 73 such that the gear teeth of Gear-wheel4 73 are in contact with gear teeth of Gear-wheel3 72a. This ensures that Gear-wheel3 72a and Gear-wheel2 72 rotate when Main-Motor 71 rotates. Voltage-generator-shaft 61b tightly fits into the Voltage-generator-gear-hole 61ca of Voltage-generator-gear 61c such that gear teeth of Voltage-generator-gear 61c are in contact with gear teeth of Gear-wheel4 73. This ensures that when Main-Motor 71 rotates Voltage-generator 61 also rotates. FIG. 128 illustrates the elements of Motor-and-driving-gears 70 and its supporting elements assembled.

3. Gear-System 74:

Refer FIG. 129 which illustrates an exploded view of the elements of Gear-system 74. Gear-system-wheel1 74a is aligned with Gear-system-wheel2 74b such that gear teeth of both are in contact Gear-system-shaft 74c tightly fits into Gear-system-wheel2-hole 74bh and Gear-system-wheel3- hole 74*dh* of Gear-system-wheel2 74*b* and Gear-system-wheel3 74*d* respectively at either end such that when Gear-system-wheel1 74*a* rotates Gear-system-wheel3 74*d* also rotates. Gear-system-wheel3 74*d* and Gear-system-wheel4 74*e* are aligned such that gear teeth of both are in contact. Gear-system-shaft-small 74*i* tightly fits into Gear-system-wheel4-hole 74*eh* and Gear-system-wheel5-hole 74*fh* of Gear-system-wheel4 74*e* and Gear-system-wheel5 74*f* respectively at either end. Gear-system-wheel6 74*g* and Gear-system-wheel5 74*f* are aligned such that gear teeth of both are in contact. This ensures that when Gear-system-wheel1 74*a* rotates Gear-system-wheel6 74*g* also rotates. FIG. 130 illustrates the elements of Gear-system 74 assembled.

4. Direction-Changer-Unit 80:

FIG. 131 illustrates an exploded view of the elements of Direction-Changer-Unit 80. Solenoid-center-unit-connecting-shaft 82*h* fits into Direction-changer-connecting-gear-hole 81*ch* of Direction-changer-connecting-gear 81*c* such that it can rotate freely. Solenoid-center-unit-connecting-shaft 82*h* freely goes through Solenoid-center-guide-slot-hole 82*dh* of Solenoid-center-guide-slot 82*d* and connects to the middle part of Solenoid-center-unit 82*c*. This ensures that Direction-changer-connecting-gear 81*c* and Direction-changer-connecting-gear-backplate 82*g* is on one side and Solenoid-center-unit 82*c* on the other side of Solenoid-center-guide-slot 82*d* such that they can freely move side to side along the Solenoid-center-guide-slot-hole 82*dh*. Direction-changer-gear1 81*a*, Direction-changer-gear2 81*b* and Direction-changer-gear3 81*d* are aligned such that gear teeth of Direction-changer-connecting-gear 81*c* is in contact either with Direction-changer-gear1 81*a* and Direction-changer-gear3 81*d* or Direction-changer-gear2 81*b* and Direction-changer-gear3 81*d* when it moves sideways along the Solenoid-center-guide-slot-hole 82*dh*. This ensures that Direction-changer-gear3 81*d* is either connected to Direction-changer-gear1 81*a* or Direction-changer-gear2 81*b* when it moves to either side along Solenoid-center-guide-slot-hole 82*dh* and not connected to any, when in center of Solenoid-center-guide-slot-hole 82*dh*.

Solenoid-center-unit-spring 82*e* is attached to Direction-changer-connecting-gear-backplate-rod 82*gr* at one end and bottom of Solenoid-center-guide-slot-extension 82*f* on the other side such that Direction-changer-connecting-gear-backplate 82*g* and hence Direction-changer-connecting-gear 81*c* always has a tendency to be at the mid-point of Solenoid-center-guide-slot-hole 82*dh*.

Electrical Power source Power-point-sub-unit1 82*i* and Power-point-sub-unit2 82*j* are connected to Solenoid-sub-unit1 82*a* and Solenoid-sub-unit2 82*b* respectively. Refer FIGS. 25, 26 and 27 which illustrates the elements of Direction-Changer-Unit 80 assembled.

5. Circular-to-Linear-Movement-Convertor 90:

Refer to FIG. 132 which illustrates an exploded view of the elements of Circular-to-linear-movement-convertor 90. Gear teeth of Chain-sprocket-system1-sprocket1 91*a* correctly fit into Chain-sprocket-system1-chain 91*c* at one end. Gear teeth of Chain-sprocket-system1-sprocket2 91*b* and Chain-sprocket-system2-sprocket1 92*a* correctly fits into Chain-sprocket-system1-chain 91*c* and Chain-sprocket-system2-chain 92*c* respectively. Chain-sprocket-system1-shaft2 91*e* tightly fits into Chain-sprocket-system1-sprocket2-hole 91*bh* and Chain-sprocket-system2-sprocket1-hole 92*ah* of Chain-sprocket-system1-sprocket2 91*b* and Chain-sprocket-system2-sprocket1 92*a* respectively. Gear teeth of Chain-sprocket-system2-sprocket2 92*b* correctly fits into Chain-sprocket-system2-chain 92*c*. Chain-sprocket-system2-connecting-rod 92*d* is fixed to Chain-sprocket-system2-chain 92*c*. Chain-sprocket-system2-weight 92*e* is hung over Chain-sprocket-system2-connecting-rod 92*d* with the help of Chain-sprocket-system2-weight-loop 92*e*1. These connections ensure that when Chain-sprocket-system1-sprocket1 91*a* rotates, it results in Chain-sprocket-system2-connecting-rod 92*d* moving vertically up and down. Refer FIG. 31 which illustrates the elements of Circular-to-linear-movement-convertor 90 as assembled.

6. Vertical-Movement-Control-Apparatus 30:

Refer FIG. 133 which illustrates an exploded view of the elements of Vertical-Movement-Control-Apparatus 30. Driver-unit-spdt_switch-connections 31*e* is connected to Driver-unit-spdt_switch-connection-point 31*bc* of Driver-unit-spdt_switch 31*b*. The mid-point of Driver-unit-spdt_switch-handle-spring 31*d* is connected to the end of Driver-unit-spdt_switch-handle 31*c*. Driver-unit-spdt_switch 31*b* is fixed on Driver-unit-slide-plate 31*a*.

Driver-unit-slide-plate 31*a* and Follower-unit-slide-plate 32*a* is correctly seated inside Driver-unit-frame-groove 34*a* of Driver-unit-frame 34 and Follower-unit-frame-groove 35*a* of Follower-unit-frame 35 respectively such that they can slide up and down. Follower-unit-arms 32*b* are connected to either ends of Driver-unit-spdt_switch-handle-spring 31*d*. Refer FIG. 134 which illustrates assembled view of the elements of Vertical-Movement-Control-Apparatus 30.

7. Variable-Opening-Entry-Mechanism:

Refer FIG. 135 which illustrates an exploded view of the elements of Variable-Opening-Entry-Mechanism along with Base-bearing 43. Base-bush 40*g* tightly fits into Jar-base-hole 40*ch* of Jar-base 40*c* of Variable-Opening-Entry-Mechanism-Jar 40. Base-bush 40*g* tightly fits into Bearing-inner-ring 43*c* of Base-bearing 43. As Base-bearing 43 is a bearing Bearing-outer-ring 43*b* can rotate freely while Bearing-inner-ring 43*c* fits tightly to Base-bush 40*g*. Variable-Opening-Entry-Mechanism-Guide1 41 and Variable-Opening-Entry-Mechanism-Guide2 42 is fixed on opposite sides of Bearing-outer-ring 43*b*. Refer FIGS. 62 and 63 which illustrates an assembled view of the elements of Variable-Opening-Entry-Mechanism along with Base-bearing 43.

8. Coconut-Holding-Mechanism 50:

Refer FIG. 136 which illustrates an exploded view of the elements of Coconut-holding-mechanism 50. Support-pillar-rod 51*a* correctly fits into the holes of Lid-hinge 53 such that Holding-lid 52 can rotate freely about Support-pillar-rod 51*a*. Screw-head 54*a* is rotated clockwise to advance Holding-screw 54*c* downward through Holding-screw-nut 54*b*. Top part of Conical-holder 55 is attached to one end of Conical-holder-spring 55*a* and the other end of Conical-holder-spring 55*a* is attached to the bottom end of Holding-screw 54*c*. Lid-lock 56 is attached to Support-pillar 51. Refer FIGS. 78, 79 and 80 which illustrates the assembled elements of Coconut-holding-mechanism 50.

This completes the assembly of all the main elements.

The following are the steps to connect the various main elements.

Step 1. Connecting Optimal-Operations-Mechanism 60, Motor-and-driving-gears 70 and Gear-system 74:

Refer FIG. 137 which illustrates an unconnected view between the main elements Optimal-Operations-Mechanism, Motor-and-driving-gears and Gear-system. Gear-wheel4-shaft 73*a* of Main-Motor 71 tightly fits into Gear-system-wheel1-hole 74*ah* of Gear-system-wheel1 74*a* such that when Main-Motor 71 rotates Gear-system-wheel1 74*a* also rotates. Connector) 61*d* Connector5 63*a* are connected to Connection-point2 61*a* and Connection-point) 71*a* respectively. This ensures that Optimal-Operations-Mechanism 60 is connected to Voltage-generator 61 and Main-Motor 71. FIG. 138 illustrates the main elements Optimal-Operations-Mechanism, Motor-and-driving-gears and Gear-system as connected together.

Step 2. Connecting Direction-Changer-Unit 80 and Circular-to-linear-movement-convertor 90:

Refer FIG. 139 which illustrates an unconnected view between Direction-Changer-Unit 80 and Circular-to-linear-movement-convertor 90. Chain-sprocket-system1-shaft1 91*d* is fixed tightly into Chain-sprocket-system1-sprocket1-hole 91*ah* at one end and into Direction-changer-gear3-hole 81*dh* at the other end. This ensures that when Direction-changer-gear3 81*d* rotates, Chain-sprocket-system1-sprocket1 91*a* also rotates. Refer FIG. 30 which illustrates the main elements Direction-Changer-Unit 80 and Circular-to-linear-movement-convertor 90 as connected together.

Step 3. Connecting group of main elements of Step1 and Step2 i.e. Connecting combination of Direction-Changer-Unit 80 and Circular-to-linear-movement-convertor 90 to the combination of Motor-and-driving-gears 70, Gear-system 74 and Optimal-Operations-Mechanism 60. Refer FIG. 140 which illustrates the view of two groups of main elements 1. Direction-Changer-Unit 80 and Circular-to-linear-movement-convertor 90 unconnected to 2. Motor-and-driving-gears 70, Gear-system 74 and Optimal-Operations-Mechanism 60.

The two groups of main elements 1. Direction-Changer-Unit 80 and Circular-to-linear-movement-convertor 90 2. Motor-and-driving-gears 70, Gear-system 74 and Optimal-Operations-Mechanism 60 are moved such that gear teeth of Gear-system-wheel6 74*g* is in contact with Direction-changer-gear1 81*a*.

Refer FIG. 141 which illustrates the connected view of the above combination.

Step 4. Connecting main elements 1. Variable-Opening-Entry-Mechanism with 2. Coconut-holding-mechanism 50.

Refer FIG. 142 which illustrates two main elements 1. Variable-Opening-Entry-Mechanism unconnected with 2. Coconut-holding-mechanism 50. Bottom part of two Support-pillar 51 of Coconut-holding-mechanism 50 are fixed to the top part of Variable-Opening-Entry-Mechanism-Jar 40 of Variable-Opening-Entry-Mechanism. Refer FIGS. 81, 82, 83 and 84 which illustrates the above elements assembled together in some figures a half coconut is also shown for clarity sake.

Step 5. Connecting main element Variable-Width-Scraper-Apparatus 20 with the group of main elements Variable-Opening-Entry-Mechanism and Coconut-holding-mechanism 50.

Refer FIG. 143 which illustrates main element Variable-Width-Scraper-Apparatus unconnected to group of main elements Variable-Opening-Entry-Mechanism and Coconut-holding-mechanism. Variable-Width-Scraper-Apparatus-Shaft 23 of Variable-Width-Scraper-Apparatus 20 correctly fits into Base-bush-hole 40*h* of Base-bush 40*g* located at Jar-base 40*c* in such a way that it can rotate freely. FIG. 67 illustrates an assembled view of the above combination.

Step 6. Connecting main element Vertical-Movement-Control-Apparatus 30 to group of main elements Direction-Changer-Unit 80, Circular-to-linear-movement-convertor 90, Motor-and-driving-gears 70, Gear-system 74 and Optimal-Operations-Mechanism 60. Refer FIG. 144 which illustrates an unconnected view of the above elements. Vertical-Movement-Control-Apparatus 30 is moved such that Chain-sprocket-system2-connecting-rod 92*d* is fixed to Driver-unit-slide-plate 31*a*. This ensures that when Chain-sprocket-system2-connecting-rod 92*d* moves vertically up and down Driver-unit-slide-plate 31*a* also moves vertically up and down. FIG. 145 illustrates an assembled view of the above combination.

Step 7. Connecting two groups of main elements i.e., 1. Variable-Width-Scraper-Apparatus 20, Variable-Opening-Entry-Mechanism and Coconut-holding-mechanism 50 with 2. Motor-and-driving-gears 70, Gear-system 74, Optimal-Operations-Mechanism 60, Direction-Changer-Unit 80, Circular-to-linear-movement-convertor 90 and Vertical-Movement-Control-Apparatus 30:

Refer FIG. 146 which illustrates an unconnected view of two groups of abovementioned main elements 1. Variable-Width-Scraper-Apparatus 20, Variable-Opening-Entry-Mechanism and Coconut-holding-mechanism 50 and 2 Motor-and-driving-gears 70, Gear-system 74, Optimal-Operations-Mechanism 60, Direction-Changer-Unit 80, Circular-to-linear-movement-convertor 90 and Vertical-Movement-Control-Apparatus 30. Group 1. Variable-Width-Scraper-Apparatus 20, Variable-Opening-Entry-Mechanism and Coconut-holding-mechanism 50 is moved such that Variable-Width-Scraper-Apparatus-Shaft 23 tightly fits into Follower-unit-bearing-ring 32*e* of Follower-unit-bearing 32*c* as well as Gear-wheel1 24 engages Gear-wheel2 72. This ensures that Variable-Width-Scraper-Apparatus-Shaft 23 and hence Variable-Width-Scraper-Apparatus 20 can rotate freely when rotated by Gear-wheel2 72 and Vertical-Movement-Control-Apparatus 30 can move it vertically up and down. Refer FIG. 147 which illustrates an assembled view of the above combination.

Alternative Embodiments of Invention

Few of the Alternative Embodiments of this Invention are Given Below

The present invention and the objectives thereof can also be embodied in and accomplished by making use of some of the alternate embodiments as described below, for the purposes of illustration:

1. Variable-Opening-Entry-Mechanism-Jar 40 Shape:

The half coconut is placed on the sloping-wall 40*a* of the Variable-Opening-Entry-Mechanism-Jar 40. The slope of the sloping-wall 40*a* could be any type of slope the only requirement being that the diameter of the Variable-Opening-Entry-Mechanism-Jar 40 where Half-coconut 11 is likely to be placed needs to increase with height from the Jar-base 40*c*.

2. Blade 22:

Blade 22 can have different shapes for the Blade-head 22*a* and blade-teeth 22*h* in order to have different shaped Scraped-coconut-meat 14*a*. Refer FIGS. 90 and 91 which illustrates Blade-Alternative1 22A1 the first alternative embodiment of blade 22. Blade-Alternative1 22A1 has Blade-head-Alternative1 22*a*A1 having six holes at one end which are Blade-Hole1-Alternative1 22*h*A1, Blade-Hole2-Alternative1 22*i*A1, Blade-Hole3-Alternative1 22*j*A1, Blade-Hole4-Alternative1 22*k*A1, Blade-Hole5-Alternative1 22*l*A1 and Blade-Hole6-Alternative1 22*m*A1. It is to be noted that all other parts, connections to supporting elements, and operations thereof remain the same as that of the blade 22 illustrated hereinbefore and hereinafter in the present description. This alternative embodiment can result in Scraped-coconut-meat 14*a* in the shape of strips or ribbons.

Refer FIGS. 92 and 93 which illustrates Blade-Alternative2 22A2 the second alternative embodiment of blade 22. Blade-Alternative2 22A2 has Blade-head-Alternative2 22aA2 which has Blade-Hole-Alternative2 22hA2. Blade-Hole-Alternative2 22hA2 has a sharp end Blade-Hole-Sharp-End 22hsA2 on one side and blunt end Blade-Hole-Blunt-End 22hbA2 on the other side. Blade-Hole-Sharp-End 22hsA2 is used to scrape the Coconut-meat 14. It is to be noted that all other parts, connections to supporting elements and operations thereof remain the same as that of the blade 22 illustrated hereinafter and hereinbefore in the present description. This alternative embodiment can result in chipped scraped-coconut-meat 14a. The blade-head with the part of blade which scrapes Coconut-meat 14 can thus have different shapes (wavy, jagged, curved etc. as can be perceived by a person skilled in the art) in order to get different shapes of Scraped-coconut-meat 14a. The part of blade which scrapes the Coconut-meat 14 can be replaced by hard brush and can be used to clean semi-spherical objects or objects similar to that of Half-coconut 11.

3. Direction-Changer-Unit 80:

A bi-direction rotating motor could be used in place of the Direction-Changer-Unit 80 where-in the polarity given to the bi-direction rotating motor is changed to make the Variable-Width-Scraper-Apparatus 20 to move vertically up and down. The polarity change is done at the Vertical-Movement-Control-Apparatus 30 where-in Driver-unit-power-unit-output1 33a and Driver-unit-power-unit-output2 33b could be modified appropriately to power the bi-direction rotating motor. This will result in redundancy of gears-system 74.

4. Vertical-Movement-Control-Apparatus 30:

Vertical-Movement-Control-Apparatus 30 is used to move the Variable-Width-Scraper-Apparatus 20 vertically up and down. Two alternative embodiments for the Vertical-Movement-Control-Apparatus 30 are described below:

4.1 Description and Operation Vertical-Movement-Control-Apparatus-Alternative1 30A1:

Refer FIG. 93 which illustrates the overall scraping apparatus to scrape to extract Coconut-meat from a Half-coconut 11 with minimal human intervention and how Vertical-Movement-Control-Apparatus-Alternative1 30A1, which is the first alternative embodiment of Vertical-Movement-Control-Apparatus 30, forms part of it. The gears-system 74, Direction-Changer-Unit 80 and Circular-to-linear-movement-convertor 90 are replaced by a more manual system.

Refer FIG. 94 which illustrates Follower-Unit-Alternative1 32A1 having Follower-Unit-base-plate-Alternative1 32aA1 onto which Follower-unit-bearing 32c is attached through Follower-unit-connection-rod 32d. The Follower-unit-bearing 32c has Follower-unit-bearing-ring 32e. Refer FIG. 95 which illustrates how edges of the Follower-Unit-base-plate-Alternative1 32aA1 correctly fit into the Follower-unit-frame-groove-Alternative1 35aA1 of the Frame-Alternative1 35A1 such that the Follower-Unit-Alternative) 32A1 can freely move vertically up and down inside the Frame-Alternative1 35A1. Figure also illustrates how the Variable-Width-Scraper-Apparatus-Shaft 23 fits tightly into the Follower-unit-bearing 32c. Refer FIG. 96 which illustrates how the Follower-Unit-base-plate-Alternative1 32aA1 is connected to the Chain-sprocket-system2-chain-Alternative1 92cA1 through the Chain-sprocket-system2-connecting-rod 92d. Refer FIGS. 93 and 97 to illustrate the Vertical-Movement-Control-Apparatus-Alternative1 30A1 which consists of Chain-sprocket-system2-chain-Alternative1 92cA1 connecting Chain-sprocket-system2-sprocket1 92a, Chain-sprocket-system2-sprocket2 92b and Manual-Gear 93A1. Vertical-Lever 93aA1 is connected to Manual-Gear 93A1 such a way that when Vertical-Lever 93aA1 is moved the Manual-Gear 93A1 rotates to move the Chain-sprocket-system2-connecting-rod 92d and hence Follower-Unit-Alternative) 32A1 vertically up and down. This results is the Variable-Width-Scraper-Apparatus-Shaft 23 and Variable-Width-Scraper-Apparatus 20 to move vertically up and down. Vertical-Lever 93aA1 has Speed-Control-Lever 93bA1 which when pressed changes the speed of the Main-Motor 71. The actual speed control is done by the Speed-Controller 93cA1 which is connected to the Speed-Control-Lever 93bA1. In order to bring the Speed-Control-Lever 93bA1 moves back to the original position after being pressed Speed-Control-Lever-Spring 93dA1 is placed below it. The connection between the Speed-Controller 93cA1 and the Main-Motor 71 is through the Connection-Point 93eA1 and Wire-Connection 93fA1. Refer FIGS. 93 and 98 which illustrates the two positions of the Vertical-Lever 93aA1 and the corresponding position of the Follower-unit-bearing 32c. Which shows the movement of the Variable-Width-Scraper-Apparatus 20 vertically up and down. While the Vertical-Lever 93aA1 is moved the Speed-Control-Lever 93bA1 can be pressed and released to change the speed of rotation of the Variable-Width-Scraper-Apparatus 20. Thus the speed of rotation and the vertically up and down movement of the Variable-Width-Scraper-Apparatus 20 is controlled manually. This can be based on the feedback in the form of vibration the hand receives from the Vertical-Lever 93aA1 and or sound from the scraping process.

4.2 Vertical-Movement-Control-Apparatus-Alternative2 30A2.

4.2a Description of Vertical-Movement-Control-Apparatus-Alternative2 30A2:

This is the second alternative embodiment of Vertical-Movement-Control-Apparatus 30. Refer FIG. 118 which illustrates the overall apparatus to scrape to extract Coconut-meat from a Half-coconut 11 with minimal human intervention and how Vertical-Movement-Control-Apparatus-Alternative2 30A2 forms part of it. Refer FIGS. 99, 100 and 101 which illustrates the Driver-Unit-Alternative2 31A2 having Driver-slide-plate-Alternative2 31aA2 which has Driver-L-hook 31fA2 enclosing Driver-slide-plate-depression 31gA2. Driver-slide-plate-Alternative2 31aA2 has two electrical contacts i.e., Driver-connector-button-bottom 31hA2 and Driver-connector-button-top 31jA2. Driver-slide-plate-Alternative2 31aA2 has two springs Driver-Spring 31iA2 and Driver-connector-button-top-spring 31kA2 which connects Driver-connector-button-top 31jA2 to the Driver-slide-plate-Alternative2 31aA2. Refer FIGS. 102,103 and 104 which illustrates Follower-Unit-Alternative2 32A2 having Follower-slide-plate-Alternative2 32aA2 which has Follower-L-hook 32fA2 enclosing Follower-slide-plate-depression 32gA2. Follower-slide-plate-Alternative2 32aA2 has an electrical contact Follower-connector-button-bottom 32hA2. Follower-slide-plate-Alternative2 32aA2 is connected to Follower-unit-bearing 32c through Follower-unit-connection-rod 32d. Follower-unit-bearing 32c has an inner Follower-unit-bearing-ring 32e. Refer FIGS. 105 and 106 which illustrates Frame-Alternative2 34A2 which has Frame-groove-Alternative2 34aA2 and two springs Frame-cushioning-springs-Alternative2 34bA2. Frame-connector-button-top-spring 34dA2 connects Frame-connector-button-top 34cA2 to Frame-Alternative2 34A2.

Refer FIGS. 107,108 and 109 which illustrates Driver-Unit-Alternative2 31A2 and Follower-Unit-Alternative2 32A2 assembled together to form the driver and follower combination. The tension in Driver-Spring 31iA2 which is between Driver-Unit-Alternative2 31A2 and Follower-Unit- Alternative2 32A2 keeps both separated. Driver-L-hook 31fA2 of Driver-Unit-Alternative2 31A2 occupies the space inside Follower-slide-plate-depression 32gA2 of Follower-Unit-Alternative2 32A2. Follower-L-hook 32fA2 of Follower-Unit-Alternative2 32A2 occupies the space inside Driver-slide-plate-depression 31gA2 of Driver-Unit-Alternative2 31A2. Refer FIGS. 110, 111 and 112 which illustrates the combination of Driver-Unit-Alternative2 31A2 and Follower-Unit-Alternative2 32A2 assembled together inside Frame-Alternative2 34A2 such that the edges of Driver-slide-plate-Alternative2 31aA2 and Follower-slide-plate-Alternative2 32aA2 correctly sit inside Frame-groove-Alternative2 34aA2. The combination of Driver-Unit-Alternative2 31A2 and Follower-Unit-Alternative2 32A2 can slide easily vertically up and down. When Driver-Unit-Alternative2 31A2 moves vertically upward the tension in spring Driver-Spring 31iA2 pushes Follower-Unit-Alternative2 32A2 to move upwards. When Follower-Unit-Alternative2 32A2 does not move upwards while Driver-Unit-Alternative2 31A2 pushes it upwards, Driver-Spring 31iA2 will compress and will result in Driver-connector-button-top 31jA2 touching Follower-connector-button-bottom 32hA2 once Driver-Spring 31iA2 is sufficiently compressed. When Driver-Unit-Alternative2 31A2 moves vertically downward Driver-L-hook 31fA2 will pull Follower-L-hook 32fA2 and hence Follower-Unit-Alternative2 32A2 will move downward.

Refer FIGS. 113 and 114 which illustrates Power-unit-Alternative2 33A2 which consists of a) Power-unit-distributor 33dA2 which takes the input power through Power-unit-input-Alternative2 33cA2 and b) Power-unit-flip-flop 33eA2 which is a double input double output Flip-Flop circuit whose outputs are Power-unit-output1-Alternative2 33aA2 and Power-unit-output2-Alternative2 33bA2. Power-unit-connections1 33fA2 connects Power-unit-distributor 33dA2 to the electrical contacts on Driver-Unit-Alternative2 31A2 and Follower-Unit-Alternative2 32A2. Positive input current from Power-unit-input-Alternative2 33cA2 is connected to Driver-connector-button-bottom 31hA2 and Driver-connector-button-top 31jA2 through Power-unit-connections1_3 33f3A2. Follower-connector-button-bottom 32hA2 is connected to Power-unit-connections1_1 33f1A2 which is connected to Power-unit-connections2_1 33g1A2 of Power-unit-connections2 33gA2 at Power-unit-distributor 33dA2. Frame-connector-button-top 34cA2 is connected to Power-unit-connections1_2 33f2A2 which is connected to Power-unit-connections2_2 33g2A2 of Power-unit-connections2 33gA2 at Power-unit-distributor 33dA2. Power-unit-connections2_3 33g3A2 carries the neutral current from Power-unit-input-Alternative2 33cA2 to Power-unit-flip-flop 33eA2.

Power-unit-connections2_1 33g1A2 and Power-unit-connections2_2 33g2A2 form the two inputs to trigger the Power-unit-flip-flop 33eA2. The table below gives the behavior of the flip-flop circuit along with a relay inside Power-unit-flip-flop 33eA2.

| FLIP-FLOP INPUT | | FLIP-FLOP OUTPUT | |
| --- | --- | --- | --- |
| 33f1A2/33g1A2 | 33f2A2/33g2A2 | 33aA2 | 33bA2 |
| 0 | 0 | OFF | ON |
| 1 | 1 | OFF | OFF |
| 1 | 0 | ON | OFF |
| 0 | 1 | OFF | ON |

Refer FIGS. 115, 116 and 117 which illustrates the overall view of Vertical-Movement-Control-Apparatus-Alternative2 30A2 and its supporting parts. FIG. 116 illustrates how Follower-Unit-Alternative2 32A2 is connected to the Variable-Width-Scraper-Apparatus-Shaft 23 through the Follower-unit-bearing 32c. FIG. 117 illustrates how Driver-Unit-Alternative2 31A2 is connected to Chain-sprocket-system2-chain 92c of Circular-to-linear-movement-convertor 90 through the Chain-sprocket-system2-connecting-rod 92d. All other parts and connections to supporting elements remain the same as Vertical-Movement-Control-Apparatus 30 illustrated hereinbefore and hereinafter in the present description.

Refer FIG. 118 which illustrate the overall apparatus to scrape to extract Coconut-meat from a half coconut with minimal human intervention and how Vertical-Movement-Control-Apparatus-Alternative2 30A2 forms a part of it.

4.2b Operation of the Vertical-Movement-Control-Apparatus-Alternative2:

The description as set forth in the present section is based on the description on the operation of Vertical-Movement-Control-Apparatus as described hereinbefore, where the driver-follower concept was explained. The present description forms an alternative embodiment of the same concept. Only the difference in the two embodiments are explained below. As noted earlier Power-unit-output1-Alternative2 33aA2 and Power-unit-output2-Alternative2 33bA2 are connected electrically to power-point-sub-unit1 82i and power-point-sub-unit2 82j respectively.

Step1:

Refer FIG. 119 which illustrates step1 of how the Driver-Unit-Alternative-2 31A2 and Follower-Unit-Alternative-2 32A2 work together to control and change the direction of vertically upward and downward movement.

The status of the present operation is:

Direction of Driver-Unit-Alternative-2 31A2: Downward

Follower-Unit-Alternative-2 32A2 freedom to vertical movement: Able to move freely Tension in Driver-Spring 31iA2: Normal Tension in Frame-cushioning-springs-Alternative2 34bA2: Starting to increase as Driver-Unit-Alternative-2 31A2 is pressing it downward.

Explanation: Here the Driver-Unit-Alternative-2 31A2 is moving downward and it reaches almost the end of its movement and it is being restrained by the Frame-cushioning-springs-Alternative2 34bA2. This results in increase in tension in Frame-cushioning-springs-Alternative2 34bA2 and also slight resistance in the downward movement of Driver-Unit-Alternative-2 31A2.

Step2:

Refer FIG. 120 which illustrates step2 of how the Driver-Unit-Alternative-2 31A2 and Follower-Unit-Alternative-2 32A2 work together to control and change the direction of vertically upward and downward movement. FIGS. 112 and 113 also illustrate the present step.

The status of the present operation is:

Direction of Driver-Unit-Alternative-2 31A2: Downward

Follower-Unit-Alternative-2 32A2 freedom to vertical movement: Able to move freely Tension in Driver-Spring 31iA2: Normal Tension in Frame-cushioning-springs-Alternative2 34bA2: High Explanation: Driver-Unit-Alternative-2 31A2 came downward against the tension in Frame-cushioning-springs-Alternative2 34bA2 and results in electrical contacts Driver-connector-button-bottom 31hA2 and Frame-connector-button-top 34cA2 touching each other. This results in electrical current or pulse flowing through Power-unit-connections1_2 33f2A2 and Power-unit-connections2_2 33g2A2 and triggering the Power-unit-flip-flop 33eA2 to power Power-unit-output2-Alternative2 33bA2 and Power-point-sub-unit2 82j. This results in the direction of movement of Driver-Unit-Alternative-2 31A2 changing to upward direction.

Step3:

Refer FIG. 121 which illustrates step3 of how the Driver-Unit-Alternative-2 31A2 and Follower-Unit-Alternative-2 32A2 work together to control and change the direction of vertically upward and downward movement.

The status of the present operation is:
Direction of Driver-Unit-Alternative-2 31A2: Upward
Follower-Unit-Alternative-2 32A2 freedom to vertical movement: Able to move freely
Tension in Driver-Spring 31iA2: Normal
Tension in Frame-cushioning-springs-Alternative2 34bA2: High but reducing Explanation: This is a continuation of the earlier status where the Driver-Unit-Alternative-2 31A2 starts to move upward.

Step4

Refer FIG. 122 which illustrates step4 of how the Driver-Unit-Alternative-2 31A2 and Follower-Unit-Alternative-2 32A2 work together to control and change the direction of vertically upward and downward movement.

The status of the present operation is:
Direction of Driver-Unit-Alternative-2 31A2: Upward
Follower-Unit-Alternative-2 32A2 freedom to vertical movement: Able to move freely
Tension in Driver-Spring 31iA2: Normal
Tension in Frame-cushioning-springs-Alternative2 34bA2: None Explanation: Driver-Unit-Alternative-2 31A2 is continuing its upward movement and pushing Follower-Unit-Alternative-2 32A2 upward with the Driver-Spring 31iA2. This results in normal tension in Driver-Spring 31iA2.

Step5

Refer FIG. 123 which illustrates step5 of how the Driver-Unit-Alternative-2 31A2 and Follower-Unit-Alternative-2 32A2 work together to control and change the direction of vertically upward and downward movement.

The status of the present operation is:
Direction of Driver-Unit-Alternative-2 31A2: Upward
Follower-Unit-Alternative-2 32A2 freedom to vertical movement: The upward movement is not possible as the Variable-Width-Scraper-Apparatus 20 could have reached the inside top end of the half-coconut 11.
Tension in Driver-Spring 31iA2: Increased as the Follower-Unit-Alternative-2 32A2 is not able to move upward but the Driver-Unit-Alternative-2 31A2 is pushing upward.
Tension in Frame-cushioning-springs-Alternative2 34bA2: None Explanation: Here the Follower-Unit-Alternative-2 32A2 is not able to move upward as the Variable-Width-Scraper-Apparatus 20 could have reached the inside top end of the half-coconut 11. As the Driver-Unit-Alternative-2 31A2 is still continuing to move upward the tension in Driver-Spring 31iA2 is increased as it is getting compressed.

Step6

Refer FIG. 124 which illustrates step6 of how the Driver-Unit-Alternative-2 31A2 and Follower-Unit-Alternative-2 32A2 work together to control and change the direction of vertically upward and downward movement. FIGS. 112 and 113 also illustrate the present step.

The status of the present operation is:
Direction of Driver-Unit-Alternative-2 31A2: Upward
Follower-Unit-Alternative-2 32A2 freedom to vertical movement: Not able to move upward
Tension in Driver-Spring 31iA2: Very high
Tension in Frame-cushioning-springs-Alternative2 34bA2: None Explanation: Follower-Unit-Alternative-2 32A2 does not move up but the Driver-Unit-Alternative-2 31A2 moves upward against the tension in Driver-Spring 31iA2 and the two electrical contacts Driver-connector-button-top 31jA2 and Follower-connector-button-bottom 32hA2 touch each other. This results in electrical current or pulse flowing through Power-unit-connections1_1 33f1A2 and Power-unit-connections2_1 33g1A2 and triggering flip-flop Power-unit-flip-flop 33eA2 to power Power-unit-output1-Alternative2 33aA2 and therefore Power-point-sub-unit1 82i. This results in the Driver-Unit-Alternative-2 31A2 changing its direction to vertically downward.

Step7

Refer FIG. 125 which illustrates step7 of how the Driver-Unit-Alternative-2 31A2 and Follower-Unit-Alternative-2 32A2 work together to control and change the direction of vertically upward and downward movement.

The status of the present operation is:
Direction of Driver-Unit-Alternative-2 31A2: Downward
Follower-Unit-Alternative-2 32A2 freedom to vertical movement: Able to move freely downward
Tension in Driver-Spring 31iA2: Normal
Tension in Frame-cushioning-springs-Alternative2 34bA2: None Explanation: This is a continuation of the earlier step and the Driver-Unit-Alternative-2 31A2 continuous to move downward pulling the Follower-Unit-Alternative-2 32A2 though the Driver-L-hook 31fA2 and Follower-L-hook 32fA2.

The series of steps as described above completes one cycle of vertical movement Several cycles are needed to complete the scraping process.

5. Usage of Word Scrape:

The word scrape in the present invention is used to describe the act of scraping the coconut. The use of the same is not limiting in nature, and various other alternate and/or similar words viz., "grate, rub, scrub, scratch, massage, abrade, rasp etc." can be used to describe the same act of scraping.

6. Usage in Similar Objects:

The scraping apparatus as described in the present invention can be employed and used with and/or for various other objects that are similar in shape to a half-coconut with a softer inner layers and relatively harder outer layers. The scraping apparatus as described in the present invention can work with similar objects mentioned above whether they have variabilities in length, width and size or not ie., a similar object with a perfect hemisphere shape can be scraped as well as an imperfect hemisphere. The present apparatus can also be used to scrape, clean, grate, rub, scrub, scratch, massage, abrade, rasp relatively softer inner layers of such objects. One such example is to make use of the present apparatus in cleaning a hollow object which is almost semispherical in shape.

7. Usage of Individual Main Elements:

The uses and/or applications of each of the main elements, namely; 1. Variable-Width-Scraper-Apparatus 20, 2. Vertical-Movement-Control-Apparatus 30, 3. Variable-Opening-Entry-Mechanism and the various alternative/exemplary embodiments as described throughout the present description are not limiting in nature, and could be used together or, in isolation in other uses. For example Vertical-Movement-Control-Apparatus 30 could be used in applications where a probe/object/shaft and the like needs to go where the height/ length/depth is not known before hand and also where the height keeps varying. Variable-Opening-Entry-Mechanism could be used in application where an object of variable width similar to Variable-Width-Scraper-Apparatus 20 needs to enter an opening of unknown or variable diameter or width.

8. Coconut as an Example:

A coconut is used as an example to explain the present apparatus, and the present apparatus, including the individual elements as described, should by no means, be construed to be limiting in scope of its uses and/or applications.

9. Gripping Half-Coconut 11:

In order that Half-coconut 11 is gripped properly the inner sloping walls Sloping-wall 40a of Variable-Opening-Entry-Mechanism-Jar 40 and inner walls of Conical-holder 55 can have rough surface in terms of circular and vertical ridges along the sloping surface 10. Scraping Action of Variable-Width-Scraper-Apparatus 20 and Variable-Width Scraper-Apparatus-Exemplary1 20E1:

In the described as set forth above and below, the Variable-Width-Scraper-Apparatus 20 can rotate at threshold speed and scrape while going vertically up and down Half-coconut 11. This can be varied by design so that Variable-Width-Scraper-Apparatus 20 rotates at less than threshold speed for one vertical direction and at threshold speed for the other vertical direction and scrape only while going vertically up or only while coming vertically downward. It scrapes at rotational speed of threshold and above.

Alternative Embodiments of Invention: Connections of Main Elements and Sub-Elements of Invention 1. Vertical-Movement-Control-Apparatus-Alternative 1 30A1:

Refer FIG. 148 which illustrates exploded view of the elements of Vertical-Movement-Control-Apparatus-Alternative1 30A1 along with its supporting parts. Variable-Width-Scraper-Apparatus-Shaft 23 is tightly fitted into Follower-unit-bearing-ring 32e. The edges of Follower-Unit-base-plate-Alternative1 32aA1 is correctly fitted into Follower-unit-frame-groove-Alternative1 35aA1 of Frame-Alternative1 35A1 such that it can slide vertically up and down inside Frame-Alternative1 35A1. Chain-sprocket-system2-sprocket1 92a, Chain-sprocket-system2-sprocket2 92b and Manual-Gear 93A1 are correctly fitted inside Chain-sprocket-system2-chain-Alternative1 92cA1 such that their gear teeth engages with Chain-sprocket-system2-chain-Alternative1 92cA1. One end of Vertical-Lever 93aA1 is fixed to the center of Manual-Gear 93A1 while Speed-Controller 93cA1 along with Speed-Control-Lever 93bA1 is fixed at the other end. Wire-Connection 93fA1 connects Connection-Point 93eA1 to Connection-point1 71a. Chain-sprocket-system2-connecting-rod 92d connects to Chain-sprocket-system2-chain-Alternative1 92cA1. Refer FIGS. 93, 95, 96, 97 and 98 which gives an assembled view of the above.

2. Vertical-Movement-Control-Apparatus-Alternative2 30A2:

Refer FIG. 149 which illustrates an exploded view of Vertical-Movement-Control-Apparatus-Alternative2 30A2. The edges of both Driver-slide-plate-Alternative2 31aA2 and Follower-slide-plate-Alternative2 32aA2 are correctly placed inside Frame-groove-Alternative2 34aA2 such that 1. Driver-L-hook 31fA2 is inside Follower-slide-plate-depression 32gA2 and Follower-L-hook 32fA2 is inside Driver-slide-plate-depression 31gA2 2. Both Driver-slide-plate-Alternative2 31aA2 and Follower-slide-plate-Alternative2 32aA2 can slide vertically up and down inside Frame-Alternative2 34A2. Chain-sprocket-system2-connecting-rod 92d is connected to Driver-slide-plate-Alternative2 31aA2. Power-unit-connections1_1 33f1A2, Power-unit-connections1_2 33f2A2 and two connections of Power-unit-connections1_3 33f3A2 are connected to Follower-connector-button-bottom 32hA2, Frame-connector-button-top 34cA2, Driver-connector-button-bottom 31hA2 and Driver-connector-button-top 31jA2 respectively. The rest of connections to supporting parts/elements is same as in normal Vertical-Movement-Control-Apparatus 30 described hereinbefore and hereinafter in the present description. Refer FIGS. 112, 114, 115, 116 and 117 which illustrates the assembled view of the above.

EXEMPLARY EMBODIMENTS

1. Variable-Width-Scraper-Apparatus

Variable-Width-Scraper-Apparatus 20 is used to consider and accommodates the variability in width within a horizontal plane of a half coconut and scrape it accordingly. One exemplary embodiment for the same is given below:

1.1 Description, Connections and Operation of Variable-Width-Scraper-Apparatus-Exemplary1 20E1

In the description above (refer FIG. 8) for Variable-Width-Scraper-Apparatus 20 body 21 was hollow. For ease of manufacturing, handling and working it could be more solid. Refer FIGS. 150, 151 and 152 which shows Body-Exemplary1 21E1 which is more solid. Body 21E1 has Blocking-holes-Exemplary1 21eE1, Blade-track-Exemplary1 21fE1, Body-base-shaft-hole-Exemplary1 21hE1 and Body-top-blade-Exemplary1 21aE1.

In the description above (Refer FIGS. 65, 70, 71 and 75) blade 22 which can extend more and can scrape against the inner wall of the Variable-Opening-Entry-Mechanism-Jar 40 is guided by means of Guide-wheel 22n and Variable-Opening-Entry-Mechanism-Guide1 41. In these figures only blade 22 which are horizontally aligned has been guided by means of Guide-wheel 22n and Variable-Opening-Entry-Mechanism-Guide1 41. In order to reduce the number of blades it would be desirable to align blade 22 which can extend more and scrape against the inner wall of the Variable-Opening-Entry-Mechanism-Jar 40 at a slope or angle to the horizontal axis. Refer FIGS. 153,154 and 155 where Blade-Exemplary1 22E1 has Blade-head 22a, Blade-body 22b, Guide-wheel-Exemplary1 22nE1 and Blade-tail-block-Exemplary1 22cE1. The rest of Blade-Exemplary1 22E1 remains same as Blade 22. Refer FIGS. 157 and 158 where Blade-Exemplary1 22E1 is at an angle or slope to the horizontal and can freely slide within Blade-track-Exemplary1 21fE1 of Body-Exemplary1 21E1. Refer FIGS. 158 and 159 which illustrates how Blocking-holes-Exemplary1 21eE1 allows Blade-body 22b to freely move through the blocking holes but prevents Blade-head 22a and Blade-tail-block-Exemplary1 22cE1 to pass through. Refer FIG. 156: from a manufacturing perspective Blade-Exemplary1 22E1 could be manufactured as two parts Blade-Exemplary1-part1 22E1-1 and Blade-Exemplary1-part2 22E1-2. Refer FIGS. 156 and 158: In order to configure Blade-Exemplary1 22E1 inside Body-Exemplary1 21E1, Blade-body 22b of Blade-Exemplary1-part1 22E1-1 could be passed through Blocking-holes-Exemplary1 21eE1 and then Blade-Exemplary1-part2 22E1-2 could be fixed to Blade-tail 22f of Blade-Exemplary1-part1 22E1-1. This fixing could be by means of s rivet or screw or any other possible alternate ways, as can be perceived by a person skilled in the art. Another way could be to manufacture Body-Exemplary1 21E1 as more than one part and assemble it with Blade-Exemplary1 22E1 inside it.

Refer FIGS. 71, 72 and 75 where it is illustrated that a particular Blade 22 which has to be guided to the extent it can move outward has Guide-wheel 22n attached to it which needs to exactly align and match Guide1-sloping-side 41a of Variable-Opening-Entry-Mechanism-Guide1 41. In order to aid this alignment practically and perfectly the top view cross-section of Variable-Width-Scraper-Apparatus-Shaft 23 needs to be asymmetric. (Presently it is circular). Refer FIG. 160 where Variable-Width-Scraper-Apparatus-Shaft-Exemplary1 23E1 illustrates one of the ways of having an asymmetric shaft. Figure also illustrates how Variable-Width-Scraper-Apparatus-Shaft-Exemplary1 23E1 tightly fits into Body-base-shaft-hole-Exemplary1 21hE1 of Body-Exemplary1 21E1 (This fitting can be that of SDS technology used in hand drills and jig-saws as it would help to easily and quickly fit and remove. Refer FIGS. 161, 162 and 163 illustrating Base-bush-Exemplary1 40gE1 having Base-bush-hole-Exemplary1 40hE1, Base-bush-narrow-Exemplary1 40iE1 and Base-bush-fan-Exemplary1 43aE1. Refer FIGS. 164 and 165 illustrating how Base-bearing 43 tightly fits into Jar-base-hole 40ch of Jar-base 40c of Variable-Opening-Entry-Mechanism-Jar 40. Refer FIG. 166 which illustrates the connection between Base-bush-Exemplary1 40gE1 and the combination of Variable-Opening-Entry-Mechanism-Jar 40 and Base-bearing 43. Refer FIGS. 167 and 168 illustrating how Base-bush-narrow-Exemplary1 40iE1 of Base-bush-Exemplary1 40gE1 tightly fits into Bearing-inner-ring 43c of Base-bearing 43. Refer FIG. 169 which illustrates the connections of Variable-Width-Scraper-Apparatus-Shaft-Exemplary1 23E1, Base-bush-Exemplary1 40gE1, Base-bush-hole-Exemplary1 40hE1, Gear-wheel1-Exemplary1 24E1, Gear-wheel1-hole-Exemplary1 24aE1, Follower-unit-bearing-Exemplary1 32cE1 and its inner ring Follower-unit-bearing-ring-Exemplary1 32eE1. Refer FIGS. 170, 171 and 172 which illustrates how Variable-Width-Scraper-Apparatus-Shaft-Exemplary1 23E1 passes freely through Base-bush-hole-Exemplary1 40hE1. Figure also illustrates how Variable-Width-Scraper-Apparatus-Shaft-Exemplary1 tightly fits into Gear-wheel1-Exemplary1 24E1 and Follower-unit-bearing-Exemplary1 32cE1 through Gear-wheel1-hole-Exemplary1 24aE1 and Follower-unit-bearing-ring-Exemplary1 32eE1 respectively.

In this configuration Variable-Width-Scraper-Apparatus-Exemplary1 20E1 can rotate freely and move vertically up and down Variable-Opening-Entry-Mechanism-Jar 40. Base-bush-Exemplary1 40gE1 can rotate freely along with Variable-Width-Scraper-Apparatus-Exemplary1 20E1 but cannot move vertically up and down. Also since Variable-Width-Scraper-Apparatus-Shaft-Exemplary1 23E1 is asymmetric in top cross section, Base-bush-Exemplary1 40gE1 will always be aligned in the same way with Variable-Width-Scraper-Apparatus-Exemplary1 20E1 as Variable-Width-Scraper-Apparatus-Shaft-Exemplary1 23E1 can fit through Base-bush-Exemplary1 40gE1 in only one way.

2. Variable-Opening-Entry-Mechanism Exemplary Embodiment 1

Refer FIGS. 157, 158 and 159 where Blade-Exemplary1 22E1 is at an angle or slope to the horizontal and can freely slide within Blade-track-Exemplary1 21fE1 of Body-Exemplary1 21E1. Refer FIGS. 70 and 74 which illustrates how Variable-Opening-Entry-Mechanism-Guide1 41 is configured with respect to horizontal Blade 22. In FIGS. 157, 158 and 159 Blade-Exemplary1 22E1 is at an angle or slope to the horizontal and if Variable-Opening-Entry-Mechanism-Guide1 41 is used to guide or restrict its outward movement or extension it would not be possible when Variable-Width-Scraper-Apparatus-Exemplary1 20E1 is coming vertically downward.

2.1 Description, Connections and Operation of Variable-Opening-Entry-Mechanism Exemplary Embodiment 1

Refer FIG. 174 which illustrates Blade-guide-gear1-Exemplary1 41jE1, Intermediate-guide-gear1-Exemplary1 41iE1 and Variable-Opening-Entry-Mechanism-Guide-Exemplary1 41E1. Blade-guide-gear1-Exemplary1 41jE1 has gear teeth Blade-guide-gear1-teeth-Exemplary1 41j1E1, Blade-guide-gear1-stem-Exemplary1 41j2E1 with one end having Blade-guide-gear1-stem-end-Exemplary1 41j3E1 and Blade-guide-gear1-pivot-hole-Exemplary1 41j5E1 for fitting a pivot for attaching to Body-Exemplary1 21E1. Intermediate-guide-gear1-Exemplary1 41iE1 has gear teeth Intermediate-guide-gear1-teeth-Exemplary1 41i1E1, Intermediate-guide-gear1-stem-Exemplary1 41i2E1 with one end having Intermediate-guide-gear1-stem-end-Exemplary1 41i3E1 and Intermediate-guide-gear1-pivot-hole-Exemplary1 41i5E1 for fitting a pivot for attaching to Body-Exemplary1 21E1. Variable-Opening-Entry-Mechanism-Guide-Exemplary1 41E1 has a sloping side Guide1-sloping-side-Exemplary1 41aE1.

Refer FIGS. 175 and 176 which illustrates Intermediate-guide-gear1-Exemplary1 41iE1 and Blade-guide-gear1-Exemplary1 41jE1 configured on Body-Exemplary1 21E1 by means of Intermediate-guide-gear1-pivot-Exemplary1 41i4E1 and Blade-guide-gear1-pivot-Exemplary1 41j4E1 respectively. This configuration is such that Intermediate-guide-gear1-Exemplary1 41iE1 and Blade-guide-gear1-Exemplary1 41jE1 are fixed onto Body-Exemplary1 21E1 and can rotate about Intermediate-guide-gear1-pivot-Exemplary1 41i4E1 and Blade-guide-gear1-pivot-Exemplary1 41j4E1 respectively. Gear teeth Intermediate-guide-gear1-teeth-Exemplary1 41i1E1 and Blade-guide-gear1-teeth-Exemplary1 41j1E1 are engaged such that if Intermediate-guide-gear)-Exemplary1 41iE1 rotates Blade-guide-gear1-Exemplary1 41jE1 will also rotate. Intermediate-guide-gear1-stem-end-Exemplary1 41i3E1 touches Guide1-sloping-side-Exemplary1 41aE1, the sloping side of Variable-Opening-Entry-Mechanism-Guide-Exemplary1 41E1, such that when Variable-Width-Scraper-Apparatus-Exemplary1 20E1 goes vertically down Guide1-sloping-side-Exemplary1 41aE1 pushes Intermediate-guide-gear1-stem-end-Exemplary1 41i3E1 upwards resulting in rotating Intermediate-guide-gear1-Exemplary1 41iE1 about Intermediate-guide-gear1-pivot-Exemplary1 41i4E1. This rotation of Intermediate-guide-gear1-Exemplary1 41iE1 will result in Blade-guide-gear1-Exemplary1 41jE1 to rotate in the opposite direction. Blade-guide-gear1-Exemplary1 41jE1 has Blade-guide-gear1-stem-Exemplary1 41j2E1 whose one end is Blade-guide-gear1-stem-end-Exemplary1 41j3E1. Blade-guide-gear1-stem-end-Exemplary1 41j3E1 is configured such that when Blade-Exemplary1 22E1 moves outward it blocks Guide-wheel-Exemplary1 22nE1. Based on the rotational position of Blade-guide-gear1-Exemplary1

41jE1, Blade-guide-gear1-stem-end-Exemplary1 41j3E1 guides Blade-Exemplary1 22E1 as to how much it will extend outward.

Refer FIGS. 177, 178 and 179 when Variable-Width-Scraper-Apparatus-Exemplary1 20E1 rotates and moves downward from position 1 to position 2 and then to position 3, due to centrifugal force Blade-Exemplary1 22E1 tries moving outward and Guide-wheel-Exemplary1 22nE1 pushes against Blade-guide-gear1-stem-end-Exemplary1 41j3E1. Due to the downward movement the height Body-Jar-Base-height-Exemplary1 21vhE1 reduces, Intermediate-guide-gear1-stem-end-Exemplary1 41i3E1 presses against Guide1-sloping-side-Exemplary1 41aE1 and results in clockwise rotation of Intermediate-guide-gear1-Exemplary1 41iE1 about Intermediate-guide-gear1-pivot-Exemplary1 41i4E1. This results in counter-clockwise rotation of Blade-guide-gear1-Exemplary1 41jE1 about Blade-guide-gear1-pivot-Exemplary1 41j4E1 resulting in Blade-guide-gear1-stem-end-Exemplary1 41j3E1 pulling Guide-wheel-Exemplary1 22nE1 and hence Blade-Exemplary1 22E1 inside Body-Exemplary1 21E1 or away from the inner walls of Variable-Opening-Entry-Mechanism-Jar 40. Similarly (Refer FIGS. 179, 178 and 177) when Variable-Width-Scraper-Apparatus-Exemplary1 20E1 rotates and moves upward, due to centrifugal force Blade-Exemplary1 22E1 tries moving outward. Guide-wheel-Exemplary1 22nE1 pushes against Blade-guide-gear1-stem-end-Exemplary1 41j3E1 to try to rotate Blade-guide-gear1-Exemplary1 41jE1 clockwise. This results in force on Intermediate-guide-gear1-Exemplary1 41iE1 to rotate counter-clockwise. As the height Body-Jar-Base-height-Exemplary1 21vhE1 between Body-Exemplary1 21E1 and Variable-Opening-Entry-Mechanism-Guide-Exemplary1 41E1 has increased and due to the slope of Guide1-sloping-side-Exemplary1 41aE1, there is gap between Intermediate-guide-gear1-stem-end-Exemplary1 41i3E1 and Guide1-sloping-side-Exemplary1 41aE1. This results in Intermediate-guide-gear1-Exemplary1 41iE1 rotate counter-clockwise until Intermediate-guide-gear1-stem-end-Exemplary1 41i3E1 touches Guide1-sloping-side-Exemplary1 41aE1. As such Blade-Exemplary1 22E1 is allowed to moves outward.

By controlling a) length of Intermediate-guide-gear1-stem-Exemplary1 41i2E1 and Blade-guide-gear1-stem-Exemplary1 41j2E1 b) gear ratio between Intermediate-guide-gear1-teeth-Exemplary1 41i1E1 and Blade-guide-gear1-teeth-Exemplary1 41j1E1. c) Shape of the slope of Guide1-sloping-side-Exemplary1 41aE1, the farthest tip of Blade-Exemplary1 22E1 can be guided to move at parallel distance from the inner wall of Variable-Opening-Entry-Mechanism-Jar 40 for Blade-Exemplary1 22E1 of a particular length and sloping at a particular angle to the horizontal. Refer FIGS. 177, 178 and 179 where Blade-extension-profile-Exemplary1 26E1 shows the profile of the farthest tip of Blade-Exemplary1 22E1 parallel to the inner wall of Variable-Opening-Entry-Mechanism-Jar 40 for various heights of Body-Jar-Base-height-Exemplary1 21vhE1. The slope of Guide1-sloping-side 41a and its length also has an effect on the above.

Refer FIGS. 180, 181 and 182 which shows half-coconut 11 of three different sizes placed inside Variable-Opening-Entry-Mechanism-Jar 40 with Variable-Width-Scraper-Apparatus-Exemplary1 20E1 in three different positions. It is to be noted that as Half-coconut 11 size (width of Cut-face-of-coconut 18) increases it is placed higher in Variable-Opening-Entry-Mechanism-Jar 40. The corresponding Blade-extension-profile-Exemplary1 26E1 shows the profile of the farthest tip of Blade-Exemplary1 22E1 parallel to the inner wall of Variable-Opening-Entry-Mechanism-Jar 40 for various heights of Body-Jar-Base-height-Exemplary1 21vhE1 and also inside the shell 15. Therefore Blade-Exemplary1 22E1 of rotating Variable-Width-Scraper-Apparatus-Exemplary1 20E1 enters and exits half-coconut 11 without being blocked by the shell.

Operation of Preferred Embodiment

The detailed operation of each of the elements has been described in the earlier sections on the respective elements. The present section describes the overall operation of the preferred embodiment without going into a detailed description of the operation of each elements.

Figure 5A:
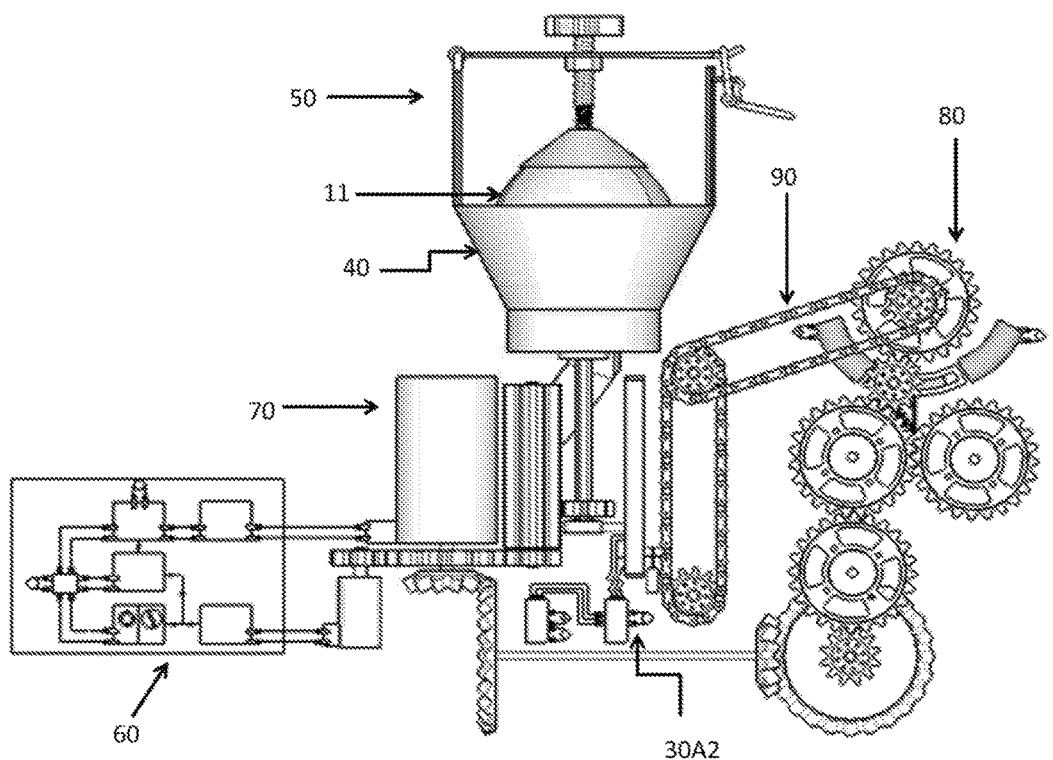
FIG. 5a is a front elevation view of preferred embodiment of apparatus to scrape coconut with half-coconut placed in position for being scraped.

Refer FIGS. 5a, 6a and 7a to get the overall view of the preferred embodiment of full coconut scraping apparatus and specific reference is made in the present section to get detailed view.

1. Power on: Refer FIG. 86

When the apparatus is connected to outside power supply electrical power comes to the apparatus through External-power 67a. This is distributed by Input-power-distributor 67 to User-interface 64, Main-controller 65 and Main-distributor 66 through the Connector2 64c, Connector3 65a and Connector4 66a.

2. Loading Half-coconut 11: Refer FIGS. 81, 82, 83 and 84

Step 1: Refer FIG. 81 Holding-lid 52 is opened.

Step 2: Refer FIG. 82 Half-coconut 11 is placed inside the Variable-Opening-Entry-Mechanism-Jar 40.

Step 3: Refer FIG. 83 Holding-lid 52 is closed with the Conical-holder 55 on top of the top end of the half-coconut 11.

Step 4: Refer FIG. 84 Lid lock-upper 56c is placed over Lid-protrusion 52a and Lid lock-lower 56a is pressed downward with Lid lock-middle 56b as the hinge resulting in Lid-lock 56 being locked. The Holding-screw-mechanism 54 is tightened by rotating the Screw-head so that the Conical-holder 55 is tightly holding the Half-coconut 11 against the Variable-Opening-Entry-Mechanism-Jar 40.

The coconut is now loaded correctly and ready to be grated. Refer FIG. 5a which illustrates the coconut scraping apparatus loaded with Half-coconut 11.

3. Switching on the grater: Refer FIG. 86

When user either pushes Push-button 64a or starts Timer 64b in User-interface 64 it will send an electrical signals Signal) 64d to Main-controller 65 to start the coconut scraping operation. This will result in Main-controller 65 sending Main-Signal 65b to Main-distributor 66 to send power to Main-motor-driver 63 as well as Power-unit-input-Alternative2 33cA2. The Main-motor-driver 63 will send the electrical power in the required form to Main-Motor 71 to get the required waveform of rotational velocity. Refer FIGS. 87 and 88 for the waveform of rotational velocity.

4. Variable-Width-Scraper-Apparatus scraping the half-coconut: Refer FIGS. 7a and 173. Motor-and-driving-gears 70 through its connecting gears will rotate Gear-wheel1-Exemplary1 24E1 and hence the Body-Exemplary1 21E1 of the Variable-Width-Scraper-Apparatus-Exemplary1 20E1. When Body-Exemplary1 21E1 rotates and reaches a threshold rotational velocity both Blade-Exemplary1 22E1 inside it will move outward due to centrifugal force on them. When the centrifugal force is strong enough the Blade-Exemplary1 22E1 will start scraping the half-coconut 11. Here the Coconut-meat 14 in the line of the radially outward movement of Blade-Exemplary1 22E1 only will get scraped. In order that the whole half-coconut 11 is scraped completely Variable-Width-Scraper-Apparatus-Exemplary1 20E1 needs to move vertically up and down which is described below.

5. Powering the Direction-Changer-Unit 80: Refer FIGS. 5a and 24.

The rotational motion of main-motor 71 is transferred to the Direction-Changer-Unit 80 through gears-system 74. Gear-system 74 also reduces the speed of rotation during this transfer. This results in Direction-changer-gear1 81a and Direction-changer-gear2 81b rotating anti-clockwise and clockwise respectively at lower velocity/speed.

6. Vertically up and down motion: Refer FIGS. 5a, 86, 25, 30, 113 to 125

In order that the Half-coconut 11 is scraped fully, Variable-Width-Scraper-Apparatus-Exemplary1 20E1 needs to vertically go up inside the Half-coconut 11 until it reaches the top of the Half-coconut 11 and then change direction to go downward and then go up again. This cycle goes on till the entire Half-coconut 11 get scraped. This vertical movement of Variable-Width-Scraper-Apparatus-Exemplary1 20E1 is controlled by the Driver-Unit-Alternative-2 31A2 and Follower-Unit-Alternative-2 32A2. Variable-Width-Scraper-Apparatus-Exemplary1 20E1 is connected to Follower-Unit-Alternative-2 32A2 which in turn is connected to Driver-Unit-Alternative-2 31A2.

Main-distributor 66 will send the electrical power to Power-unit-input-Alternative2 33cA2 which is sent to Driver-connector-button-bottom 31hA2 and Driver-connector-button-top 31jA2 on Driver-Unit-Alternative2 31A2. Power-unit-output1-Alternative2 33aA2 and Power-unit-output2-Alternative2 33bA2 are connected electrically to power-point-sub-unit1 82i and power-point-sub-unit2 82j respectively.

When Driver-Unit-Alternative2 31A2 moves downward, it pulls Follower-Unit-Alternative2 32A2 which pulls Variable-Width-Scraper-Apparatus-Exemplary1 20E1 (which is rotating) downward. Driver-Unit-Alternative2 31A2 moves downward until Driver-connector-button-bottom 31hA2 comes into contact with Frame-connector-button-top 34cA2. This results in electrical power flowing through Frame-connector-button-top 34cA2 triggering the Power-unit-flip-flop 33eA2 to power Power-unit-output2-Alternative2 33bA2 (disconnecting electrical power to Power-unit-output1-Alternative2 33aA2) and hence Power-point-sub-unit2 82j of Direction-Changer-Unit 80. This results in disconnecting electrical power to solenoid-sub-unit1 82a and powering solenoid-sub-unit2 82b. Direction-changer-connecting-gear 81c moves rightward connecting Direction-changer-gear3 81d with Direction-changer-gear2 81b.

This will result in Direction-Changer-Unit 80 to change direction and hence Circular-to-linear-movement-convertor 90 will start moving Driver-Unit-Alternative-2 31A2 upward. When Driver-Unit-Alternative-2 31A2 moves vertically upward, it pushes Follower-Unit-Alternative2 32A2 and hence Variable-Width-Scraper-Apparatus-Exemplary1 20E1 (which is rotating) vertically upward.

When Variable-Width-Scraper-Apparatus-Exemplary1 20E1 moves upward it will get resistance when it reaches Coconut-meat 14. Since Variable-Width-Scraper-Apparatus-Exemplary1 20E1 is rotating, it will scrape Coconut-meat 14 and move upwards, but as the pressure of resistance from Coconut-meat 14 increases Driver-connector-button-top 31jA2 (which has electrical power) will come into contact with Follower-connector-button-bottom 32hA2. This will result in electrical power flowing through Follower-connector-button-bottom 32hA2 triggering the Power-unit-flip-flop 33eA2 to power Power-unit-output1-Alternative2 33aA2 (disconnecting electrical power to Power-unit-output2-Alternative2 33bA2) and hence Power-point-sub-unit1 82i of Direction-Changer-Unit 80. This results in disconnecting electrical power to solenoid-sub-unit2 82b and powering solenoid-sub-unit1 82a. Direction-changer-connecting-gear 81c moves leftward to connect Direction-changer-gear3 81d with Direction-changer-gear1 81a.

This will result in Direction-Changer-Unit 80 to change direction and hence Circular-to-linear-movement-convertor 90 will start moving Driver-Unit-Alternative-2 31A2 downward. When Driver-Unit-Alternative-2 31A2 moves vertically downward, it pulls Follower-Unit-Alternative2 32A2 and hence Variable-Width-Scraper-Apparatus-Exemplary1 20E1 (which is rotating) vertically downward. Driver-Unit-Alternative2 31A2 moves downward until Driver-connector-button-bottom 31hA2 comes into contact with Frame-connector-button-top 34cA2, where it changes direction to move upward and the cycle continuous.

The upward movement of Follower-Unit-Alternative2 32A2 is resisted when Variable-Width-Scraper-Apparatus-Exemplary1 20E1 touches the Coconut-meat 14 of half-coconut 11. This could be the inner side walls or top part of Coconut-meat 14 (when the scraping starts) and the top inner wall of the hard Shell 15 (towards the end of scraping half-coconut 11). One cycle of the vertical movement is completed when the Follower-Unit-Alternative2 32A2 starts at the lowest vertical point goes vertically up and comes back to the lowest vertical point, referred to as Vertical cycle time.

7. Variable-Opening-Entry-Mechanism: Refer FIGS. 180, 181 and 182

As the Half-coconut 11 has different width its width at Cut-face-of-coconut 18 is not fixed. In order that Variable-Width-Scraper-Apparatus-Exemplary1 20E1 scrapes half-coconut 11 fully, it needs to move vertically up and down and enter and exit the half coconut at Cut-face-of-coconut 18. When Body-Exemplary1 21E rotates Blade-Exemplary1 22E1 is forced to move outward radially due to centrifugal force. Before entering the Half-coconut 11 through the Cut-face-of-coconut 18 Blade-Exemplary1 22E1 could extend beyond the width of the Half-coconut 11 and result in getting blocked by the shell 15. Variable-Opening-Entry-Mechanism Exemplary Embodiment 1 guides Blade-Exemplary1 22E1 and therefore Variable-Width-Scraper-Apparatus-Exemplary1 20E1 enters and exits the Cut-face-of-coconut 18 optimally. Half-coconut 11 is placed inside the Sloping-wall 40a of Variable-Opening-Entry-Mechanism-Jar 40 at a certain height based on its size. As the size increases diameter of Cut-face-of-coconut 18 increases and the half-coconut 11 is placed higher inside Variable-Opening-Entry-Mechanism-Jar 40.

In order that Variable-Width-Scraper-Apparatus-Exemplary1 20E1 enters and exits the Cut-face-of-coconut 18 optimally the following needs to be maintained:

a) Blade-extension-profile-Exemplary1 26E1 of Blade-Exemplary1 22E1 for various heights of Body-Jar-Base-height-Exemplary) 21vhE1 of Variable-Width-Scraper-Apparatus-Exemplary1 20E1 is parallel to the inner Sloping-wall 40a of Variable-Opening-Entry-Mechanism-Jar 40.

b) The parallel distance of Blade-extension-profile-Exemplary1 26E1 from inner Sloping-wall 40a needs to be such that it is constant and such that Variable-Width-Scraper-Apparatus-Exemplary1 20E1 enters and exits the Cut-face-of-coconut 18 optimally.

Refer FIGS. 180, 181 and 182 where the above is illustrated.

8. Coconut Expeller: Refer FIG. 172

Variable-Width-Scraper-Apparatus-Exemplary1 20E1 rotates in anti-clockwise direction it rotates Base-bush-fan-Exemplary1 43aE1 as well as scrapes the Coconut-meat 14 to form Scraped-coconut-meat 14a. When Base-bush-fan-Exemplary1 43aE1 rotates in anti-clockwise direction it will create a downward suction and pushes the Scraped-coconut-meat 14a through Expeller-opening 40e into the Expeller-chute 40d. A bowl can be placed at the end of the Expeller-chute 40d to collect the Scraped-coconut-meat 14a. Expeller-vent 40f gives view from outside into the Expeller-chute 40d to view/check the flow of scraped Coconut-meat (Scraped-coconut-meat 14a).

9. Switching off the coconut scraper Refer FIG. 86

There are three ways in which apparatus to scrape Coconut-meat 14 will stop as described below:

1. When On-Off-push-button 64a is pressed a second time: This will trigger a Signal1 64d to Main-controller 65 which has flip-flop circuit Main-controller 65 will send Main-Signal 65b to Main-distributor 66 to disconnect the electrical supply to both Main-motor-driver 63 as well as to Power-unit-input-Alternative2 33cA2 essentially stopping both the rotational motion and the vertical motion to the Variable-Width-Scraper-Apparatus-Exemplary1 20E1.
2. When Timer 64b completes its course of set time and reaches end time: This will trigger a Signal1 64d to Main-controller 65 which has flip flop circuit. Main-controller 65 will send Main-Signal 65b to Main-distributor 66 to disconnect the electrical supply to both Main-motor-driver 63 as well as to Power-unit-input-Alternative2 33cA2 essentially stopping both the rotational motion and the vertical motion to the Variable-Width-Scraper-Apparatus-Exemplary1 20E1.
3. When the whole coconut is scraped: Vertical cycle time is the time duration between two upward flip of the Driver-unit-spdt_switch-handle. This is a varying cycle time as the time increases as the coconut is being scraped. When the Half-coconut 11 is being scraped there is load on the Blade-Exemplary1 22E1 as it scrapes against the Coconut-meat 14 and the Main-Motor 71 will run at load speed. When the Coconut-meat 14 is completely scraped and the blades reach the shell 15, it will have no load and the Main-Motor 71 will run at almost no load speed i.e. faster. Voltage-generator 61 rotates when the Main-Motor 71 rotates and as the speed of rotation increases the voltage generated by Voltage-generator 61 also increases. When Main-Motor 71 rotates at no load speed, voltage generated by Voltage-generator 61 crosses the threshold voltage. At a particular point of time if the voltage generated by Voltage-generator 61 crosses the threshold voltage and sustains it for the duration of the vertical cycle time, it is understood that the whole Half-coconut 11 has been scraped fully. At this point Signal1 62a is sent by Voltage-analyzer 62 to the Main-controller 65 which has flip flop circuit. Main-controller 65 will send Main-Signal 65b to Main-distributor 66 to disconnect the electrical supply to both Main-motor-driver 63 as well as to Power-unit-input-Alternative2 33cA2 essentially stopping both the rotational motion and the vertical motion to the Variable-Width-Scraper-Apparatus-Exemplary1 20E1.

10. Bringing apparatus to scrape coconut to initial position: Refer FIGS. 5a, 30, 114 and 115.

As in all the above three cases, in order to stop the apparatus to scrape coconut, electrical power is disconnected to both Main-motor-driver 63 as well as Power-unit-input-Alternative2 33cA2. This will result in the rotational motion of Variable-Width-Scraper-Apparatus-Exemplary1 20E1 getting stopped as well as neither power-point-sub-unit1 82i nor power-point-sub-unit1 82j having electric power. This is position 3 for Direction-Changer-Unit 80 and Direction-changer-gear3 81d can rotate freely as it is not connected to any motor through gears. As there is weight Chain-sprocket-system2-weight 92e attached to the Chain-sprocket-system2-connecting-rod 92d, there is tendency for this weight to pull the Chain-sprocket-system2-connecting-rod 92d as well as Variable-Width-Scraper-Apparatus-Exemplary1 20E1 downward. As the Direction-changer-gear3 81d is free to rotate there is no hindrance in this movement Hence the Variable-Width-Scraper-Apparatus-Exemplary1 20E1 will move to the lowest position vertically when apparatus to scrape coconut is stopped or switched off. This is the ideal initial position to start the apparatus to scrape coconut.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention in which all terms are meant in their broadest, reasonable sense unless otherwise indicated. Any headings utilized within the description are for convenience only and have no legal or limiting effect.

The Present Disclosure has One or More Following Advantages:

The present disclosure relates generally to a scraping apparatus and more specifically it relates to an apparatus to scrape Coconut-meat to extract it from a half coconut with minimal manual intervention In an embodiment of the present disclosure, apparatus to scrape coconut provides an apparatus to scrape Coconut-meat to extract it from a half coconut with minimal manual intervention.

In another embodiment of the present disclosure, apparatus to scrape coconut provides an apparatus to scrape Coconut-meat to extract it from a half coconut that reduces risk of injury while scraping.

In another embodiment of the present disclosure, apparatus to scrape coconut provides an apparatus to scrape Coconut-meat to extract it from a half coconut that is convenient to use. In another embodiment of the present disclosure, apparatus to scrape coconut provides an apparatus to scrape Coconut-meat to extract it from a half coconut that is faster.

I claim:

1. A scraping apparatus to scrape and extract coconut meat from a half-coconut comprising:
    a variable-width-scraper-apparatus for accommodating a horizontal-width-variability of the half-coconut, said variable-width-scraper-apparatus comprising a body, at least one variably extendable blade adapted to extend outward and scrape considering and accommodating said horizontal-width-variability of said half-coconut across a length of said half-coconut, and a variable-width-scraper-apparatus-shaft functionally connected to a means for generating rotational motion in said variable-width-scraper-apparatus, such that, in use, said variable-width-scraper-apparatus-shaft rotates and said at least one variably extendable blade moves outward to exert pressure on said coconut meat; and
    at least one of a vertical-movement-control-apparatus or a variable-opening-entry-mechanism, wherein said vertical-movement-control-apparatus comprises a driver-unit, a follower-unit, and a driver-unit-power-unit functionally connected to a means for generating reciprocating linear motion in said vertical-movement-control-apparatus and adaptable to a vertical-height-variability of said half-coconut, said vertical-movement-control-apparatus enabling said variable-width-scraper-apparatus to move in a reciprocating linear motion and scrape said half-coconut, wherein said variable-opening-entry-mechanism is adapted to a cut-face-width-variability of said half-coconut for optimally guiding an entry of said variable-width-scraper-apparatus into said half-coconut.

2. The scraping apparatus as claimed in claim 1, wherein said body comprises one or more of:
- at least one body-side-wall, and the body-side-wall comprising smaller blocking-holes and larger non-blocking-holes;
- at least one blocking-hole and at least one blade-track; or
- a body-top-blade for scraping top part of said half-coconut and two body-side-walls on either side separated by a body-side-wall-gap.

3. The scraping apparatus as claimed in claim 1, wherein said at least one variably extendable blade is configured inside said body, with each variably extendable blade having a blade-head, a blade-body, and a blade-tail-block, and wherein said blade-head comprises no teeth, at least one tooth, or six teeth.

4. The scraping apparatus as claimed in claim 1, wherein said driver-unit slides vertically up and down in a driver-unit-frame and said follower-unit slides vertically up and down in a follower-unit-frame or said driver-unit and said follower-unit slides vertically up and down in a frame and wherein said driver-unit-power-unit is electrically connected to said driver-unit and to said means for generating reciprocating linear motion.

5. The scraping apparatus as claimed in claim 1, wherein said driver-unit comprises a driver-unit-spdt_switch, a driver-unit-spdt_switch and said follower-unit comprises at least one follower-unit-arm, a follower-unit-bearing, a follower-unit-connection-rod, and a follower-unit-bearing-ring and wherein said driver-unit-power-unit receives feedback from said driver-unit based on a switching position of a handle of said driver-unit-spdt_switch and sends it to the means for generating reciprocating linear motion.

6. The scraping apparatus as claimed in claim 1, wherein said means for generating reciprocating linear motion in said vertical-movement-control-apparatus comprises a direction-changer-unit and a circular-to-linear-movement-convertor converting rotational motion of a main-motor to linear motion.

7. The scraping apparatus as claimed in claim 1, wherein said variable-opening-entry-mechanism comprises:
- a variable-opening-entry-mechanism-jar, comprising a sloping-wall, where said half-coconut is placed;
- at least a variable-opening-entry-mechanism-guide; and
- a means for said at least one variably extendable blade to be optimally guided by said at least variable-opening-entry-mechanism-guide.

8. The scraping apparatus as claimed in claim 1, wherein said variable-opening-entry-mechanism comprises:
- a variable-opening-entry-mechanism-jar;
- at least a variable-opening-entry-mechanism-guide;
- and a means for blade to be optimally guided by said at least variable-opening-entry-mechanism-guide, wherein said at least one variably extendable blade comprises a guide-wheel and a guide-wheel-connecting-shaft, wherein said at least variable-opening-entry-mechanism-guide comprises a guide1-sloping-side and a guide1-base, wherein said at least one variably extendable blade and said at least variable-opening-entry-mechanism-guide are configured such that said guide-wheel is guided by said guide1-sloping-side, wherein a slope of guide1-sloping-side is such that said at least one variably extendable blade of said variable-width-scraper-apparatus is guided optimally for entry into said half-coconut adapting to the cut-face-width-variability of said half-coconut.

9. The scraping apparatus as claimed in claim 1, wherein said variable-opening-entry-mechanism comprises:
- a variable-opening-mechanism-jar;
- at least a variable-opening-entry-mechanism-guide; and
- a means for said at least one variably extendable blade to be optimally guided by said at least variable-opening-entry-mechanism-guide, wherein said at least one variably extendable blade comprises a guide-wheel and a guide-wheel-connecting-shaft, wherein said at least variable-opening-entry-mechanism-guide comprises a guide1-sloping-side and a guide1-base, wherein said variable-opening-entry-mechanism comprises Intermediate-guide-gear1 and Blade-guide-gear1 and optionally said Intermediate-guide-gear1 and said Blade-guide-gear1 and said Blade-guide-gear1 are configured such that said guide-wheel is guided by said guide1-sloping-side, wherein a slope of guide1-sloping-side is such that said at least one variably extendable blade of said variable-width-scraper-apparatus is guided optimally for entry into said half-coconut adapting to the cut-face-width-variability of said half-coconut.

10. A variable-width-scraper-apparatus for accommodating a horizontal-width-variability of a half-coconut comprising:
- a body;
- at least one variably extendable blade that can extend outward and scrape considering and accommodating the horizontal-width-variability of the half-coconut across a length of said half-coconut; and
- a variable-width-scraper-apparatus-shaft functionally connected to a means for generating rotational motion in said variable-width-scraper-apparatus, such that, in use, said variable-width-scraper-apparatus-shaft rotates and said at least one variably extendable blade moves outward to exert pressure on said half-coconut.

11. The variable-width-scraper-apparatus as claimed in claim 10, wherein said body comprises at least one body-side-wall, and said at least one body-side-wall comprises smaller blocking-holes and larger non-blocking-holes.

12. The variable-width-scraper-apparatus as claimed in claim 10, wherein said body comprises at least one blocking-hole and at least one blade-track.

13. The variable-width-scraper-apparatus as claimed in claim 10, wherein said at least one variably extendable blade is configured inside said body, with each variably extendable blade having a blade-head, a blade-body, and a blade-tail-block.

14. The variable-width-scraper-apparatus as claimed in claim 10, wherein said body comprises a body-top-blade for scraping a top part of said half-coconut and two body-side-walls on either side separated by a body-side-wall-gap.

15. The variable-width-scraper-apparatus as claimed in claim 10, wherein there are two or four variably extendable blades.

16. The variable-width-scraper-apparatus as claimed in claim 10, wherein said at least one variably extendable blade is configured inside said body, with each variably extendable blade having a blade-head, a blade-body, and a blade-tail-block, wherein said blade-head comprises no teeth, at least one tooth, or six teeth for scraping coconut meat in said half-coconut.

17. The variable-width-scraper-apparatus as claimed in claim 10, wherein said at least one variably extendable blade configured inside said body, with each blade having a blade-head, a blade-body, and a blade-tail-block, wherein said blade-head is formed at an angle to said blade-body.

18. A vertical-movement-control-apparatus for accommodating a vertical-height-variability of a half-coconut comprising:
  a driver-unit;
  a follower-unit;
  a driver-unit-power-unit; and
  a means for generating reciprocating linear motion in said vertical-movement-control-apparatus.

19. The vertical-movement-control-apparatus as claimed in claim 18, wherein said driver-unit slides vertically up and down in a driver-unit-frame and said follower-unit slides vertically up and down in a follower-unit-frame; or said driver-unit and said follower-unit slides vertically up and down in a frame.

20. The vertical-movement-control-apparatus as claimed in claim 18, wherein said driver-unit comprises a driver-unit-spdt_switch, a driver-unit-spdt_switch-connection-point, and a driver-unit-spdt_switch-handle which when flipped up or down gives two different switching positions for said driver-unit-spdt_switch, and said follower-unit comprises at least one follower-unit-arm, a follower-unit-bearing, a follower-unit-connection-rod, and a follower-unit bearing-ring.

21. The vertical-movement-control-apparatus as claimed in claim 18, wherein said driver-unit comprises a driver-unit-spdt_switch, connection-point, and a driver-unit-spdt_switch-handle which when flipped up or down gives two different switching positions for said driver-unit-spdt_switch, and said driver-unit-spdt_switch-handle of said driver-unit is functionally connected to said follower-unit.

22. The vertical-movement-control-apparatus as claimed in claim 18, wherein said driver-unit-power-unit is electrically connected to said driver-unit and to said means for generating reciprocating linear motion.

23. The vertical-movement-control-apparatus as claimed in claim 18, wherein said driver-unit comprises a driver-unit-spdt_switch, a driver-unit-spdt_switch-connection-point, and a driver-unit-spdt_switch-handle which when flipped up or down give two different switching positions for said driver-unit-spdt_switch and said driver-unit-power-unit receives feedback from said driver-unit based on a switching position of said driver-unit-spdt_switch-handle.

24. The vertical-movement-control-apparatus as claimed in claim 18, wherein said follower-unit comprises at least on follower-unit-arm, a follower-unit-bearing, a follower-unit-connection-rod, and a follower-unit-bearing-ring and said follower-unit-bearing, said follower-unit-connection-rod, and said follower-unit-bearing-ring of said follower-unit functionally connects said vertical-movement-control-apparatus to a variable-width-scraper-apparatus.

25. The vertical-movement-control-apparatus as claimed in claim 18, wherein said means for generating reciprocating linear motion in said vertical-movement-control-apparatus comprises a circular-to-linear-movement-convertor converting rotational motion of a main-motor to linear motion 78 to 80.

26. The vertical-movement-control-apparatus as claimed in claim 25, wherein said means for generating reciprocating linear motion in said vertical-movement-control-apparatus comprises a chain and sprocket system comprising chain-sprocket-system1 chain-sprocket-system2 and chain-sprocket-system2-connecting-rod, and said driver-unit is connected to said chain-sprocket-system2-connecting-rod.

27. The vertical-movement-control-apparatus as claimed in claim 18, wherein said vertical-movement-control-apparatus comprises follower-unit which slides inside a frame, a chain-sprocket-system2-chain, manual-gear with a vertical-lever to manually power chain-sprocket-system2-chain, a chain-sprocket-system2-connecting-rod to connect chain-sprocket-system2-chain to follower-unit, a follower-unit-bearing, a follower-unit-connection-rod and a follower-unit-bearing-ring used to connect vertical-movement-control-apparatus to variable-width-scraper-apparatus, a follower-unit which slides inside a frame, a chain-sprocket-system2-chain, a manual-gear with a vertical-lever to manually power chain-sprocket-system2-chain, a speed-control-lever with a speed-controller to control a speed of rotation of a main-motor, a chain-sprocket-system2-connecting-rod to connect chain-sprocket-system2-chain to follower-unit-alternative1, a follower-unit-bearing, a follower-unit connection-rod and a follower-unit-bearing-ring used to connect vertical-movement-control-apparatus-alternative1 to variable-width-scraper-apparatus.

28. The vertical-movement-control-apparatus as claimed in claim 18, wherein said driver-unit and follower-unit are functionally connected such that in one direction driver-unit pushes follower-unit and in the opposite direction driver-unit pulls follower-unit and optionally said driver-unit comprises driver-slide-plate which has driver-L-hook enclosing driver-slide-plate-depression and follower-unit comprises follower-slide-plate which has follower-L-hook enclosing follower-slide-plate-depression.

29. A method for scraping and extracting coconut meat from a half-coconut comprising the steps:
  adapting to a horizontal-width-variability of said half-coconut within a horizontal plane using a variable-width-scraper-apparatus and a means configured with said variable-width-scraper-apparatus for generating rotational motion in said variable-width-scraper-apparatus;
  adapting to a vertical-height-variability of said half-coconut using a vertical-movement-control-apparatus and a means configured with said vertical-movement-control-apparatus for generating reciprocating linear motion in said vertical-movement-control-apparatus and enabling said variable-width-scraper-apparatus to move in a reciprocating motion and scrape said half-coconut; and
  adapting to a cut-face-width-variability of said half-coconut using a variable-opening-entry-mechanism for optimally guiding an entry of said variable-width-scraper-apparatus into said half-coconut.

* * * * *